US012760134B2

(12) United States Patent
Durban et al.

(10) Patent No.: US 12,760,134 B2
(45) Date of Patent: Oct. 13, 2026

(54) CURABLE COMPOSITION WITH POLYMERIZABLE MONOMERS AND FILLERS FOR ADDITIVE MANUFACTURING

(71) Applicant: Align Technology, Inc., San Jose, CA (US)

(72) Inventors: Matthew Durban, Sunnyvale, CA (US); John Michael Riedesel, San Jose, CA (US); Peter Dorfinger, Los Altos Hills, CA (US); Yan Chen, Cupertino, CA (US)

(73) Assignee: Align Technology, Inc., San Jose, CA (US)

( * ) Notice: Subject to any disclaimer, the term of this patent is extended or adjusted under 35 U.S.C. 154(b) by 613 days.

(21) Appl. No.: 18/348,289

(22) Filed: Jul. 6, 2023

(65) Prior Publication Data

US 2024/0018289 A1 Jan. 18, 2024

Related U.S. Application Data

(60) Provisional application No. 63/358,673, filed on Jul. 6, 2022.

(51) Int. Cl.

| | |
|---|---|
| ***C08F 222/10*** | (2006.01) |
| ***A61C 7/08*** | (2006.01) |
| ***A61C 13/08*** | (2006.01) |
| ***B29C 64/129*** | (2017.01) |
| ***B29K 35/00*** | (2006.01) |
| ***B29L 31/00*** | (2006.01) |
| ***B33Y 10/00*** | (2015.01) |
| ***B33Y 70/00*** | (2020.01) |
| ***B33Y 80/00*** | (2015.01) |
| ***C08F 2/50*** | (2006.01) |
| ***C08K 3/36*** | (2006.01) |

(52) U.S. Cl.

CPC ............ *C08F 222/102* (2020.02); *A61C 7/08* (2013.01); *A61C 13/08* (2013.01); *B29C 64/129* (2017.08); *B33Y 70/00* (2014.12); *C08F 2/50* (2013.01); *C08F 222/1065* (2020.02); *C08K 3/36* (2013.01); *B29K 2035/00* (2013.01); *B29L 2031/7536* (2013.01); *B33Y 10/00* (2014.12); *B33Y 80/00* (2014.12)

(58) Field of Classification Search

None

See application file for complete search history.

(56) References Cited

U.S. PATENT DOCUMENTS

| | | | |
|---|---|---|---|
| 5,820,368 | A | 10/1998 | Wolk |
| 5,975,893 | A | 11/1999 | Chishti et al. |
| 6,183,248 | B1 | 2/2001 | Chishti et al. |
| 6,309,215 | B1 | 10/2001 | Phan et al. |
| 6,386,864 | B1 | 5/2002 | Kuo |
| 6,450,807 | B1 | 9/2002 | Chishti et al. |
| 6,454,565 | B2 | 9/2002 | Phan et al. |
| 6,471,511 | B1 | 10/2002 | Chishti et al. |
| 6,524,101 | B1 | 2/2003 | Phan et al. |
| 6,572,372 | B1 | 6/2003 | Phan et al. |
| 6,607,382 | B1 | 8/2003 | Kuo et al. |
| 6,705,863 | B2 | 3/2004 | Phan et al. |
| 6,749,414 | B1 | 6/2004 | Hanson et al. |
| 6,783,604 | B2 | 8/2004 | Tricca |
| 6,790,035 | B2 | 9/2004 | Tricca et al. |
| 6,814,574 | B2 | 11/2004 | Abolfathi et al. |
| 6,830,450 | B2 | 12/2004 | Knopp et al. |
| 6,947,038 | B1 | 9/2005 | Anh et al. |
| 7,074,039 | B2 | 7/2006 | Kopelman et al. |
| 7,104,792 | B2 | 9/2006 | Taub et al. |
| 7,121,825 | B2 | 10/2006 | Chishti et al. |
| 7,160,107 | B2 | 1/2007 | Kopelman et al. |
| 7,192,273 | B2 | 3/2007 | McSurdy, Jr. |
| 7,347,688 | B2 | 3/2008 | Kopelman et al. |
| 7,354,270 | B2 | 4/2008 | Abolfathi et al. |
| 7,448,514 | B2 | 11/2008 | Wen |
| 7,481,121 | B1 | 1/2009 | Cao |
| 7,543,511 | B2 | 6/2009 | Kimura et al. |
| 7,553,157 | B2 | 6/2009 | Abolfathi et al. |
| 7,600,999 | B2 | 10/2009 | Knopp |
| 7,658,610 | B2 | 2/2010 | Knopp |
| 7,766,658 | B2 | 8/2010 | Tricca et al. |

(Continued)

FOREIGN PATENT DOCUMENTS

| | | | |
|---|---|---|---|
| CN | 113717330 | A | 11/2021 |
| WO | WO-2015075094 | A1 | 5/2015 |

(Continued)

OTHER PUBLICATIONS

Tumbleston, et al., "Additive Manufacturing. Continuous Liquid Interface Production of 3D Objects," Science (New York, N.Y.), 2015, vol. 347(6228), pp. 1349-1352.

(Continued)

*Primary Examiner* — Robert T Butcher

(74) *Attorney, Agent, or Firm* — Seed Intellectual Property Law Group LLP

(57) ABSTRACT

Disclosed herein are curable compositions containing a plurality of polymerizable monomers comprising at least 80 wt % of a crosslinker for additive manufacturing. The curable compositions comprise high-crosslinker content, and yield tough, lightweight polymeric materials suitable for dental appliances, including but not limited to aligners, attachment placement devices, incremental palatal expanders, dentures, crowns, etc.

26 Claims, 64 Drawing Sheets

(56) References Cited

U.S. PATENT DOCUMENTS

| | | | |
|---|---|---|---|
| 7,771,195 B2 | 8/2010 | Knopp et al. | |
| 7,854,609 B2 | 12/2010 | Chen et al. | |
| 7,871,269 B2 | 1/2011 | Wu et al. | |
| 7,878,801 B2 | 2/2011 | Abolfathi et al. | |
| 7,878,805 B2 | 2/2011 | Moss et al. | |
| 7,883,334 B2 | 2/2011 | Li et al. | |
| 7,892,474 B2 | 2/2011 | Shkolnik et al. | |
| 7,914,283 B2 | 3/2011 | Kuo | |
| 7,947,508 B2 | 5/2011 | Tricca et al. | |
| 8,152,518 B2 | 4/2012 | Kuo | |
| 8,172,569 B2 | 5/2012 | Matty et al. | |
| 8,235,715 B2 | 8/2012 | Kuo | |
| 8,292,617 B2 | 10/2012 | Brandt et al. | |
| 8,337,199 B2 | 12/2012 | Wen | |
| 8,401,686 B2 | 3/2013 | Moss et al. | |
| 8,517,726 B2 | 8/2013 | Kakavand et al. | |
| 8,562,337 B2 | 10/2013 | Kuo et al. | |
| 8,641,414 B2 | 2/2014 | Borovinskih et al. | |
| 8,684,729 B2 | 4/2014 | Wen | |
| 8,708,697 B2 | 4/2014 | Li et al. | |
| 8,758,009 B2 | 6/2014 | Chen et al. | |
| 8,771,149 B2 | 7/2014 | Rahman et al. | |
| 8,899,976 B2 | 12/2014 | Chen et al. | |
| 8,899,977 B2 | 12/2014 | Cao et al. | |
| 8,936,463 B2 | 1/2015 | Mason et al. | |
| 8,936,464 B2 | 1/2015 | Kopelman | |
| 9,022,781 B2 | 5/2015 | Kuo et al. | |
| 9,119,691 B2 | 9/2015 | Namiranian et al. | |
| 9,161,823 B2 | 10/2015 | Morton et al. | |
| 9,241,774 B2 | 1/2016 | Li et al. | |
| 9,326,831 B2 | 5/2016 | Cheang | |
| 9,433,476 B2 | 9/2016 | Khardekar et al. | |
| 9,610,141 B2 | 4/2017 | Kopelman et al. | |
| 9,655,691 B2 | 5/2017 | Li et al. | |
| 9,675,427 B2 | 6/2017 | Kopelman | |
| 9,700,385 B2 | 7/2017 | Webber | |
| 9,744,001 B2 | 8/2017 | Choi et al. | |
| 9,844,424 B2 | 12/2017 | Wu et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,201,409 B2 | 2/2019 | Mason et al. | |
| 10,213,277 B2 | 2/2019 | Webber et al. | |
| 10,299,894 B2 | 5/2019 | Tanugula et al. | |
| 10,363,116 B2 | 7/2019 | Boronkay | |
| 10,383,705 B2 | 8/2019 | Shanjani et al. | |
| D865,180 S | 10/2019 | Bauer et al. | |
| 10,449,016 B2 | 10/2019 | Kimura et al. | |
| 10,463,452 B2 | 11/2019 | Matov et al. | |
| 10,470,847 B2 | 11/2019 | Shanjani et al. | |
| 10,492,888 B2 | 12/2019 | Chen et al. | |
| 10,517,701 B2 | 12/2019 | Boronkay | |
| 10,537,406 B2 | 1/2020 | Wu et al. | |
| 10,537,463 B2 | 1/2020 | Kopelman | |
| 10,548,700 B2 | 2/2020 | Fernie | |
| 10,555,792 B2 | 2/2020 | Kopelman et al. | |
| 10,588,776 B2 | 3/2020 | Cam et al. | |
| 10,613,515 B2 | 4/2020 | Cramer et al. | |
| 10,639,134 B2 | 5/2020 | Shanjani et al. | |
| 10,743,964 B2 | 8/2020 | Wu et al. | |
| 10,758,323 B2 | 9/2020 | Kopelman | |
| 10,781,274 B2 | 9/2020 | Liska et al. | |
| 10,813,720 B2 | 10/2020 | Grove et al. | |
| 10,874,483 B2 | 12/2020 | Boronkay | |
| 10,881,487 B2 | 1/2021 | Cam et al. | |
| 10,912,629 B2 | 2/2021 | Tanugula et al. | |
| 10,959,810 B2 | 3/2021 | Li et al. | |
| 10,993,783 B2 | 5/2021 | Wu et al. | |
| 11,026,768 B2 | 6/2021 | Moss et al. | |
| 11,026,831 B2 | 6/2021 | Kuo | |
| 11,045,282 B2 | 6/2021 | Kopelman et al. | |
| 11,045,283 B2 | 6/2021 | Riley et al. | |
| 11,103,330 B2 | 8/2021 | Webber et al. | |
| 11,123,156 B2 | 9/2021 | Cam et al. | |
| 11,154,382 B2 | 10/2021 | Kopelman et al. | |
| 11,166,788 B2 | 11/2021 | Webber | |
| 11,174,338 B2 | 11/2021 | Liska et al. | |
| 11,219,506 B2 | 1/2022 | Shanjani et al. | |
| 11,259,896 B2 | 3/2022 | Matov et al. | |
| 11,273,011 B2 | 3/2022 | Shanjani et al. | |
| 11,278,375 B2 | 3/2022 | Wang et al. | |
| 11,318,667 B2 | 5/2022 | Mojdeh et al. | |
| 11,331,166 B2 | 5/2022 | Morton et al. | |
| 11,344,385 B2 | 5/2022 | Morton et al. | |
| 11,376,101 B2 | 7/2022 | Sato et al. | |
| 11,419,702 B2 | 8/2022 | Sato et al. | |
| 11,419,710 B2 | 8/2022 | Mason et al. | |
| 11,471,253 B2 | 10/2022 | Venkatasanthanam et al. | |
| 11,497,586 B2 | 11/2022 | Kopelman | |
| 11,504,214 B2 | 11/2022 | Wu et al. | |
| 11,523,881 B2 | 12/2022 | Wang et al. | |
| 11,534,268 B2 | 12/2022 | Li et al. | |
| 11,534,974 B2 | 12/2022 | O'Leary et al. | |
| 11,554,000 B2 | 1/2023 | Webber | |
| 11,564,777 B2 | 1/2023 | Kopelman et al. | |
| 11,571,278 B2 | 2/2023 | Kopelman et al. | |
| 11,571,279 B2 | 2/2023 | Wang et al. | |
| 11,576,750 B2 | 2/2023 | Kopelman et al. | |
| 11,576,752 B2 | 2/2023 | Morton et al. | |
| 11,589,955 B2 | 2/2023 | Medvinskaya et al. | |
| 11,596,502 B2 | 3/2023 | Webber et al. | |
| 11,602,414 B2 | 3/2023 | Sato et al. | |
| 11,642,194 B2 | 5/2023 | Boronkay et al. | |
| 11,642,198 B2 | 5/2023 | Kopelman et al. | |
| 11,666,415 B2 | 6/2023 | Wang et al. | |
| 11,701,203 B2 | 7/2023 | Makarenkova et al. | |
| 11,737,857 B2 | 8/2023 | Derakhshan et al. | |
| 2002/0192617 A1 | 12/2002 | Phan et al. | |
| 2004/0166462 A1 | 8/2004 | Phan et al. | |
| 2004/0166463 A1 | 8/2004 | Wen et al. | |
| 2005/0014105 A1 | 1/2005 | Abolfathi et al. | |
| 2005/0186524 A1 | 8/2005 | Abolfathi et al. | |
| 2005/0244768 A1 | 11/2005 | Taub et al. | |
| 2006/0019218 A1 | 1/2006 | Kuo | |
| 2006/0078841 A1 | 4/2006 | DeSimone et al. | |
| 2006/0115782 A1 | 6/2006 | Li et al. | |
| 2006/0115785 A1 | 6/2006 | Li et al. | |
| 2006/0199142 A1 | 9/2006 | Liu et al. | |
| 2006/0234179 A1 | 10/2006 | Wen et al. | |
| 2008/0118882 A1 | 5/2008 | Su | |
| 2008/0160473 A1 | 7/2008 | Li et al. | |
| 2008/0286716 A1 | 11/2008 | Sherwood | |
| 2008/0286717 A1 | 11/2008 | Sherwood | |
| 2009/0280450 A1 | 11/2009 | Kuo | |
| 2010/0055635 A1 | 3/2010 | Kakavand | |
| 2010/0129763 A1 | 5/2010 | Kuo | |
| 2011/0269092 A1 | 11/2011 | Kuo et al. | |
| 2014/0061974 A1 | 3/2014 | Tyler | |
| 2014/0067334 A1 | 3/2014 | Kuo | |
| 2014/0265034 A1 | 9/2014 | Dudley | |
| 2015/0102532 A1 | 4/2015 | DeSimone et al. | |
| 2016/0193014 A1 | 7/2016 | Morton et al. | |
| 2017/0007359 A1 | 1/2017 | Kopelman et al. | |
| 2017/0135793 A1 | 5/2017 | Webber et al. | |
| 2018/0360567 A1 | 12/2018 | Xue et al. | |
| 2019/0000592 A1 | 1/2019 | Cam et al. | |
| 2019/0000593 A1 | 1/2019 | Cam et al. | |
| 2019/0046297 A1 | 2/2019 | Kopelman et al. | |
| 2019/0099129 A1 | 4/2019 | Kopelman et al. | |
| 2019/0262101 A1 | 8/2019 | Shanjani et al. | |
| 2019/0298494 A1 | 10/2019 | Webber et al. | |
| 2020/0054423 A1 * | 2/2020 | Hagenbuch | A61K 6/78 |
| 2020/0155276 A1 | 5/2020 | Cam et al. | |
| 2020/0172747 A1 | 6/2020 | Bonderer et al. | |
| 2020/0188062 A1 | 6/2020 | Kopelman et al. | |
| 2020/0214598 A1 | 7/2020 | Li et al. | |
| 2021/0038481 A1 | 2/2021 | Takada et al. | |
| 2021/0108014 A9 | 4/2021 | Sun | |
| 2021/0147672 A1 | 5/2021 | Cole et al. | |
| 2021/0353508 A1 | 11/2021 | Hohmann | |
| 2022/0251250 A1 | 8/2022 | Ling et al. | |

(56) References Cited

U.S. PATENT DOCUMENTS

2024/0117081 A1* 4/2024 Hara .................... C09D 11/106
2025/0207005 A1* 6/2025 Suzuki ..................... A61K 6/30

FOREIGN PATENT DOCUMENTS

WO WO-2016078838 A1 5/2016
WO WO-2018032022 A1 2/2018
WO WO-2022109191 A1 5/2022

OTHER PUBLICATIONS

Obrien, et al., "Color Distribution of Three Regions of Extracted Human Teeth," Dental Materials, 1997, vol. 13(3), pp. 179-185.

* cited by examiner

CURABLE COMPOSITION WITH POLYMERIZABLE MONOMERS AND FILLERS FOR ADDITIVE MANUFACTURING

INCORPORATION BY REFERENCE

All publications, patents, and patent applications mentioned in this disclosure are herein incorporated by reference to the same extent as if each individual publication, patent, or patent application was specifically and individually indicated to be incorporated by reference in its entirety. This application claims priority to U.S. Provisional Patent Application No. 63/358,673, filed Jul. 6, 2022, entitled "3D PRINTABLE MATERIAL FOR THE FABRICATION OF PRINTED ORTHODONTIC ATTACHMENTS," the contents of which are hereby incorporated by reference as if set forth fully herein.

BACKGROUND OF THE DISCLOSURE

Orthodontic devices are subject to stringent requirements for strength, flexibility, durability, size, weight, and appearance. While strong devices are often required to affect desired treatment outcomes, such as tooth alignment, practical limitations concerning comfort, appearance, and patient compliance often require these devices be small, lightweight, and transparent or neutral in appearance. Furthermore, for many dental applications, materials must be compatible with high resolution printing methods. As few materials offer this combination of features, new materials are needed to enable current and emerging dental treatment technologies.

SUMMARY OF THE DISCLOSURE

The present disclosure provides a range of curable compositions usable by a range of 3D-printing methods and configured for a variety of practical applications. In many cases, the curable compositions comprise high-crosslinker content, and yield tough, lightweight polymeric materials suitable for medical applications. Many such compositions contain pluralities of crosslinkers varying in size, sidechain functionality, and flexibility, affecting high degrees of molecular-level heterogeneity in the cured and uncured polymers. As such heterogeneity can be important for toughness, color, and translucency, the curable compositions of the present disclosure can be well suited for use in dental devices, including spacers, aligners, one or more incremental palatal expanders, and/or attachment placement devices.

In various aspects, the present disclosure provides a curable composition comprising a plurality of polymerizable monomers, which polymerizable monomers comprise at least 80 wt % of a crosslinker; and at least 10 wt % of a filler material.

In various aspects, the present disclosure provides a curable composition comprising a plurality of polymerizable monomers, which polymerizable monomers comprise at least 80 wt % of a crosslinker; and at least 0.5 wt % of a wetting agent.

In various aspects, the present disclosure provides a curable composition comprising a plurality of polymerizable monomers, which polymerizable monomers comprise at least 80 wt % of a crosslinker; wherein the curable composition is configured to develop a color defined by an L* value between 70 and 95, an a* value of between −11 and 1, and a b* value of between 2 and 22 upon curing.

In various aspects, the present disclosure provides a curable composition comprising a first crosslinker comprising: a first plurality of polymerizable functional groups, and an aryl or a heteroaryl group disposed between at least two polymerizable functional groups of the first plurality of polymerizable functional groups; a second crosslinker comprising a second plurality of polymerizable functional groups, and a carbamate, a glycol, a carbonate, a urea, an ester, an amide, a thioether, a thioester, a guanidine, or a combination thereof disposed between at least two polymerizable functional groups of the second plurality of polymerizable functional groups.

In various aspects, the present disclosure provides a method of repositioning a patient's teeth, the method comprising generating a treatment plan for the patient, the plan comprising a plurality of intermediate tooth arrangements for moving teeth along a treatment path from an initial tooth arrangement toward a final tooth arrangement; providing a dental attachment comprising the printed device generated from a curable composition of a plurality of polymerizable monomers, which polymerizable monomers comprise at least 80 wt % of a crosslinker; and at least 10 wt % of a filler material; and adhering the dental attachment to a tooth of the subject; coupling a dental aligner to the dental attachment, wherein the dental aligner is configured to move at least one of the patient's teeth toward an intermediate tooth arrangement or the final tooth arrangement.

A method of making an attachment placement device, the method comprising obtaining a curable composition of additively manufacturing a printed article comprising the attachment placement device using the curable composition comprising a plurality of polymerizable monomers, which polymerizable monomers comprise at least 80 wt % of a crosslinker; and at least 10 wt % of a filler material.

In various aspects, the present disclosure provides a dental attachment placement device generated from one of above curable compositions by an additive manufacturing process, the curable composition comprising at least one first crosslinker having a rigid backbone between a plurality of first polymerizable functional groups, at least one second crosslinker having a flexible backbone between a plurality of second polymerizable functional groups, and a photoinitiator. The polymeric material formed from the curable composition has a tensible strength of about 50 MPa or greater, a modulus strength of 1200 MPa or greater, and a strain at break of about 4% or greater.

In various aspects, the present disclosure provides a dental attachment placement device generated from a curable composition by an additive manufacturing process. The dental attachment placement device comprises, a body, one or more additively manufactured dental attachments shaped to attach to a person's dentition at corresponding locations, wherein the one or more additively manufactured dental attachments are shaped to engage with corresponding one or more attachment wells of an aligner, and when, engaged with the one or more attachment wells, impart one or more forces to the person's dentition, and one or more additively manufactured supports to removably couple the one or more additively manufactured attachments to the body.

DESCRIPTION OF THE FIGURES

The novel features of the invention are set forth with particularity in the appended claims. A better understanding of the features and advantages of the present disclosure will be obtained by reference to the following detailed description that sets forth illustrative embodiments, in which the principles of the invention are utilized, and the accompanying drawings of which:

DETAILED DESCRIPTION

Figure 1A:
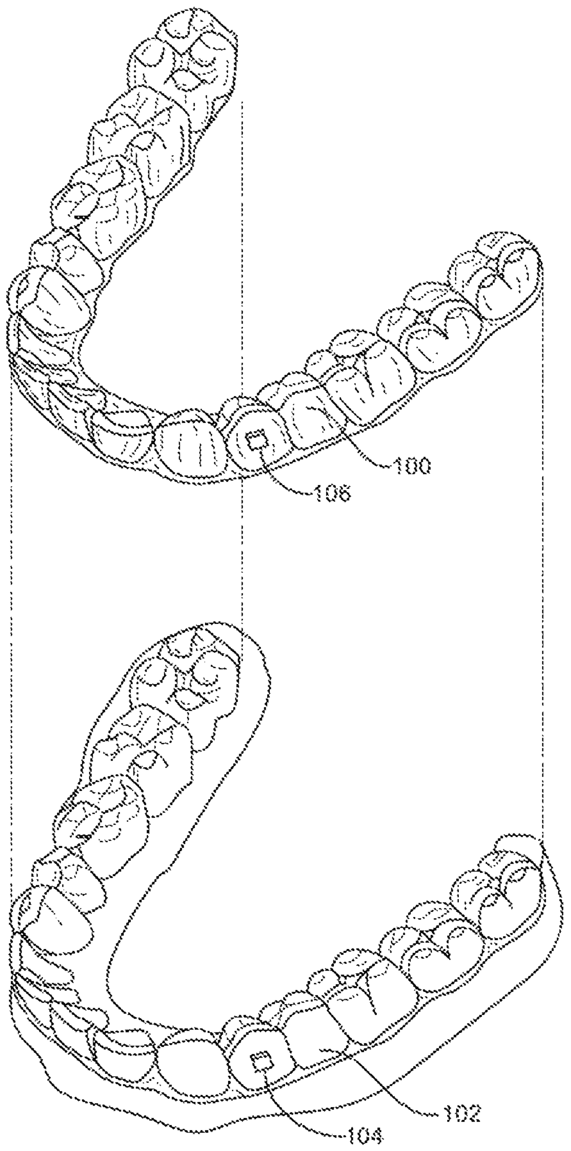
FIG. 1A illustrates a tooth repositioning appliance, in accordance with some embodiments.

The present disclosure provides a range of curable compositions usable by a range of 3D-printing methods and configured for a variety of practical applications. In many cases, the curable compositions comprise high-crosslinker content, and yield tough, lightweight polymeric materials suitable for medical applications. Many such compositions contain pluralities of crosslinkers varying in size, sidechain functionality, and flexibility, affecting high degrees of molecular-level heterogeneity in the cured and uncured polymers. As such heterogeneity can be important for toughness, color, and translucency, the curable compositions of the present disclosure can be well suited for use in dental devices, including spacers, aligners, one or more incremental palatal expanders, and/or attachment placement devices.

I. Definitions

All terms, chemical names, expressions and designations have their usual meanings which are well-known to those skilled in the art. As used herein, the terms "to comprise" and "comprising" are to be understood as non-limiting, i.e., other components than those explicitly named may be included.

Number ranges are to be understood as inclusive, i.e., including the indicated lower and upper limits. Furthermore, the term "about", as used herein, and unless clearly indicated otherwise, generally refers to and encompasses plus or minus 10% of the indicated numerical value(s). For example, "about 10%" may indicate a range of 9% to 11%, and "about 1" may include the range 0.9-1.1.

As used herein, the term "polymer" generally refers to a molecule composed of repeating structural units connected by covalent chemical bonds and characterized by a substantial number of repeating units (e.g., equal to or greater than 20 repeating units and often equal to or greater than 100 repeating units and often equal to or greater than 200 repeating units) and a molecular weight greater than or equal to 5,000 Daltons (Da) or 5 kDa, such as greater than or equal to 10 kDa, 15 kDa, 20 kDa, 30 kDa, 40 kDa, 50 kDa, or 100 kDa. Polymers are commonly the polymerization product of one or more monomer precursors. The term polymer includes homopolymers, i.e., polymers consisting essentially of a single repeating monomer species. The term polymer also includes copolymers which are formed when two or more different types (or species) of monomers are linked in the same polymer. Copolymers may comprise two or more different monomer species, and include random, block, alternating, segmented, grafted, tapered and other copolymers. The term "cross-linked polymers" generally refers to polymers having one or multiple links between at least two polymer chains, which can result from multivalent monomers forming cross-linking sites upon polymerization. In various embodiments, a polymer herein is a telechelic polymer capable of undergoing further polymerization reactions, e.g., with other polymerizable components present in a curable resin.

As used herein, the term "oligomer" generally refers to a molecule composed of repeating structural units connected by covalent chemical bonds and characterized by a number of repeating units less than that of a polymer (e.g., equal to or less than 20 or less than 10 repeating units) and a lower molecular weight than polymers, e.g., less than 5,000 Da or less than 2,000 Da, and in various cases from about 0.5 kDa to about 5 kDa. In some case, oligomers may be the polymerization product of one or more monomer precursors. In various embodiments, an oligomer herein is a telechelic oligomer capable of undergoing further polymerization reactions, e.g., with other polymerizable components present in a curable resin.

As used herein, the terms "telechelic polymer" and "telechelic oligomer" generally refer to a polymer or oligomer the molecules of which are capable of entering, through polymerizable reactive functional groups, into further polymerization.

As used herein, the term "reactive diluent" generally refers to a substance which reduces the viscosity of another substance, such as a monomer or curable resin. A reactive diluent may become part of another substance, such as a polymer obtained by a polymerization process. In some examples, a reactive diluent is a curable monomer which, when mixed with a curable resin, reduces the viscosity of the resultant formulation and is incorporated into the polymer that results from polymerization of the formulation.

Oligomer and polymer mixtures can be characterized and differentiated from other mixtures of oligomers and polymers by measurements of molecular weight and molecular weight distributions.

The molecular weight (M) is a number-average molecular weight ($M_n$), which is the average number of repeating units n times the molecular weight or molar mass ($M_i$) of the repeating unit. The number-average molecular weight ($M_n$) is the arithmetic mean, representing the total weight of the molecules present divided by the total number of molecules.

As used herein, the term "fibre" can refer to an elongated material comprising a length in considerable excess of its height and width. For example, a fibre can be a substantially cylindrical material with a length of at least 50, at least 100, or at least 200 times its diameter. A fibre can comprise a range of materials, including polymers, glasses, ceramics, metals, composites, and combinations thereof. Optionally, a fibre can comprise a hollow cavity extending along a portion or the entirety of its length.

Photoinitiators described in the present disclosure can include those that can be activated with light and initiate polymerization of the polymerizable components of a resin or formulation. A "photoinitiator", as used herein, may generally refer to a compound that can produce radical species and/or promote radical reactions upon exposure to radiation (e.g., UV or visible light).

The term "biocompatible," as used herein, refers to a material that does not elicit an immunological rejection or detrimental effect, referred herein as an adverse immune response, when it is disposed within an in-vivo biological environment. For example, in embodiments a biological marker indicative of an immune response changes less than 10%, or less than 20%, or less than 25%, or less than 40%, or less than 50% from a baseline value when a human or animal is exposed to or in contact with the biocompatible material. Alternatively, immune response may be determined histologically, wherein localized immune response is assessed by visually assessing markers, including immune cells or markers that are involved in the immune response pathway, in and adjacent to the material. In an aspect, a biocompatible material or device does not observably change immune response as determined histologically. In some embodiments, the disclosure provides biocompatible devices configured for long-term use, such as on the order of weeks to months, without invoking an adverse immune response. Biological effects may be initially evaluated by measurement of cytotoxicity, sensitization, irritation and intracutaneous reactivity, acute systemic toxicity, pyrogenicity, subacute/subchronic toxicity and/or implantation. Biological tests for supplemental evaluation include testing for chronic toxicity.

"Bioinert" refers to a material that does not elicit an immune response from a human or animal when it is disposed within an in-vivo biological environment. For example, a biological marker indicative of an immune response remains substantially constant (plus or minus 5% of a baseline value) when a human or animal is exposed to or in contact with the bioinert material. In some embodiments, the disclosure provides bioinert devices.

As used herein, the terms "homogenous" and "homogeneity" may refer to uniformity in a constituent distribution or a property of a composition or material. In some cases, homogenous denotes distributional uniformity at the microscopic, nanoscopic, or chemical level. In some cases, homogenous refers to random distributions of components within a composition or material. In some cases, homogenous denotes spatially invariant chemical or physical properties (e.g., spatially uniform hardness or color) of a composition or material.

As used herein, the terms "heterogenous" and "heterogeneity" may refer to nonuniformity in a constituent distribution or a property of a composition or material. In some cases, "heterogenous" denotes partitioning or patterning within a composition or material. For example, an emulsion may be heterogenous to the degree that two or more components separate into distinct phases. In some cases, heterogenous denotes spatial variance in chemical or physical properties of a composition or material. In some cases, heterogenous denotes nonuniform crystallinity over a portion of a composition or material.

When a group of substituents is disclosed herein, it is understood that all individual members of that group and all subgroups, including any isomers, enantiomers, and diastereomers of the group members, are disclosed separately. When a Markush group or other grouping is used herein, all individual members of the group and all combinations and subcombinations possible of the group are intended to be individually included in the disclosure. When a compound is described herein such that a particular isomer, enantiomer or diastereomer of the compound is not specified, for example, in a formula or in a chemical name, that description is intended to include each isomers and enantiomer of the compound described individually or in any combination. Additionally, unless otherwise specified, all isotopic variants of compounds disclosed herein are intended to be encompassed by the disclosure. Specific names of compounds are intended to be exemplary, as it is known that one of ordinary skill in the art can name the same compounds differently.

It is noted that as used herein and in the appended claims, the singular forms "a", "an", and "the" include plural reference unless the context clearly dictates otherwise. Thus, for example, reference to "a monomer" includes a plurality of such monomers and equivalents thereof known to those skilled in the art, and so forth. As well, the terms "a" (or "an"), "one or more" and "at least one" can be used interchangeably herein. It is also to be noted that the terms "comprising", "including", and "having" can be used interchangeably.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim.

As used herein, the term "group" may refer to a reactive functional group of a chemical compound. Groups of the present compounds refer to an atom or a collection of atoms that are a part of the compound. Groups of the present disclosure may be attached to other atoms of the compound via one or more covalent bonds. Groups may also be characterized with respect to their valence state. The present disclosure includes groups characterized as monovalent, divalent, trivalent, etc. valence states.

As used herein, the term "substituted" refers to a compound (e.g., an alkyl chain) wherein a hydrogen is replaced by another reactive functional group or atom, as described herein.

As used herein, a broken line in a chemical structure can be used to indicate a bond to the rest of the molecule. For example,  in

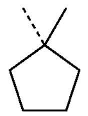

is used to designate the 1-position as the point of attachment of 1-methylcyclopentate to the rest of the molecule. Alternatively,

in, e.g.,

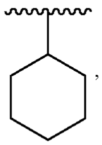 [SMILES: *C1CCCCC1]

can be used to indicate that the given moiety, the cyclohexyl moiety in this example, is attached to a molecule via the bond that is "capped" with the wavy line.

"Aliphatic" or "aliphatic group" as used herein means a straight-chain or branched $C_1$-$C_{30}$ hydrocarbon chain that is completely saturated or that contains one or more units of unsaturation, or a monocyclic $C_3$-$C_{20}$ hydrocarbon or bicyclic $C_8$-$C_{20}$ hydrocarbon that is completely saturated or that contains one or more units of unsaturation, but which is not aromatic (also referred to herein as "cycloalkyl"), that has a single point of attachment to the rest of the molecule where in any individual ring in said bicyclic ring system has 3-7 members. For example, suitable aliphatic groups include, but are not limited to, linear or branched alkyl, alkenyl, alkynyl groups and hybrids thereof such as (cycloalkyl) alkyl, (cycloalkenyl)alkyl or (cycloalkyl)alkenyl.

Alkyl groups include straight-chain, branched and cyclic alkyl groups, unless otherwise defined for a compound or genus of compounds. Alkyl groups include those having from 1 to 30 carbon atoms, unless otherwise defined. Thus, alkyl groups can include small alkyl groups having 1 to 3 carbon atoms, medium length alkyl groups having from 4-10 carbon atoms, as well as long alkyl groups having more than 10 carbon atoms, particularly those having 10-30 carbon atoms. The term cycloalkyl specifically refers to an alky group having a ring structure such as a ring structure comprising 3-30 carbon atoms, optionally 3-20 carbon atoms and optionally 3-10 carbon atoms, including an alkyl group having one or more rings. Cycloalkyl groups include those having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkyl groups can also carry alkyl groups. Cycloalkyl groups can include bicyclic and tricyclic alkyl groups. Alkyl groups are optionally substituted, as described herein. Substituted alkyl groups can include among others those which are substituted with aryl groups, which in turn can be optionally substituted.

Specific alkyl groups include methyl, ethyl, n-propyl, isopropyl, cyclopropyl, n-butyl, s-butyl, t-butyl, cyclobutyl, n-pentyl, branched-pentyl, cyclopentyl, n-hexyl, branched hexyl, and cyclohexyl groups, all of which are optionally substituted. Unless otherwise defined herein, substituted alkyl groups include fully halogenated or semihalogenated alkyl groups, such as alkyl groups having one or more hydrogens replaced with one or more fluorine atoms, chlorine atoms, bromine atoms and/or iodine atoms. Thus, substituted alkyl groups can include fully fluorinated or semifluorinated alkyl groups, such as alkyl groups having one or more hydrogens replaced with one or more fluorine atoms. An alkoxy group is an alkyl group that has been modified by linkage to oxygen and can be represented by the formula R—O and can also be referred to as an alkyl ether group. Examples of alkoxy groups include, but are not limited to, methoxy, ethoxy, propoxy, butoxy and heptoxy. Alkoxy groups include substituted alkoxy groups wherein the alkyl portion of the groups is substituted as provided herein in connection with the description of alkyl groups. As used herein MeO— refers to $CH_3O$—. Moreover, a thioalkoxy group, as used herein is an alkyl group that has been modified by linkage to sulfur atom (instead of an oxygen) and can be represented by the formula R—S.

Alkenyl groups include straight-chain, branched and cyclic alkenyl groups. Alkenyl groups include those having 1, 2 or more double bonds and those in which two or more of the double bonds are conjugated double bonds. Unless otherwise defined herein, alkenyl groups include those having from 2 to 20 carbon atoms. Alkenyl groups include small alkenyl groups having 2 to 3 carbon atoms. Alkenyl groups include medium length alkenyl groups having from 4-10 carbon atoms. Alkenyl groups include long alkenyl groups having more than 10 carbon atoms, particularly those having 10-20 carbon atoms. Cycloalkenyl groups include those in which a double bond is in the ring or in an alkenyl group attached to a ring. The term cycloalkenyl specifically refers to an alkenyl group having a ring structure, including an alkenyl group having a 3-, 4-, 5-, 6-, 7-, 8-, 9- or 10-member carbon ring(s) and particularly those having a 3-, 4-, 5-, 6-, 7- or 8-member ring(s). The carbon rings in cycloalkenyl groups can also carry alkyl groups. Cycloalkenyl groups can include bicyclic and tricyclic alkenyl groups. Alkenyl groups are optionally substituted. Unless otherwise defined herein, substituted alkenyl groups include among others those that are substituted with alkyl or aryl groups, which groups in turn can be optionally substituted. Specific alkenyl groups include ethenyl, prop-1-enyl, prop-2-enyl, cycloprop-1-enyl, but-1-enyl, but-2-enyl, cyclobut-1-enyl, cyclobut-2-enyl, pent-1-enyl, pent-2-enyl, branched pentenyl, cyclopent-1 -enyl, hex-1-enyl, branched hexenyl, cyclohexenyl, all of which are optionally substituted. Substituted alkenyl groups can include fully halogenated or semihalogenated alkenyl groups, such as alkenyl groups having one or more hydrogens replaced with one or more fluorine atoms, chlorine atoms, bromine atoms and/or iodine atoms. Substituted alkenyl groups include fully fluorinated or semifluorinated alkenyl groups, such as alkenyl groups having one or more hydrogen atoms replaced with one or more fluorine atoms.

Aryl groups include groups having one or more 5-, 6-, 7- or 8-membered aromatic rings, including heterocyclic aromatic rings. The term heteroaryl specifically refers to aryl groups having at least one 5-, 6-, 7- or 8-member heterocyclic aromatic ring. Aryl groups can contain one or more fused aromatic rings, including one or more fused heteroaromatic rings, and/or a combination of one or more aromatic rings and one or more nonaromatic rings that may be fused or linked via covalent bonds. Heterocyclic aromatic rings can include one or more N, O, or S atoms in the ring. Heterocyclic aromatic rings can include those with one, two or three N atoms, those with one or two O atoms, and those with one or two S atoms, or combinations of one or two or three N, O or S atoms. Aryl groups are optionally substituted. Substituted aryl groups include among others those that are substituted with alkyl or alkenyl groups, which groups in turn can be optionally substituted. Specific aryl groups include phenyl, biphenyl groups, pyrrolidinyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, and naphthyl groups, all of which are optionally substituted. Substituted aryl groups include fully halogenated or semihalogenated aryl groups, such as aryl groups having one or more hydrogens replaced with one or more fluorine atoms, chlorine atoms, bromine atoms and/or iodine atoms. Substituted aryl groups include fully fluorinated or semifluorinated aryl groups, such as aryl groups having one or more hydrogens replaced with one or more fluorine atoms. Aryl groups include, but are not limited to, aromatic group-containing or heterocyclic aromatic group-containing groups corresponding to any one of the following: benzene, naphthalene, naphthoquinone, diphenylmethane, fluorene, anthracene, anthraquinone, phenanthrene, tetracene, tetracenedione, pyridine, quinoline, isoquinoline, indoles, isoindole, pyrrole, imidazole, oxazole, thiazole, pyrazole, pyrazine, pyrimidine, purine, benzimidazole, furans, benzofuran, dibenzofuran, carbazole, acridine, acridone, phenanthridine, thiophene, benzothiophene, dibenzothiophene, xanthene, xanthone, flavone, coumarin, azulene or anthracycline. As used herein, a group corresponding to the groups listed above expressly includes an aromatic or heterocyclic aromatic group, including monovalent, divalent and polyvalent groups, of the aromatic and heterocyclic aromatic groups listed herein provided in a covalently bonded configuration in the compounds of the disclosure at any suitable point of attachment. In some embodiments, aryl groups contain between 5 and 30 carbon atoms. In some embodiments, aryl groups contain one aromatic or heteroaromatic six-member ring and one or more additional five- or six-member aromatic or heteroaromatic ring. In embodiments, aryl groups contain between five and eighteen carbon atoms in the rings. Aryl groups optionally have one or more aromatic rings or heterocyclic aromatic rings having one or more electron donating groups, electron withdrawing groups and/or targeting ligands provided as substituents.

Arylalkyl groups are alkyl groups substituted with one or more aryl groups wherein the alkyl groups optionally carry additional substituents and the aryl groups are optionally substituted. Specific alkylaryl groups are phenyl-substituted alkyl groups, e.g., phenylmethyl groups. Alkylaryl groups are alternatively described as aryl groups substituted with one or more alkyl groups wherein the alkyl groups optionally carry additional substituents and the aryl groups are optionally substituted. Specific alkylaryl groups are alkyl-substituted phenyl groups such as methylphenyl. Substituted arylalkyl groups include fully halogenated or semihalogenated arylalkyl groups, such as arylalkyl groups having one or more alkyl and/or aryl groups having one or more hydrogens replaced with one or more fluorine atoms, chlorine atoms, bromine atoms and/or iodine atoms.

As used herein, the terms "alkylene" and "alkylene group" are used synonymously and refer to a divalent group "—$CH_2$—" derived from an alkyl group as defined herein. The disclosure includes compounds having one or more alkylene groups. Alkylene groups in some compounds function as attaching and/or spacer groups. Compounds of the disclosure may have substituted and/or unsubstituted $C_1$-$C_{20}$ alkylene, $C_1$-$C_{10}$ alkylene and $C_1$-$C_6$ alkylene groups.

As used herein, the terms "cycloalkylene" and "cycloalkylene group" are used synonymously and refer to a divalent group derived from a cycloalkyl group as defined herein. The disclosure includes compounds having one or more cycloalkylene groups. Cycloalkyl groups in some compounds function as attaching and/or spacer groups. Compounds of the disclosure may have substituted and/or unsubstituted $C_3$-$C_{20}$ cycloalkylene, $C_3$-$C_{10}$ cycloalkylene and $C_3$-$C_5$ cycloalkylene groups.

As used herein, the terms "arylene" and "arylene group" are used synonymously and refer to a divalent group derived from an aryl group as defined herein. The disclosure includes compounds having one or more arylene groups. In some embodiments, an arylene is a divalent group derived from an aryl group by removal of hydrogen atoms from two intra-ring carbon atoms of an aromatic ring of the aryl group. Arylene groups in some compounds function as attaching and/or spacer groups. Arylene groups in some compounds function as chromophore, fluorophore, aromatic antenna, dye and/or imaging groups. Compounds of the disclosure include substituted and/or unsubstituted $C_3$-$C_{30}$ arylene, $C_3$-$C_{20}$ arylene, $C_3$-$C_{10}$ arylene and $C_1$-$C_5$ arylene groups.

As used herein, the terms "heteroarylene" and "heteroarylene group" are used synonymously and refer to a divalent group derived from a heteroaryl group as defined herein. The disclosure includes compounds having one or more heteroarylene groups. In some embodiments, a heteroarylene is a divalent group derived from a heteroaryl group by removal of hydrogen atoms from two intra-ring carbon atoms or intra-ring nitrogen atoms of a heteroaromatic or aromatic ring of the heteroaryl group. Heteroarylene groups in some compounds function as attaching and/or spacer groups. Heteroarylene groups in some compounds function as chromophore, aromatic antenna, fluorophore, dye and/or imaging groups. Compounds of the disclosure include substituted and/or unsubstituted $C_3$-$C_{30}$ heteroarylene, $C_3$-$C_{20}$ heteroarylene, $C_1$-$C_{10}$ heteroarylene and $C_3$-$C_5$ heteroarylene groups.

As used herein, the terms "alkenylene" and "alkenylene group" are used synonymously and refer to a divalent group derived from an alkenyl group as defined herein. The invention includes compounds having one or more alkenylene groups. Alkenylene groups in some compounds function as attaching and/or spacer groups. Compounds of the disclosure include substituted and/or unsubstituted $C_2$-$C_{20}$ alkenylene, $C_2$-$C_{10}$ alkenylene and $C_2$-$C_5$ alkenylene groups.

As used herein, the terms "cycloalkenylene" and "cycloalkenylene group" are used synonymously and refer to a divalent group derived from a cycloalkenyl group as defined herein. The disclosure includes compounds having one or more cycloalkenylene groups. Cycloalkenylene groups in some compounds function as attaching and/or spacer groups. Compounds of the disclosure include substituted and/or unsubstituted $C_3$-$C_{20}$ cycloalkenylene, $C_3$-$C_{10}$ cycloalkenylene and $C_3$-$C_5$ cycloalkenylene groups.

As used herein, the terms "alkynylene" and "alkynylene group" are used synonymously and refer to a divalent group derived from an alkynyl group as defined herein. The disclosure includes compounds having one or more alkynylene groups. Alkynylene groups in some compounds function as attaching and/or spacer groups. Compounds of the disclosure include substituted and/or unsubstituted $C_2$-$C_{20}$ alkynylene, $C_2$-$C_{10}$ alkynylene and $C_2$-$C_5$ alkynylene groups.

As used herein, the terms "halo" and "halogen" can be used interchangeably and refer to a halogen group such as a fluoro (—F), chloro (—Cl), bromo (—Br) or iodo (—I)

The term "heterocyclic" refers to ring structures containing at least one other kind of atom, in addition to carbon, in the ring. Examples of such heteroatoms include nitrogen, oxygen and sulfur. Heterocyclic rings include heterocyclic alicyclic rings and heterocyclic aromatic rings. Examples of heterocyclic rings include, but are not limited to, pyrrolidinyl, piperidyl, imidazolidinyl, tetrahydrofuryl, tetrahydrothienyl, furyl, thienyl, pyridyl, quinolyl, isoquinolyl, pyridazinyl, pyrazinyl, indolyl, imidazolyl, oxazolyl, thiazolyl, pyrazolyl, pyridinyl, benzoxadiazolyl, benzothiadiazolyl, triazolyl and tetrazolyl groups. Atoms of heterocyclic rings can be bonded to a wide range of other atoms and reactive functional groups, for example, provided as substituents.

The term "carbocyclic" refers to ring structures containing only carbon atoms in the ring. Carbon atoms of carbocyclic rings can be bonded to a wide range of other atoms and reactive functional groups, for example, provided as substituents.

The term "alicyclic ring" refers to a ring, or plurality of fused rings, that is not an aromatic ring. Alicyclic rings include both carbocyclic and heterocyclic rings.

The term "aromatic ring" refers to a ring, or a plurality of fused rings, that includes at least one aromatic ring group. The term aromatic ring includes aromatic rings comprising carbon, hydrogen and heteroatoms. Aromatic ring includes carbocyclic and heterocyclic aromatic rings. Aromatic rings are components of aryl groups.

The term "fused ring" or "fused ring structure" refers to a plurality of alicyclic and/or aromatic rings provided in a fused ring configuration, such as fused rings that share at least two intra ring carbon atoms and/or heteroatoms.

As used herein, the term "alkoxyalkyl" refers to a substituent of the formula alkyl-O-alkyl.

As used herein, the term "polyhydroxyalkyl" refers to a substituent having from 2 to 12 carbon atoms and from 2 to 5 hydroxyl groups, such as the 2,3-dihydroxypropyl, 2,3,4-trihydroxybutyl or 2,3,4,5-tetrahydroxypentyl residue.

As used herein, the term "polyalkoxyalkyl" refers to a substituent of the formula alkyl-(alkoxy)$_n$-alkoxy wherein n is an integer from 1 to 10, e.g., 1 to 4, and in some embodiments 1 to 3.

The term "heteroalkyl", as used herein, generally refers to an alkyl, alkenyl or alkynyl group as defined herein, wherein at least one carbon atom of the alkyl group is replaced with a heteroatom. In some instances, heteroalkyl groups may contain from 1 to 18 non-hydrogen atoms (carbon and heteroatoms) in the chain, or from 1 to 12 non-hydrogen atoms, or from 1 to 6 non-hydrogen atoms, or from 1 to 4 non-hydrogen atoms. Heteroalkyl groups may be straight or branched, and saturated or unsaturated. Unsaturated heteroalkyl groups have one or more double bonds and/or one or more triple bonds. Heteroalkyl groups may be unsubstituted or substituted. Exemplary heteroalkyl groups include, but are not limited to, alkoxyalkyl (e.g., methoxymethyl), and aminoalkyl (e.g., alkylaminoalkyl and dialkylaminoalkyl). Heteroalkyl groups may be optionally substituted with one or more substituents.

The term "carbonyl", as used herein, for example in the context of $C_{1-6}$ carbonyl substituents, generally refers to a carbon chain of given length (e.g, $C_{1-6}$), wherein each of the carbon atom of a given carbon chain can form the carbonyl bond, as long as it chemically feasible in terms of the valence state of that carbon atom. Thus, in some instance, the "$C_{1-6}$ carbonyl" substituent refers to a carbon chain of between 1 and 6 carbon atoms, and either the terminal carbon contains the carbonyl functionality, or an inner carbon contains the carbonyl functionality, in which case the substituent could be described as a ketone. The term "carboxy", as used herein, for example in the context of $C_{1-6}$ carboxyl substituents, generally refers to a carbon chain of given length (e.g, $C_{1-6}$), wherein a terminal carbon contains the carboxy functionality, unless otherwise defined herein.

As to any of the groups described herein that contain one or more substituents, it is understood that such groups do not contain any substitution or substitution patterns which are sterically impractical and/or synthetically non-feasible. In addition, the compounds of this disclosure include all stereochemical isomers arising from the substitution of these compounds.

Unless otherwise defined herein, optional substituents for any alkyl, alkenyl and aryl group includes substitution with one or more of the following substituents, among others:

halogen, including fluorine, chlorine, bromine or iodine;

pseudohalides, including —CN, —OCN (cyanate), —NCO (isocyanate), —SCN (thiocyanate) and —NCS (isothiocyanate);

—COOR, where R is a hydrogen or an alkyl group or an aryl group and more specifically where R is a methyl, ethyl, propyl, butyl, or phenyl group all of which groups are optionally substituted;

—COR, where R is a hydrogen or an alkyl group or an aryl group and more specifically where R is a methyl, ethyl, propyl, butyl, or phenyl group all of which groups are optionally substituted;

—$CON(R)_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$OCON(R)_2$, where each R, independently of each other R, is a hydrogen or an alkyl group or an aryl group and more specifically where R is a methyl, ethyl, propyl, butyl, or phenyl group all of which groups are optionally substituted; and where R and R can form a ring which can contain one or more double bonds and can contain one or more additional carbon atoms;

—$N(R)_2$, where each R, independently of each other R, is a hydrogen, or an alkyl group, or an acyl group or an aryl group and more specifically where R is a methyl, ethyl, propyl, butyl, phenyl or acetyl group, all of which are optionally substituted; and where R and R can form a ring that can contain one or more double bonds and can contain one or more additional carbon atoms;

—SR, where R is hydrogen or an alkyl group or an aryl group and more specifically where R is hydrogen, methyl, ethyl, propyl, butyl, or a phenyl group, which are optionally substituted;

—$SO_2R$, or —SOR, where R is an alkyl group or an aryl group and more specifically where R is a methyl, ethyl, propyl, butyl, or phenyl group, all of which are optionally substituted;

—OCOOR, where R is an alkyl group or an aryl group;

—$SO_2N(R)_2$, where each R, independently of each other R, is a hydrogen, or an alkyl group, or an aryl group all of which are optionally substituted and wherein R and R can form a ring that can contain one or more double bonds and can contain one or more additional carbon atoms; and —OR, where R is H, an alkyl group, an aryl group, or an acyl group all of which are optionally substituted. In a particular example R can be an acyl yielding —OCOR", wherein R" is a hydrogen or an alkyl group or an aryl group and more specifically where R" is methyl, ethyl, propyl, butyl, or phenyl groups all of which groups are optionally substituted.

Specific substituted alkyl groups include haloalkyl groups, particularly trihalomethyl groups and specifically trifluoromethyl groups. Specific substituted aryl groups include mono-, di-, tri, tetra- and pentahalo-substituted phenyl groups; mono-, di-, tri-, tetra-, penta-, hexa-, and hepta-halo-substituted naphthalene groups; 3- or 4-halo-substituted phenyl groups, 3- or 4-alkyl-substituted phenyl groups, 3- or 4-alkoxy-substituted phenyl groups, 3- or 4-RCO— substituted phenyl, 5- or 6-halo-substituted naphthalene groups. More specifically, substituted aryl groups include acetylphenyl groups, particularly 4-acetylphenyl groups; fluorophenyl groups, particularly 3-fluorophenyl and 4-fluorophenyl groups; chlorophenyl groups, particularly 3-chlorophenyl and 4-chlorophenyl groups; methylphenyl groups, particularly 4-methylphenyl groups; and methoxyphenyl groups, particularly 4-methoxyphenyl groups.

As to any of the above groups that contain one or more substituents, it is understood that such groups do not contain any substitution or substitution patterns which are sterically impractical and/or synthetically non-feasible. In addition, as further described herein, the compounds of this disclosure can include all stereochemical isomers (and racemic mixtures) arising from the substitution of these compounds.

II. Curable Compositions

The present disclosure provides a range of curable compositions, as well as solid polymeric materials printed therefrom. In many cases, a curable composition of the present disclosure comprises a plurality of crosslinkers with varying molecular weights, sizes, and/or non-polymerizable functionalizations, such that polymers generated from the curable composition comprise high degrees of molecular-level heterogeneity which can be important for toughness and proper appearance. In some cases, the curable composition is photocurable, chemically curable, thermocurable, or any combination thereof. In some cases, the composition is photocurable.

In some embodiments, the curable composition comprises a resin matrix including a plurality of polymerizable monomers, which polymerizable monomers comprise at least 80 weight percent (wt %) of a crosslinker. In some cases, the curable composition comprises at least 10 wt % of a filler material. In some cases, the filler material is an inorganic material. In some cases, the curable composition comprises a wetting agent. In some cases, the curable composition comprises a photoinitiator. In some cases, the curable composition comprises a pigment. In some cases, the curable composition comprises a glass transition temperature modifier. In some cases, the curable composition comprises a reactive diluent. In some cases, the curable composition comprises a UV blocker.

In some cases, the curable composition is configured to develop a particular color upon curing (e.g., upon reaching at least 95% completion of curing). The color of the curable or cured composition can often be described with L*, a*, and b* values, which can denote lightness, red-green scale, and blue-yellow scale, respectively, wherein L* values span from 0 to 100, with 0 indicating no brightness (i.e., black), and 100 indicating diffuse white; a* values can span from −128 to 128, with −128 indicating green, 128 indicating red, and values in between −128 and 128 reflecting combinations of green and red; and b* values can span from −128 to 128, with −128 indicating blue, 128 indicating yellow, and values in between −128 and 128 indicating combinations of blue and yellow. In some cases, the curable composition is configured to develop a color defined by an L* value between 70 and 95, an a* value of between −11 and 1, and a b* value of between 2 and 22 upon curing. In some cases, the curable composition is configured to develop a color defined by an L* value between 78 and 87, an a* value of between −7 and −3, and a b* value of between 8 and 16 upon curing. In some cases, the curable composition is configured to develop a color which shade matches a tooth of a subject. In some cases, the curable composition is configured to have a transmittance for 550 nm and 650 nm light of between 40% and 100% upon curing into a 1 mm to 12 mm thick object. In some cases, the curable composition is configured to have a transmittance for 550 nm and 650 nm light of between 40% and 75% upon curing into a 1 mm to 12 mm thick object. In some cases, the curable composition is configured to have a transmittance for 550 nm and 650 nm light of between 60% and 100% upon curing into a 1 mm to 12 mm thick object. In some cases, the curable composition is configured to have a transmittance for 550 nm and 650 nm light of a translucency of between 50% and 90% upon curing into a 1 mm to 12 mm thick object.

In many cases, a majority of polymerizable functional groups of the curable composition comprise ethylenically unsaturated functional groups. In some cases, between about 50 and about 100 mol percent (mol %) of functional groups of the plurality of polymerizable monomers are ethylenically unsaturated functional groups. In some cases, between about 70 and about 100 mol % of functional groups of the plurality of polymerizable monomers are ethylenically unsaturated functional groups. In some cases, between about 80 and about 100 mol % of functional groups of the plurality of polymerizable monomers are ethylenically unsaturated functional groups. In some cases, between about 90 and about 100 mol % of functional groups of the plurality of polymerizable monomers are ethylenically unsaturated functional groups. In some cases, between about 95 and about 100 mol % of functional groups of the plurality of polymerizable monomers are ethylenically unsaturated functional groups. In some cases, between about 60 and about 90 mol % of functional groups of the plurality of polymerizable monomers are ethylenically unsaturated functional groups. For example, a curable composition consistent with the present disclosure can be entirely comprised of acrylate and/or methacrylate-based crosslinkers.

In some cases, the curable composition comprises from between about 50 wt % and about 100 wt %, between about 70 and about 100 wt %, between about 80 and about 100 wt %, between about 90 and about 100 wt %, between about 95 and 100 wt %, or between about 60 and about 90 wt % of the polymerizable monomers.

In some cases, between about 50 and about 100 mol %, between about 70 and about 100 mol %, between about 80 and about 100 mol %, between about 90 and about 100 mol %, between about 95 and 100 mol %, or between about 60 and about 90 mol % of functional groups of the plurality of polymerizable functional groups of the curable composition are acrylate, methacrylate, acrylamide, methacrylamide, vinyl ether, styryl, or a combination thereof. In some cases, between about 50 and about 100 mol %, between about 70 and about 100 mol %, between about 80 and about 100 mol %, between about 90 and about 100 mol %, between about 95 and 100 mol %, or between about 60 and about 90 mol % of polymerizable functional groups of the curable composition are acrylate, methacrylate, or a combination thereof.

In some cases, between about 50 and about 100 mol percent of polymerizable monomers of the curable composition comprise a molecular weight of at least 250 Da. In some cases, between about 70 and about 100 mol percent of polymerizable monomers of the curable composition comprise a molecular weight of at least 250 Da. In some cases, between about 90 and about 100 mol percent of polymerizable monomers of the curable composition comprise a molecular weight of at least 250 Da. In some cases, between about 50 and about 100 mol percent of polymerizable monomers of the curable composition comprise a molecular weight of at least 500 Da. In some cases, between about 70 and about 100 mol percent of polymerizable monomers of the curable composition comprise a molecular weight of at least 500 Da. In some cases, between about 80 and about 100 mol percent of polymerizable monomers of the curable composition comprise a molecular weight of at least 500 Da.

1) Crosslinkers

Many instances of the curable compositions disclosed herein comprise high crosslinker loadings. In some cases, the crosslinker is at least 85 wt % of the polymerizable monomers. In some cases, the crosslinker is at least 90 wt % of the polymerizable monomers. In some cases, the crosslinker is at least 95 wt % of the polymerizable monomers. In some cases, the crosslinker is at least 97.5 wt % of the polymerizable monomers. In some cases, the crosslinker is at least 99 wt % of the polymerizable monomers. Such high crosslinker loadings can lead to high viscosities and low vapor pressures in the curable compositions, as well as high toughness, elastic moduli, and swelling resistance in materials printed therefrom.

In many cases, the crosslinker comprises a plurality of crosslinkers. As combinations of crosslinkers can impart properties not achievable with single crosslinker compositions, the curable composition can comprise two or more crosslinkers with distinct structures and properties. In some cases, the use of multiple, structurally distinct crosslinkers can lead to molecular level heterogeneity which can be important for optical transparency, low scattering, and low refraction, and toughness. Use of multiple, structurally distinct crosslinkers is important because heterogeneity from using multiple types allows for multiple phases within the material. Different components can provide hard or soft phases, and a range of distances between crosslinks. This allows to have a material that is both stiff and tough. Furthermore, in some cases, the use of multiple, structurally distinct crosslinkers can diminish crystallization. For example, while a high concentration of a urethane acrylate can promote lamellae and crystalline domain formation, addition of an aromatic crosslinker, such as a bisphenol α-glycidyl methacrylate, can promote molecular-level heterogeneity disruptive towards ordered packing.

Accordingly, in some cases, a curable composition comprises at least two, at least three, at least four, at least five, or at least six crosslinkers. In some cases, the curable composition comprises between two and five crosslinkers. In some cases, the curable composition comprises between three and four crosslinkers. In some cases, at least a subset of the crosslinkers are present within 10-fold weight percentages within the curable composition. In some cases, at least a subset of the crosslinkers are present within 5-fold weight percentages within the curable composition. In some cases, at least a subset of the crosslinkers are present within 3-fold weight percentages within the curable composition. In some cases, the crosslinkers are present within 10-fold weight percentages within the curable composition. In some cases, the crosslinkers are present within 5-fold weight percentages within the curable composition. In some cases, the crosslinkers are present within 3-fold weight percentages within the curable composition. For example, the curable composition can comprise between 15.8 wt % and 36.8 wt % of two, three, four, five, or six crosslinkers.

In some cases, the curable composition comprises multiple crosslinkers with different molecular weights. In some cases, crosslinkers of a plurality of crosslinkers comprise molecular weights differing by at least 100 Da, at least 150 Da, at least 200 Da, at least 250 Da, at least 350 Da, at least 500 Da, at least 750 Da, or at least 1000 Da. In some cases, between about 50 and about 100 mol %, between about 70 and about 100 mol %, between about 80 and about 100 mol %, between about 90 and about 100 mol %, between about 95 and 100 mol %, or between about 60 and about 90 mol % of crosslinkers of a curable composition comprise a molecular weight of at least 200 Da, at least 250 Da, at least 350 Da, at least 500 Da, at least 750 Da, or at least 1000 Da. In some cases, between about 50 and about 100 mol percent of crosslinkers of a curable composition comprise a molecular weight of at least 250 Da. In some cases, between about 90 and about 100 mol percent of crosslinkers of a curable composition comprise a molecular weight of at least 250 Da. In some cases, the curable composition comprises at least one crosslinker with a molecular weight of less than 1000 Da. In some cases, the curable composition comprises at least one crosslinker with a molecular weight of less than 750 Da. In some cases, the curable composition comprises at least one crosslinker with a molecular weight of less than 500 Da. In some cases, the curable composition comprises at least one crosslinker with a molecular weight of less than 300 Da. In some cases, the crosslinker with a molecular weight of less than 1000 Da, less than 750 Da, less than 500 Da, or less than 300 Da constitutes at least 10 wt % of the curable composition.

In some cases, the crosslinker comprises two polymerizable functional groups. In some cases, the crosslinker comprises three polymerizable functional groups. In some cases, the crosslinker comprises four or more polymerizable functional groups. In some cases, the crosslinker comprises between two and four polymerizable functional groups. In some cases, a plurality of crosslinkers of a curable composition each comprise two polymerizable functional groups. In some cases, between about 50 and about 100 wt % of crosslinkers of a plurality of crosslinkers comprise two polymerizable functional groups. In some cases, between about 70 and about 100 wt % of crosslinkers of a plurality of crosslinkers comprise two polymerizable functional groups. In some cases, between about 90 and about 100 wt % of crosslinkers of a plurality of crosslinkers comprise two polymerizable functional groups. In some cases, between about 95 and about 100 wt % of crosslinkers of a plurality of crosslinkers comprise two polymerizable functional groups. In some cases, between about 50 and about 100 molar percent (mol %) of crosslinkers of a plurality of crosslinkers comprise two polymerizable functional groups. In some cases, between about 70 and about 100 mol % of crosslinkers of a plurality of crosslinkers comprise two polymerizable functional groups. In some cases, between about 90 and about 100 mol % of crosslinkers of a plurality of crosslinkers comprise two polymerizable functional groups. In some cases, between about 95 and about 100 mol % of crosslinkers of a plurality of crosslinkers comprise two polymerizable functional groups.

As crosslinker length can influence molecular-level packing such as hydrogen bonding, Van der Waals interactions, and polymer entangling, a crosslinker of the present disclosure can comprise a range of lengths. In some cases, a crosslinker comprises at least 6, at least 8, at least 10, at least 12, at least 14, at least 18, at least 22, or at least 30 atoms between polymerizable functional groups (e.g., Decanediol dimethacrylate (DDDMA) can be taken to contain 10 atoms between its methacrylate groups). In some cases, a crosslinker comprises at least 8 atoms between polymerizable functional groups. In some cases, a plurality of crosslinkers of a curable composition each comprise at least 6, at least 8, at least 10, at least 12, at least 14, at least 18, at least 22, or at least 30 atoms. In some cases, the plurality of crosslinkers each comprise at least 8 atoms between polymerizable functional groups.

In some cases, the crosslinker comprises an aryl, heteroaryl, a carbamate, a glycol, a carbonate, a urea, an ester, an amide, a thioether, a thioester, a guanidine, or a combination thereof within a backbone (e.g., disposed between at least two polymerizable functional groups). In some cases, the crosslinker comprises an alkane backbone, an alkane diol backbone, an oligoethylene glycol backbone, a bisphenyl backbone, a glycidyl backbone, a urethane backbone, or a combination thereof.

In some cases, the crosslinker comprises an epoxy acrylate (e.g., a Bisphenol A epoxy acrylate), an epoxy methacrylate (e.g., a Bisphenol A epoxy methacrylate), a novolac type epoxy acrylate (e.g., cresol novolac epoxy acrylate or phenol novolac epoxy acrylate), a modified epoxy acrylate (e.g., phenyl epoxy acrylate, aliphatic alkyl epoxy acrylate, soybean oil epoxy acrylate, Photocryl© DP296, Photocryl® E207/25TP, Photocryl® E207/25HD, or Photocryl® E207/30PE), a urethane acrylate, an aliphatic urethane acrylate (e.g., aliphatic difunctional acrylate, aliphatic trifunctional acrylate, aliphatic multifunctional acrylate), an aromatic urethane acrylate (e.g., aromatic difunctional acrylate, aromatic trifunctional acrylate, aromatic multifunctional acrylate), a urethane methacrylate, an aliphatic urethane methacrylate, an aromatic urethane methacrylate, a polyester acrylate (e.g., trifunctional polyester acrylate, tetrafunctional polyester acrylate, difunctional polyester acrylate, hexafunctional polyester acrylate), a silicone acrylate (e.g., silicone urethane acrylate, silicone polyester acrylate), a melamine acrylate, a dendritic acrylate, an acrylic acrylate, a caprolactone monomer acrylate (e.g., caprolactone methacrylate, caprolactone acrylate), an oligo amine acrylate (e.g., amine acrylate, aminated polyester acrylate), a diphenol acrylate, a diphenol methacrylate, an alkyl acrylate, an alkyl methacrylate, an alkanediol acrylate, an alkanediol methacrylate, a derivative thereof, or a combination thereof. Non-limiting examples of aliphatic urethane acrylates include difunctional aliphatic acrylates (e.g., Miramer PU210, Miramer PU2100, Miramer PU2560, Miramer SC2404, Miramer SC2565, Miramer UA5216, Miramer U307, Miramer U3195, or Photocryl DP102), trifunctional aliphatic acyrlates (e.g., Miramer PU320, Miramer PU340, Miramer PU3450, Miramer U375, or Photocryl DP225), tetrafunctional aliphatic acrylates (e.g., Miramer U3304), hexafunctional aliphatic acrylates (e.g., Miramer MU9800), multifunctional aliphatic acrylates (e.g., Miramer MU9800 or Miramer SC2152), or combinations thereof.

2) Filler Materials

The curable composition can comprise a filler material which does not participate in polymerization, but which, upon curing, becomes fixed within the cured resin, affecting its material properties. For example, addition of a filler material to a curable composition can decrease vapor pressure and increase viscosity prior to curing and enhance the strength, storage modulus, and stiffness of polymeric materials printed therefrom. Furthermore, in some cases, filler material can inhibit crack or deformation propagation, shielding small breaks from spreading throughout a printed material. For practical applications such as dental appliances, filler material can lower overall mass and thickness requirements and increase lifespan. Such enhancements can be particularly important for orthodontic appliances, such as dental attachments, which may require continuous or repeated use over extended timeframes. For example, a tooth alignment program may rely on a single set of dental attachments retaining shape, strength, and integrity over multiple years of treatment. In many cases, the filler material is an inorganic material. In particular cases, the filler material is a radioopaque material, which may increase the detectability of the curable composition by imaging systems while minimally affecting appearance and color.

The filler material can be heterogeneously distributed throughout the curable composition or a material printed therefrom. In some cases, the filler material is homogeneously dispersed throughout the curable composition. Such homogeneous dispersal can be achieved, for example, by agitation or mixing of the curable composition prior to or during curing. In some cases, the filler material is homogeneously distributed along a first dimension or set of dimensions, and unevenly distributed along a second dimension or set of dimensions. For example, the filler material can be randomly dispersed throughout a length and width of a curable composition, and unevenly distributed along a height of the curable composition. The filler material can be patterned, for example along a transverse or longitudinal wave, or along a concentration gradient. The filler material can also be concentrated within an interior space or along a surface of the curable composition or material printed therefrom. In some cases, the filler material is patterned within the curable composition. In such cases, the filler material may be concentrated along a longitudinal or transverse wave, a complex pattern, a gradient, or a combination thereof. In some cases, the filler material can be provided as a weave (e.g., overlapping, non-parallel fibers), clusters, sheets, or combinations thereof.

The curable composition can comprise filler material over a range of weight percentages. A filler material can be a minor constituent of a curable composition, for example accounting for less than 5 weight percent (wt %), or can account for a majority of the weight of the curable composition. In some cases, the filler material is present as at least 0.05 wt %, at least 0.5 wt %, at least 1 wt %, at least 2 wt %, at least 3 wt %, at least 5 wt %, at least 8 wt %, at least 10 wt %, at least 12 wt %, at least 15 wt %, at least 20 wt %, at least 25 wt %, at least 30 wt %, at least 40 wt %, at least wt %, at least 60 wt %, at least 70 wt %, at least 75 wt %, or at least 80 wt % of the curable composition. In some cases, the filler material is present as at most 80 wt %, at most 75 wt %, at most 70 wt %, at most 60 wt %, at most 50 wt %, at most 40 wt %, at most 30 wt %, at most 25 wt %, at most 20 wt %, at most 15 wt %, at most 10 wt %, at most 8 wt %, at most 5 wt %, at most 3 wt %, at most 2 wt %, at most 1 wt %, or at most 0.5 wt % of a curable resin. In some cases, the filler material is present between 0.05 and 60 wt %, between 1 and 5 wt %, between 1 and 10 wt %, between 1 and 20 wt %, between 2 and 5 wt %, between 2 and 10 wt %, between 2 and 20 wt %, between 3 and 6 wt %, between 3 and 10 wt %, between 3 and 20 wt %, between 5 and 10 wt %, between 5 and 25 wt %, between 8 and 20 wt %, between 10 and 60 wt %, between 12 and 25 wt %, between 15 and 30 wt %, between 15 and 40 wt %, between 20 and 35 wt %, between 25 and 50 wt %, between 30 and 50 wt %, between 35 and 65 wt %, between 40 and 65 wt %, between 40 and wt %, between 50 and 75 wt %, or between 60 and 80 wt % of the curable composition. In some cases, the filler material is present between 10 and 60 wt % of the curable composition. In some cases, the filler material is present between 20 and 60 wt % of the curable composition. In some cases, the filler material is present between 20 and 40 wt % of the curable composition. In some cases, the filler material is present between 30 and 50 wt % of the curable composition.

The filler material can comprise a mass of between about 0.05 and about 500 μg per discrete unit (e.g., for at least 80%, 95%, or 99% of constituent particles, fibers, glass shards, etc.). The filler material can comprise a mass of between about 0.05 and about 5 μg, between about 0.1 and about 10 μg, between about 0.25 and about 15 μg, between about 0.5 and about 30 μg, between about 1 and about 50 μg, between about 10 and about 100 μg, or between about 50 and about 500 μg per discrete unit. The filler material can comprise an average width or diameter between about 2 and about 500 microns, between about 2 and about 200 microns, between about 2 and about 100 microns, between about 2 and about 50 microns, between about 2 and about 25 microns, between about 5 and about 500 microns, between about 5 and about 200 microns, between about 5 and about 100 microns, between about 5 and about 50 microns, between about 5 and about 50 microns, between about 5 and about 25 microns, between about 10 and about 500 microns, between about and about 200 microns, between about 10 and about 100 microns, between about 10 and about microns, between about 10 and about 50 microns, between about 10 and about 25 microns, between about 25 and about 500 microns, between about 25 and about 200 microns, between about and about 100 microns, between about 25 and about 50 microns, between about 50 and about 500 microns, between about 50 and about 200 microns, between about 50 and about 100 microns, or between about 100 and about 500 microns.

In some cases, the filler material comprises a pre-polymerized species. As non-limiting examples, prepolymerized species can comprise a saccharide, such as hyaluronic acid, chitosan, or cellulose acetate butyrate (CAB); a synthetic polymer such as a polyurethane, a polyacrylate, a polymethacrylate, a polyethylene, a polystyrene, a polyvinyl, a polyester, or a polyether; or a combination thereof. The prepolymerized species can be linear or branched, and can comprise a defined 3-dimensional structure, such as a star, a dendrimer, a sheet, a particle-like structure, a brush-like structure, or a combination thereof.

In some cases, the filler material is an inorganic filler material. As non-limiting examples, the inorganic filler material can comprise a silica, a glass, a ceramic, a metal oxide, a crystal, a carbon nanomaterial (e.g., a carbon nanotube, a fullerene, graphene, graphite, diamond), an inorganic semiconductor (e.g., gallium arsenide, silicon, boron phosphide or arsenide), or a combination thereof. In some cases, the filler material comprises a nanoparticle or a microparticle. In some cases, the filler material is provided as nanoparticles or microparticles. In some cases, the filler material is provided as a powder.

The filler material can comprise a mass of between about 0.05 and about 500 μg per discrete unit (e.g., per particle, fiber, glass shard, etc.). The filler material can comprise a mass of between about 0.05 and about 5 μg, between about 0.1 and about 10 μg, between about 0.25 and about 15 μg, between about 0.5 and about 30 μg, between about 1 and about 50 μg, between about and about 100 μg, or between about 50 and about 500 μg per discrete unit. The filler material can comprise an average width or diameter between about 2 and about 500 microns, between about 2 and about 200 microns, between about 2 and about 100 microns, between about 2 and about 50 microns, between about 2 and about 25 microns, between about 5 and about 500 microns, between about 5 and about 200 microns, between about 5 and about 100 microns, between about 5 and about 50 microns, between about 5 and about 50 microns, between about 5 and about 25 microns, between about 10 and about 500 microns, between about 10 and about 200 microns, between about and about 100 microns, between about 10 and about 50 microns, between about 10 and about microns, between about 10 and about 25 microns, between about 25 and about 500 microns, between about 25 and about 200 microns, between about 25 and about 100 microns, between about and about 50 microns, between about 50 and about 500 microns, between about 50 and about 200 microns, between about 50 and about 100 microns, or between about 100 and about 500 microns.

3) Wetting Agents

In some cases, the curable composition comprises a wetting agent. As wetting agents can modify printed material surface properties, inclusion of a wetting agent can enhance suitability for 3D printing. In some cases, a wetting agent can increase hydrophilicity and wettability, and thus can be important for medical devices configured for use in wet environments, such as those experienced by orthodontic appliances. In many cases, wetting agents decrease water surface tension along the surface of a printed material, promoting water coating formation so as to diminish contact between a printed material and surrounding tissues (e.g., between a dental attachment and buccal mucosa).

The wetting agent can comprise a hydrophilic material, such as a siloxane, a polyamide, a polylactone, a phosphate ester, a polylactam, or a combination thereof. In particular cases, the wetting agent comprises a siloxane. In some cases, the siloxane is a polyether-modified polydimethylsiloxane.

In some cases, the curable composition comprises from between about 0.01 to about 3 wt % of the wetting agent. In some cases, the curable composition comprises from about 0.05 to about 1.5 wt %, from about 0.1 to about 1.5 wt %, from about 0.3 to about 1.5 wt %, from about 0.1 to about 1 wt %, from about 0.1 to about 0.5 wt %, from about 0.2 to about 1 wt %, from about 0.3 to about 0.7 wt %, or from about 0.4 to about 1 wt % of the wetting agent.

4) Pigments

The curable composition can further comprise a pigment. As appearance can be important for medical devices which are visible during use, such as many of the orthodontic appliances disclosed herein, careful selections of base matrix materials (e.g., polymerizable species) and additives are often required for patient contentment and compliance. Nonetheless, simultaneous optimization of appearance and mechanical properties can be challenging. For example, while some urethanes provide combinations of mechanical attributes (e.g., hardness) suitable for use in dental attachments, many of these urethanes also contribute to strong opaque amber or green visual profiles often considered undesirable for orthodontic appliances (which are instead often preferred as clear or color-neutral). Surprising results disclosed herein include combinations of polymerizable species, physical property modifying materials (e.g., fillers and wetting agents), and pigments which provide desired physical and visual characteristics for medical applications.

In some embodiments, the curable composition comprises a pigment. In some cases, the pigment comprises an inorganic or organometallic species. In some cases, the pigment comprises an organic species, such as an anthraquinone, a diazo, an isoindolinone, a benzimidazolone, a diketo pyrrolo pyrrole, an isoindolinone, a naphthol, a phthalocyanine, or a dioxazine. In some cases, the pigment is a metal oxide, such as titanium dioxide, zinc oxide, iron oxide (e.g., wüstite (FeO), magnetite ($Fe_3O_4$), alpha phase hematite ($\alpha$-$Fe_2O_3$), beta phase hematite ($\beta$-$Fe_2O_3$), maghemite ($\gamma$-$Fe_2O_3$), or epsilon phase iron oxide ($\varepsilon$-$Fe_2O_3$)), cobalt oxide, yttrium oxide, aluminum oxide, or a combination thereof. In some cases, the pigment is a metal salt, such as an yttrium salt (e.g., yttrium acetate, yttrium chloride, yttrium formate, yttrium carbonate, yttrium sulfamate, yttrium silicate, yttrium lactate, yttrium nitrate, yttrium bromide, yttrium hydroxide, yttrium molybdate, yttrium sulfate, yttrium silicate, yttrium fluoride, or yttrium oxalate), barium sulphate ($BaSO_4$), bismuth vanadate, nickel antimony, ammonium manganese pyrophosphate ($NH_4MnP_2O_7$), zinc sulphide (ZnS), lithopone, buff titanium ($TiO_2$ and iron oxide) or a combination thereof. These pigment materials can be crystalline or amorphous. In some cases, the pigment is an opaque crystalline material having a high degree of crystallinity in excess of 50% by volume.

In some cases, the curable composition comprises from about 0.001 to about 3 wt % of the pigment. In some cases, the curable composition comprises from about 0.005 to about 2 wt % of the pigment. In some cases, the curable composition comprises from about 0.005 to about 0.5 wt % of the pigment. In some cases, the curable composition comprises from about 0.01 to about 0.3 wt % of the pigment. In some cases, the curable composition comprises from about 0.005 to about wt % of the pigment.

In some cases, the curable composition is configured to develop a color defined by an L* value between 70 and 95, an a* value of between −11 and 1, and a b* value of between 2 and 22 upon curing. In some cases, the curable composition is configured to develop a color defined by an L* value between 78 and 87, an a* value of between −7 and −3, and a b* value of between 8 and 16 upon curing. In some cases, the curable composition is configured to develop a high degree of transparency upon curing. In some cases, the curable composition is configured to develop opaqueness upon curing. In some cases, the curable composition, upon curing, has an average light transmittance over the visible light spectrum (about 380 to about 700 nanometers) of at least about 50%, at least about 60%, at least about 70%, at least about 80%, at least about 85%, at least about 90%, or at least about 95%. In some cases, upon curing into a 1 to 12 mm thick object, the curable composition has a total transmittance over the visible light spectrum (about 380 to about 700 nanometers) of at most about 60%, at most about 50%, at most about 40%, at most about 30%, at most about 20%, at most about 10%, or at most about 5%. In some cases, upon curing into a 1 to 12 mm thick object, the curable composition has a total transmittance of 550 nm light of between 40% and 100%, between 40% and 75%, between 60% and 100%, or between 50% and 90%. In some cases, upon curing into a 1 to 12 mm thick object, the curable composition has a total transmittance of 650 nm light of between 40% and 100%, between 40% and 75%, between 60% and 100%, or between 50% and 90%.

5) Reactive Diluents

The curable composition can comprise a reactive diluent homogenously or heterogenously dispersed or patterned therethrough. The degree of heterogenous partitioning (e.g., emulsification) or homogeneity can be controlled with a method or device disclosed herein, for example through agitation prior to printing. In some cases, the degree of heterogeneity in a curable composition can be controlled through addition of solvents or reactive diluents. In various cases, a reactive diluent can comprise an acrylate or methacrylate moiety for incorporation into an oligomeric or polymeric backbone, coupled to a linear or cyclic (e.g., mono-, bi-, or tricyclic) side-chain moiety. Generally, any aliphatic, cycloaliphatic or aromatic molecule with a monofunctional polymerizable reactive functional group can be used (also includes liquid crystalline monomers). In some instances, the polymerizable reactive functional groups are acrylate or methacrylate groups. In some instances, a reactive diluent is a syringol, guaiacol, or vanillin derivative, for example homosalic methacrylate (HSMA), syringyl methacrylate (SMA), isobornyl methacrylate (IBOMA), or isobornyl acrylate (IBOA). In some cases, the reactive diluent used herein can have a low vapor pressure, low viscosity, or a combination thereof. In some embodiments, however, low amounts (e.g., 5% w/w or less) of a reactive diluent may be used. In some embodiments, no reactive diluent is used.

In some embodiments, the reactive diluent comprises an acrylate, a methacrylate, an acrylamide, or a methacrylamide monomer. In some cases, the reactive diluent comprises an acrylate or a methacrylate monomer. In some cases, the acrylate or methacrylate monomer is selected from n-butyl acrylate, iso-decyl acrylate, n-decyl methacrylate, n-dodecyl acrylate, n-dodecyl methacrylate, 2-ethylhexyl acrylate, 2-(2-ethoxyethoxy)ethyl acrylate, n-hexyl acrylate, 2-methoxyethylacrylate, n-octyl methacrylate, 2-phenylethyl acrylate, n-propyl acrylate, and tetrahydrofurfuryl acrylate.

6) Photoinitiators

In various embodiments, the curable composition herein is a photo-curable composition. Such photo-curable compositions described herein can comprise one or more photoinitiators. Such photoinitiator, when activated with light of an appropriate wavelength (e.g., UV/VIS) can initiate a polymerization reaction (e.g., during photo-curing) between the telechelic polymers, monomers, and other potentially polymerizable components that may be present in the photo-curable resin, to form a polymeric material as further described herein. Generally, photoinitiators described in the present disclosure can include those that can be activated with light and initiate polymerization of the polymerizable components of the formulation. A “photoinitiator”, as used herein, may generally refer to a compound that can produce radical species and/or promote radical reactions upon exposure to radiation (e.g., UV or visible light).

In some embodiments, the photo-curable composition herein comprises 0.05 to 1 wt %, to 2 wt %, 0.05 to 3 wt %, 0.05 to 4 wt %, 0.05 to 5 wt %, 0.1 to 1 wt %, 0.1 to 2 wt %, 0.1 to 3 wt %, 0.1 to 4 wt %, 0.1 to 5 wt %, 0.1 to 6 wt %, 0.1 to 7 wt %, 0.1 to 8 wt %, 0.1 to 9 wt %, or 0.1 to 10 wt %, based on the total weight of the composition, of a photoinitiator. In some embodiments, the photoinitiator is a free radical photoinitiator. In certain embodiments, the free radical photoinitiator comprises an alpha hydroxy ketone moiety (e.g., 2-hydroxy-2-methylpropiophenone or 1-hydroxycyclohexyl phenyl ketone), an alpha-amino ketone (e.g., 2-benzyl-2-(dimethylamino)-4'-morpholinobutyrophenone or 2-methyl-1-[4-(methylthio)phenyl]-2-morpholinopropan-1-one), 4-methyl benzophenone, an azo compound (e.g., 4,4'-Azobis(4-cyanovaleric acid), 1,1'-Azobis(cyclohexanecarbonitrile, Azobisisobutyronitrile, 2,2'-Azobis(2-methylpropionitrile), or 2,2'-Azobis(2-methylpropionitrile)), an inorganic peroxide, an organic peroxide, or any combination thereof. In some embodiments, the composition comprises a photoinitiator comprising TPO-L (ethyl (2,4,6-trimethylbenzoyl)phenyl phosphinate). In some embodiments, a photo-curable resin comprises a photoinitiator selected from a benzophenone, a mixture of benzophenone and a tertiary amine containing a carbonyl group which is directly bonded to at least one aromatic ring, 2-methyl-1-[4-(methylthio)-phenyl]-2-morpholino-propanone-1 or 2,2-dimethoxy-1,2-diphenylethan-1-one. In some embodiments, the photoinitiator comprises an acetophenone photoinitiator (e.g., 4'-hydroxyacetophenone, 4'-phenoxyacetophenone, 4'-ethoxyaceto-phenone), a benzoin, a benzoin derivative, a benzil, a benzil derivative, a benzophenone (e.g., 4-benzoylbiphenyl, 3,4-(dimethylamino)benzophenone, 2-methylbenzophenone), a cationic photoinitiator (e.g., diphenyliodonium nitrate, (4-iodophenyl)diphenylsulfonium triflate, triphenylsulfonium triflate), an anthraquinone, a quinone (e.g., camphorquinone), a phosphine oxide, a phosphinate, 9,10-phenanthrenequinone, a thioxanthone, a coumarin (e.g., 3-benzoyl-7-methoxycoumarin, 3-benzoyl-6,8-dichlorocoumarin, 7-diethylamino-3-thienoylcoumarin), a benzoylformate (e.g., methyl benzoylformate), any combination thereof, or any derivative thereof.

In some embodiments, the photoinitiator can have a maximum wavelength absorbance between 200 and 300 nm, between 300 and 400 nm, between 400 and 500 nm, between 500 and 600 nm, between 600 and 700 nm, between 700 and 800 nm, between 800 and 900 nm, between 150 and 200 nm, between 200 and 250 nm, between 250 and 300 nm, between 300 and 350 nm, between 350 and 400 nm, between 400 and 450 nm, between 450 and 500 nm, between 500 and 550 nm, between 550 and 600 nm, between 600 and 650 nm, between 650 and 700 nm, or between 700 and 750 nm. In some embodiments, the photoinitiator has a maximum wavelength absorbance between 300 to 500 nm.

In some embodiments, the curable composition may include a phosphine oxide photoinitiator capable of absorbing light in the range of about 300 to about 600 nm. Examples of phosphine oxide photoinitiators include ethyl 2,4,6-trimethylbenzylphenyl phosphinate (TPO), bis(2,4,6-trimethylbenzoyl)phenyl phosphine oxide (BAPO819), and bis(2,6-dimethoxybenzoyl)-(2,4,4-trimethylpentyl) phosphine oxide. In some embodiments, the curable composition includes a photoinitiator system containing two or more phosphine oxide photoinitiators. In some embodiments, the photoinitiator system includes a 25:75 mixture, by weight, of bis(2,6-dimethoxybenzoyl)-2,4,4-trimethylpentyl phosphine oxide and 2-hydroxy-2-methyl-1-phenylpropan-1-one, a 1:1 mixture, by weight, of bis(2,4,6-trimethylbenzoyl) phenyl phosphine oxide and 2-hydroxy-2-methyl-1-phenylpropane-1-one, and a 25:75 mixture, by weight, of BAPO and oligo[2-hydroxy-2-methyl-1-[4-(1-methylvinyl) phenyl]propanone. In one specific embodiments, the photoinitiator system includes 1 wt % BAPO along with 3 wt % oligo[2-hydroxy-2-methyl-144-(1-methylvinyl) phenyl] based on a total weight of the curable composition.

7) Glass Transition Temperature Modifier

In some embodiments, the curable composition herein comprises a component in addition to a polymerizable compound described herein that can alter the glass transition temperature of the cured polymeric material. In such instances, a glass transition temperature modifier (also referred to herein as a $T_g$ modifier or a glass transition modifier) can be present in a photo-curable resin from about 0 to 50 wt %, based on the total weight of the composition. The $T_g$ modifier can have a high glass transition temperature, which leads to a high heat deflection temperature, which can be necessary to use a material at elevated temperatures. In some embodiments, the curable resin comprises 0 to 80 wt %, 0 to 75 wt %, 0 to 70 wt %, 0 to 65 wt %, 0 to 60 wt %, 0 to 55 wt %, 0 to 50 wt %, 1 to 50 wt %, 2 to 50 wt %, 3 to 50 wt %, 4 to 50 wt %, 5 to 50 wt %, 10 to 50 wt %, 15 to 50 wt %, 20 to 50 wt %, 25 to 50 wt %, 30 to 50 wt %, 35 to 50 wt %, 0 to 40 wt %, 1 to 40 wt %, 2 to 40 wt %, 3 to 40 wt %, 4 to 40 wt %, 5 to 40 wt %, 10 to 40 wt %, 15 to 40 wt %, or 20 to 40 wt % of a $T_g$ modifier. In certain embodiments, the curable resin comprises 0-50 wt % of a glass transition modifier. In some instances, the number average molecular weight of the $T_g$ modifier is 0.4 to 5 kDa. In some embodiments, the number average molecular weight of the $T_g$ modifier is from 0.1 to 5 kDa, from 0.2 to 5 kDa, from 0.3 to 5 kDa, from 0.4 to 5 kDa, from 0.5 to 5 kDa, from 0.6 to kDa, from 0.7 to 5 kDa, from 0.8 to 5 kDa, from 0.9 to 5 kDa, from 1.0 to 5 kDa, from 0.1 to 4 kDa, from 0.2 to 4 kDa, from 0.3 to 4 kDa, from 0.4 to 4 kDa, from 0.5 to 4 kDa, from 0.6 to 4 kDa, from 0.7 to 4 kDa, from 0.8 to 4 kDa, from 0.9 to 4 kDa, from 1 to 4 kDa, from 0.1 to 3 kDa, from 0.2 to 3 kDa, from 0.3 to 3 kDa, from 0.4 to 3 kDa, from 0.5 to 3 kDa, from 0.6 to 3 kDa, from 0.7 to 3 kDa, from 0.8 to 3 kDa, from 0.9 to 3 kDa, or from 1 to 3 kDa. A polymerizable compound of the present disclosure (which can, in some cases, act by itself as a $T_g$ modifier) and a separate $T_g$ modifier compound can be miscible and compatible in the methods described herein. When used in the subject compositions, the $T_g$ modifier may provide for high $T_g$ and strength values, sometimes at the expense of elongation at break. In some cases, a toughness modifier may provide for high elongation at break and toughness via strengthening effects, and a polymerizable monomer described herein may improve the processability of the formulations, e.g., by acting as a reactive diluent, particularly of those compositions comprising high amounts of toughness modifiers, while maintaining high values for strength and $T_g$.

In some embodiments, the $T_g$ modifier comprises a plurality of aliphatic rings. In certain embodiments, the $T_g$ modifier comprises a plurality of aliphatic rings. In some embodiments, the aliphatic rings are hydrocarbon rings. In some embodiments, the aliphatic rings are saturated. In some embodiments, the plurality of aliphatic rings comprise cyclobutane, cyclopentane, cyclohexane, cycloheptane, cyclooctane, cyclononane, cyclodecane, or any combination thereof. In some embodiments, the plurality of aliphatic rings include bridged ring structures. In some embodiments, the plurality of aliphatic rings include fused ring structures. In certain embodiments, the middle portion of the $T_g$ modifier comprises a cyclohexane-1,4-dicarboxylic acid, a cyclohexanedimethanol, a cyclohexane-1,4-diylbis(methylene) dicarbamate, or a combination thereof. In certain embodiments, the center of the $T_g$ modifier structure comprises a cyclohexane-1,4-diylbis(methylene) dicarbamate (e.g., TGM1, TGM2, and TGM3).

In some embodiments, the $T_g$ modifier comprises a methacrylate. In some embodiments, the $T_g$ modifier comprises at least two methacrylates. In certain embodiments, the Tg modifier has terminal portions comprising methacrylates. In some embodiments, the Tg modifier has a structure that terminates at each end with a methacrylate. In some embodiments, the Tg modifier is a bis(2-methacrylate).

In some embodiments, the $T_g$ modifier is selected from H1188 (bis((2-((methacryloyloxy)methyl)octahydro-1H-4,7-methanoinden-5-yl)methyl) cyclohexane-1,4-dicarboxylate), TGM1, TGM2, TGM3, TGM4, or combinations thereof.

In some embodiments, the $T_g$ modifier is H1188:

H1188

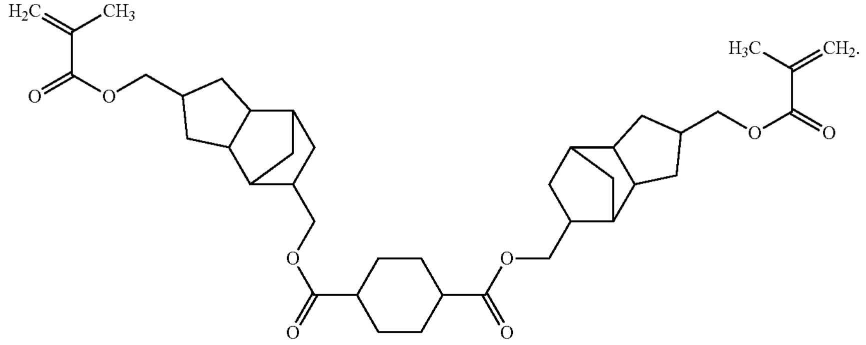

In some embodiments, the $T_g$ modifier is TGM1:

TGM1

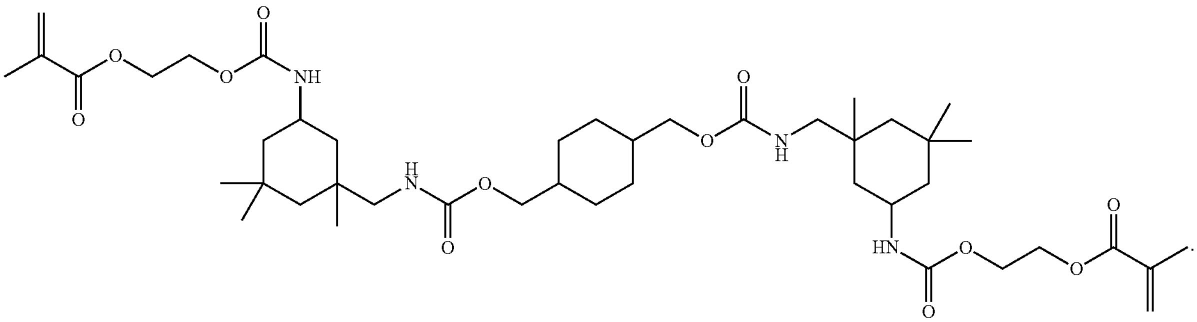

In some embodiments, the $T_g$ modifier is TGM2:

TGM2

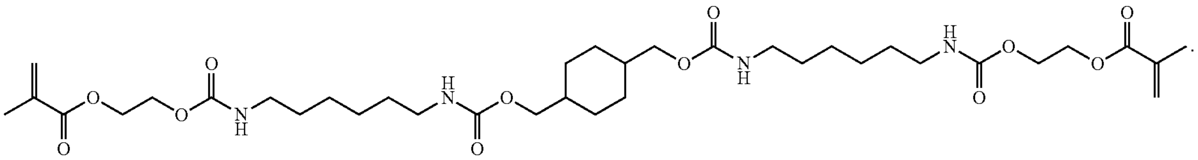

In some embodiments, the $T_g$ modifier is TGM3:

TGM3

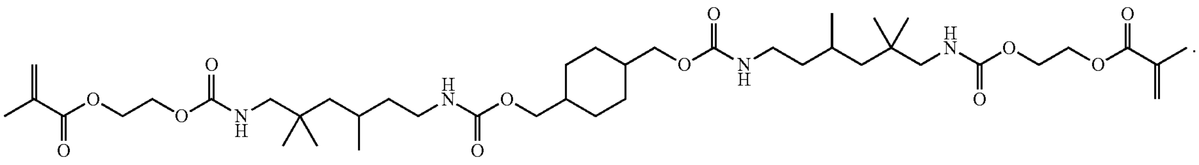

In some embodiments, the $T_g$ modifier is TGM4:

TGM4

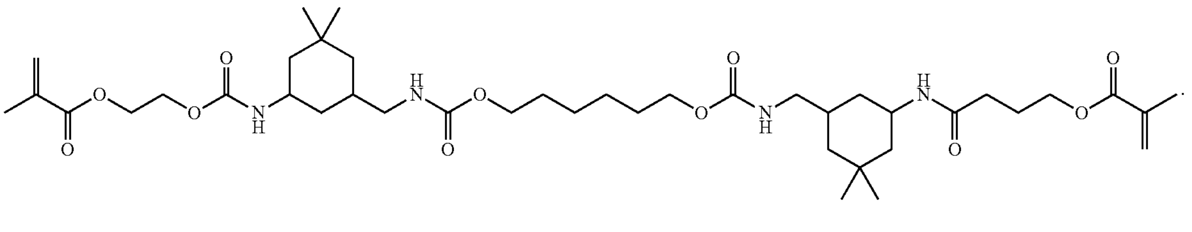

8) UV Blocker

In some embodiments, the curable composition comprises a UV blocker. The UV blocker can absorb UV light to reduce or present the rapid degradation of color when the orthodontic appliance is in use. As a result, the color stability of the orthodontic appliance is improved. In some embodiments, the curable composition herein comprises 0.05 to 1 wt %, 0.05 to 2 wt %, 0.05 to 3 wt %, 0.05 to 4 wt %, 0.05 to 5 wt %, 0.1 to 1 wt %, 0.1 to 2 wt %, 0.1 to 3 wt %, 0.1 to 4 wt %, 0.1 to 5 wt %, or 0.1 to 6 wt %, based on the total weight of the composition, of a UV blocker. Examples of UV blockers include, but are not limited to, triazines, benzoxazinones, benzotriazoles, benzophenones, benzoates, formamidines, cinnamates/propenoates, aromatic propanediones, benzimidazoles, cycloaliphatic ketones, formanilides (including oxamides), cyanoacrylates, benzopyranones, salicylates, vinillins, and mixtures thereof. In some more specfic embodiments, the UV blocker includes 2-hydroxy-4-n-octyloxybenzophenone, 2-hydroxy-4-methoxybenzophenone, 2-hydroxy-4-methoxy-5-sulfobenzophe none, 2-(4-benzoyl-3-hydroxyphenoxy)-2-propenoic acid ethyl ester, 2,2'-dihydroxy-4-methoxybenzophenone, dioxybenzone, 2-hydroxy-4-(2-hydroxy-3-decyloxypropoxy)benzophenone, 2-hydroxy-4-(2-hydroxy-3-octyloxypropoxy) benzophenone; 2,4,4'-Trihydroxybenzophenone, 2-hydroxy-4-(isooctyloxy)benzophenone, 2-hydroxy-4-dodecyloxybenzophenone, 2,2'-dihydroxy-4,4'-dimethoxy-5, 5'-disulfobenzophenone, disodium salt; 2,4-dihydroxybenzophenone, 4-benzoylresorcinol, 2,2'-Dihydroxy-4,4'-dimethoxybenzophenone, 2,2',4,4'-tetrahydroxybenzophenone, 2,2'-Dihydroxy-4-(2-hydroxyethoxy)benzophenone, 2-hydroxy-4-benzyloxybenzophenone, or mixtures thereof.

In some embodiments, the curable composition further comprises an optical brightener used in combination with a UV absorber to raise the cutoff wavelength and increases blueness to the materials by absorbing UV radiation and re-emit it as fluorescence in the blue region. Examples of optical brighteners include, but are not limited to, stilbenes, disuphonates, tetrasulphonates, and hexasulphonates. In some embodiments, the curable composition herein comprises 0.005 to 0.6 wt %, 0.001 to 0.8 wt %, 0.05 to 0.2 wt %, or 0.1 to 0.3 wt %, based on the total weight of the composition, of an optical brightener.

In some embodiments, the curable composition further comprises a hindered amine light stabilizer (HALS) comprising at least one secondary or tertiary amine groups used in combination with a UV absorber to improve the photostability. Examples of HALS include, but are not limited to, oxo-piperazinyl-triazine, bis-(2,2,6,6-tetramethyl-4-piperidinyl)sebacate or Bis-(1,2,2,6,6-pentamethyl-4-piperidinyl)-2-n-butyl-2-(3,5-di-tert-butyl-4-hydroxybenzyl)malonate. In some embodiments, the curable composition herein comprises 0.001 to 2 wt % or 0.05 to 1 wt %, based on the total weight of the composition, of a HALS.

9) Solvents

In some embodiments, the curable composition comprises a solvent. In some embodiments, the solvent is nonpolar. In certain embodiments, the nonpolar solvent comprises pentane, cyclopentane, hexane, cyclohexane, benzene, toluene, 1,4-dioxane, chloroform, diethyl ether, dichloromethane, a derivative thereof, or a combination thereof. In some embodiments, the solvent is polar and aprotic. In certain embodiments, the polar aprotic solvent comprises tetrahydrofuran, ethyl acetate, acetone, dimethylformamide, acetonitrile, DMSO, propylene carbonate, a derivative thereof, or a combination thereof. In some embodiments, the solvent comprises a polar protic solvent. In certain embodiments, the polar protic solvent comprises formic acid, n-butanol, isopropyl alcohol, n-propanol, t-butanol, ethanol, methanol, acetic acid, water, a derivative thereof, or a combination thereof. In some embodiments, the photo-curable resin comprises less than 90%, less than 80%, less than 70%, less than 60%, less than 50%, less than 40%, less than 30%, less than 20%, less than 15%, less than 10%, less than 5%, less than 3%, less than 2%, or less than 1% of the solvent by weight. In some cases, the solvent is configured to evaporate or separate from the curable composition following curing.

10) Curable Resin Properties

A curable composition of the present disclosure can be capable of being 3D printed at a temperature greater than 25° C. In some cases, the printing temperature is at least about 30° C., 40° C., 50° C., 60° C., 80° C., or 100° C. As described herein, a polymerizable monomer of this disclosure that can part of the curable composition, can have a low vapor pressure and/or mass loss at the printing temperature, thereby providing improved printing conditions compared to conventional compositions used in additive manufacturing.

In some embodiments, a curable composition herein has a melting temperature greater than room temperature. In some embodiments, the curable composition has a melting temperature greater than 20° C., greater than 25° C., greater than 30° C., greater than 35° C., greater than 40° C., greater than 45° C. greater than 50° C., greater than 55° C., greater than 60° C., greater than 65° C., greater than 70° C., greater than 75° C., or greater than 80° C. In some embodiments, the curable composition has a melting temperature from 20° C. to 250° C., from 30° C. to 180° C., from 40° C. to 160° C., or from 50° C. to 140° C. In some embodiments, the curable composition has a melting temperature greater than 60° C. In other embodiments, the curable composition has a melting temperature from 80° C. to 110° C. In some instances, a curable composition can have a melting temperature of about 80° C. before polymerization, and after polymerization, the resulting polymeric material can have a melting temperature of about 100° C.

In certain instances, it may be advantageous that a curable composition is in a liquid phase at an elevated temperature. As an example, a conventional curable composition can comprise polymerizable components that may be viscous at a process temperature, and thus can be difficult to use in the fabrication of objects (e.g., using 3D printing). As a solution for that technical problem, the present disclosure provides curable composition comprising photo-polymerizable components such as monomers described herein that can melt at an elevated temperature, e.g., at a temperature of fabrication (e.g., during 3D printing), and can have a decreased viscosity at the elevated temperature, which can make such curable compositions more applicable and usable for uses such as 3D printing. Hence, in some embodiments, provided herein are curable composition that are a liquid at an elevated temperature. In some embodiments, the elevated temperature is at or above the melting temperature ($T_m$) of the curable compositions. In certain embodiments, the elevated temperature is a temperature in the range from about 40° C. to about 100° C., from about ° C. to about 100° C., from about 80° C. to about 100° C., from about 40° C. to about 150° C., or from about 150° C. to about 350° C. In some embodiments, the elevated temperature is a temperature above about 40° C., above about 60° C., above about 80° C., or above about 100° C. In some embodiments, a curable composition herein is a liquid at an elevated temperature with a viscosity less than about 50 PaS, less than 2 about 0 PaS, less than about 10 PaS, less than about 5 PaS, or less than about 1 PaS. In some embodiments, a curable composition herein is a liquid at an elevated temperature of above about 40° C. with a viscosity less than about 20 PaS. In yet other embodiments, a curable composition herein is a liquid at an elevated temperature of above about ° C. with a viscosity less than about 1 PaS.

In some embodiments, at least a portion of a curable composition herein has a melting temperature below about 100° C., below about 90° C., below about 80° C., below about 70° C., or below about 60° C. In some embodiments, at least a portion of a curable composition herein melts at an elevated temperature between about 100° C. and about 20° C., between about 90° C. and about ° C., between about 80° C. and about 20° C., between about 70° C. and about 20° C., between about ° C. and about 20° C., between about 60° C. and about 10° C., or between about 60° C. and about 0° C.

In various embodiments, a curable composition herein as well as its photo-polymerizable components can be biocompatible, bioinert, or a combination thereof. In various instances, the photo-polymerizable compounds of a composition herein can have biocompatible and/or bioinert metabolic (e.g., hydrolysis) products.

A curable composition of the present disclosure can comprise less than about 20 wt % or less than about 10 wt % hydrogen bonding units. In some aspects, a curable composition herein comprises less than about 15 wt %, less than about 10 wt %, less than about 9 wt %, less than about 8 wt %, less than about 7 wt %, less than about 6 wt %, less than about 5 wt %, less than about 4 wt %, less than about 3 wt %, less than about 2 wt %, or less than about 1 wt % hydrogen bonding units.

11) Exemplary Curable Compositions According to the Present Disclosure

In some cases, the curable composition comprises a plurality of crosslinkers with different properties and chemical structures. In some cases, at least 70%, at least 80%, at least 85%, at least 90%, at least 95%, at least 97.5%, or at least 99% of the polymerizable functional groups of the curable composition are disposed within crosslinkers, wherein the crosslinkers comprise two types of crosslinkers with different backbones. In some embodiments, the first type crosslinker has a rigid backbone for imparting high strength to the orthodontic appliance, while the second type crosslinker has a non-rigid (i.e., flexible) backbone for imparting high toughness to the orthodontic appliance. In some embodiments, the second type crosslinker can also function as a reactive diluent for improving printability of the curable composition. The curable composition may include any number of the first type crosslinker and the second type crosslinker so that the dental attachments formed from the curable composition can have sufficient strength to transfer force to the joined tooth without attachment deformation or fracture.

In some embodiments, the first type crosslinker has the following structure (I):

$$Y^1—X^1\text{-}L^1\text{-}A\text{-}L^2\text{-}X^2—Y^2, \quad (I)$$

wherein:

A is a cycloalkylene, alkylenecycloalkylene, alkylenecycloalkylenealkylene heterocycloalkylene, arylene, heteroarylene, alkylenearylene or alkylenearylenealkylene group;

$L^1$ and $L^2$ are independently an amide, ether, ester, carbonate, urethane or urea linkage;

$X^1$ and $X^2$ are independently an alkylene or heteroalkene linker; and $Y^1$ and $Y^2$ are independently a polymerizable functional group.

In some embodiments, A has one of the following structures:

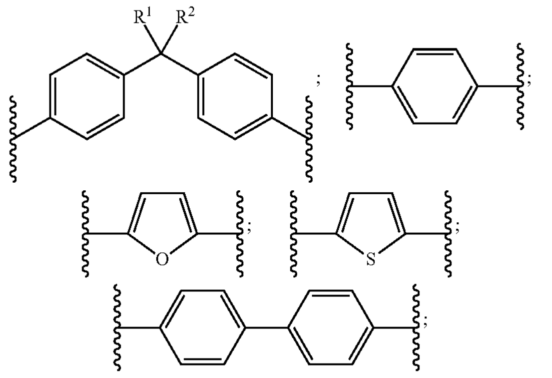

-continued

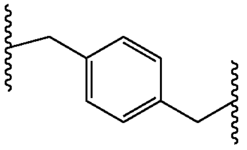

or

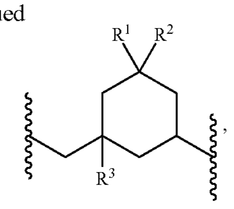

wherein $R^1$, $R^2$ and $R^3$ are independently H or alkyl.

In some embodiments, $R^1$, $R^2$ and $R^3$ are methyl.

In some embodiments, $X^1$ and $X^2$ independently have on

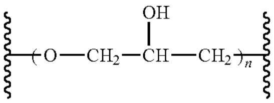

or

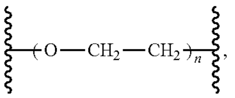

wherein n is an integer from 1 to 20.

In some embodiments, $Y^1$ and $Y^2$ independently have one of the following structures:

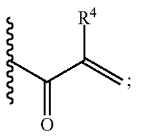

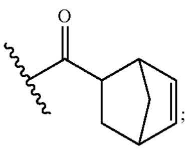

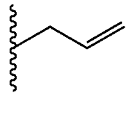

or

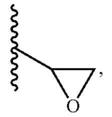

wherein $R^4$ is H or alkyl.

In some embodiments, the first type crosslinker is a di(meth)acrylate with an aromatic or a cycloaliphatic functionality. Examples of first type crosslinkers include, but are not limited to, ethoxylated bisphenol A dimethacrylate (BisEMA6), bisphenol A diglycidyl dimethacrylate (Bis-GMA) or isophorone urethane dimethacrylate.

In some embodiments, the second type crosslinker has the following structure (II):

$$Y^3—X^3\text{-}L^3\text{-}B\text{-}L^4\text{-}X^4—Y^3, \quad (II)$$

wherein:

B is a linear or branched alkylene or heteroalkylene group;

$L^3$ and $L^4$ are independently an optional amide, ether, ester, carbonate, urethane or urea linkage;

$X^3$ and $X^4$ are independently an optional alkylene or heteroalkene linker; and $Y^3$ and $Y^4$ are independently a polymerizable functional group.

In some embodiments, B has one of the following structures:

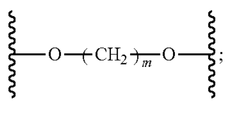

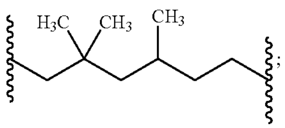

-continued

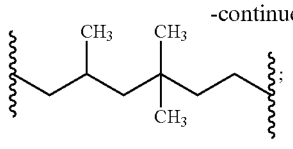
;
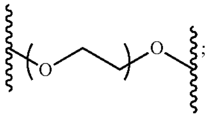
;

wherein m is an integer from 1 to 20.

In some embodiments, $X^3$ and $X^4$ independently have one of the following structures:

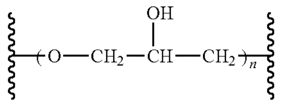
or
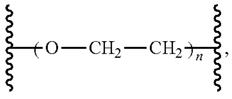
, wherein n is an integer from 1 to 20.

In some embodiments, $Y^3$ and $Y^4$ independently have one of the following structures:

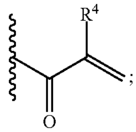
;
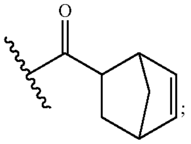
;
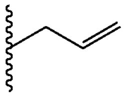
or
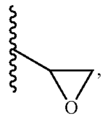
, wherein $R^4$ is H or alkyl.

In some embodiments, the second type crosslinker is a di(meth)acrylate with an linear or branched aliphatic functionality. Examples of second type crosslinkers include, but are not limited to triethylene glycol dimethacrylate (TEGDMA), glycerol dimethacrylate (GDMA), ethyleneglycol dimethacrylate, neopentyl glycol dimethacrylate (NPGDMA), polyethyleneglycol di(meth)acrylate (PEGDMA), Ebecryl 8402 (aliphatic urethane diacrylate of 1000 molecular weight), Ebecryl 8409 (aliphatic urethane diacrylate of 100 molecular weight), and BRC-443D (aliphatic hydrophobic urethane diacrylate).

In some cases, at least 90% of the polymerizable functional groups of the curable composition are disposed within crosslinkers, wherein the crosslinkers comprise at least two crosslinkers with different backbones. In some cases, the curable composition is photocurable, chemically curable, thermocurable, or any combination thereof. In some cases, the curable composition is photocurable. In some cases, the composition further comprises a filler material. In some cases, the filler material comprises a silica, a glass, a radiopaque material, a pre-polymerized filler, a ceramic, a metal, a metal oxide, a crystal, or any combination thereof. In some cases, the filler material comprises a fumed silica, a glass powder, a radiopaque filler, a pre-polymerized filler, or any combination thereof. In some cases, the curable composition further comprises a wetting agent. In some cases, the wetting agent comprises a siloxane. In some cases, the curable composition further comprises a pigment. In some cases, the pigment is inorganic. In some cases, the composition further comprises a photoinitiator. In some cases, the photoinitiator comprises an oligomer or a polymer. In some cases, the curable composition comprises from between about 50 wt % and about 100 wt %, between about 70 and about 100 wt %, between about 80 and about 100 wt %, between about 90 and about 100 wt %, between about 95 and 100 wt %, or between about 60 and about 90 wt % of the polymerizable species.

In some cases, the curable composition has a color and degree of transparency which render them detectable by 3D scanners and neutral in appearance when disposed in a mouth. In some cases, the curable composition is configured to develop a color defined by an L* value between 70 and 95, an a* value of between −11 and 1, and a b* value of between 2 and 22 upon curing. In some cases, the curable composition is configured to develop a color defined by an L* value between 78 and 87, an a* value of between −7 and −3, and a b* value of between 8 and 16 upon curing.

In a specific example, the curable composition comprises a first crosslinker comprising a first plurality of polymerizable functional groups and an aryl or a heteroaryl group disposed between at least two polymerizable functional groups of the first plurality of polymerizable functional groups; and a second crosslinker comprising a second plurality of polymerizable functional groups and a carbamate, a glycol, a carbonate, a urea, an ester, an amide, a thioether, a thioester, a guanidine, or a combination thereof disposed between at least two polymerizable functional groups of the second plurality of polymerizable functional groups. In some such cases, the first and the second pluralities of polymerizable functional groups are each pluralities of ethylenically unsaturated functional groups. In some cases, the first and the second pluralities of polymerizable functional groups each comprise two polymerizable functional groups. In some cases, the first plurality of polymerizable functional groups comprises two polymerizable functional groups, and the second plurality of polymerizable functional groups comprises more than two polymerizable functional groups. In some cases, the first and the second pluralities of polymerizable functional groups each comprise more than two polymerizable functional groups. In some cases, the second crosslinker comprises a carbamate, a glycol, or a combination thereof disposed between at least two polymerizable functional groups of the second plurality of polymerizable functional groups. In some cases, the first and the second pluralities of polymerizable functional groups are pluralities of acrylate groups, methacrylate groups, acrylamide groups, methacrylamide groups, vinyl ether groups, styryl groups, epoxy groups, or a combination thereof. In some cases, the first and the second pluralities of polymerizable functional groups are pluralities of acrylate groups, methacrylate groups, or a combination thereof. In some cases, the first and the second crosslinker differ in molecular weight by at least 200 Daltons (Da).

In some cases, the at least two polymerizable functional groups of the first plurality of polymerizable functional groups are spaced by at least 6, at least 8, at least 10, at least 12, at least 14, at least 18, at least 22, or at least 30 atoms. In some cases, the at least two polymerizable functional groups of the first plurality of polymerizable functional groups are each spaced by at least 14 atoms. In some cases, the at least two polymerizable functional groups of the second plurality of polymerizable functional groups are spaced by at least 6, at least 8, at least 10, at least 12, at least 14, at least 18, at least 22, or at least 30 atoms. In some cases, the at least two polymerizable functional groups of the second plurality of polymerizable functional groups are each spaced by at least 14 atoms.

In some cases, the composition further comprises a third crosslinker comprising a third plurality of polymerizable functional groups, and an alkyl backbone connecting at least two polymerizable functional groups of the third plurality of polymerizable functional groups. In some cases, the alkylene backbone is substituted with a functional group selected from the group consisting of halogen, alkyl, alkenyl, alkynyl, alkoxyl, hydroxyl, amine, thiol, cyano, aryl, heteroaryl, ester, amide, carbamate, carbonate, and combinations thereof. In some cases, the alkylene backbone is unsubstituted.

In some cases, the third plurality of polymerizable functional groups is a plurality of ethylenically unsaturated functional groups. In some cases, the third plurality of polymerizable functional groups is a plurality of acrylate groups, methacrylate groups, acrylamide groups, methacrylamide groups, vinyl ether groups, styryl groups, epoxy groups, or a combination thereof. In some cases, the third plurality of polymerizable functional groups is a plurality of acrylate groups, methacrylate groups, or a combination thereof. In some cases, the third plurality of polymerizable functional groups comprises two polymerizable functional groups. In some cases, the third plurality of polymerizable functional groups comprises more than two polymerizable functional groups.

In some cases, the at least two polymerizable functional groups are separated by 5 to 20 carbon atoms of the alkylene backbone. In some cases, the alkylene backbone is unsubstituted. In some cases, the at least two polymerizable functional groups are separated by 6 to 15 carbon atoms of the alkylene backbone. In some cases, the at least two polymerizable functional groups are separated by 8 to 12 carbon atoms of the alkylene backbone.

In some cases, the at least two polymerizable functional groups of the third plurality of polymerizable functional groups are spaced by at least 4, at least 6, at least 8, at least 10, at least 12, at least 14, at least 18, or at least 22 atoms. In some cases, the at least two polymerizable functional groups of the first plurality of polymerizable functional groups are each spaced by at least 6 atoms. In some cases, the at least two polymerizable functional groups of the second plurality of polymerizable functional groups are spaced by at least 6, at least 8, at least 10, at least 12, at least 14, at least 18, at least 22, or at least 30 atoms. In some cases, the third crosslinker differs in molecular weight by at least 100 Da, but at least 150 Da, by at least 200 Da, by at least 250 Da, by at least 300 Da, by at least 400 Da, or by at least 500 Da from each of the first and second crosslinkers. In some cases, the third crosslinker differs in molecular weight by at least 200 Da from each of the first and second crosslinkers.

In some cases, the composition further comprises a fourth crosslinker comprising a fourth plurality of polymerizable functional groups, and an alkyl backbone connecting at least two polymerizable functional groups of the fourth plurality of polymerizable functional groups.

In some cases, a crosslinker (e.g., the first, second, third, or fourth crosslinker) is an alkanediol diacrylate or dimethacrylate. In some cases, the alkanediol diacrylate or dimethacrylate is hexanediol, heptanediol, octanediol, nonanediol, decanediol, undecanediol, dodecanediol, tridecane diol, or tretradecanediol diacrylate or dimethacrylate. In some cases, the alkanediol diacrylate or dimethacrylate is octanediol, nonanediol, decanediol, undecanediol, or dodecanediol diacrylate or dimethacrylate. In some cases, the alkanediol diacrylate or dimethacrylate is decanediol diacrylate or dimethacrylate.

In some cases, a crosslinker is a bisphenol diacrylate or dimethacrylate. In some cases, the bisphenol acrylate or dimethacrylate is a bisphenol glycidyl diacrylate or dimethacrylate. In some cases, the bisphenol acrylate or dimethacrylate is bisphenol a-glycidyl acrylate or methacrylate. The bisphenol acrylate or dimethacrylate is an ethoxylated bisphenol A diacrylate or dimethacrylate. In some cases, two crosslinkers of the curable composition (e.g., two of the first, second, third, and fourth crosslinkers) are bisphenol A diacrylates or dimethacrylates. In some such cases, a first crosslinker is a bisphenol a-glycidyl methacrylate and a second crosslinker is an ethoxylated bisphenol A dimethacrylate.

In some cases, a crosslinker is a urethane diacrylate or dimethacrylate.

In some cases, the curable composition comprises a formulation as outlined in any one of TABLES 1-11 below:

TABLE 1

Exemplary Curable Compositions

| Constituent | Weight Percentage (wt %) |
|---|---|
| First Crosslinker | 1-40 |
| Second Crosslinker | 1-40 |
| Third Crosslinker | 1-40 |
| Photoinitiator | 0.1-5 |

TABLE 2

Exemplary Curable Compositions

| Constituent | Weight Percentage (wt %) |
|---|---|
| Alkanediol Diacrylate or Dimethacrylate | 1-40 |
| Bisphenol Diacrylate or Dimethacrylate | 1-40 |
| Urethane Diacrylate or Dimethacrylate | 1-40 |
| Photoinitiator | 0.1-5 |

TABLE 3

Exemplary Curable Compositions

| Constituent | Weight Percentage (wt %) |
|---|---|
| First Crosslinker | 5-40 |
| Second Crosslinker | 5-40 |
| Third Crosslinker | 5-40 |
| Photoinitiator | 0.1-5 |
| Pigment | 0.005-2 |
| Wetting Agent | 0.1-1.5 |

TABLE 4

Exemplary Curable Compositions

| Constituent | Weight Percentage (wt %) |
|---|---|
| Alkanediol Diacrylate or Dimethacrylate | 5-40 |
| Bisphenol Diacrylate or Dimethacrylate | 5-40 |
| Urethane Diacrylate or Dimethacrylate | 5-40 |
| Photoinitiator | 0.1-5 |
| Pigment | 0.005-2 |
| Wetting Agent | 0.1-1.5 |

TABLE 5

| Exemplary Curable Compositions | |
|---|---|
| Constituent | Weight Percentage (wt %) |
| First Crosslinker | 5-40 |
| Second Crosslinker | 5-40 |
| Third Crosslinker | 5-40 |
| Fourth Crosslinker | 5-40 |
| Photoinitiator | 0.1-5 |
| Pigment | 0.005-2 |
| Wetting Agent | 0.1-1.5 |

TABLE 6

| Exemplary Curable Compositions | |
|---|---|
| Constituent | Weight Percentage (wt %) |
| Alkanediol Diacrylate or Dimethacrylate | 5-40 |
| First Bisphenol Diacrylate or Dimethacrylate | 5-40 |
| Second Bisphenol Diacrylate or Dimethacrylate | 5-40 |
| Urethane Diacrylate or Dimethacrylate | 5-40 |
| Photoinitiator | 0.1-5 |
| Pigment | 0.005-2 |
| Wetting Agent | 0.1-1.5 |

TABLE 7

| Exemplary Curable Compositions | |
|---|---|
| Constituent | Weight Percentage (wt %) |
| Decanediol dimethacrylate (DDDMA) | 10-25 |
| Bisphenol a-glycidyl methacrylate (BisGMA) | 10-25 |
| Ethoxylated Bisphenol A Dimethacrylate (EBPADM) | 23-35 |
| EBECRYL® 8409 | 30-42 |
| Photoinitiator | 0.1-5 |
| Pigment | 0.005-2 |

TABLE 8

| Exemplary Curable Compositions | |
|---|---|
| Constituent | Weight Percentage (wt %) |
| Decanediol dimethacrylate (DDDMA) | 10-25 |
| Bisphenol a-glycidyl methacrylate (BisGMA) | 10-25 |
| Ethoxylated Bisphenol A Dimethacrylate (EBPADM) | 20-35 |
| EBECRYL ® 8409 | 30-45 |
| Photoinitiator | 0.1-6 |
| Pigment | 0.005-2 |
| Wetting Agent | 0.1-1.5 |

TABLE 9

| Exemplary Curable Compositions | |
|---|---|
| Constituent | Weight Percentage (wt %) |
| First Crosslinker | 1-35 |
| Second Crosslinker | 1-50 |
| Third Crosslinker | 1-80 |
| Filler Material | 10-60 |
| Photoinitiator | 0.1-5 |
| Pigment | 0.005-3 |
| Wetting Agent | 0.005-3 |

TABLE 10

| Exemplary Curable Compositions | |
|---|---|
| Constituent | Weight Percentage (wt %) |
| First Crosslinker | 1-25 |
| Second Crosslinker | 1-40 |
| Third Crosslinker | 1-80 |
| Fourth Crosslinker | 1-40 |
| Filler Material | 10-60 |
| Photoinitiator | 0.1-5 |
| Pigment | 0.005-3 |
| Wetting Agent | 0.005-3 |

TABLE 11

| Exemplary Curable Compositions | |
|---|---|
| Constituent | Weight Percentage (wt %) |
| Alkanediol Diacrylate or Dimethacrylate | 1-25 |
| First Bisphenol Diacrylate or Dimethacrylate | 1-40 |
| Second Bisphenol Diacrylate or Dimethacrylate | 1-80 |
| Urethane Diacrylate or Dimethacrylate | 1-40 |
| Inorganic Filler Material | 10-60 |
| Photoinitiator | 0.1-5 |
| Pigment | 0.005-3 |
| Wetting Agent | 0.005-3 |

III. Printed Materials

Aspects of the present disclosure provide materials printed from curable compositions disclosed herein. The printed materials can be comprised of a curable composition disclosed herein (e.g., printed into an attachment placement device comprised of greater than 90%, greater than 95%, or greater than 99% of the curable composition), or can be printed into devices or articles comprising multiple materials (e.g., into a dental aligner comprising layers of the curable composition interspersed by layers of a low viscosity curable adhesive). The printed materials can have properties which are advantageous for medical devices, and in particular for orthodontic devices. In some cases, the printed materials are configured for use as attachment placement devices.

In some cases, a printed material comprises a modulus of between about 600 MPa and about 3200 MPa. In some cases, the printed material comprises a modulus of between about 800 and about 2400 MPa. In some cases, the printed material comprises a modulus of between about 1000 and about 2400 MPa. In some cases, the printed material comprises a modulus of at least about 600 MPa, at least about 800 MPa, at least about 1000 MPa, at least about 1200 MPa, at least about 1500 MPa, at least about 1800 MPa, or at least about 2400 MPa.

In some cases, the printed material comprises a maximum stress of between about 25 and about 160 MPa. In some cases, the printed material comprises a strength of between about 30 and about 140 MPa. In some cases, the printed material comprises a strength of between about 40 and about 120 MPa. In some cases, the printed material comprises a strength of at least about 25 MPa, at least about 30 MPa, at least about 40 MPa, at least about 50 MPa, at least about 60 MPa, at least about 70 MPa, or at least about 80 MPa.

In some cases, the printed material comprises a strain at break of between about 1.5% and about 9%. In some cases, the printed material comprises a strain at break of between about 2.5% and about 7.5%. In some cases, the printed material comprises a strain at break of between about 3% and about 7%. In some cases, the printed material comprises a strain at break of between about 3.5% and about 6.5%. In some cases, the printed material comprises a strain a break of at least about 1.5%, at least about 2%, at least about 2.5%, at least about 3%, at least about 3.5%, at least about 4%, at least about 4.5%, or at least about 5%.

In some cases, the printed material comprises a color defined by an L* value between 70 and 95, an a* value of between −11 and 1, and a b* value of between 2 and 22. In some cases, the printed material comprises a color defined by an L* value between 78 and 87, an a* value of between −7 and −3, and a b* value of between 8 and 16. In some cases, the printed material has an average light transmittance over the visible light spectrum (about 380 to about 700 nanometers) of at least about 50%, at least about 60%, at least about 70%, at least about 80%, at least about 85%, at least about 90%, or at least about 95%. In some cases, the printed material has an average light transmittance over the visible light spectrum (about 380 to about 700 nanometers) of at most about 60%, at most about 50%, at most about 40%, at most about 30%, at most about 20%, at most about 10%, or at most about 5%.

In some cases, the printed material can be a medical device or a portion thereof. The medical device can be an orthodontic appliance. In some cases, the orthodontic appliance can be a dental attachment, a dental aligner, a one or more incremental palatal expander, or a dental spacer. In specific cases, the medical device is a dental attachment. In some cases, the dental attachment is configured for use with a dental aligner.

IV. Methods of Printing

The present disclosure provides methods for synthesizing the polymerizable compound of the present disclosure, methods of using compositions (e.g., resins and polymeric materials) comprising such compounds (e.g., to homogenize or pattern compounds and species within the compositions), as well as methods for generating objects such as medical devices. A polymerizable compound of the present disclosure (e.g., a crosslinkers as described herein) can be used as a components in a range of materials applicable to many different industries such as transportation, hobbyist, prototyping, medical, art and design, microfluidics, and molding, among others. Printable medical devices, as disclosed herein, can include orthodontic appliances.

1) Fabrication and Use of Orthodontic Appliances

Provided herein are methods for using the polymerizable compounds, curable resins and compositions comprising such compounds, as well as polymeric materials produced from such resins and composition for the fabrication of a medical device, such as an orthodontic appliance (e.g., a dental aligner, a one or more incremental palatal expanders, a dental spacer, and/or an attachment placement device). The methods can comprise homogenizing, dispersing, or patterning constituents of the curable resins, which may thereby modify a property of the curable resin or a polymerizable material generated therefrom.

Thus, in some embodiments, a method herein further comprises the step of fabricating a device or an object using an additive manufacturing device, wherein the additive manufacturing device facilitates the curing. In some embodiments, the curing of a polymerizable resin produces the cured polymeric material. In certain embodiments, a polymerizable resin is cured using an additive manufacturing device to produce the cured polymeric material. In some embodiments, the method further comprises the step of cleaning the cured polymeric material. In certain embodiments, the cleaning of the cured polymeric material includes washing and/or rinsing the cured polymeric material with a solvent, which can remove uncured resin and undesired impurities from the cured polymeric material. Cleaning may further include centrifuging a printed item to remove excess and/or uncured material therefrom.

In some embodiments, a polymerizable resin herein can be curable and have melting points <100° C. in order to be liquid and, thus, processable at the temperatures usually employed in currently available additive manufacturing techniques. As described herein, the polymerizable monomers of the present disclosure that are used as components in the curable resins can have a vapor pressure of around 0.01 mmHg at a print temperature compared to conventional reactive diluents or other polymerizable components used in curable resins. Such low vapor pressure of the monomers described herein can be particularly advantageous for use of such monomer in the curable (e.g., photocurable) compositions and additive manufacturing where elevated temperatures (e.g., 60° C., 80° C., 90° C., or higher) may be used. In various instances, a polymerizable monomer can have a vapor pressure of at most about 12 Pa at 60° C., or lower, as further described herein.

In some embodiments, a curable resin herein can comprise at least one photo-polymerization initiator (i.e., a photoinitiator) and may be heated to a predefined elevated process temperature ranging from about 50° C. to about 120° C., such as from about 90° C. to about 120° C., before becoming irradiated with light of a suitable wavelength to be absorbed by the photoinitiator, thereby causing activation of the photoinitiator to induce polymerization of the curable resin to obtain a cured polymeric material, which can optionally be cross-linked.

In some embodiments, the methods disclosed herein for forming a polymeric material are part of a high temperature lithography-based photo-polymerization process, wherein a curable resin (e.g., a photo-curable resin) that can comprise at least one photo-polymerization initiator is heated to an elevated process temperature (e.g., from about 50° C. to about 120° C., such as from about 90° C. to about 120° C.). Thus, a method for forming a polymeric material according to the present disclosure can offer the possibility of quickly and facilely producing devices, such as orthodontic appliances, by additive manufacturing such as 3D printing using curable resins as disclosed herein. In various embodiments, such curable resin is a photo-curable resin comprising two or more crosslinkers and optionally comprising a filler material as described herein, e.g., a plurality of crosslinkers and an inorganic filler material.

Photo-polymerization can occur when a photo-curable resin herein is exposed to radiation (e.g., UV or visible light) of a wavelength sufficient to initiate polymerization. The wavelengths of radiation useful to initiate polymerization may depend on the photoinitiator used. “Light” as used herein includes any wavelength and power capable of initiating polymerization. Some wavelengths of light include ultraviolet (UV) or visible. UV light sources include UVA (wavelength about 400 nanometers (nm) to about 320 nm), UVB (about 320 nm to about 290 nm) or UVC (about 290 nm to about 100 nm). Any suitable source may be used, including laser sources.

The source may be broadband or narrowband, or a combination thereof. The light source may provide continuous or pulsed light during the process. Both the length of time the system is exposed to UV light and the intensity of the UV light can be varied to determine the ideal reaction conditions.

In some embodiments, the methods disclosed herein include the use of additive manufacturing to produce a device comprising the cured polymeric material. Such device can be an orthodontic appliance. The orthodontic appliance can be a dental aligner, a one or more incremental palatal expander, a dental spacer, and/or an attachment placement device. In certain embodiments, the methods disclosed herein use additive manufacturing to produce a device comprising, consisting essentially of, or consisting of the cured polymeric material. Additive manufacturing includes a variety of technologies which fabricate three-dimensional objects directly from digital models through an additive process. In some aspects, successive layers of material are deposited and "cured in place". A variety of techniques are known to the art for additive manufacturing, including selective laser sintering (SLS), fused deposition modeling (FDM) and jetting or extrusion. In many embodiments, selective laser sintering involves using a laser beam to selectively melt and fuse a layer of powdered material according to a desired cross-sectional shape in order to build up the object geometry. In many embodiments, fused deposition modeling involves melting and selectively depositing a thin filament of thermoplastic polymer in a layer-by-layer manner in order to form an object. In yet another example, 3D printing can be used to fabricate an orthodontic appliance herein. In many embodiments, 3D printing involves jetting or extruding one or more materials (e.g., the crystallizable resins disclosed herein) onto a build surface in order to form successive layers of the object geometry. In some embodiments, a photo-curable resin described herein can be used in inkjet or coating applications. Cured polymeric materials may also be fabricated by "vat" processes in which light is used to selectively cure a vat or reservoir of the curable resin. Each layer of curable resin may be selectively exposed to light in a single exposure or by scanning a beam of light across the layer. Specific techniques that can be used herein can include stereolithography (SLA), Digital Light Processing (DLP) and two photon-induced photo-polymerization (TPIP).

In some embodiments, the methods disclosed herein use continuous direct fabrication to produce a device comprising the cured polymeric material. Such device can be an orthodontic appliance as described herein. In certain embodiments, the methods disclosed herein can comprise the use of continuous direct fabrication to produce a device (e.g., an orthodontic appliance) comprising, consisting essentially of, or consisting of the cured polymeric material. A non-limiting exemplary direct fabrication process can achieve continuous build-up of an object geometry by continuous movement of a build platform (e.g., along the vertical or Z-direction) during an irradiation phase, such that the hardening depth of the irradiated photo-polymer (e.g., an irradiated photo-curable resin, hardening during the formation of a cured polymeric material) is controlled by the movement speed. Accordingly, continuous polymerization of material (e.g., polymerization of a photo-curable resin into a cured polymeric material) on the build surface can be achieved. Such methods are described in U.S. Pat. No. 7,892,474, the disclosure of which is incorporated herein by reference in its entirety. In yet another example, a continuous direct fabrication method utilizes a "heliolithography" approach in which a liquid resin (e.g., a photo-curable resin) is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety. Continuous liquid interface production of 3D objects has also been reported (J. Tumbleston et al., Science, 2015, 347 (6228), pp 1349-1352), which reference is hereby incorporated by reference in its entirety for description of the process. Another example of continuous direct fabrication method can involve extruding a material composed of a curable liquid material or resin surrounding a solid strand. The material can be extruded along a continuous three-dimensional path in order to form the object. Such methods are described in U.S. Patent Publication No. 2014/0061974, the disclosure of which is incorporated herein by reference in its entirety.

In some embodiments, the methods disclosed herein can comprise the use of high temperature lithography to produce a device comprising the cured polymeric material. Such device can be an orthodontic appliance as described herein. In certain embodiments, the methods disclosed herein use high temperature lithography to produce a device comprising, consisting essentially of, or consisting of the cured polymeric material. "High temperature lithography," as used herein, may refer to any lithography-based photo-polymerization processes that involve heating photo-polymerizable material(s) (e.g., a photo-curable resin disclosed herein). The heating may lower the viscosity of the photo-curable resin before and/or during curing. Non-limiting examples of high-temperature lithography processes include those processes described in WO 2015/075094, WO 2016/078838 and WO 2018/032022. In some implementations, high-temperature lithography may involve applying heat to material to temperatures from about 50° C. to about 120° C., such as from about 90° C. to about 120° C., from about 100° C. to about 120° C., from about 105° C. to about 115° C., from about 108° C. to about 110° C., etc. The material may be heated to temperatures greater than about 120° C. It is noted other temperature ranges may be used without departing from the scope and substance of the inventive concepts described herein.

Since, in some cases, the polymerizable compounds of the present disclosure can, as part of a photo-curable resin, become co-polymerized in the polymerization process of a method according to the present disclosure, the result can be an optionally cross-linked polymer comprising moieties of one or more species of polymerizable compound(s) as repeating units. In some cases, such polymer is a cross-linked polymer which, typically, can be suitable and useful for applications in orthodontic appliances. The polymerizable compounds of this disclosure comprising a plurality of reactive functional groups can provide uniform and continuous polymeric networks with clear phase separation.

In many cases a method herein can comprise polymerizing a curable resin which comprises a crosslinker or a plurality thereof, which, upon polymerization, can furnish a cross-linked polymer matrix which can comprise moieties originating from the polymerizable compound(s) of the present disclosure as repeating units. In order to obtain cross-linked polymers which can be particularly suitable as orthodontic appliances, the at least one polymerizable species used in the method according to the present disclosure can be selected with regard to several thermomechanical properties of the resulting polymers. In some instances, a curable resin of the present disclosure can comprise one or more species of polymerizable compounds. In some cases, a polymerizable monomer of the present disclosure can also have cross-linking functionalities, in instances where it contains a plurality of reactive functional groups (similar to the polymerizable compounds herein), and thus not only act as a reactive diluent with low vapor pressure, but also as a cross-linking agent during polymerization of a curable resin described herein. In other embodiments, a resin comprises a polymerizable compound as described herein, a polymerizable monomer, and a cross-linking monomer, wherein both monomers are different species (i.e., chemical entities).

V. Orthodontic Appliances and Uses Thereof

The polymerizable compounds according to the present disclosure can be used as components to curable compositions that can be additively manufactured into dental appliances, including, without limitation: one or more aligners comprising a plurality of tooth-receiving cavities shaped to move a patient's dentition from a first arrangement toward a target arrangement, one or more incremental palatal expanders shaped to expand a patient's palate from a first configuration toward a target configuration, dental spacer(s), and/or attachment placement devices.

The polymerizable compounds according to the present disclosure can be components of curable compositions that, when additively manufactured, become a aligners with tooth-receiving cavities that move a patient's teeth from a first arrangement toward a second arrangement and/or with favorable mechanical properties (elongation at break, stiffness, stress, strain, etc.) to do the same. Aligners may implement one or more of the methods of repositioning teeth disclosed herein, where the method comprises: (i) generating a treatment plan for the patient, the plan comprising a plurality of intermediate tooth arrangements for moving teeth along a treatment path from an initial tooth arrangement toward a final tooth arrangement; (ii) producing a dental appliance comprising a polymeric material described herein, e.g., a polymeric material that comprises, in a polymerized form, in a homogenous, dispersed, or patterned distribution; and moving on-track, with the dental appliance, at least one of the patient's teeth toward an intermediate tooth arrangement or the final tooth arrangement.

The polymerizable compounds according to the present disclosure can be used components of curable compositions that, when additively manufactured, become one or more incremental palatal expanders that expand a patient's palate from a first arrangement toward a target arrangement. Incremental palatal expanders may lock into a patient's palate and may implement one or more stages of a digital treatment plan, with or without aligners.

In various implementations, polymerizable compounds according to the present disclosure can be used as components to curable compositions that, when additively manufactured, become one or more attachment placement devices that are used to place and/or bond attachments to a patient's dentition. An attachment placement device, as used herein, may include a dental appliance that can be coupled to a patient's dentition and, when coupled to the patient's dentition, can help place and/or affix attachments to portions of the patient's dentition. Attachment placement devices can include registration surfaces that include mating surfaces sized and/or shaped to approximate the contour of one or more teeth and fit the one or more teeth with attachments at a specific position and/or orientation. In some implementations, an attachment placement device may include one or more attachment supports that extend from registration elements, where the attachment supports are frangibly coupled to attachments that can be broken off at specific positions and/or orientations on a patient's teeth. Attachment placement devices may further include one or more additively manufactured attachments that are releasably carried by attachment supports to specific positions and/or orientations on a patient's teeth. Attachment placement devices may further include adhesive (e.g., bonding material) that allows attachments to be coupled to teeth. Attachment placement devices may include one or more wells surrounding at least a portion of an attachment, where the well is configured to collect or shape excess adhesive material for removal. An attachment well may include a rim configured for surface contact with a tooth. The rim may define an edge of an attachment to separate the attachment from excess attachment material in the well, in order to facilitate removal of the excess attachment material.

A method of treatment can include coupling an attachment placement device to one or more teeth of the patient in order to locate attachments on the attachment placement device at desired positions and/or orientations. Registration elements on the attachment placement device may hold the attachment placement device onto the patient's dentition so that attachments may be appropriately placed. Attachment supports may interface between registration elements and prefabricated attachments placed on the patient's teeth. A practitioner may apply adhesive to prefabricated attachments on an attachment placement device and/or release existing adhesive (e.g., by removing stickers/backings) from attachments on an attachment placement device. (Removal may, but need not, occur before placement of the attachment placement device on the patient's dentition.) A practitioner may further decouple (e.g, break) attachment supports at appropriate locations so that attachments can be frangibly released to appropriate positions and/or orientations on a patient's teeth. Once attachments are on a patient's teeth, they can engage with wells and/or other portions of tooth receiving cavities to effect intended displacements and/or forces on the patient's dentition. Such engagement can hold the dental appliance in a desired position or orientation, can facilitate the proper transmittal of force from the dental appliance to the tooth, and can aid in treatment comfort.

Such dental appliance can be produced using processes that include additive manufacturing, as further described herein.

As used herein, the terms "rigidity" and "stiffness" can, but need not, be used interchangeably, as are the corresponding terms "rigid" and "stiff" As used herein a "plurality of teeth" encompasses two or more teeth.

In many embodiments, one or more posterior teeth comprises one or more of a molar, a premolar or a canine, and one or more anterior teeth comprising one or more of a central incisor, a lateral incisor, a cuspid, a first bicuspid or a second bicuspid.

In some embodiments, the compositions and methods described herein can be used to couple groups of one or more teeth to each other. The groups of one or more teeth may comprise a first group of one or more anterior teeth and a second group of one or more posterior teeth. The first group of teeth can be coupled to the second group of teeth with the polymeric shell appliances as disclosed herein.

The embodiments disclosed herein are well suited for moving one or more teeth of the first group of one or more teeth or moving one or more of the second group of one or more teeth, and combinations thereof.

The embodiments disclosed herein are well suited for combination with one or more known commercially available tooth moving components such as attachments and polymeric shell appliances. In many embodiments, the appliance and one or more attachments are configured to move one or more teeth along a tooth movement vector comprising six degrees of freedom, in which three degrees of freedom are rotational and three degrees of freedom are translation.

The present disclosure provides orthodontic systems and related methods for designing and providing improved or more effective tooth moving systems for eliciting a desired tooth movement and/or repositioning teeth into a desired arrangement.

Although reference is made to an appliance comprising a polymeric shell appliance, the embodiments disclosed herein are well suited for use with many appliances that receive teeth, for example appliances without one or more of polymers or shells. The appliance can be fabricated with one or more of many filler materials such as metal, glass, reinforced fibres, carbon fibre, composites, reinforced composites, aluminum, biological materials, and combinations thereof, for example. In some cases, the reinforced composites can comprise a polymer matrix reinforced with ceramic or metallic particles, for example. The appliance can be shaped in many ways, such as with thermoforming or direct fabrication as described herein, for example. Alternatively, or in combination, the appliance can be fabricated with machining such as an appliance fabricated from a block of material with computer numeric control machining. In some cases, the appliance is fabricated using a polymerizable compound according to the present disclosure, for example, using the monomers as reactive diluents for curable resins.

1) Attachment Placement Devices

In some implementations, polymerizable compounds and/or polymeric materials according to the present disclosure may be additively manufactured to form attachment placement devices. An attachment placement device additively manufactured using polymerizable compounds and/or polymeric materials according to the present disclosure may be coupled to a patient's dentition and may guide placement of dental attachments (e.g., items adhesively placed and/or bonded on teeth that, in combination with aligners, effect displacements and/or forces on the teeth). Attachments may include items made of bonding adhesive that are shaped to engage with wells inside aligners and, that, when engaged with wells inside aligners effect displacements and/or forces on teeth. In some implementations, attachments include prefabricated (e.g., additively manufactured) items that are adhesively coupled to teeth, and are of one or more shapes that engage with wells inside aligners and, that, when engaged with wells inside aligners effect displacements and/or forces on teeth. As noted herein, registration surfaces of an attachment placement device can be sized and/or shaped to approximate a contour of a patient's dentition and fit teeth in the dentition with attachments (e.g., those made of bonding material, prefabricated attachments, etc.) at particular position(s) and/or orientation(s). In some implementations, an attachment placement device may include one or more attachment supports that extend from registration elements, where the attachment supports are frangibly coupled to attachments that can be broken off at specific positions and/or orientations on a patient's teeth. Attachment placement devices may further include one or more additively manufactured attachments that are releasably carried by attachment supports to specific positions and/or orientations on a patient's teeth. Attachment placement devices may further include adhesive (e.g., bonding material) that allows attachments to be coupled to teeth. Attachment placement devices may include one or more wells surrounding at least a portion of an attachment, where the well is configured to collect or shape excess adhesive material for removal. An attachment well may include a rim configured for surface contact with a tooth. The rim may define an edge of an attachment to separate the attachment from excess attachment material in the well, in order to facilitate removal of the excess attachment material.

In some aspects, an attachment placement device and/or attachment includes a body shaped to conform to contours of a patient's dentition, and may further be configured to accommodate one or more attachments attached to an exterior surface of the patient's dentition, and/or one or more light sources, for instance, as described in U.S. patent application Ser. No. 14/939,246, entitled "Dental attachment formation structure," filed Nov. 11, 2015, to Peter Webber, the contents of which are hereby incorporated by reference as if set forth fully herein.

Figure 6A:
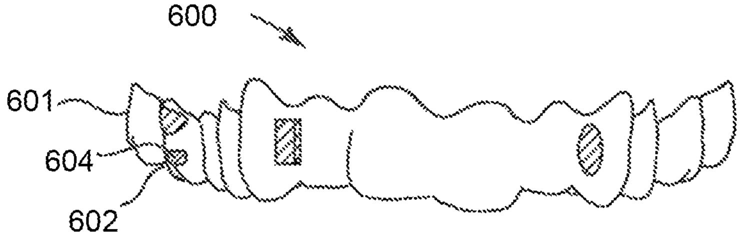
FIG. 6A illustrates a front view of a dental attachment formation appliance, in accordance with some embodiments.
Figure 6B:
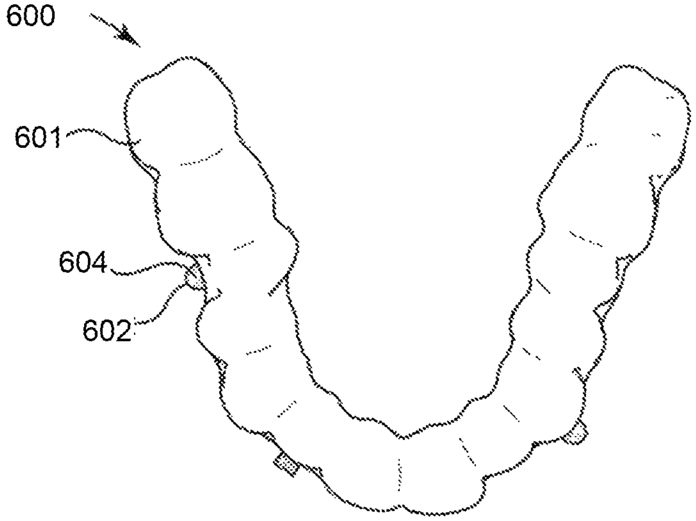
FIG. 6B illustrates a top view of a dental attachment formation appliance, in accordance with some embodiments.
Figure 7:
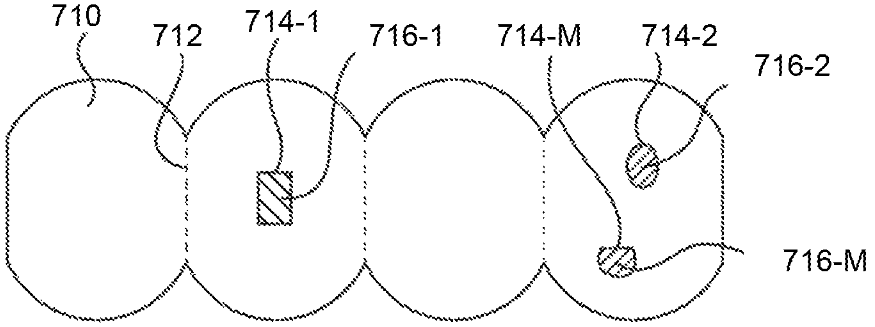
FIG. 7 illustrates a front view of an attachment formation appliance, in accordance with some embodiments.

In various aspects, a dental attachment device and/or attachment includes a body having a first surface shaped to abut an exterior surface of a tooth and a well portion of the first surface shaped to form an attachment that is to be attached to the exterior surface of the tooth, a release layer formed over a surface of the well to allow the attachment to be removed from the well, and an attachment material that is used to form the attachment positioned within the well, as described in U.S. patent application Ser. No. 14/939,252, entitled, "Dental attachment formation structures," filed Nov. 11, 2015, to Webber et al., the contents of which are hereby incorporated by reference as if set forth fully herein. FIG. 6A illustrates a front view of a dental attachment formation appliance 600 according to a various aspects. FIG. 6B illustrates a top view of a dental attachment formation appliance 600 according to various aspects. In the examples of FIGS. 6A and 6B, the appliance 600 (an appliance) includes a body 601 having a surface shaped to conform to the contours of at least one exterior surface of a tooth (in this example, the body has surfaces to conform to the buccal, lingual, and occlusal surfaces of the teeth). The body 601 also includes wells 602 formed in the appliance 600 to provide a template for the shape of the attachments and position and orientation of the attachments on one or more teeth of the patient. These wells can then be filled with attachment formation material 604 that will be cured to form the attachment. FIG. 7 illustrates a front view of an attachment formation appliance 700 according to some implementations. In the example of FIG. 7, the appliance 700 includes a body 710 having multiple wells 714-1, 714-2, and 714-N formed on one surface that is to be applied to a tooth. In this embodiment, the right most section has two wells formed therein. Additionally, the section second from the left includes one well formed therein. Multiple wells can be formed on the same section and/or on multiple sections of a dental placement appliance.

Figure 8A:
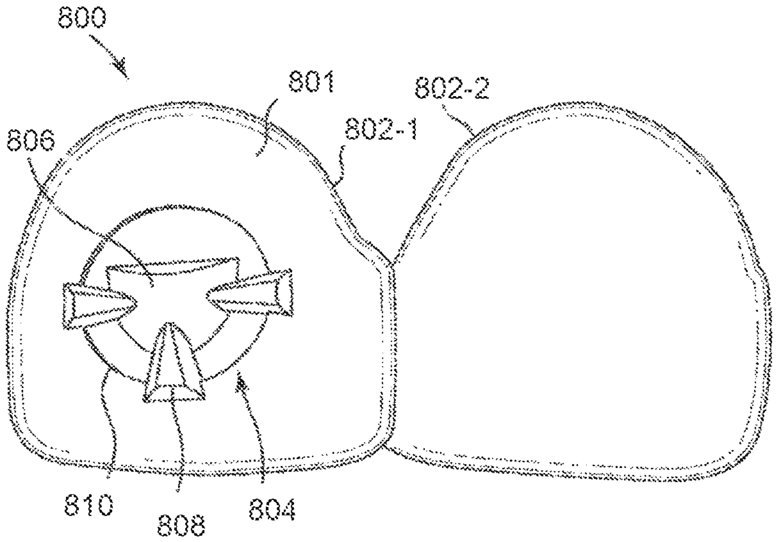
FIG. 8A illustrates a front view of a dental attachment placement structure for placement of an attachment, in accordance with some embodiments.

In various aspects, a dental attachment device and/or attachment a body having an attachment placement surface that is to be placed on an attachment affixing surface of a tooth and wherein the attachment placement surface includes a portion that is shaped to allow placement of an attachment at a particular position on the affixing surface of the tooth and a portion of the body having a contour that is shaped to correspond with a contour of an alignment surface of a tooth and when the contour of the body and the corresponding contour is aligned, the attachment is located at the particular position and can be secured to the affixing surface of the tooth, for instance, as described in U.S. patent application Ser. No. 14/963,527, entitled "Dental attachment placement structure," filed Dec. 9, 2015, to Webber et al., the contents of which are hereby incorporated by reference as if set forth fully herein. FIG. 8A illustrates a front view of a dental attachment placement structure 800 for placement of an attachment according to a number of embodiments of the present disclosure. In the example of FIG. 8A, the apparatus 800 includes a body 801 having at least one surface shaped to conform to one or more of the contours of an exterior surface of a tooth. In the example of FIG. 8A, the body has multiple surfaces, (inner surfaces of portions 802-1 and 802-2), each shaped to conform to the multiple contours of an exterior surface of a tooth, and other surfaces will be discussed in more detail in conjunction with the description of FIG. 8B. The body 801 can also include an attachment mounting structure 804 including an attachment 806, an aperture 810 to allow placement of the attachment 806 on the surface of a tooth, and a plurality of supports 808.

Figure 8B:
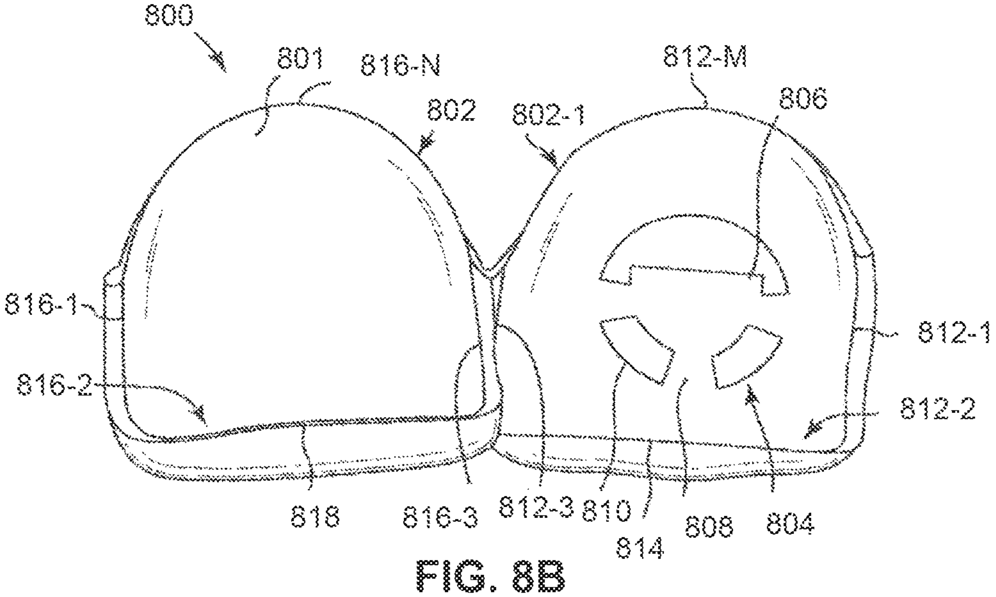
FIG. 8B illustrates a back view of the dental attachment placement structure of FIG. 8A.
Figure 8C:
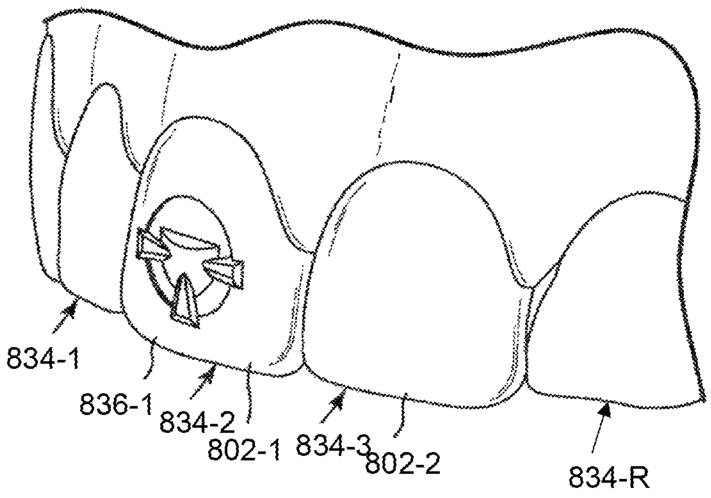
FIG. 8C illustrates a front view of the dental attachment placement structure of FIGS. 8A and 8B positioned on a tooth of a patient.
Figure 8D:
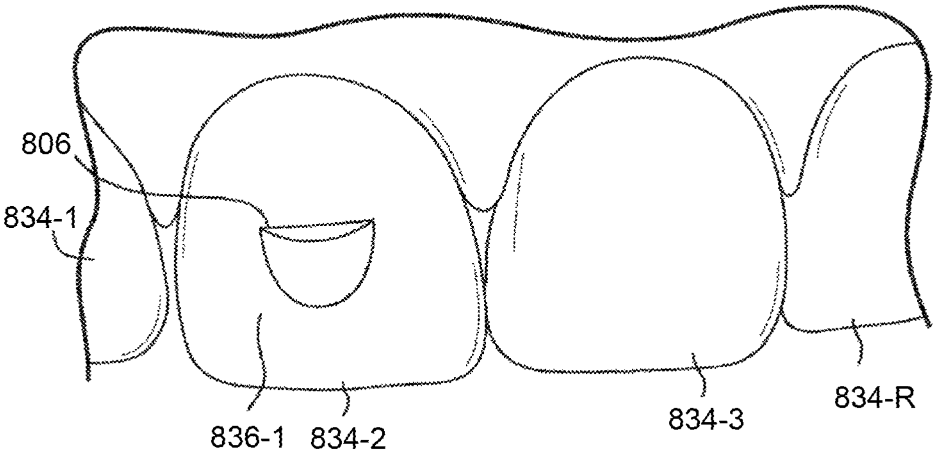
FIG. 8D illustrates a front view of a dental attachment attached to a tooth of a patient utilizing the dental attachment placement structure of FIGS. 8A and 8B.

FIG. 8B illustrates a back view of the dental attachment placement structure of FIG. 8A. In this view, the back side of the body 801 is shown including the back side of the attachment mounting structure 804 including the attachment 806 and supports 808, and the two inner surfaces of portions 802-1 and 802-2 of the body 801, each shaped to conform to the multiple contours of an exterior surface of a tooth are shown. As used herein, a surface that is shaped to conform to a contour of an exterior surface of a tooth (i.e., an alignment surface) can be used to accurately position and/or orient the attachment on the tooth. For example, if surface of the apparatus is shaped to conform to a contour of the front surface of the tooth (e.g., surface 802-1 shown in FIG. 8A), then when the apparatus is pressed against the front surface of the tooth such that the contours of the tooth and the apparatus correspond to each other, the attachment will be correctly oriented with respect to the angle of the back side of the attachment to the surface of the tooth. FIG. 8C illustrates a front view of the dental attachment placement structure of FIGS. 8A and 8B positioned on a tooth of a patient. In the view of FIG. 8C, several teeth and the gingiva of a patient are illustrated, including teeth 834-1, 834-2, 834-3, through 834-R. The apparatus 800 has been placed on the two of the teeth (834-2 and 834-3) such that the inner surfaces of portions 802-1 and 802-2 are placed in contact with tooth surfaces 836-1 and 836-2, respectively. FIG. 8D illustrates a front view of a dental attachment attached to a tooth of a patient utilizing the dental attachment placement structure of FIGS. 8A and 8B. The resultant placement has been accomplished via the attachment mounting structure illustrated in FIGS. 8A and 8B.

Figure 9:
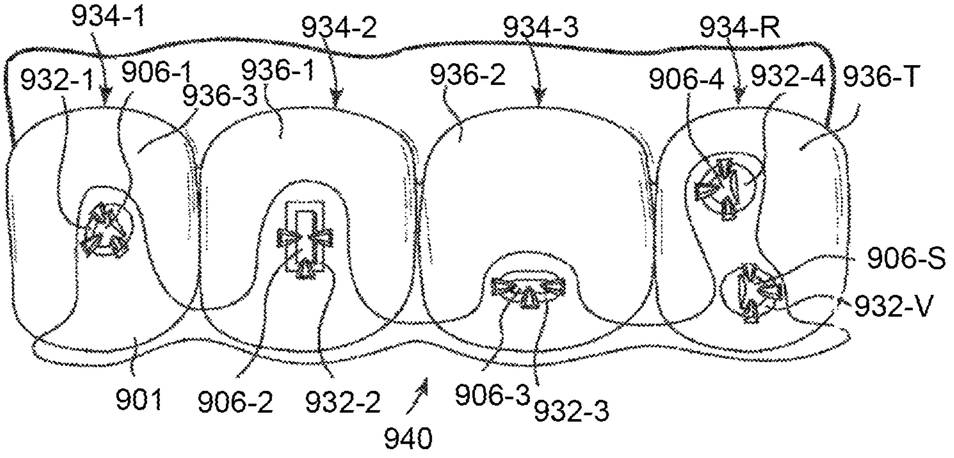
FIG. 9 illustrates a front view of a dental attachment placement structure 900 having multiple attachment placement components provided on the structure, in accordance with some embodiments.

FIG. 9 illustrates a front view of a dental attachment placement structure 900 having multiple attachment placement components provided on the structure according to some implementations. In the example of FIG. 9, the body 901 of apparatus 940 has an attachment mounting structure has an aperture 932-1 with an attachment 906-1 placed in the aperture. Through use of the apparatus 940, the attachment is in the desired position and orientation for securing to the surface 936-3 of tooth 934-1. Attachments 906-2, 906-3, 906-4, and 906-S are also positioned in apertures 932-2, 932-3, 932-4, and 932-V on surface 936-1 of tooth 934-2, 936-2 of tooth 934-3, and 936-T of tooth 934-R. In such an embodiment, one or more of the teeth can have multiple attachments affixed thereon. In order to save fabrication time and materials cost, the apparatus may include multiple attachment locations and only some may be used at any given time. In such applications, the apparatus 940 can, for example, be used to affix attachment 906-2 at one point in time and can be reused to attach 906-S at aperture 932-V or an attachment at one or more of the other locations on the apparatus (e.g., apertures 932-1, 932-2, and/or 932-3) at a different time. Another feature of the embodiment of FIG. 9, is that in order to save fabrication time and materials cost, an apparatus with less material can be used. In such embodiments, the apparatus can be designed such that a reduced amount or minimized amount of material is used in order to properly position the attachment at a desired location.

Figure 10A:
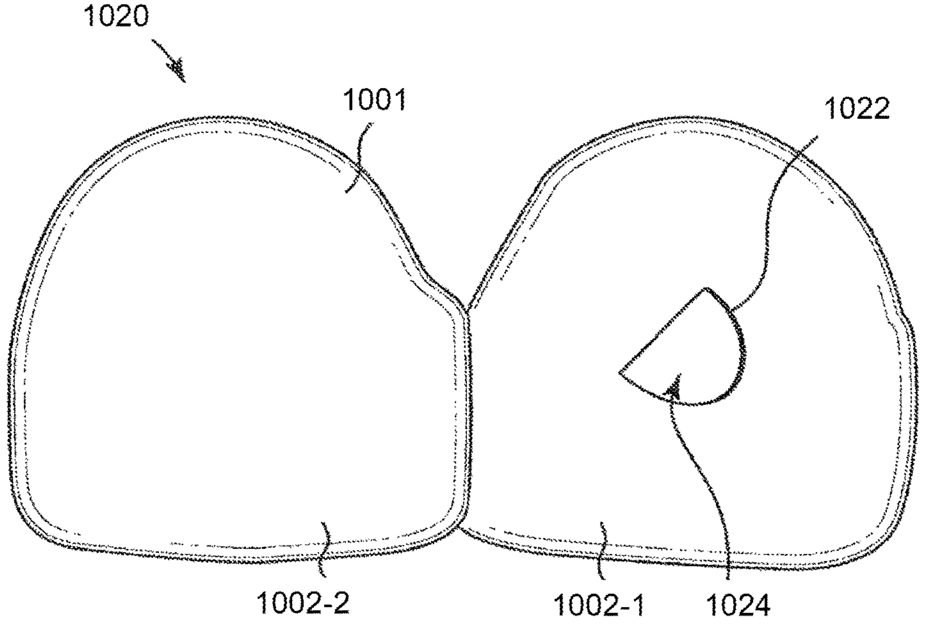
FIG. 10A illustrates a front view of a dental attachment placement structure for etching a tooth, in accordance with some embodiments.
Figure 10B:
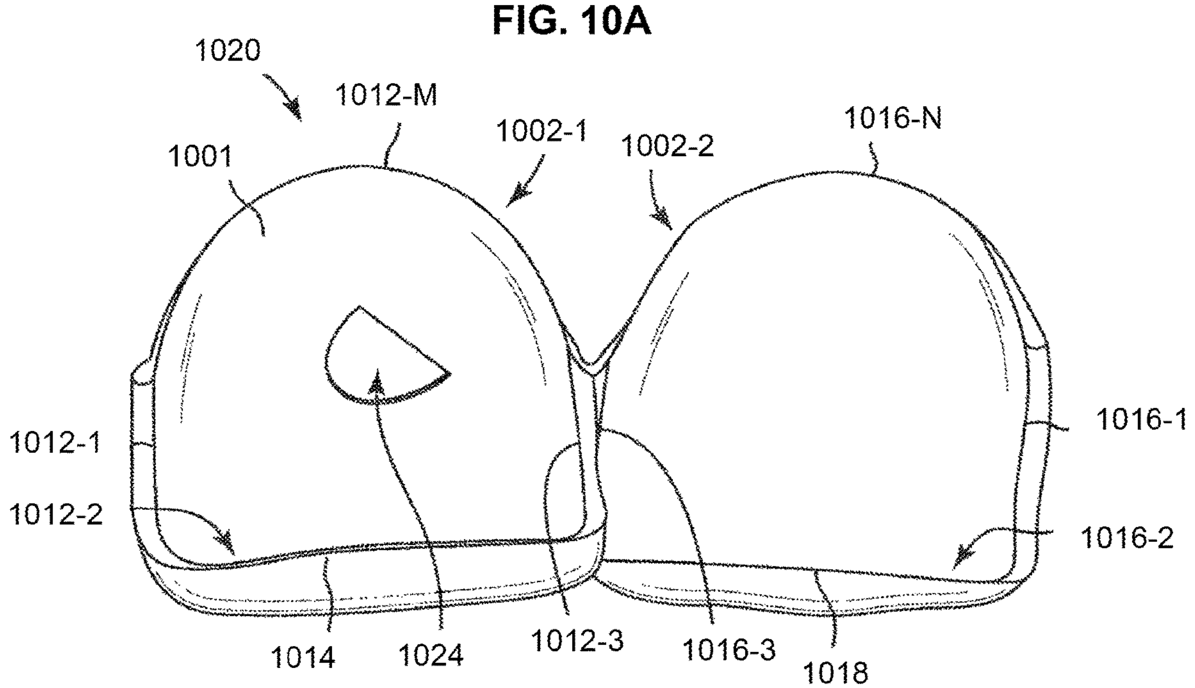
FIG. 10B illustrates a back view of the dental attachment placement structure of FIG. 10A.

FIGS. 10A and 10B illustrate another apparatus embodiment that can be used in the placement of an attachment on the surface of a tooth. FIG. 10A illustrates a front view of a dental attachment placement structure for etching a tooth according to a number of embodiments of the present disclosure. FIG. 10B illustrates a back view of the dental attachment placement structure of FIG. 10A. In the example of FIG. 10A, the body 1001 includes an aperture 1024 formed in portion 1002-1. The aperture 1024 has a specific shape 1022 that, when the apparatus 1020 is placed correctly on the tooth, will allow the attachment area (i.e., the area at which the attachment will be attached) to be etched without etching other areas of the tooth. The structure illustrated in FIG. 10A, allows the treatment professional to place the apparatus 1020 onto the teeth of a patient to provide a mask for purposes of etching in a more accurate position and orientation for placement of an attachment. The example illustrated in FIG. 10B includes multiple surfaces that can be used to assist in the alignment of the etch mask with respect to the intended surface of the tooth to which the attachment is to be secured. For example, one or more of surfaces: 1012-1, 1012-2, 1012-10, 1012-M, 1014, 1016-1, 1016-2, 1016-10, 1016-N, 1018, and/or inner surfaces of portions 1002-1 and/or 1002-2 can be utilized in various embodiments of the present disclosure. The surface of the tooth can be etched with an etching material that can, for example be brushed onto the surface of the tooth by the treatment professional through the aperture 1024. In the embodiment of FIGS. and 10B, the shape 1022 of the aperture 1024 is sized and shaped to be as large or slightly larger or smaller than the attachment that is to be placed on the tooth. However, in some embodiments, the size and/or shape of the aperture may be different than the surface of the attachment that is to be placed in the tooth.

Figure 10C:
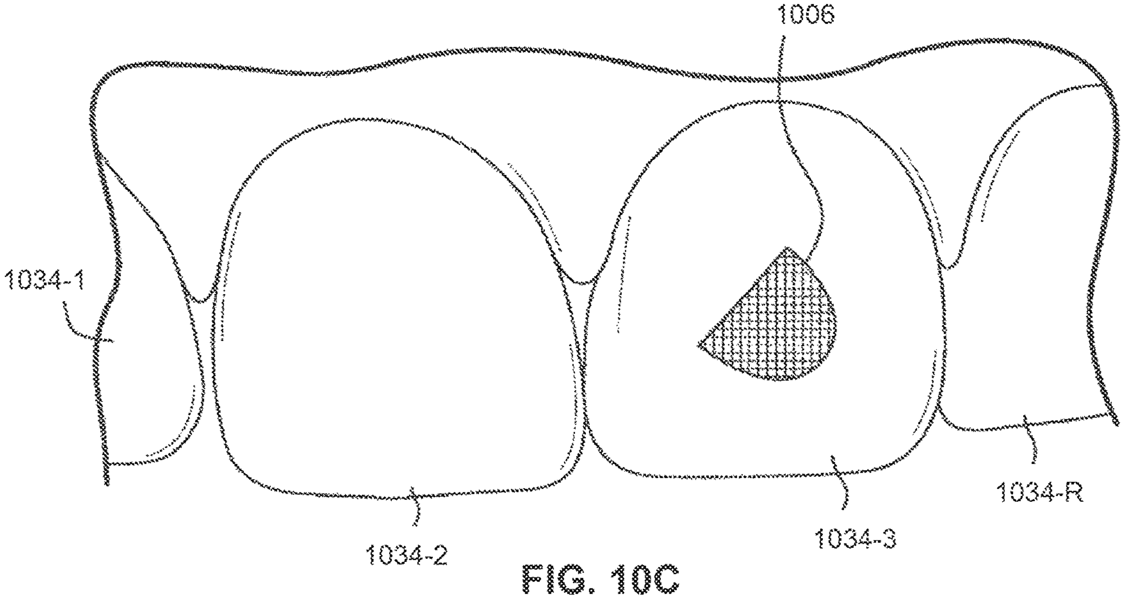
FIG. 10C illustrates a front view of an etched area of a tooth of a patient that has been etched utilizing the dental attachment placement structure of FIGS. 10A and 10B.

FIG. 10C illustrates a front view of an etched area of a tooth of a patient that has been etched utilizing the dental attachment placement structure of FIGS. 10A and 10B. The resultant etched area 1006 has been accomplished via the attachment mounting structure illustrated in FIGS. A and 3B. In this manner, the surface of the tooth can be etched at an area that is large enough to secure an attachment, but not un-necessarily large. Also, in this manner, an attachment can be correctly positioned on the surface of tooth 1034-3 and oriented such that it can provide the desired force to the teeth of the patient. (e.g., 10344, 1034-2, 1034-3, 1034-R, and/or other teeth of the patient) when combined with the dental appliance that wild attach to the attachment.

Figure 11:
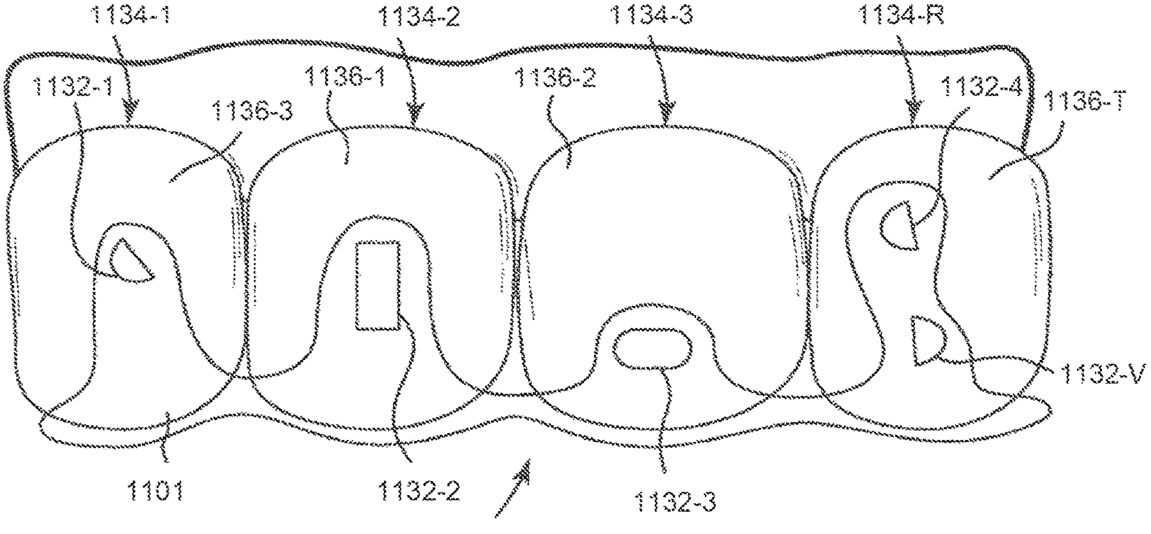
FIG. 11 illustrates a front view of a dental attachment placement structure having multiple attachment placement components provided on the structure, in accordance with some embodiments.

FIG. 11 illustrates a front view of a dental attachment placement structure 1100 having multiple attachment placement components provided on the structure according to a number of embodiments of the present disclosure. In the embodiment of FIG. 11, the body 1101 of apparatus 1100 has an attachment mounting structure that includes multiple apertures 1132-1, 1132-2, 1132-3, 1132-4, and 1132-V that can be used to etch portions of teeth 1134-1, 1134-2, 1134-3, 1134-R on surfaces 1136-1, 1136-2, 1136-3, and 1136-T. In order to save fabrication time and materials cost, the apparatus may include multiple etch locations and only some may be used at any given time. In such applications, the apparatus 11110 can, for example, be used to etch a location on a tooth at one point in time and can be reused to etch another location on a tooth at another point in time.

Figure 12A:
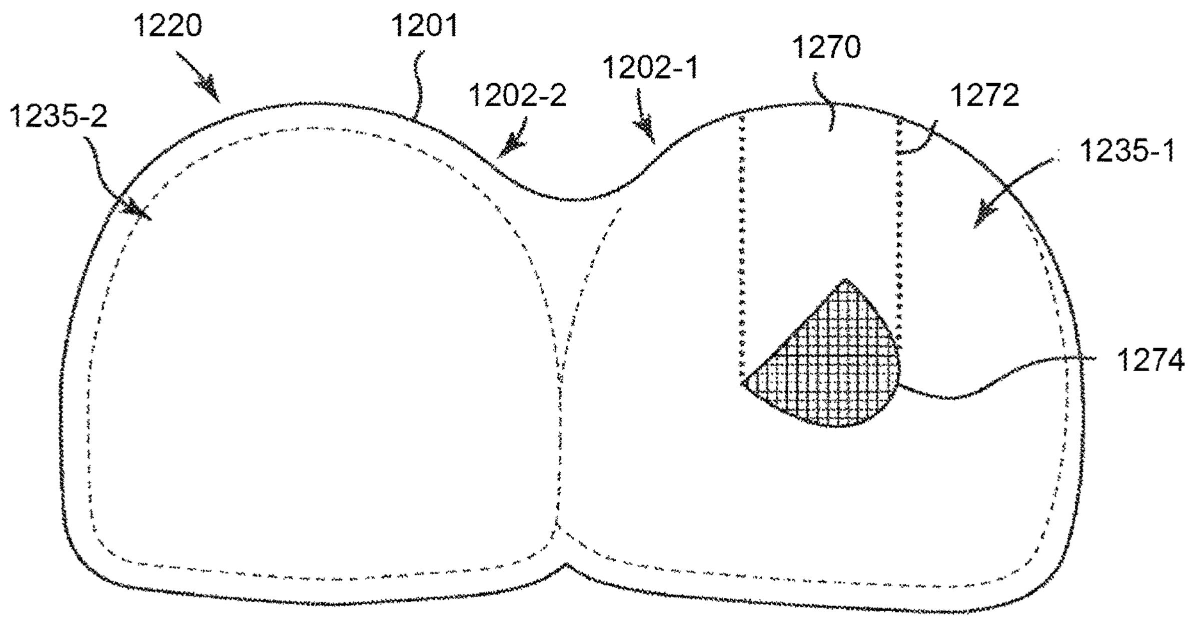
FIG. 12A illustrates a front view of another dental attachment placement structure for etching a tooth, in accordance with some embodiments.

FIG. 2A illustrates a front view of another dental attachment placement structure for etching a tooth according to the present disclosure. In the example of FIG. 12A, the apparatus 1220 includes a body 1201 having at least one surface shaped to conform to one or more of the contours of an exterior surface of a tooth. The body has multiple surfaces, 1202-1 and 1202-2, each shaped to conform to the multiple contours of an exterior surface of a tooth. Some embodiments may have one or more other surfaces similar to those shown in FIG. 10B to aid in the alignment of the dental attachment placement structure with the tooth. In the example of FIG. 12A, the surface 1202-1 is positioned on tooth surface 12312-1 and surface 1202-2 is positioned on tooth surface 12312-2.

Figure 12B:
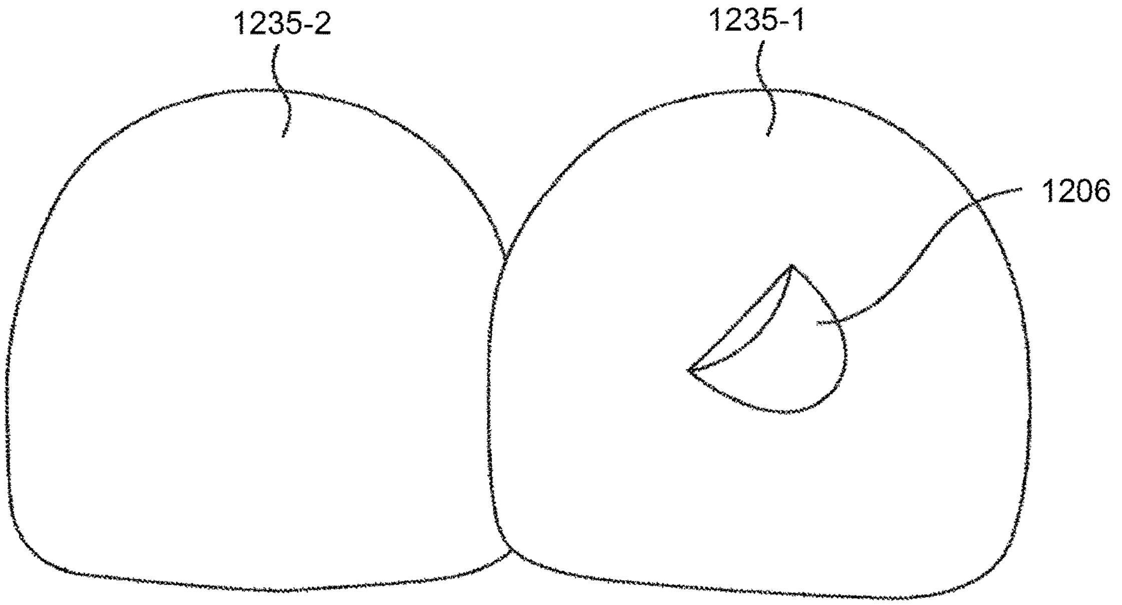
FIG. 12B illustrates front view of a dental attachment attached to a tooth of a patient utilizing the dental attachment placement structure of FIG. 12A.

FIG. 12B illustrates front view of a dental attachment attached to a tooth of a patient utilizing the dental attachment placement structure of FIG. 12A. This figure includes a tooth surface 1235-1 of a first tooth and a tooth surface of a second tooth 1235-2, and an attachment 1206 mounted on the surface 1235-1.

Figure 13A:
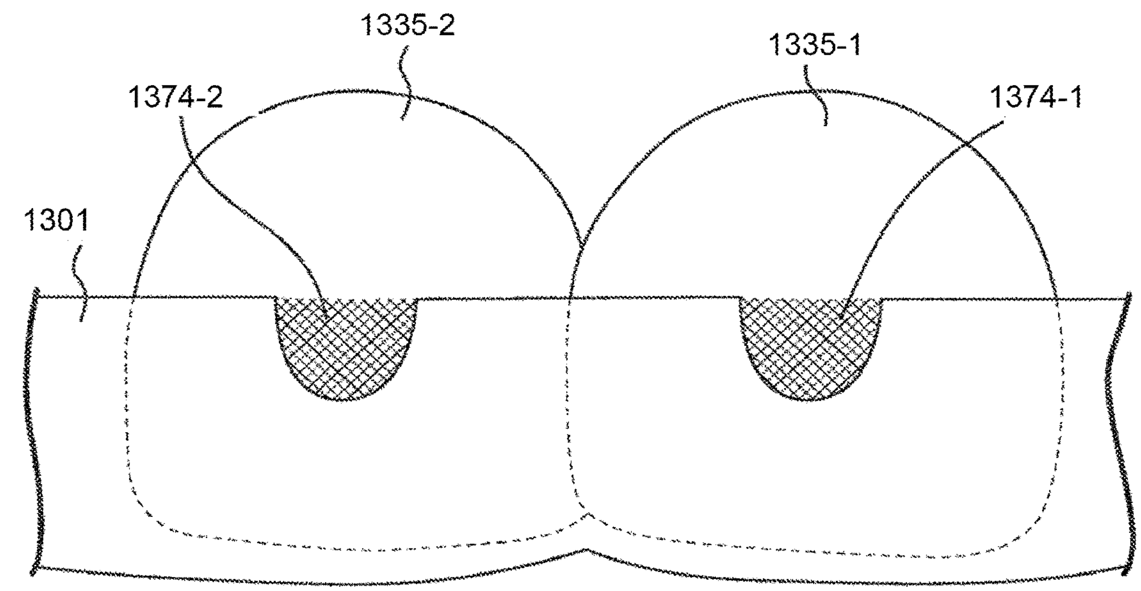
FIG. 13A illustrates a front view of another dental attachment placement structure for etching a tooth, in accordance with some embodiments.
Figure 13B:
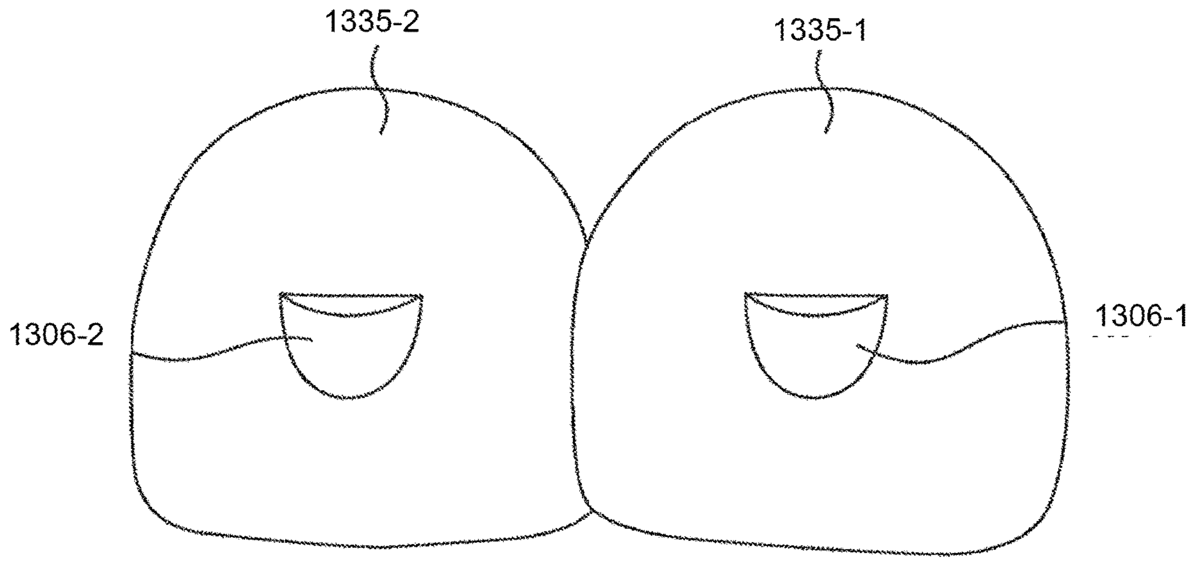
FIG. 13B illustrates front view of multiple dental attachments attached to multiple teeth of a patient utilizing the dental attachment placement structure of FIG. 13A.

FIG. 13A illustrates a front view of another dental attachment placement structure for etching a tooth according to the present disclosure. FIG. 13A illustrates an example wherein the body 1301 of the dental attachment placement structure has apertures that do not fully surround the area to be etched. The body can be used as a guide for what area is to be etched (e.g., areas 1374-1 and 1374-2), and as a guide to placement of one or more attachments (e.g., 1306-1 and 1306-2), but also allows for removal of the body 1301, once the attachment has been secured to the surface of the tooth (e.g., 1335-1 and/or 1335-2). For instance, FIG. 13B illustrates front view of multiple dental attachments attached to multiple teeth of a patient utilizing the dental attachment placement structure of FIG. 13A. This figure includes a tooth surface 1335-1 of a first tooth and a tooth surface of a second tooth 1335-2, and attachments 13013-1 and 13013-2 mounted on the surfaces 1335-1 and 1335-2, respectively. As can be seen from FIG. 13B, the attachments 13013-1 and 13013-2 are positioned and oriented on the surface of the teeth 1335-1 and 1335-2 in the same position and orientation as the etched areas 1374-1 and 1374-2, thereby allowing better adhesion of the attachments 13013-1 and 13013-2 to the surface of the teeth 1335-1 and 1335-2. This is because the attachment was placed in the apertures of body 1301 while it was positioned on tooth surfaces 1335-1 and 1335-2, then removed after the attachments 13013-1 and 13013-2 were adhered to etched areas 1374-1 and 1374-2.

Figure 14A:
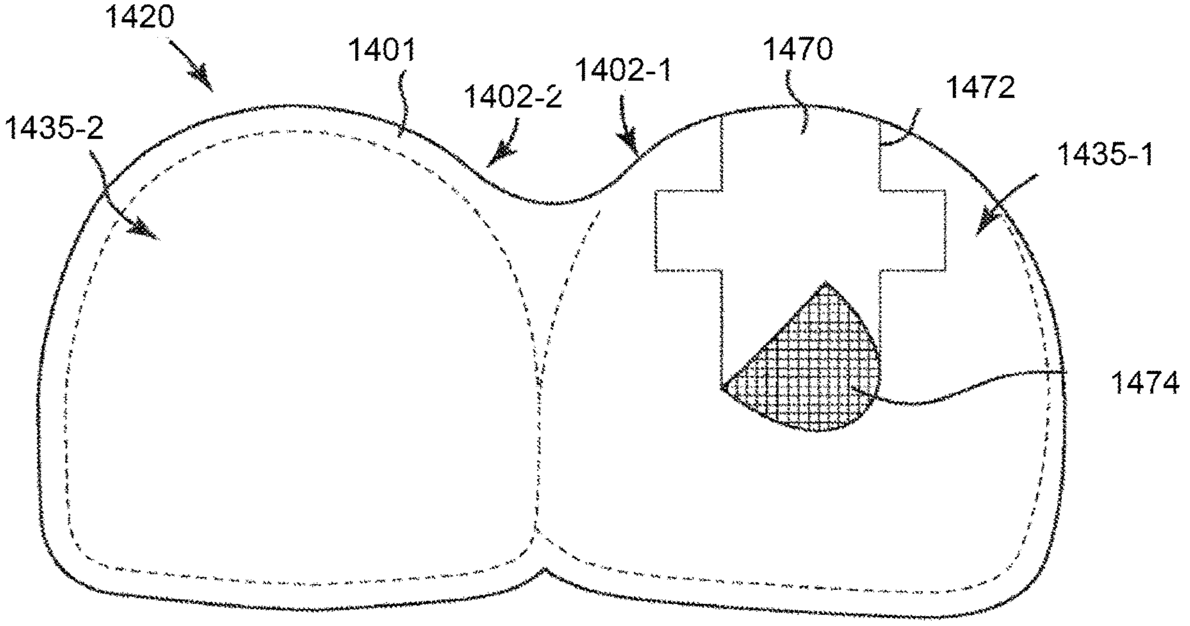
FIG. 14A illustrates a front view of another dental attachment placement structure for etching a tooth, in accordance with some embodiments.

FIG. 14A illustrates a front view of another dental attachment placement structure for etching a tooth according to the present disclosure. The example of FIG. 14A is similar to that of FIG. 12A. In the example of FIG. 14A, the apparatus 1420 includes a body 1401 having at least one surface shaped to conform to one or more of the contours of an exterior surface of a tooth. The body has multiple surfaces, 1402-1 and 1402-2, each shaped to conform to the multiple contours of an exterior surface of a tooth.

Figure 14B:
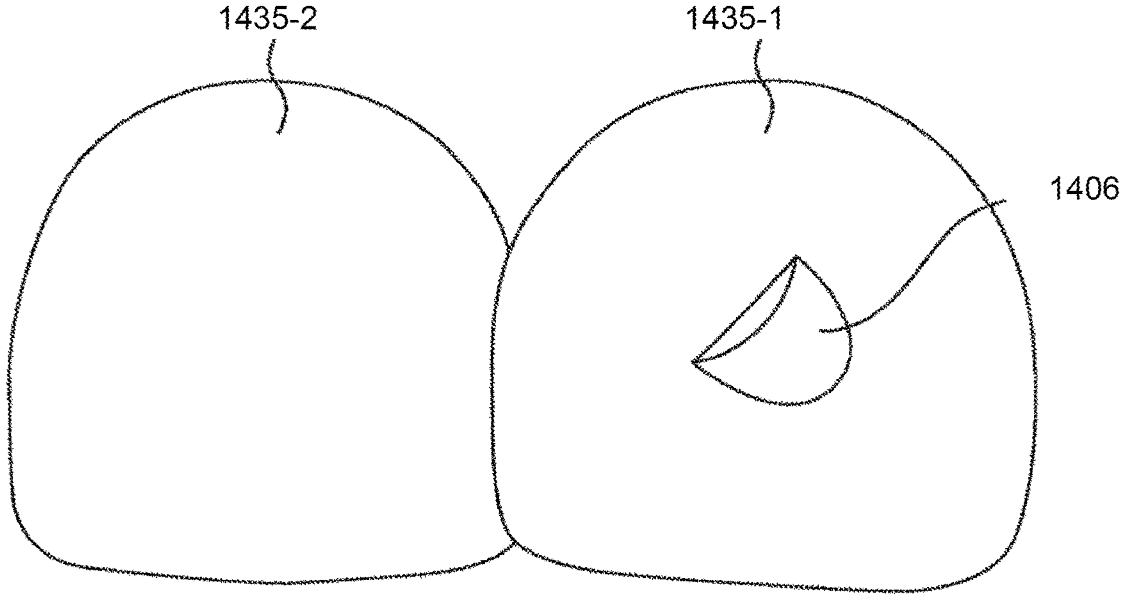
FIG. 14B illustrates front view of a dental attachment attached to a tooth of a patient utilizing the dental attachment placement structure of FIG. 14A.

FIG. 14B illustrates front view of a dental attachment attached to a tooth of a patient utilizing the dental attachment placement structure of FIG. 14A. This figure includes a tooth surface 1435-1 of a first tooth and a tooth surface of a second tooth 1435-2, and an attachment 1406 mounted on the surface 1435-1. As illustrated in this figure, the attachment 1406 is positioned and oriented on the surface of the tooth 1435-1 in the same position and orientation as the etched area 14144, thereby allowing better adhesion of the attachment 1406 to the surface of the tooth 1435-1. As with the embodiment of FIGS. 12A and 12, this is because the attachment was placed in the aperture of body 1401 while it was positioned on tooth surfaces 1435-1 and 1435-2, then removed after the attachment 1406 was adhered to etched area 1434.

In some aspects, an attachment placement device and/or attachment includes a body configured to position one or more attachments to a tooth of a dental arch, the body including multiple apertures, the body including a contoured surface for mating with one or more teeth of the dental arch to align each of the multiple apertures over a particular corresponding position on a surface of the tooth, wherein each of the multiple apertures has an attachment attached to one or more supports extending from the body and arranged radially with respect to the attachment to support the attachment within the aperture and align the attachment over the particular corresponding position. Each attachment can include one or more engagement surfaces configured to engage with an aligner dental appliance to apply a force to the one or more teeth. The supports for attachments can be configured to be broken from the attachment at or near locations where the at least two supports and the attachment are connected. Examples of such attachment placement devices include those described in U.S. patent application Ser. No. 15/623,263, entitled, “Dental attachment placement structure,” filed Jun. 14, 2017, to Webber et al., the contents of which are hereby incorporated by reference as if set forth fully herein.

FIGS. 15A-17C provide several implementations that each include different support structures that make the connection between the body of the dental attachment placement structure and the attachment. These implementations may each have benefits for some implementations and those differences and their benefits are discussed below.

As shown and described in the implementations of FIGS. 15A-17C, the attachment is located within an aperture and the dental attachment placement structure includes at least one support connecting the attachment to the body. As can be seen from the implementation of FIG. 15C, the attachment 1506 can be connected to the one or more supports 1508. The direct connection can be arched as shown to reduce or eliminate contact of the support to the surface of the tooth.

Such an arch may be beneficial, for example, because the treatment professional may not have to maneuver a detachment tool as close to the tooth as an implementation where the support or the connection between the support and the attachment touch the tooth surface. In some such implementations, the support can be connected to the attachment such that it can be released from the attachment.

For example, in some implementations, the junction between the attachment and the support can include a feature to assist in the detachment of the attachment from the support. This feature can be located at or near the transition between the support material and the attachment material.

The feature can, for example, be a physical feature provided at the junction, such as one or more perforations, a portion that is thinner than the rest of the support and/or attachment, or a different material than the attachment and/or the support, among other attachment separation structures discussed herein. The feature can also be the use of a particular material at the junction that allows for a stimulant to be applied to that material that allows the attachment to be more easily removed. Such materials could, for example, make the material more brittle, thereby allowing it to be more easily broken, or cause the material to dissolve or disintegrate. Examples, of stimulants include wavelengths of light, such as UV, or chemical materials that cause the above affects based on interaction with the support material at the junction between the attachment and the one or more supports.

Once the attachment 1506 is separated from the body 1501, the attachment will remain on the tooth (e.g., attachment is affixed via adhesive to the surface of the tooth) during a portion or all of one or more treatment periods and the dental attachment placement structure body will be removed from the teeth of the patient. For example, this can be accomplished by lifting parts of the body over the attachment or by cutting/breaking the body into pieces and removing it in that manner.

The implementation also includes a dental attachment placement structure, connected to a dental attachment to hold the attachment in a particular position. A portion of the body has a contour that is shaped to correspond with a contour of an alignment surface of a tooth such that when the contour of the body and the corresponding contour of the tooth are aligned, the aperture is located over the particular position on the surface of the tooth.

Figure 15A:
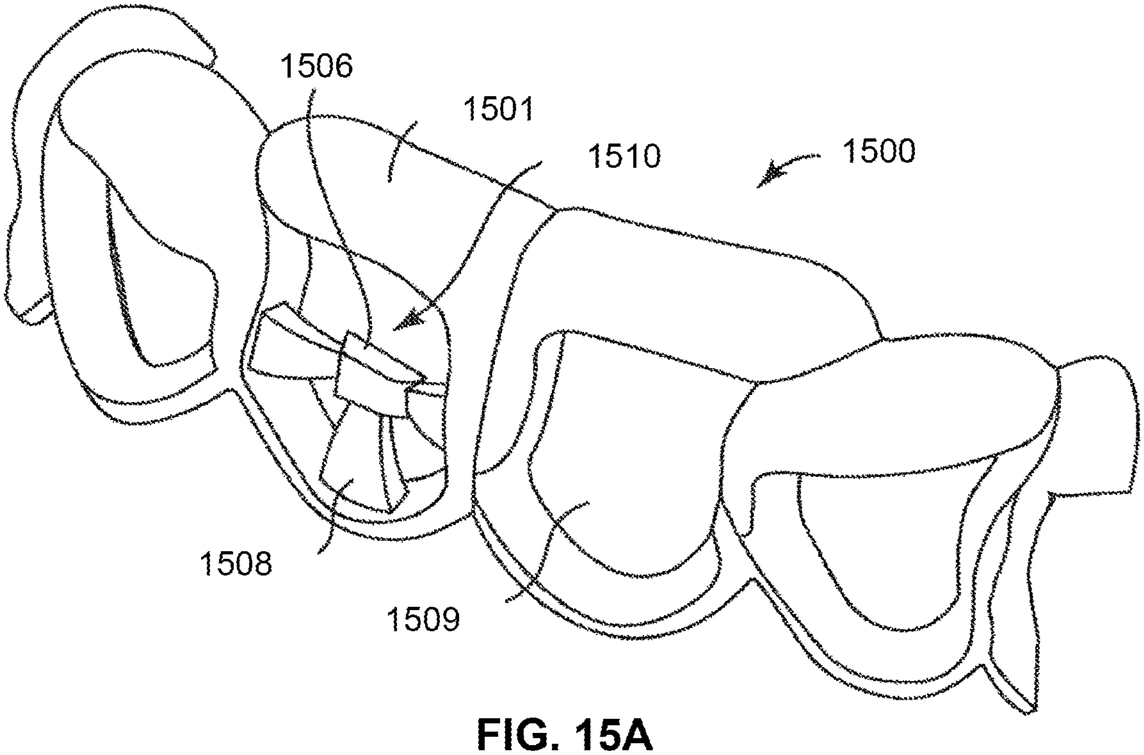
FIG. 15A illustrates an angled front view of a dental attachment placement structure having an attachment placement component provided on the structure, in accordance with some embodiments.

FIG. 15A illustrates an angled front view of a dental attachment placement structure having an attachment placement component provided on the structure according to a number of implementations of the present disclosure. conforming to the surface of the tooth and that there is a top surface In the view of FIG. 15A, an attachment placement structure that conforms to the front surfaces of a tooth at a top of the tooth, sides of the tooth and bottom of the tooth (along the gingival line of the tooth). The illustrated structure is shown for a lower jaw, but such implementations are not limited to use with the lower jaw. The attachment placement structure 1500 of FIG. 15A includes a body 1501 having several tooth shaped portions, at least one of those portions having an attachment 1506 connected thereto by a number of supports 1508, the supports separated by one or more apertures 1510.

FIG. 15A shows the attachment 1506 attached to the body 1501 by three supports 15015. One feature of the supports shown in FIG. 15A, is that they are arched along their direction of elongation. This feature can allow the surface of the supports that is closest to the tooth to be a distance that is further away from the tooth than the surface of the attachment that is closest to the tooth (the surface of the attachment that is to be attached to the tooth).

Further, as can be seen in the implementation of FIG. 15A, the support can be tapered from a first thickness at its connection to the body 1501 to a second, thinner thickness at its connection to the attachment 1506. This can be beneficial in various ways. For example, the thinned connection at the attachment end of the support allows more space for a separation tool to be placed, while the thicker end allows a more stable and substantial support member during positioning and separation.

The illustration of the implementation in FIG. 15A also shows that the body may not cover the entire front surfaces of the teeth adjacent to the tooth on which the attachment 1506 is to be affixed. For example, an aperture 1509 may be formed in the body over a portion that would cover a part of the adjacent tooth.

Figure 15B:
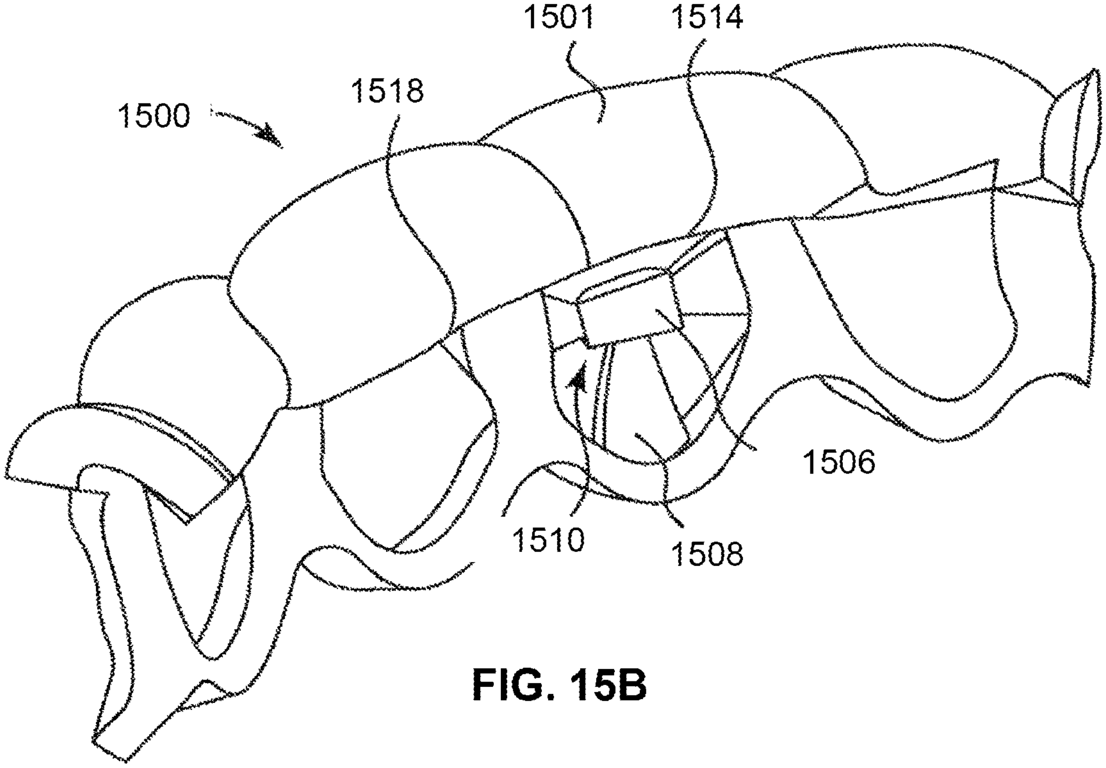
FIG. 15B illustrates an angled back view of the dental attachment placement structure of FIG. 15A.

FIG. 15B illustrates an angled back view of the dental attachment placement structure of FIG. 15A. In this view, the body 1501 of the structure 1500 has a number of tooth cavities for the placement of a tooth therein. In the example of FIG. 15B, four cavities are shown, however, implementations are not limited to four teeth and more or less tooth cavities can be provided in various implementations.

Each cavity is formed from a number of surfaces of the structure that are used to contact a corresponding surface of the tooth onto which the cavity is placed. As shown in FIG. 15A, those surfaces may represent complete surfaces of a tooth or parts of such surface (e.g., the aperture 1509).

The apparatus includes a body 1501 having a tooth-shaped surface that is shaped to conform to the front surface of a tooth and is to be placed against the front surface of the tooth. This tooth-shaped surface of the body can include an aperture (e.g., aperture 1510) to allow placement of an attachment at a particular position on the tooth surface. It will be understood that, in some implementations, the aperture may not be completely closed around its edge. Such designs should be considered to be within the implementations of the present disclosure.

As shown in FIG. 15A, FIG. 15B also shows the apertures 1510 that provide spaces between the supports 15015. In the implementation of FIG. 15B, the structure also includes a first back side portion 1514 that conforms to the back side of the first tooth and a second back side portion 15115 that conforms to the back side of the second tooth. As will be discussed with respect to FIG. 15C, a surface of the structure may also be used in conjunction with the biting surface of a tooth for improving the alignment of the attachment prior to affixing it to the tooth.

Also, it should be noted by the reader that the surface on which the line for element number 1506 is positioned is the surface on the attachment that is to be attached to the tooth. It is on this surface that an adhesive material is to be placed (the adhesive is not shown). The adhesive can be applied to the entire surface or to a part thereof. The adhesive can be ultra-violet (UV) curable adhesive or any other suitable type of adhesive that can be used to affix the attachment to the tooth surface.

In some implementations, the attachment can, for example, include an adhesive layer positioned to secure the attachment to an affixing surface of a tooth. In some implementations, the adhesive is only located on the portion of the attachment that will contact the tooth. In this manner, it is unlikely that the adhesive will secure other parts of the apparatus to the tooth or create excess dried adhesive that may need to be removed from the tooth.

In some implementations, the surface of the attachment that contacts the tooth may contain a recessed well or pocket in which an adhesive can be applied. This controls the location of where the adhesive is applied and avoids issues surrounding excess adhesive, for example, unwanted flash, unwanted adherence of the positioning structure supports to the tooth.

In some implementations, a release layer is provided over the adhesive. The release layer can be a thin film of plastic, wax paper, or other suitable covering that can be removable by the treatment professional when it is time for the attachment to be placed on the tooth of the patient. This can be beneficial, for example, to allow the adhesive to be applied at or shortly after fabrication of the apparatus, does not expose the adhesive to contaminants that may harden or make the adhesive less effective (e.g., dust).

The use of surfaces (e.g., 1514, 1518, and/or 1512 of FIG. 15C) in conjunction with other surfaces can also allow for use of the corners of one or more teeth to be used to aid in positioning and/or orientation of an attachment. The use of corners can be beneficial in that they can be used to control the positioning of the attachment in more axes of movement than use of the edge surfaces of a tooth.

Figure 15C:
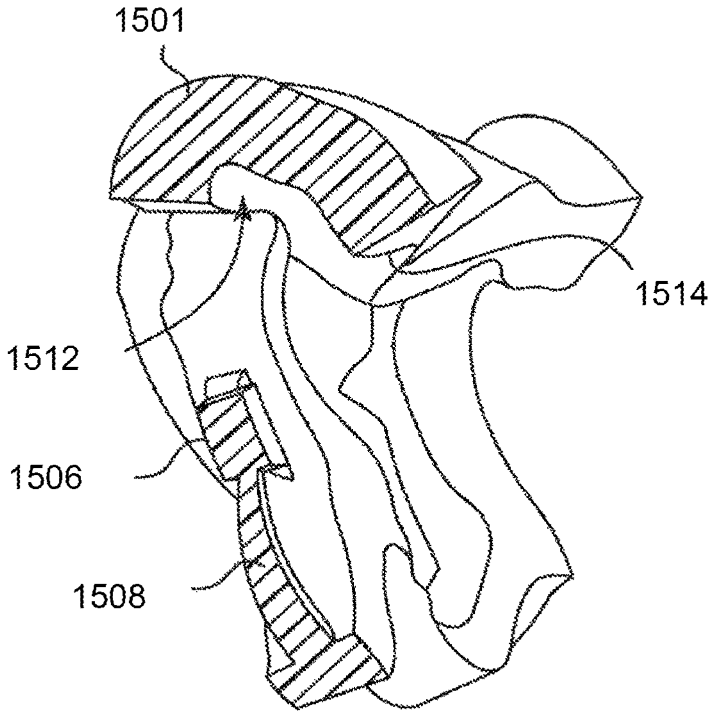
FIG. 15C illustrates a cutaway side view of the dental attachment placement structure of FIG. 15A.

FIG. 15C illustrates a cutaway side view of the dental attachment placement structure of FIG. 15A. FIG. 15C provides a view of the shape of the cavity described above as well and more detail regarding the supports 15015 and attachment 1506 and their connection.

As discussed above with respect to FIG. 15B, the cavity for placement of a tooth is formed from a number of surfaces of the body 1501 of the structure. For example, the cavity, in the implementation of FIG. 15A-15C is formed from the inside surface that conforms to the front side of the tooth (e.g., buccal side), a surface 1512 that contacts and wraps around the tooth's incisal edge (top surface of the tooth in this implementation, but may be bottom surface, if the structure is designed for the upper jaw), and surface 1514 that conforms to the back side of the tooth (e.g., lingual side). In this manner, the three surfaces, when in contact with the tooth, can provide more precise locating of the attachment for placement on the tooth.

Figure 16A:
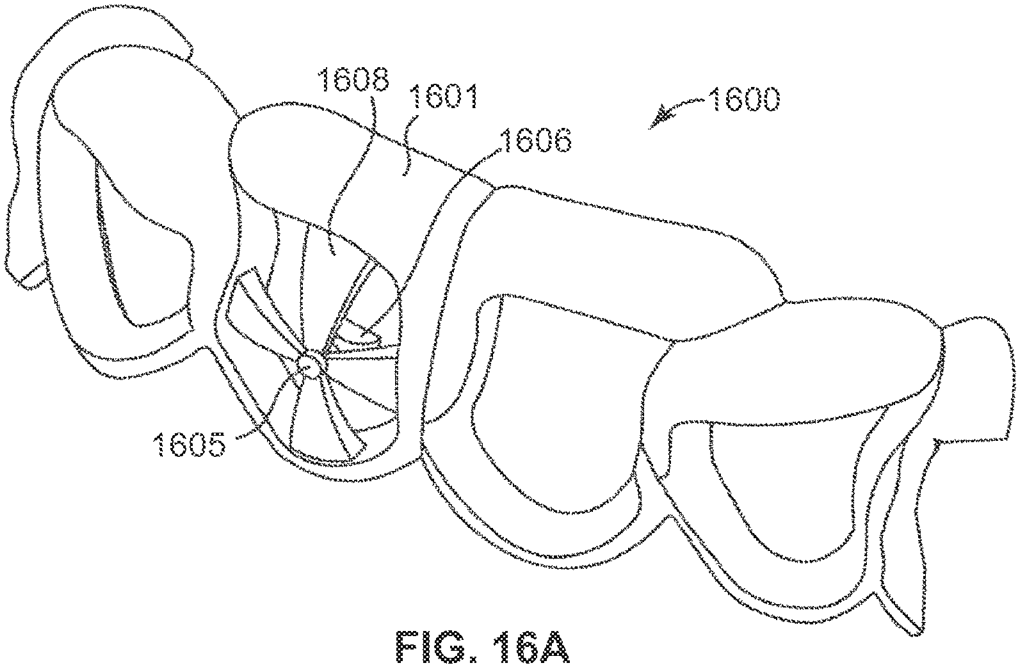
FIG. 16A illustrates an angled front view of a dental attachment placement structure having an attachment placement component provided on the structure, in accordance with some embodiments.
Figure 16B:
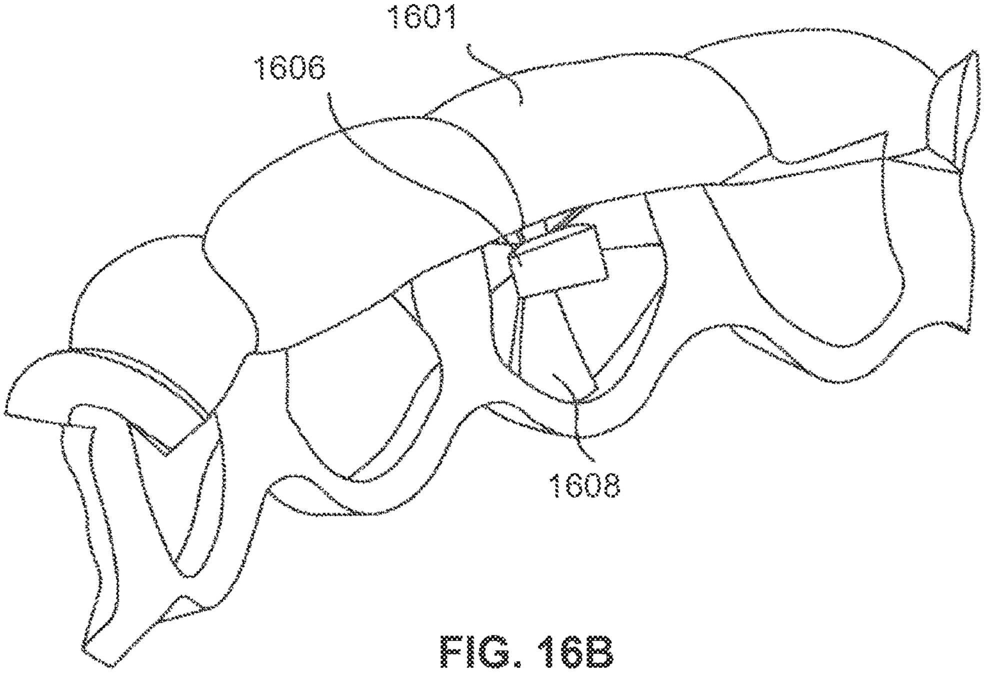
FIG. 16B illustrates an angled back view of the dental attachment placement structure of FIG. 16A.

FIG. 16A illustrates an angled front view of a dental attachment placement structure having an attachment placement component provided on the structure according to a number of implementations of the present disclosure. FIG. 16B illustrates an angled back view of the dental attachment placement structure of FIG. 16A.

In FIGS. 16A and 16B, the structure 1600 includes an attachment 1606 that is connected by a single connection member 1605 to four supports 1608 that are connected to the body 1601. In this type of implementation, the connection that is severed to detach the appliance from the rest of the dental attachment placement structure offers several benefits.

For example, the connection is a single connection allowing the detachment to be made with only one breaking of the connection with the attachment. Also, with a single connection, any residual material from the single connection member is located in one area of the attachment making removal of the extra material easier.

Figure 16C:
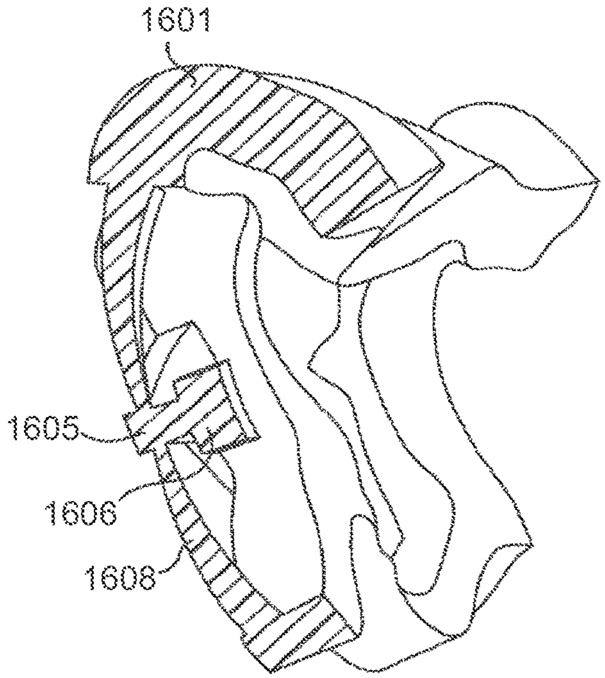
FIG. 16C illustrates a cutaway side view of the dental attachment placement structure of FIG. 16A.

Additionally, in the implementation shown in FIGS. 16A-16C, the connection is at the top of the attachment which makes detachment and removal of any excess material easier as the connection area is away from the surface of the tooth and more easily accessible. In addition, only one surface of the attachment is affected by the presence of these supports, therefore preserving the integrity of all other attachment surfaces. This is important as these surfaces play a critical role in the orthodontic treatment and require a high degree of dimensional accuracy.

Any suitable number of supports can be utilized. For example, in FIGS. 16A-16C four supports 1608 are used, but in other implementations, for example, those shown in FIGS. 15A-15C and 17A-17C, other numbers of supports are provided.

In some implementations, the support functionality can be provided by a material that spans across at least part of the area covering the front surface of tooth. In such an implementation, the attachment can be attached to the material or to one or more connection members such as the type shown at 1605 in FIG. 16A.

In such implementations, the material may, for example, be cut away to allow access to the connection between the connection member and the attachment in order to detach the attachment. In some implementations, a stimulant that can be applied as discussed above. In such implementations, the stimulant can be used, for example, to make the material (or a portion thereof) and/or connection member brittle or dissolve the material and/or connection to detach the attachment therefrom.

FIG. 16C illustrates a cutaway side view of the dental attachment placement structure of FIG. 16A. FIG. 16C, provides a better view of the single connection member 1605 that connects the attachment 1606 to the supports 1608. As shown in FIGS. 16A-16C, in some implementations, there is a single connection area between the attachment and the attachment placement structure. As stated herein, this, for example, allows the attachment to be separated from the rest of the apparatus more easily and/or with less potential for damage to the tooth or attachment during the separation process.

Figure 17A:
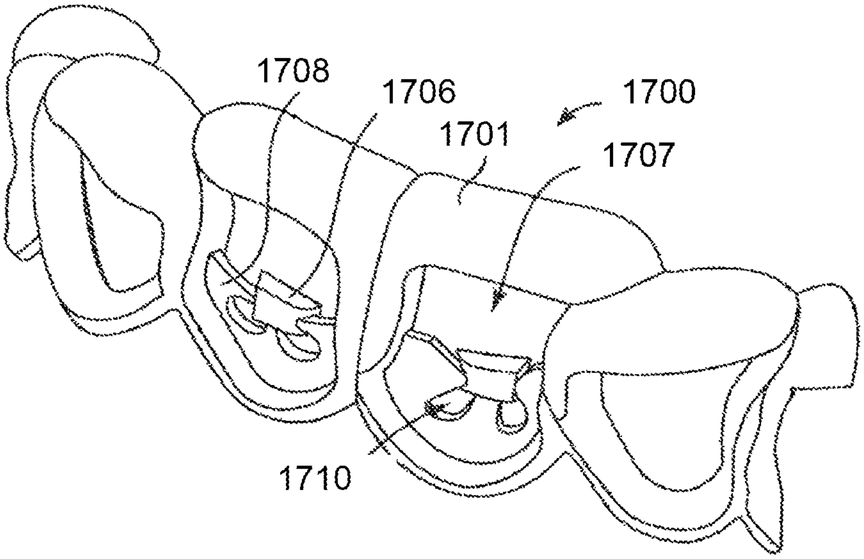
FIG. 17A illustrates an angled front view of a dental attachment placement structure having an attachment placement component provided on the structure, in accordance with some embodiments.
Figure 17B:
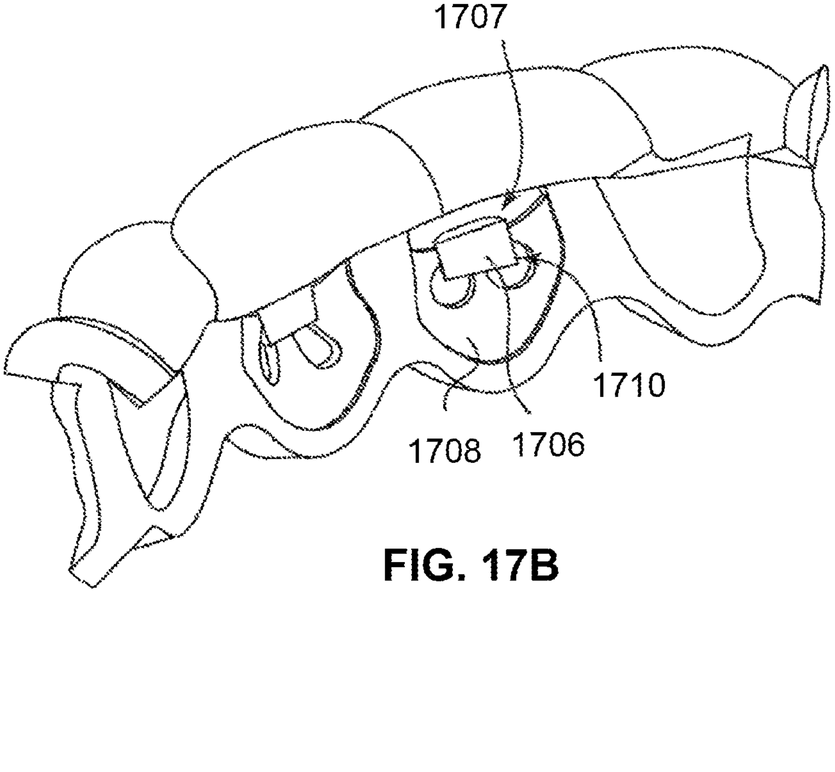
FIG. 17B illustrates an angled back view of the dental attachment placement structure of FIG. 17A.

FIG. 17A illustrates an angled front view of a dental attachment placement structure having an attachment placement component provided on the structure according to a number of implementations of the present disclosure. FIG. 17B illustrates an angled back view of the dental attachment placement structure of FIG. 17A.

As shown in the implementation illustrated in FIGS. 17A and 17B, at least one of the attachment mounting structures can have a support connected between the body and a dental attachment. In this manner the supports can be cut instead of a solid layer of material thereby making it easier to release the attachment from the rest of the apparatus.

For instance, in FIGS. 17A and 17B, the supports, that connect the attachment 1706 to the body 1701 of the structure 1700, can be formed individually or can be formed as a sheet of material and then apertures, such as apertures 1710 can be formed in the sheet of material. This sheet of material can be formed with the body 1701 or can be attached to the body after fabrication. The support structure can be fabricated as shown in FIGS. 17A and 17B or can be fabricated to fill the entire inside area of inside shape of the tooth of the body 1701 and then a part of the support can be removed to form aperture 1707.

The body can also include an additional attachment mounting structure (e.g., a second attachment mounting structure) for attaching one or more dental attachments to an exterior surface of another tooth. This allows further elements of the patient's mouth to be used to further corroborate the position of the appliance. This is, for example, because the surfaces and edges of the apparatus when they contact the mouth of the patient, at surfaces and edges of the tooth or teeth that those surface and/or edges of the apparatus.

For example, as shown in FIGS. 17A and 17B, more than one attachment can be provided on the structure for attachment to a user's teeth. In such implementations, the supports can be the same type of configuration, as shown with respect to supports 1708 in FIG. 17A, or can be different types of configurations (e.g., a support type from 15A-15C could be utilized, and/or from another implementation shown herein).

Figure 17C:
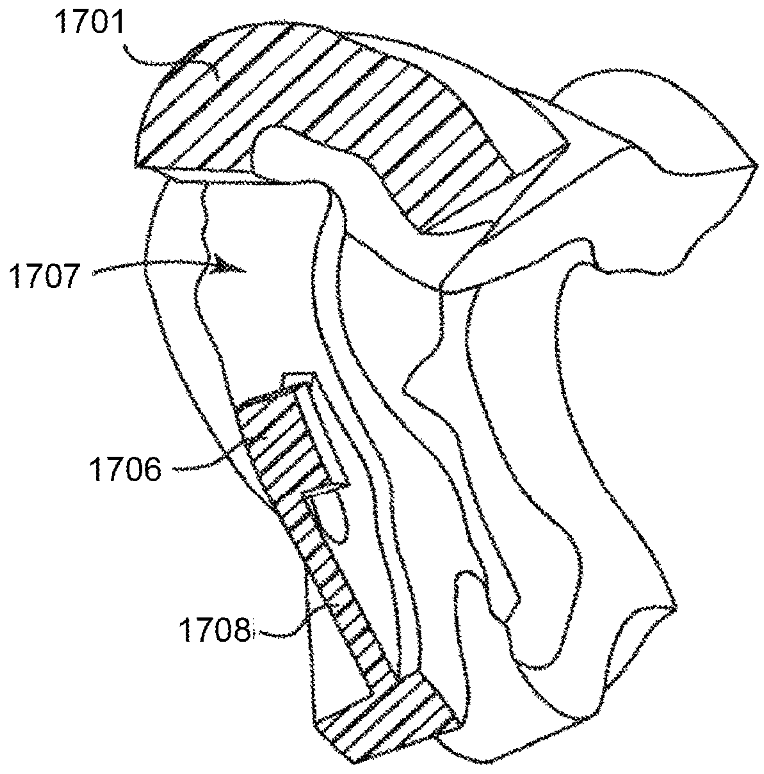
FIG. 17C illustrates a cutaway side view of the dental attachment placement structure of FIG. 17A.

In some implementations, having more support material (e.g., the support structure of FIGS. 17A-17C compared to the thinner supports of FIGS. 15A-15C) may provide benefits in certain implementations. For example, a more stable structure may provide for better positioning of the attachment, due to its rigidity or other characteristics.

FIG. 17C illustrates a cutaway side view of the dental attachment placement structure of FIG. 17A. FIG. 17C better shows the arrangement of the support structure 1708 and the aperture 1707 formed with respect to the attachment 1706 and body 1701. In this implementation, the support structure is not arched, which may be easier to manufacture, among other benefits, and its connections to the attachment 1706 are away from the surface that will contact the tooth of the patient. As stated elsewhere, this may be beneficial in allowing for easier detachment of the attachment 1706 from the support structure 1708 and less potential for damaging the tooth during the detachment process, among other benefits.

In some aspects, an attachment placement device and/or attachment includes a may include a minimal holding one or more dental attachments. The minimal frame may include features for registering and accurately aligning and orienting the dental attachments with respect to surfaces of the teeth, and for securing the dental attachments to the teeth. The attachment positions on the teeth may be determined based on an orthodontic treatment plan using a virtual model of a patient's dental arch. Examples of such attachment placement devices include those described in U.S. patent application Ser. No. 16/366,686, entitled, "Dental attachment placement structure," filed June Mar. 27, 2019, to Webber et al., the contents of which are hereby incorporated by reference as if set forth fully herein.

As discussed herein, the dental attachments are structures that are specifically shaped to provide particular forces to move one or more teeth of a patient. They can be used to move a tooth directly (e.g., to move a tooth to which they are attached) or indirectly (e.g., to act as an anchor and to direct force elsewhere to move a tooth toward another location in a patient's mouth). As described herein, the attachment can be used to apply a force to one or more teeth when used in conjunction with, for example, a cavity formed in an aligner. The cavity can be shaped to have at least one surface that contacts a surface of the attachment, with the aligner providing the force to the attachment, which is then used to move the one or more teeth. In order to impart a force accurately, the attachment should be placed at a precise position on a surface of a tooth and in a particular orientation to the tooth, such that when the aligner is placed over the teeth, the specialized cavity having the surface therein will contact the desired surface of the attachment in a manner that will accurately impart the desired force at the desired force vector.

In some cases, the attachment is configured to be used in conjunction with an alignment device instead of, or in addition to, an aligner. For example, the attachment may be adapted to engage with an elastic band or brace to provide more leverage and more force on the teeth. In a specific example, the attachment includes a hook or groove that an elastic band can hook around. Such attachment features are sometimes referred to as power arms or buttons. The elastic band can hook around two of the attachments to apply a pulling force that applies a force pulling the two attachments together. Accurate positioning and orientation of such attachment features on the tooth surfaces can be important in order to apply the forces in a desired direction.

The accurate positioning of an attachment is referred to herein as registration, which describes a condition of correct alignment or proper relative position and orientation with respect to a surface of a tooth. This term can be used to describe the proper positioning of an attachment, but can also be used to describe the proper fit between an attachment placement structure and a surface or edge of a tooth used to assure proper positioning and orientation of the attachment placement structure. As described herein, this can involve the use of a contoured surface on the attachment placement structure having unique undulations or grooves that match the unique undulations or grooves on the surface of a particular tooth of a patient, wherein registration refers to the alignment of the undulations or grooves of the surface of the attachment placement structure with those of the tooth surface and when aligned, and which indicates that the attachment placement structure is in the correct position and orientation for placement of the one or more attachments. This contoured surface can be formed based on a computer model (e.g., 3D or 2D) of at least a portion of a patient's dentition. In some cases, the more features (e.g., undulations, grooves, surfaces of a tooth, edges of a tooth, number of surfaces or edges of other teeth), the more accurate the positioning and orientation of the attachment can be.

In some embodiments, the attachment placement structure is formed with the one or more attachments attached thereto. Such technologies can be particularly useful in some such embodiments as the two can be fabricated during the same process. For example, the attachment placement structure and attachments can be formed together using one or more of an additive manufacturing (3D printing) process, a subtractive manufacturing process (e.g., machining, cutting, milling, drilling, or etching), and a molding process.

In some embodiments, the body of the attachment placement structure can be in the form of a frame with the one or more attachments extending from the frame. In addition to the attachment(s), the frame can support other features for placing and aligning the attachment placement device on a dental arch. For example, one or more registration anchors used to register the position of the attachment(s) can also extend from the frame. In some embodiments, one or more retention supports used to support the position of the attachment placement device extend off the frame.

An advantage of a such a frame structure is that the attachment placement device can be made of a minimal amount of material and may be more easily fabricated. In some cases, the attachment placement device can be 3D printed without the use of supports used in conventional 3D printing processes. This can eliminate the need to remove such supports after the printing process, thereby decreasing the time and cost of manufacture. Thus, a portion of the attachment placement device may have a surface having a shape corresponding to a build plate used during a 3D printing process. In some cases, this surface is (e.g., substantially) flat. The frame structure may also allow for easier access to the parts of the dental arch during placement of the attachment as the frame may take up less space around the teeth compared to an attachment placement structure that covers and occludes more of the dental arch. Thus, the treatment professional can access portions of the teeth and/or gums that would not be accessible using a higher coverage placement apparatus.

Figure 18A:
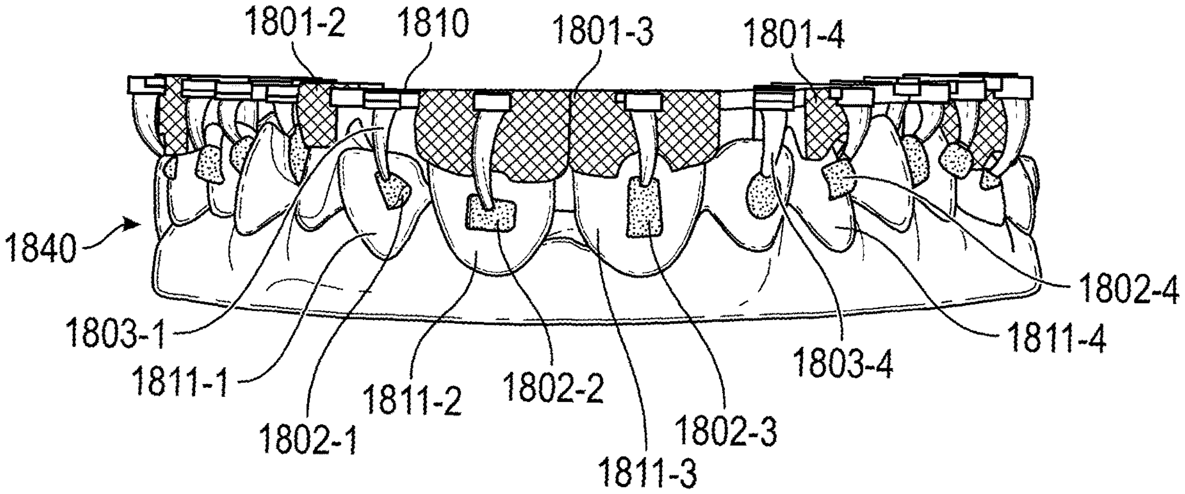
FIG. 18A illustrates a front view of a dental attachment placement structure, in accordance with some embodiments.

FIG. 18A illustrates a front view of a dental attachment placement structure according to a number of embodiments of the present disclosure. The structure illustrated includes several components that when used together can be beneficial in the accurate placement and orientation of one or more attachments on one or more buccal tooth surfaces of a dental arch 1840. The features illustrated in this figure are a frame 1810 configured to extend over at least a portion of the dental arch. The frame may be a solid structure that follows the shape of the dental arch of the patient, or a portion of the dental arch. The frame can support one or more extending structures that cooperate with the frame to register the one or more dental attachments (examples of which are identified as 1802-1, 1802-2, 1802-3, and 1802-4) to predetermined tooth surface position(s). The dental attachment(s) may be attached to the frame via one or more an attachment supports (examples of which are identified as 1803-1 and 1803-4). This can allow the dental attachment to extend a distance from the frame and to access the predetermined position on a corresponding tooth surface. If multiple attachments are used, the attachment supports may extend in the same direction with respect to the frame. For instance, attachment supports may extend in a downward (or upward) direction from the frame to position the supports below (or above) the frame.

The dental attachment may be removably attached to the attachment support such that the attachment can be detached from the dental attachment placement structure, for example, after the attachment is affixed to the tooth surface. An attachment may be attached to an attachment support at an interface region between the attachment and attachment support. This interface region may be configured for easy detachment. For example, the attachment support may have a thicker end close to the frame that tapers to a lesser thickness at the interface region for easier detachment. In some embodiments, detachment is accomplished using a detachment tool, as described herein. In a number of embodiments, the interface region is sufficiently frangible to allow the attachment to break away from the attachment support without the use of detachment tool. In some cases, a user may be able to detach the attachment by applying a compressive, tensile or pressing force on the attachment (e.g., by the user's hand).

The frame may also include one or more registration anchors (examples of which are identified as 1801-2, 1801-3, and 1801-4) that extend from the frame and that include contact surfaces that register with corresponding one or more teeth. When the contact surfaces of the registration anchor(s) register with corresponding teeth, the dental attachments can also register with the corresponding tooth surfaces. In some cases, the registration anchor contact surface is contoured to complement the undulations and/or grooves of a corresponding surface of one or more teeth. The contoured surface may be adapted to complement the surfaces of any type of one or more teeth, such as one or more incisors, canines, premolars, and molars. The contoured surface may be adapted to complement any side of a tooth, such as one or more lingual, occlusal, buccal, and distal tooth surfaces. In some embodiments, the registration anchor may at least partially encapsulate an incisal edge of a tooth. The registration anchor may and extend over more than one side of a tooth, such as portions of the top (e.g., crown), buccal and/or lingual sides of the corresponding tooth. In the example shown in FIG. 18A, the registration anchors extend over the top and buccal sides of corresponding teeth.

In some cases, the dental attachment is configured to attach to the same tooth as the tooth that the registration anchor is configured to contact. For instance, attachment 1802-4 is aligned with a surface of tooth 1811-4, which is the same tooth that registration anchor 1801-4 is registered with. In some cases, the registration anchor is configured to registered with a different tooth that the tooth that the dental attachment is configured to attach to. For instance, attachment 1802-1 is aligned with a surface of tooth 1811-1, which is different than tooth 1811-2 that registration anchor 1801-3 is registered with. The registration anchor may be configured to registered with multiple teeth. For instance, registration anchor 1801-3 can adapted to registered with surfaces of tooth 1811-2 and tooth 1811-3. When the one or more registration anchors are correctly placed on and registered with corresponding tooth surface(s), the dental attachment placement structure can be properly aligned with the dental arch, and the attachment(s) can be precisely positioned with respect to the tooth surface(s).

Figure 18B:
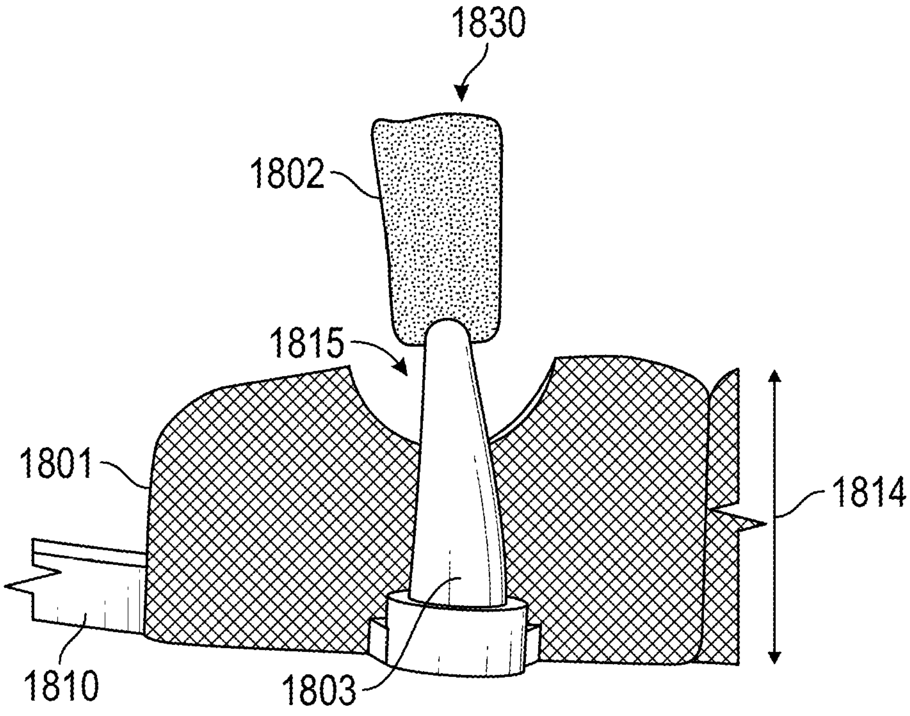
FIG. 18B illustrates a close-up view of an attachment portion of the dental attachment placement structure of FIG. 18A.

FIG. 18B illustrates a close-up view of an attachment portion of the dental attachment placement structure of FIG. 18A. In this example, the attachment support 1803 extends indirectly from the frame 1810 via registration the anchor 1801. This configuration can allow the attachment 1802 to be connected to the same tooth that the registration anchor 1801 is registered with. In the example shown, the registration anchor 1801 includes a clearance 1815 to provide proper positioning of the attachment 1802 without interference from the registration anchor 1801 and/or attachment support 1803. The shape and depth of the clearance 1814 may vary depending on the desired tooth position for the attachment 1802. The thickness and height 1814 of the registration anchor 1801, as well as its offset from the tooth, may also vary depending on the desired placement of attachment 1802. In some cases, the clearance 1815 provides access for the treatment professional around the attachment 1802 during, for example, the process of affixing the attachment 1802 to the tooth.

In addition to extending the attachment in a downward or upward direction away from the frame and toward the tooth, the attachment support may also align an attachment surface (e.g., 1830) of the attachment with respect to the tooth surface. In some cases, the attachment support points the attachment surface (e.g., 1830) in a direction toward the midline of the frame. For example, the attachment support may have an arched shape that orients the attachment such that the attachment surface is substantially parallel to the target tooth surface. In other embodiments, the attachment support has an angled shape. This arched or angled shape may also provide room for the user's hand or a detachment tool to access the attachment for detachment as the arched shape can bow outward. The shape and size of the dental attachment 1802 can vary depending on desired force characteristics and the shape and type of corresponding dental appliance (e.g., aligner), as described herein.

Figure 18C:
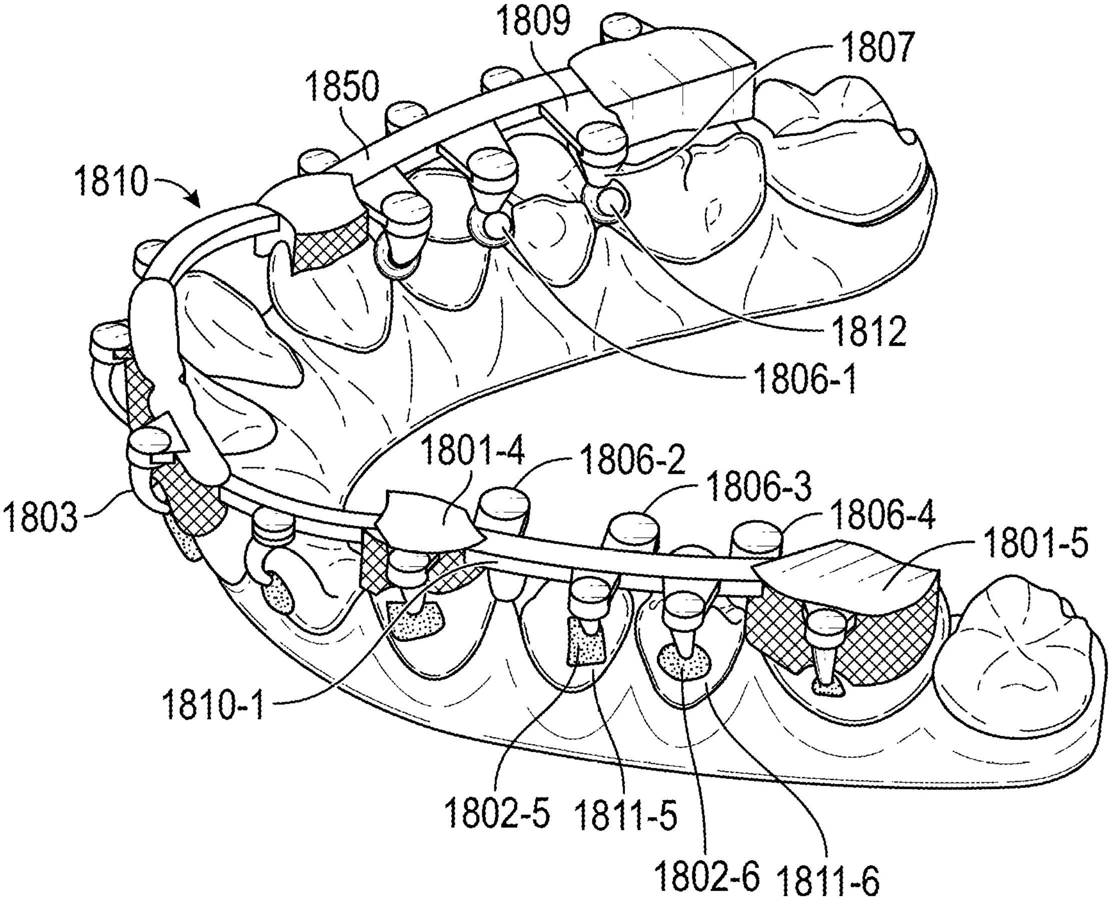
FIG. 18C illustrates a perspective side view of the dental attachment placement structure of FIG. 18A.
Figure 18D:
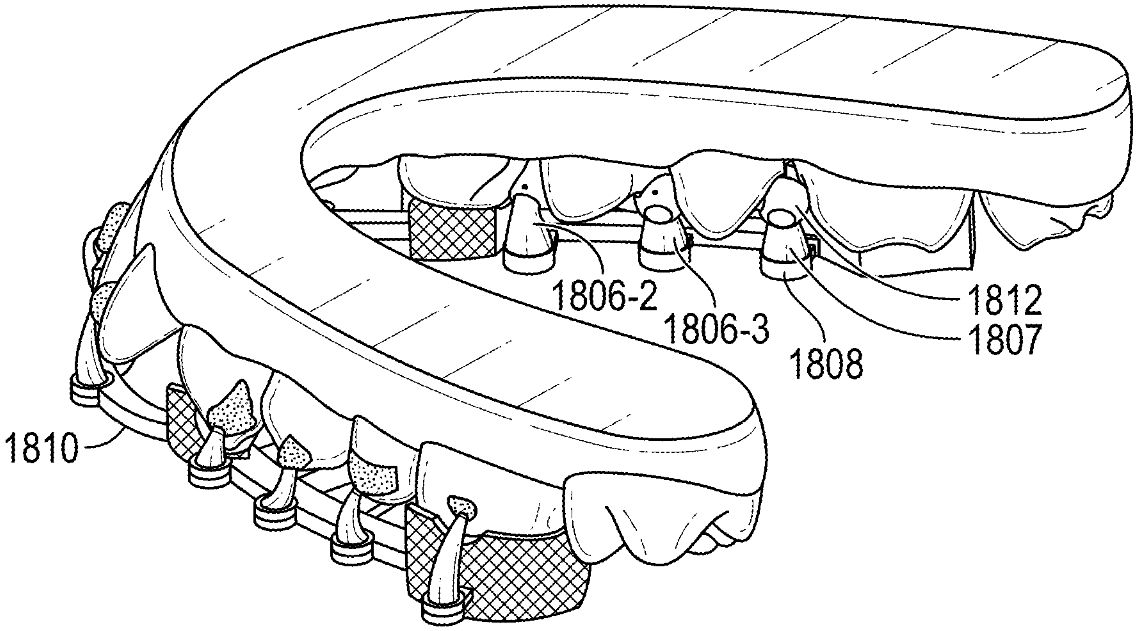
FIG. 18D illustrates an alternative perspective side view of the dental attachment placement structure of FIG. 18A.

In some embodiments, the dental attachment placement structure includes one or more retention supports that extends from the frame and is configured to maintain the dental attachment(s) at the predetermined position(s). FIGS. 18C and 18D illustrate top and bottom perspective views of the dental attachment placement structure of FIG. 18A on a dental arch, showing exemplary retention supports, examples of which are identified as 1806-1, 1806-2 and 1806-3. A retention support can include a contact portion 1812 that is configured to contact one or more teeth and/or gums of the dental arch. In the example shown, the contact portion 1812 is shaped and sized to contact an interproximal region between the teeth. The contact portion can have any shape. In some cases, the contact portion has a substantially spherical shape, as shown. Other non-limiting examples shapes can include a polyhedron (e.g., tetrahedron or cube), cone, cylinder and ovoid shapes. The retention support may include an arched or angled portion that extends the dental contact portion a distance from the frame. For example, the retention support may include a horizontal portion 1809 that extends in a horizontal direction with respect to the frame 1810, and a vertical portion 1807 that extends in a vertical direction with respect to the frame 1810, which position the dental contact portion 1812 on a surface (e.g., lingual surface) of the dental arch.

In some cases, the retention support extends from a different side of the frame than the attachment support. For example, the retention support can extend from a first side of the frame and the attachment support may extend from a second side of the frame. In the example shown in FIGS. 18C and 18D, the retention supports extend from a lingual side of the frame such that the retention supports can contact a lingual portion of the dental arch, and the attachment supports (e.g., 1803) extend from a buccal side of the frame such that the attachments (e.g., 1802) can register at positions on buccal surfaces of the teeth. The retention support can support the lingual side of the frame to stabilize the position of the dental attachment placement structure on the dental arch in three-dimensions.

The frame (e.g., 1810) can be shaped and sized for following at least a portion of the dental arch. In some instances, the frame has an arched shape (e.g., U-shaped) in accordance with the dental arch. In other embodiments, the frame covers only a portion of the dental arch. The frame may be one continuous piece or may include multiple pieces that are joined together. Such sections may have a curved (e.g., arched) shape or be straight and joined together to provide a generally curved (e.g., arched) shape. Although the example shown shows frame 1810 that is adapted to follow along occlusal sides of the teeth (e.g., top of the dental arch), other variations are encompassed by the instant disclosure. For example, the frame may be adapted to follow along the lingual and/or buccal sides of the teeth (e.g. inside of the dental arch and/or outside of the dental arch). In some embodiments the frame is adapted to follow along multiple sides of the teeth (e.g., two or more of the occlusal, lingual and buccal sides). In some cases, the dental attachment placement structure includes more than one frame. For example, two or more frames may be adapted to follow along one or more of the occlusal, lingual and buccal sides of the teeth. Such variations may be included in any of the dental attachment placement structures described herein.

In some embodiments, the registration anchors register with only a subset of the teeth of the dental arch. In some examples, two or more registration anchors are used to span the frame over one or more teeth. For instance, registration anchors 1801-4 and 1801-5 extend from the frame 1810 such that they are separated by a gap portion 1810-1 of the frame. The registration anchors 1801-4 and 1801-5 are configured to register with non-adjacent teeth such that the gap portion 1810-1 of the frame spans teeth 1811-5 and 1811-6. This can allow the gap portion 1810-1 of the frame to suspend over the dental arch and allow dental attachments 1802-5, 1802-6 and retention supports 1806-2, 1806-3, 1806-4 to be positioned over their respective target teeth. This allows the dental attachment placement structure to occlude less of the dental arch than a dental attachment placement structure that covers more tooth surfaces. For instance, the treatment professional can more easily access regions around the intervening teeth 1811-5 and 1811-6 for attaching the attachments 1802-5 and 1802-6.

As described herein, the dental attachment placement structure can be formed using additive manufacturing techniques. In some cases, this involves printing portions of the dental attachment placement structure on a build plate (sometimes referred to as a build platform or base plate) of an additive manufacturing machine without the use of supports. As known, manufacturing supports are often used in 3D printing to support the 3D object on a build plate during the printing process. Such manufacturing supports are typically used to support portions of the 3D object, such as overhangs, that tend to deform during the printing process and are generally removed from the 3D object after the printing process is complete. Such manufacturing supports adds extra material, and adds extra manufacturing time and expense for removing the supports. In some embodiments, the dental attachment placement structure is printed without the use of manufacturing supports, thereby saving material, time and money. In the example shown in FIG. 18C, the frame 1810 can have a surface 1850 (e.g., top or bottom surface) that can be formed on a build plate without the use of manufacturing supports to provide the advantages described above. The surface 1850 may be a substantially flat surface in accordance with a flat build plate surface. The flat surface 1850 may correspond to a top (or bottom) surface of the dental attachment placement structure, where the attachment support(s) (e.g., 1803) and/or retention support(s) (e.g., 1806-1, 1806-2, 1806-3, 1806-4) extend with respect to a bottom (or top) surface of the frame. In some cases, portions of the attachment support(s) and/or retention support(s) can also be built on the build plate and have a correspondingly flat surface.

To use the dental attachment placement apparatus, a treatment professional can position the one or more registration anchors on corresponding tooth surfaces. In the embodiment shown in FIGS. 18A-18D, the registration anchors start at the frame and extend until the anchors encapsulate at least a portion of an incisal edge and extend over one or more sides of corresponding teeth. This positions the one or more dental attachments against corresponding tooth surfaces at predetermined positions. The one or more retention supports can also be positioned on (and in some cases, registered with) surfaces of one or more teeth (e.g., on a lingual side of the dental arch) to maintain the position of the dental attachments. The dental attachment can be affixed to the predetermined position on the tooth surface using, for example, one or more adhesives, as described herein. The dental attachments can be detached from the dental supports such that only the dental attachments from the structure remain coupled to the patient's dental arch.

Figure 18E:
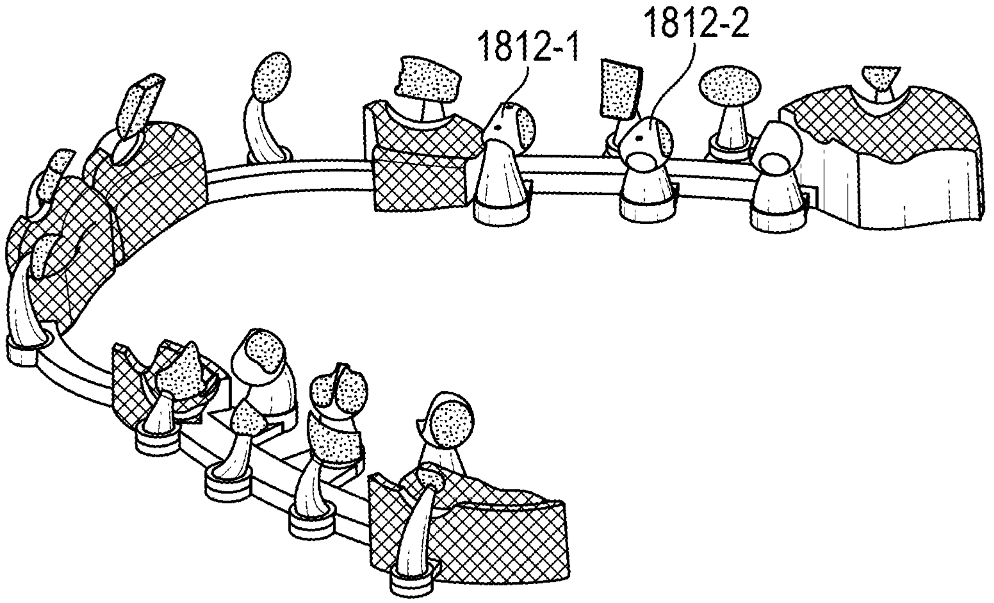
FIG. 18E illustrate a perspective view of the dental attachment placement structure of FIG. 18A without a dental arch, showing aspects of various contact portions of retention supports.
Figure 18F:
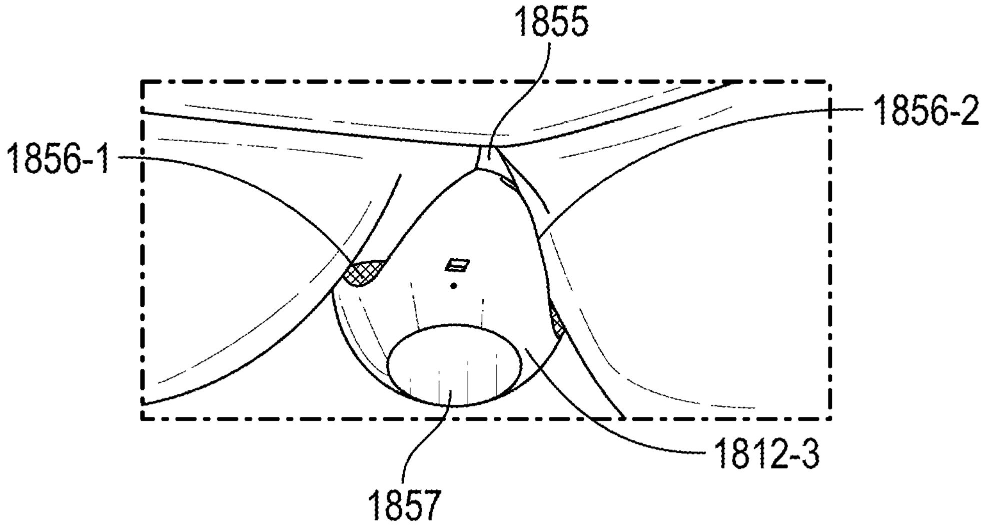
FIG. 18F illustrates a close-up view of a contact portion of a retention support of the dental attachment placement structure of FIG. 18A.

FIG. 18E illustrate a perspective view of the dental attachment placement structure of FIG. 18A without a dental arch, showing aspects of various contact portions (e.g., 1812-1 and 1812-2) of retention supports. FIG. 18F shows a close-up view of a contact portion 1812-3. The contact portion can be configured to be placed in the interproximal region 1855 between adjacent teeth. The contact portion can include one or more conforming surfaces (e.g., 1856-1 and 1856-2) that is configured to conform to the shape of teeth and/or gums. The conformed shape may allow the contact portion to grip onto a surface of the dental arch (e.g., on the lingual side). The shape of the contact portion 1812 can be determined based on virtual model. For instance, a virtual sphere (or cone, tetrahedron, etc.) can be placed in a virtual model of the interproximal region (based on a scan of the patient's dentition) and subtracting regions from the virtual sphere where the teeth would be. In this process, in some embodiments, the gingiva are also taken into account. In some instances, the virtual model of the gingiva can be enlarged by a scaling factor (e.g., making the gingiva 10% larger), and thus any portions of the virtual sphere that are contacting the scaled up gingiva are subtracted from the sphere. In this manner, the contact portion of the retention feature can be formed such that its surfaces will match those of the teeth that it will be in contact with and without interfering with (e.g., contacting) the gingiva, which may cause discomfort to the patient. In some embodiments, the contact portion of the retention feature includes one or more chamfered surfaces (e.g., 1857), e.g., to reduce the amount of protrusion of the contact portion from the dental arch, which may also increase the comfort to the patient.

Figure 18G:
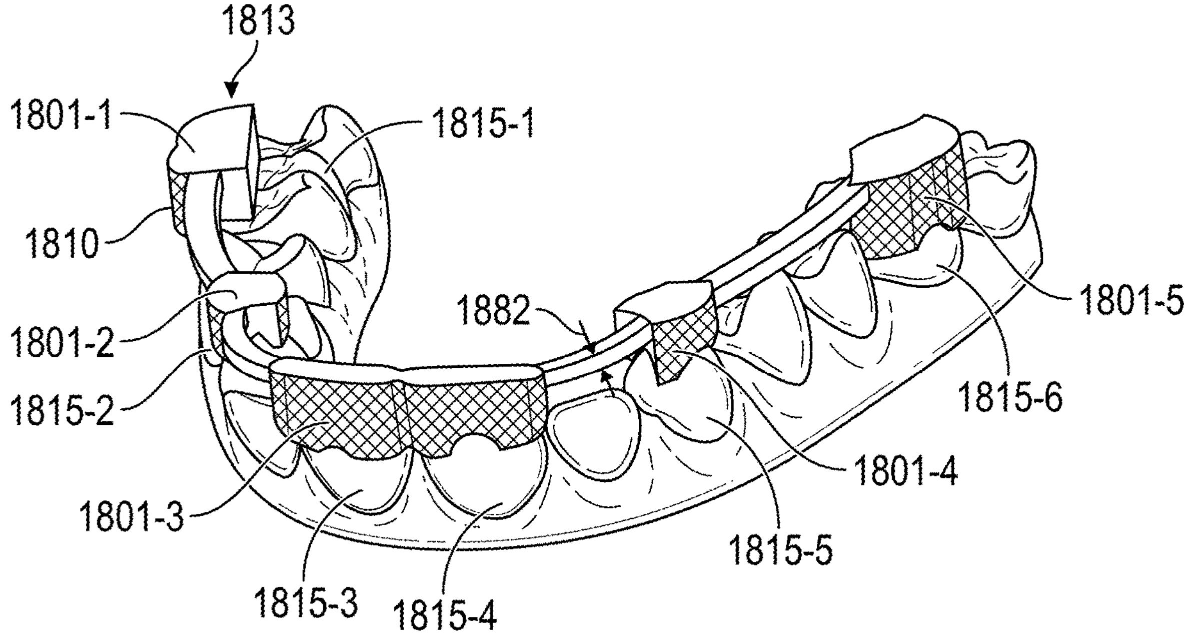
FIG. 18G illustrates an overhead view of the dental attachment placement structure of FIG. 18A where a portion of the frame is modified to have a zig-zag or "Z" shape as an alternative to an arch shape.
Figure 18H:
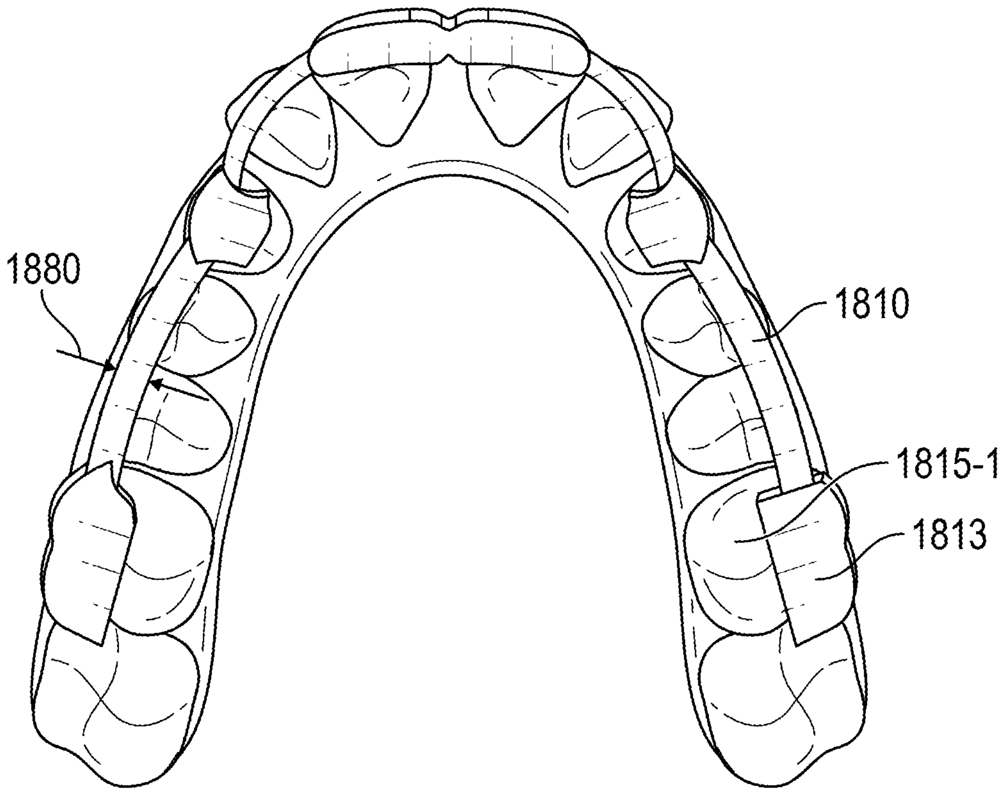
FIG. 18H illustrates an alternative perspective side view of the frame and registration anchors of the dental attachment placement structure of FIG. 18A.
Figure 18I:
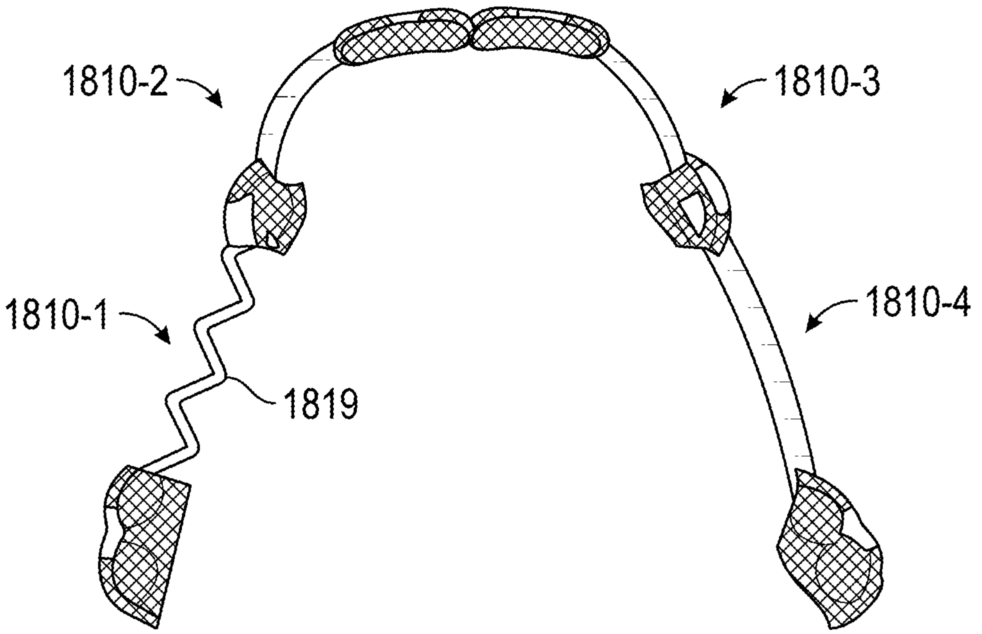
FIG. 18I illustrates an overhead view of an alternative of the dental attachment placement structure of FIG. 18A including one or more flexible frame portions.

FIGS. 18G and 18H show alternative views of the dental attachment placement structure of FIG. 18A without the dental attachments and retention supports to allow certain features to be examined and discussed more closely and to aid the reader's understanding. One or more registration anchors (e.g., 1801-1, 1801-2, 1801-3, 1801-4 and 1801-5) can be configured to register with one or more corresponding anchor teeth (e.g., 1815-1, 1815-2, 1815-3, 1815-4, 1815-5 and 1815-6). According to some embodiments, the buccal aspect 1813 (i.e., the tallest point of the buccal surfaces of a tooth) of the one or more anchor teeth can be used as the outermost limit of the dental attachment placement structure. A thickness (e.g., 1880) and width (e.g., 1882) of the frame (or portions of the frame) can be varied such that distance between the frame and the buccal aspect 1813 is as small as practical, thereby minimizing the distance between the frame and the dental arch.

In some embodiments, one or more portions of the dental attachment placement structure is flexible in order to reduce stress concentrations in portions of the structure. Since the dental attachment placement structure may be made of brittle material (e.g., some composite materials), such flexible features can allow the structure to be more resilient and less prone to breakage while still being made of material(s) having desirable properties such as stiffness. The flexible features can reduce the occurrence of breakage during handling (e.g., during manufacture and shipping) of the structure. Having flexible features may allow more structures to be printed (e.g., on a build plate) per 3D printing run. The flexible features may also allow the structures to bend in ways that reduce the dimensions of the structures for more efficient packaging. The flexible features may also provide some tolerance so that the structure can fit on the patient's dental arch more easily. FIGS. 18G-18K show variations of the dental attachment placement structure 18A with various flexible features, in accordance with some embodiments. FIGS. 18G-18K do not show certain features, such as dental attachments and retention supports for simplicity; however, such features can be included.

FIG. 18G illustrates an overhead view of the dental attachment placement structure where a portion 1810-1 of the frame is modified to have a zig-zag or "Z" shape as an alternative to an arch shape. In other variations, the flexible portion can have a sinusoidal or "S" shaped pattern. Such geometries may allow the flexible portion 1810-1 to bend or twist in response to forces (e.g., pushing, pulling, twisting) that may be applied to the frame, thereby distributing the stress and reducing stress concentrations. One or more of portions 1810-1, 1810-2, 1810-3 and 1810-4 of the frame may include such modified curved geometry, depending on particular needs. These types of changes in geometry of the frame allow the frame (or portions thereof) to be flexible without changing the material of the frame. That is, flexible portion 1810-1 may be made of the same material as one or more of portions 1810-2, 1810-3 and 1810-4 of the frame, attachment supports, attachment supports and retention anchors. This solution may be more cost effective than manufacturing the structure with different materials having different degrees of flexibility.

Figure 18J:
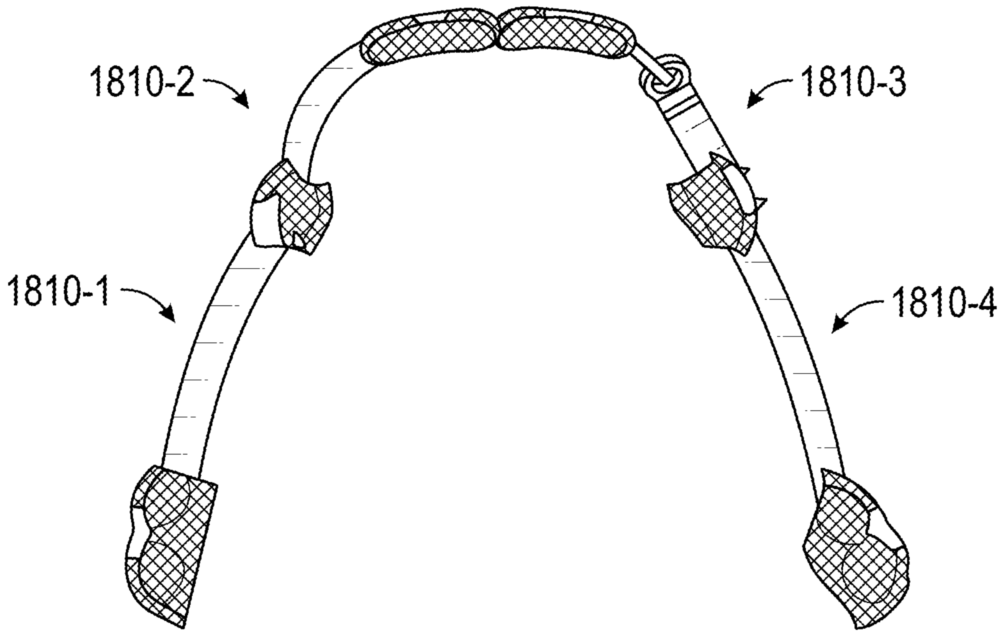
FIGS. 18J-18K illustrate a link joint alternative to the arch-shaped frame portions of FIG. 18A.
Figure 18K:
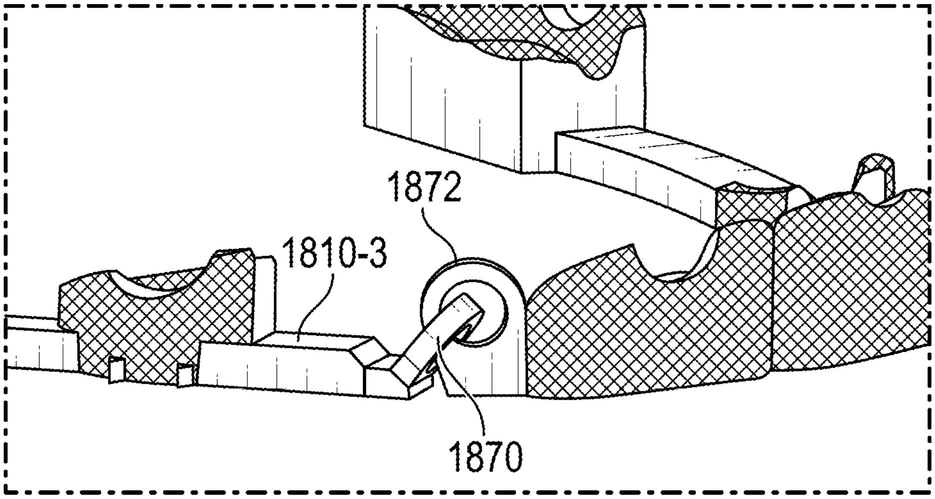

FIGS. 18J and 18K illustrate a link joint alternative to the arch-shaped frame portions of FIG. 18A. The link joint can include interlocking links, such as a first link 1870 and second link 1872 denoted in FIG. 18K. The link joint can include any number of interlocking links (e.g., 2, 3, 4, 5, 6, 10, 20). The interlocking nature of the link joint may allow the links to move with respect to each other while remaining connected with each other. As with a zig-zag or sinusoidal geometry, the link joint geometry can give the frame portion 1810-3 flexibility for resisting breakage when a force (e.g., pushing, pulling, twisting) are applied to the frame. The link joint can be placed anywhere along the frame as needed, including one or more of portions 1810-1, 1810-2, 1810-3 and 1810-4 of the frame. It should be noted that the linked link joint geometry may efficiently be formed using a 3D printing process, whereby the interlocking links can be formed intact (i.e., linked).

Figure 18L:
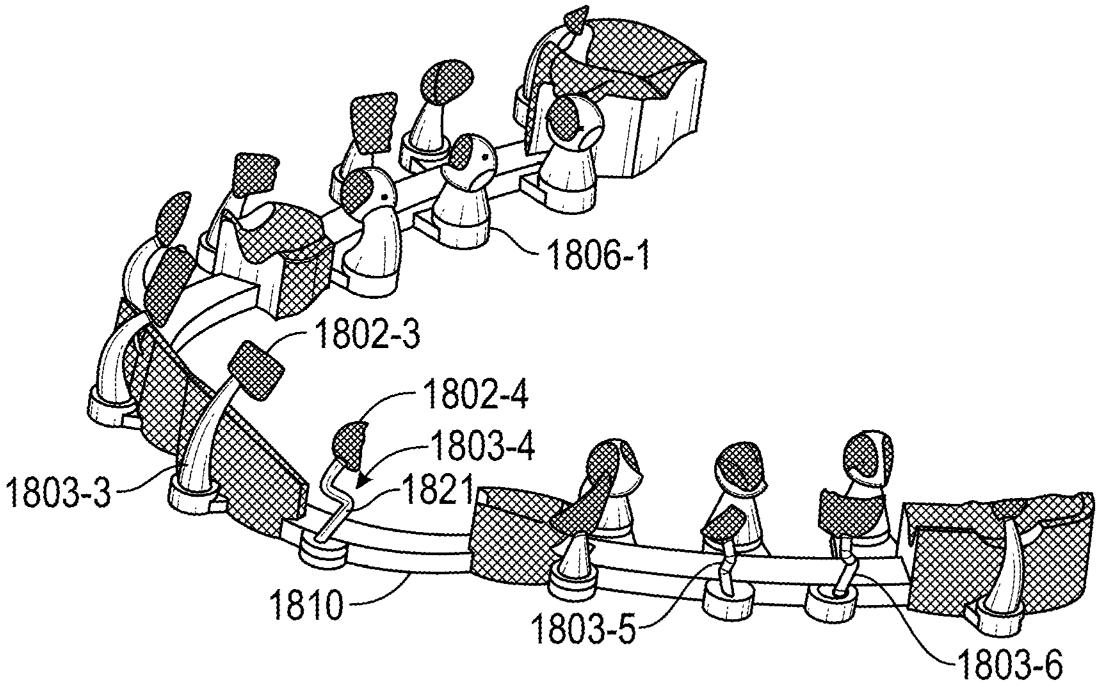
FIG. 18L illustrates an alternative variation of the structure of FIG. 18A having flexible attachment supports.

The dental attachment placement structure may have flexible portions other than the frame. FIG. 18L illustrates an alternative variation of the structure of FIG. 18A having flexible attachment supports 1803-4, 1803-5 and 1803-6. As opposed an attachment support which tapers from a thicker diameter near the frame to a thinner diameter near the attachment (e.g., 1803-3), the flexible attachment supports may be thinner in diameter and have a sinusoidal or zig-zag shape that provides increased flexibility and resilience in response to an applied force (e.g., pushing, pulling, twisting). Having a more flexible attachment support can also allow for more maneuverability of the attachment (e.g., 1803-4) by the treatment specialist during placement and affixing of the attachment, and may reduce the risk of the attachment support being accidently adhered to the tooth surface. The flexible attachment support can have any shape and is not limited to the sinusoidal or zig-zag shape shown in FIG. 18K. For example, a spring (e.g., spiral), arc, bow or hook shape may also provide a desired amount of flexibility. The dental attachment placement structure can have any number of flexible attachment supports (e.g., 1, 2, 3, 4, 5, 8, 10). In some cases, one or more of the retention supports (e.g., 1806-1) may have a flexible geometry (e.g., sinusoidal or zig-[0256]

Figure 24:
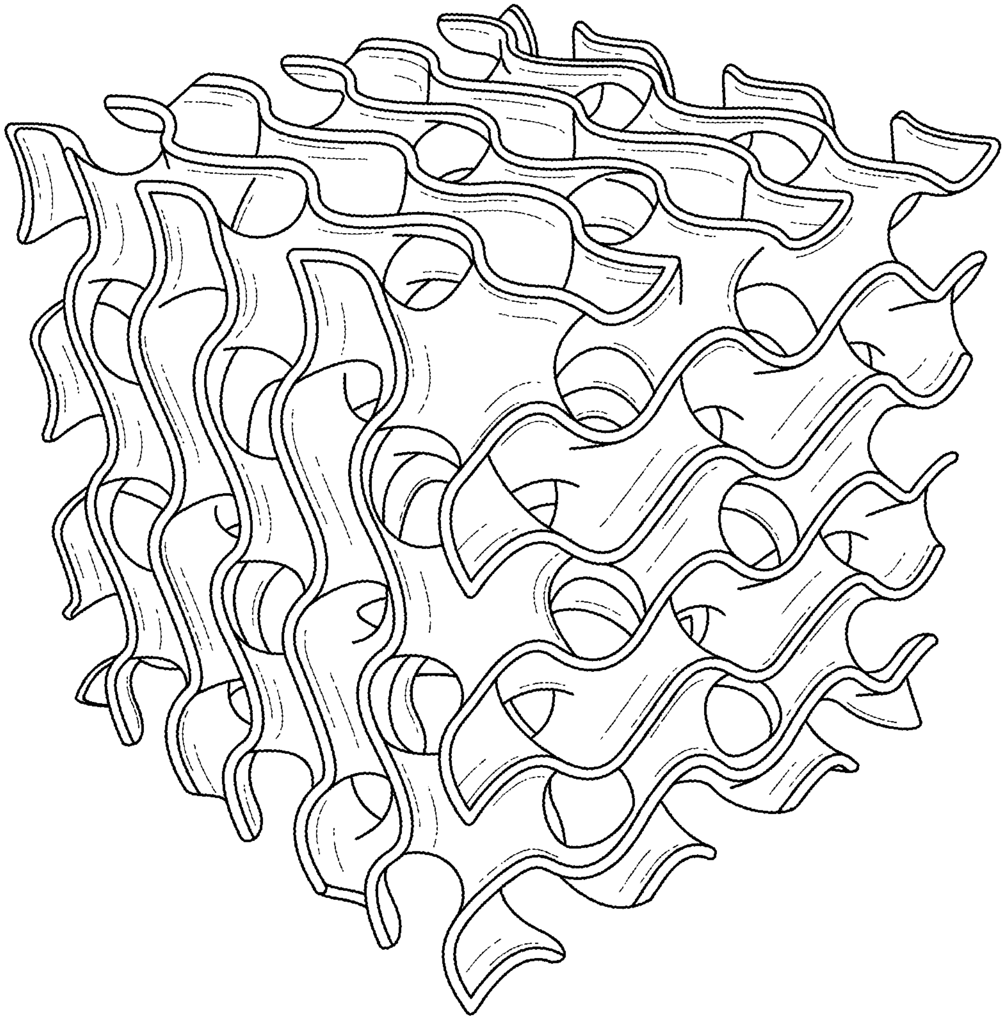
FIG. 24 illustrates a perspective view of an example of a lattice structure that can be incorporated into one or more portions of any of the dental attachment placement structures described herein.

According to some embodiments, the material forming the one or more features of the dental attachment placement structure provides flexibility. FIG. 24 illustrates a perspective view of an example of a lattice structure that can be incorporated into one or more portions of any of the dental attachment placement structures described herein. The lattice structure can include cavities that can increase the flexibility and/or reduces material consumption and weight of the structure. The lattice structure is incorporated into one or more of the frame, registration anchors, attachments, attachment supports, retention supports, or other portion of a dental attachment placement structure. As such, the rigidity or flexibility of the elements can be adjusted based upon the desired implementation.

A dental attachment placement structure may include any combination of the flexible features of FIGS. 18G-18L and 18. For example, the structure can include one or more flexible frame portions 1819 (e.g., FIG. 18I), one or more flexible attachment supports 1821 (e.g., FIG. 18L) and/or one or more flexible retention supports. The number of flexible features can vary depending on particular needs. Generally, the structure may have some flexibility to resist breakage and rigid enough to support and maintain the attachment(s) when placed on a patient's dental arch. In some embodiments, the flexible features are made of the same material as other portions of the structure, as described above. The flexibility may arise, at least in part, due to the shape; e.g., sinusoidal, zig-zag, etc. shapes may be used. In some embodiments, the flexible features are made of a different material (e.g., more flexible) than other portion of the structure.

Figure 18M:
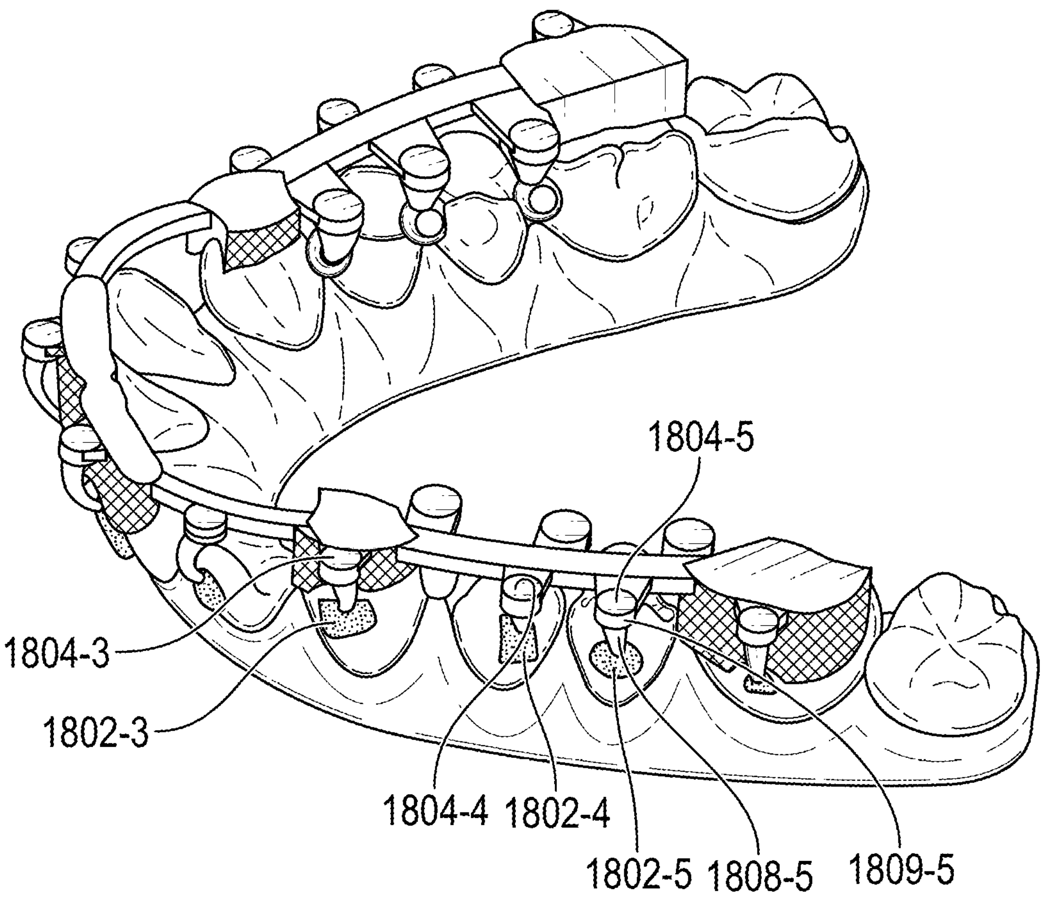
FIGS. 18M and 18N illustrate one example of how features of the dental attachment placement structure of FIG. 18A can be formed from a virtual model.
Figure 18N:
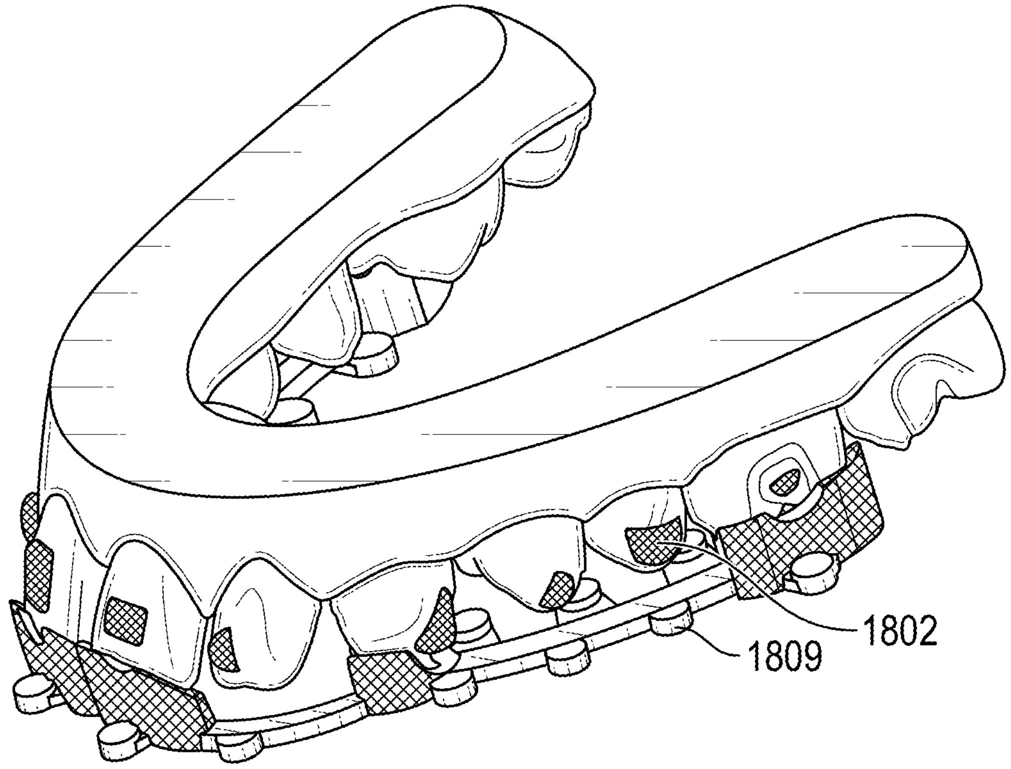

As described herein, the dental attachment placement structure can be formed based on a virtual model. According to some embodiments, the location and orientation of the frame and other features of the structure are determined based on the location of the dental attachments in the virtual model. FIGS. 18M and 18N illustrate one example of how features of the dental attachment placement structure of FIG. 18A can be formed from a virtual model. The side perspective view of FIG. 18M illustrates a side perspective view of the structure showing how the attachment support 1804-5 that supports attachment 1802-05 can include a base portion 1809-5 and a bridge portion 1809-5. Although not necessary in all embodiments, the base portion 1809-5 can be a solid, extruded, circular structure. The diameter and thickness of the attachment support may vary. The base portion 1809-5 may have a greater thickness (e.g., diameter) than the bridge portion 1808-5.

To determine the location and orientation of the frame 1810, a center of the attachment 1802-3 can be located and projected vertically until it intersects with the plane of the frame 1810. This point can be used as a reference (e.g., correspond to the center of a circle) used to create the base portion 1809-5, thereby informing the location and orientation of the frame 1810. The bridge portion 1809-5 can be formed to connect the base portion 1809-5 to the frame or registration anchor. The dental attachments 1802-4 and 1802-5 can likewise be used to create corresponding base portions and bridge portions for connecting the attachment supports 1804-4 and 1804-5 to the frame or a registration anchor, as well as the remaining dental attachments and attachment supports, until the location and orientation of the entire frame 2101 is determined. During, for example a 3D printing process, the attachment support may be centered under the dental attachment. FIG. 18N illustrates a different view of a base portion 1809 of an attachment support (without the bridge portion) with respect to a corresponding attachment 1802.

Figure 19A:
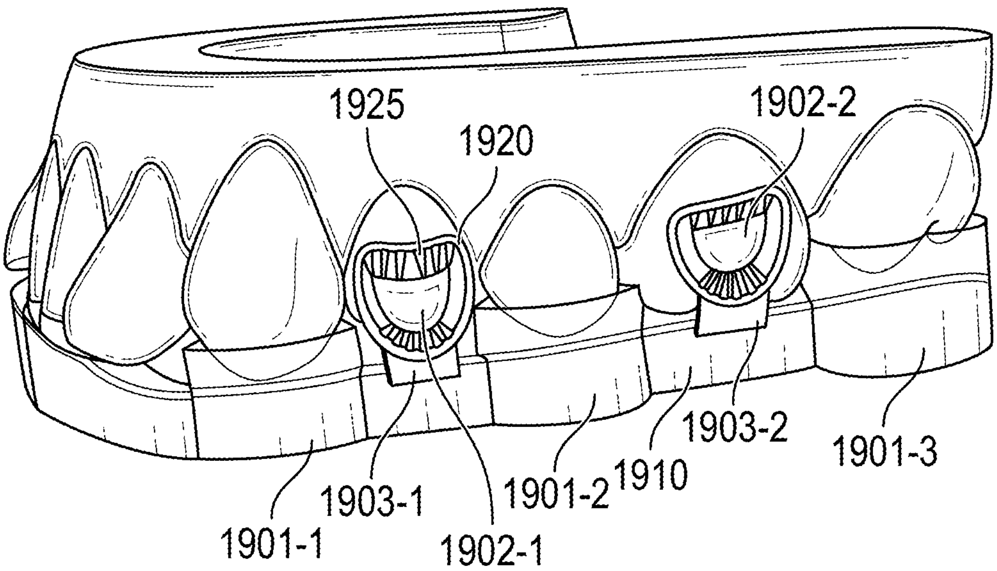
FIG. 19A shows a buccal side view of an alternative dental attachment placement structure, in accordance with some embodiments.
Figure 19B:
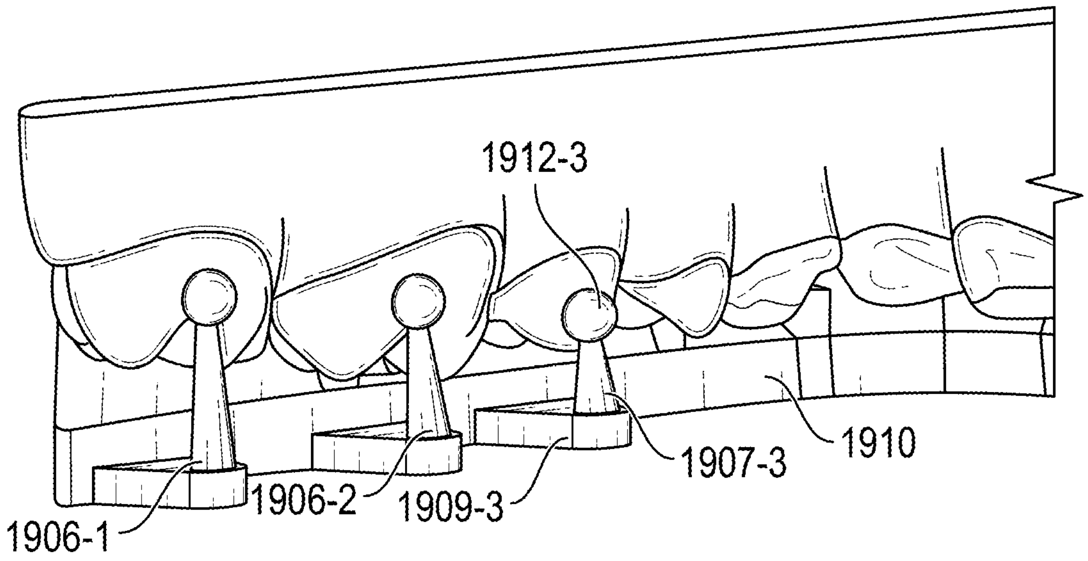
FIG. 19B shows a lingual side view of the dental attachment placement structure of FIG. 19A showing an attachment frame and retention supports according to some embodiments.

FIG. 19A shows a buccal side view and FIG. 19B shows a lingual side view of an alternative dental attachment placement structure according to a number of embodiments. The dental attachment placement structure can have similar features of the dental attachment placement structure of FIGS. 12A-12N, such as a frame 1910, one or more attachments (e.g., 1902-1 and 1902-2), one or more attachment supports (e.g., 1903-1 and 1903-2), one or more registration anchors (e.g., 1901-1, 1902-2 and 1901-3), and one or more retention supports (e.g., 1906-1 and 1906-2). The one or more retention supports can include a contact portion (e.g., 1912-3), a horizontal portion 1909-3 that extends in a horizontal direction with respect to the frame 1910, and a vertical portion 1907-3 that extends in a vertical direction with respect to the frame 1910.

As illustrated in Figured 19A, an attachment may be supported by an attachment frame (e.g., 1920) attached to the attachment support (e.g., 1903-1) and which may at least partially surround a perimeter of the attachment (e.g., 1902-1). The attachment may be connected to the attachment frame via one or more struts (e.g., 1925), which may correspond to a frangible portion of the attachment frame. For example, an interface region between a strut and the attachment may be sufficiently frangible such that the attachment can be detached from the attachment frame without the use of a detachment tool (e.g., by the user's hands). In some instances, the struts have a tapered geometry, whereby a thickness of the strut tapers down from the attachment frame to the attachment. The attachment frame can include any number of struts (e.g., 1, 2, 3, 4, 5, 10, 20). I some cases, the struts at least partially surround the perimeter of the attachment to maintain the attachment in position within the attachment frame. The attachment frame may be configured to protect the attachments and/or struts from being detached and/or damaged during manufacturing, handling and shipping.

As illustrated in Figured 19B, the one or more retention supports (e.g., 1906-1 and 1906-2) can be configured to contact a tooth surface between interproximal regions (e.g., a single tooth). In some cases, the one or more retention supports is configured to contact a crown surface of one or more teeth. This non-interproximal regions contact configuration can provide greater retention through increased surface contact with the one or more teeth. Further, this may provide a more accurate registration surface for the contact portion (e.g., 1912-3) since in some cases a digital scan of the interproximal region may be less accurate than a scan of a tooth surface between interproximal regions. In some embodiments, the dental attachment placement structure includes a combination of one or more retentions supports configured to contact one or more interproximal regions and one or more retentions supports configured to contact a tooth surface between one or more interproximal regions.

Figure 19C:
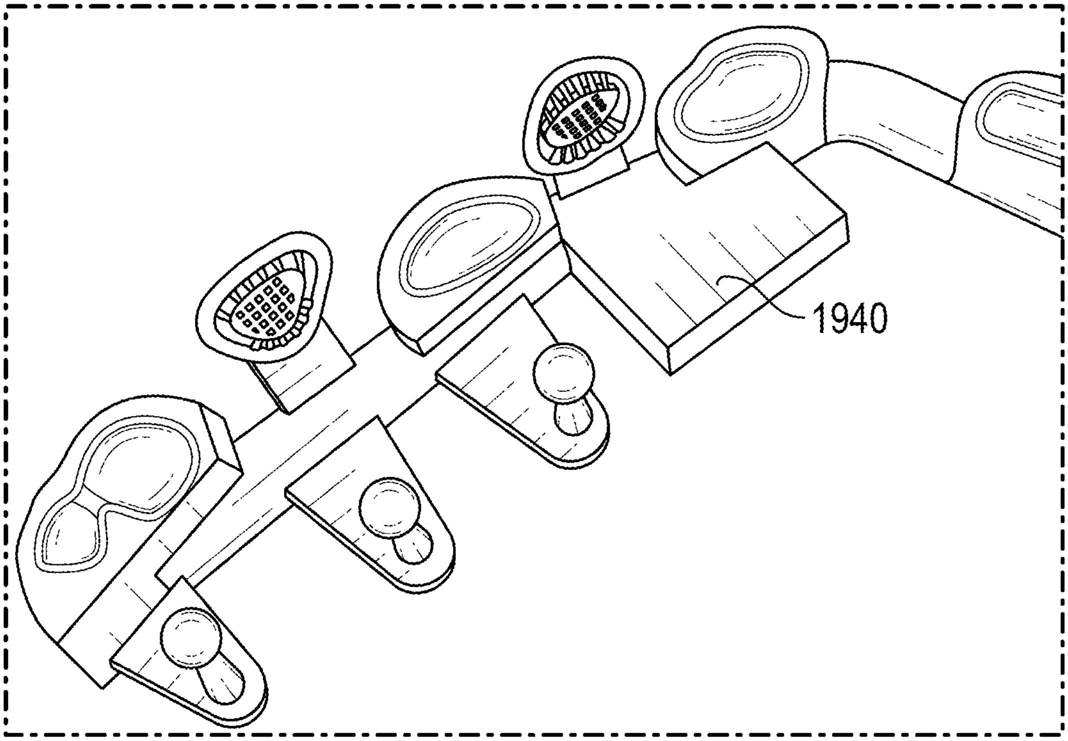
FIG. 19C illustrates an overhead view of a dental attachment placement structure of FIG. 19A showing an identifier according to some embodiments.

FIG. 19C illustrates an overhead view of the dental attachment placement structure of FIG. 19A showing an identifier 1940 according to some embodiments. The identifier may be a device identifier 1940 that uniquely identifies the model, lot number, specific device, patient or other identifying characteristic of the dental attachment placement structure. The identifying may include one or more number, letters and symbols. In some cases, the identifier is integrated into the device during manufacture. For example, the identifier may be added in a virtual model of the dental attachment placement structure such that the identifier is integrated into the structure when 3D printed. In some cases, the identifier is added after forming the dental attachment placement structure.

Figure 19D:
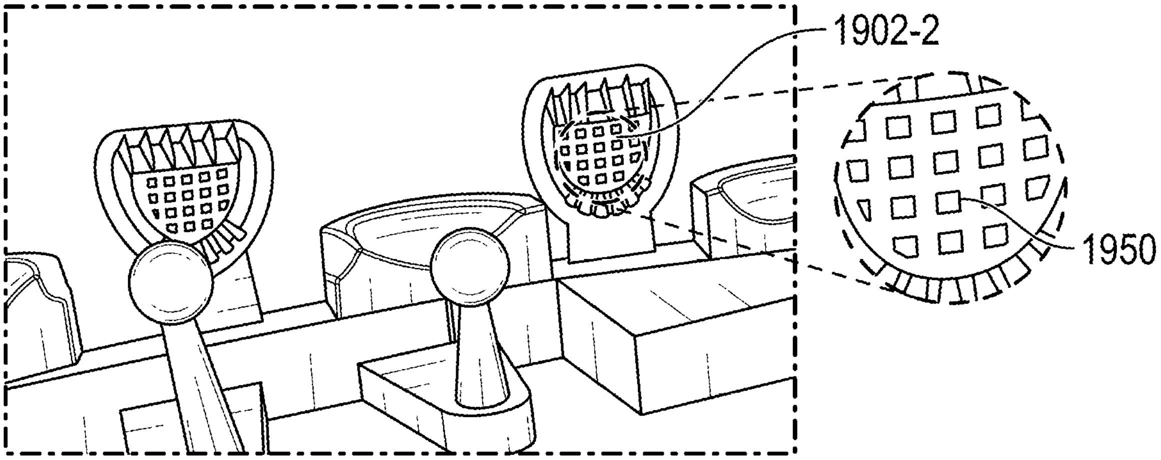
FIG. 19D illustrates a side view of the dental attachment placement structure of FIG. 19A showing an exemplary attachment surface of an attachment according to some embodiments.

FIG. 19D illustrates a side view of the dental attachment placement structure of FIG. 19A showing an exemplary attachment surface 1950 of an attachment 1902-2 according to some embodiments. The attachment surface may be textured surface to provide more surface area and to increase the shear bond strength between attachment and the surface of the target tooth. In some embodiments, the textured surface is a grid pattern, as shown in the inset view of FIG. 19D. Other variations of textured surfaces can include one or more lines or bars (e.g., horizontal, vertical, diagonal and/or radial), cross-hatches, circular, zig-zag, sinusoidal, and polygonal (e.g., squares, rectangles, triangles, hexagons) patterns. In some cases, the textured surface is added to a virtual model of the dental attachment placement structure and integrated into the structured during manufacture (e.g., 3D printing). In some cases, the textured surface is added after forming the dental attachment placement structure.

In some embodiments, one or more of the dental attachments includes an auxiliary feature to provide a particular function according to a treatment plan. The one or more auxiliary features may be used in conjunction with one or more orthodontic appliances, such as an aligner, elastic band, brace and/or bracket, to apply prescribed forces to the patient's teeth. According to some embodiments, the dental attachment placement structure includes attachments with integrated auxiliary features for easier and more accurate placement of the auxiliary features on the dental arch. Examples of auxiliary features can include one or more of a power arm, hook, button, spring, brace, bracket, wire, rod, band, blade, coil, elastic, ring, track, link and chain.

Figure 20A:
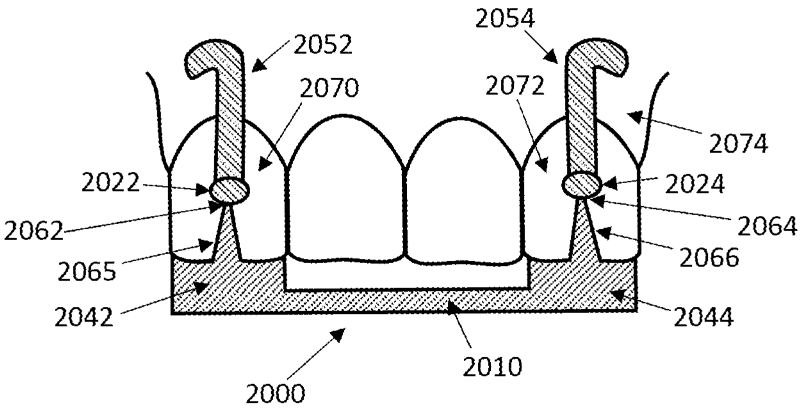
FIG. 20A illustrates a side view of a dental attachment having dental attachments with power arm auxiliary features being attached to a dental arch using a dental attachment placement structure, in accordance with some embodiments.
Figure 20B:
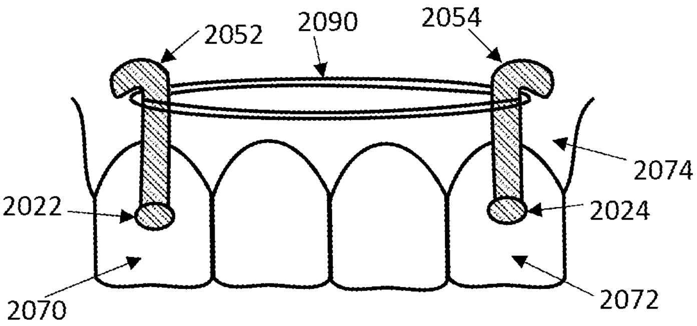
FIG. 20B shows the dental attachments with power arm auxiliary features of FIG. 20A on corresponding teeth after the dental attachment placement structure is removed and a resilient band is hooked onto the auxiliary features.

FIGS. 20A and 20B illustrate side views of exemplary dental attachments having power arm auxiliary features being attached to a dental arch using a dental attachment placement structure 2000. The dental attachment placement structure 2000 can include similar features as the structures of FIGS. 12A-12N and 13A-13D such as one or more frames (e.g., 2010), one or more dental attachments (e.g., 2022 or 2024), one or more registration anchors (e.g., 2042 or 2044), and one or more retention supports. One or more of the attachments can include an auxiliary feature (e.g., 2052 or 2054) that extends from the attachment. In the example shown, the auxiliary feature is an elongated hook, also referred to as a power arm. In some cases, the auxiliary feature is added to a virtual model of the dental attachment placement structure and integrally formed with the structure (e.g., using 3D printing). The placement, size, angle and other aspects of the auxiliary feature can be determined (e.g., calculated) depending on a desired movement of teeth according to a treatment plan.

Once the dental attachment placement structure is formed, it may be positioned on the patient's dental arch, such as shown in FIG. 20A. For example registration anchors 2042 and 2044 can be placed on and adjusted to register with corresponding teeth 2070 and 2072, respectively. The retention supports (if any) may also be positioned on an opposing (e.g., lingual) side of the dental arch for support. Once registered in the predetermined position of a tooth, the attachment can be affixed to the tooth using methods described herein, such as using an adhesive. The attachment and auxiliary feature can be detached from the dental attachment placement structure at an interface region (e.g., 2062 or 2064) between the attachment and an attachment support (e.g., 2065 or 2066). In some embodiments, the interface region may be frangible such that the attachment may be removed without a detachment tool. In some embodiments, the attachment is configured to be removed using a detachment tool.

FIG. 20B shows the dental attachments with the auxiliary features on corresponding teeth after the dental attachment placement structure is removed and a resilient band 2090 is hooked onto the auxiliary features. In some embodiments, the auxiliary feature is configured to extend above (or below) the gum line such that a portion of the auxiliary feature extends in the direction of the gingiva 2074 and the root of the tooth. This may allow the auxiliary feature to increase the moment arm of the auxiliary feature, as desired in some power arm applications. For example, the longer the auxiliary features 2052 and 2054, and the higher the band 2090 is placed on the auxiliary features 2052 and 2054, the greater the pulling force for pulling teeth 2070 and 2072 together. In some embodiments, the attachments (e.g., 2022 or 2024) and/or auxiliary features (e.g., 2052 or 2054) are also used in conjunction with one or more additional orthodontic devices, such as an aligner, to move teeth in the dental arch according to a treatment plan.

Figure 21:
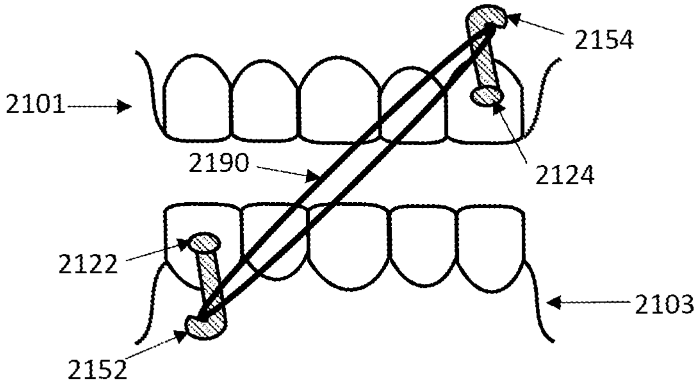
FIG. 21 illustrates dental attachments with auxiliary features being attached to a dental arch using a dental attachment placement structure, in accordance with some embodiments.

FIG. 21 illustrates another example of an application of dental attachments with auxiliary features. A first auxiliary feature 2152 can be attached to a first dental attachment 2122 on a tooth of a first dental arch 2103 of the patient. A second auxiliary feature 2154 can be attached to a second dental attachment 2124 on a tooth of a second dental arch 2101 of the patient. An elastic band 2190 can be hooked onto the first and second auxiliary features to provide a pulling force to pull corresponding teeth in toward each other. The angles of the first and second auxiliary features may vary depending on a desired force direction. In some embodiments, the attachments and/or auxiliary features are also used in conjunction with one or more additional orthodontic devices, such as one or more aligners, to move teeth in the first and/or second dental arches according to a treatment plan.

Figure 22A:
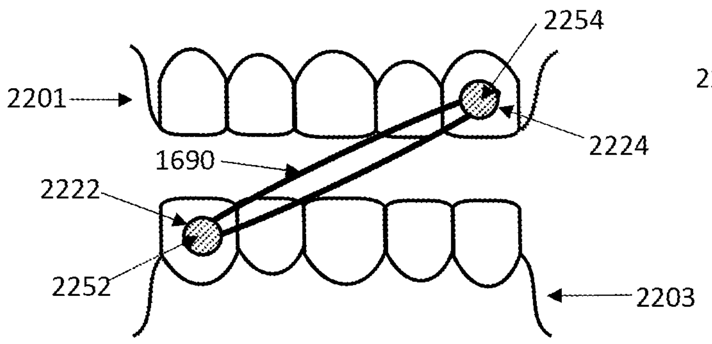
FIGS. 22A-22B illustrates dental attachments with button auxiliary features attached to opposing dental arches and a resilient member coupled thereto, in accordance with some embodiments.
Figure 22B:
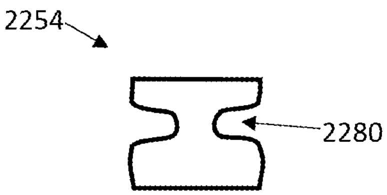

FIG. 22A illustrates a further example of dental attachments with auxiliary features. The dental attachment (e.g., 2222 or 2224) can include an auxiliary feature (e.g., 2252 or 2254) in the form of a button. FIG. 22B shows an example section view of the button auxiliary feature 2254, showing a groove 2280 that an elastic band 1590 can be hooked around. The elastic band 1590 can be hooked around the button auxiliary features 2252 and 2254 to apply a pulling force toward corresponding teeth on opposing dental arches 2201 and 2203. In some embodiments, the attachments and/or auxiliary features are also used in conjunction with one or more additional orthodontic devices, such as one or more aligners, to move teeth in the first and/or second dental arches according to a treatment plan.

Figure 23:
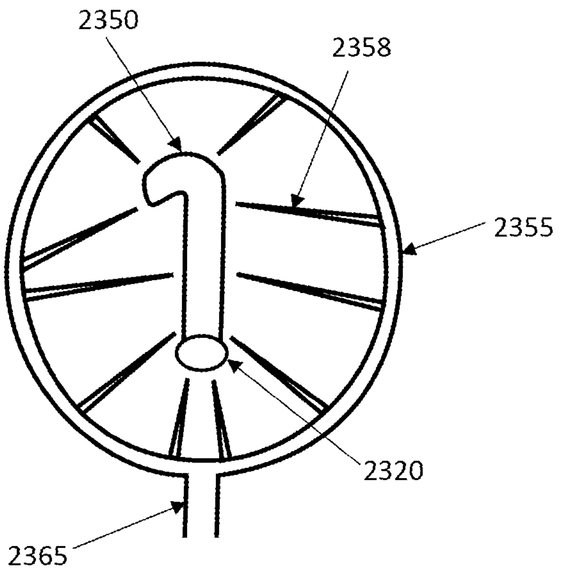
FIG. 23 illustrates a power arm functional feature with an attachment frame and retention supports, in accordance with some embodiments.

In some embodiments, the auxiliary feature and attachment are supported by an attachment frame, such as illustrated in in the example of FIG. 23. The dental attachment (e.g., 2320) with auxiliary feature (e.g., 2350) attached thereto can be supported by an attachment frame (e.g., 2355), which is connected directly or indirectly to the frame. In some cases, the attachment frame is directly or indirectly connected to the frame by an attachment support (e.g., 2365) that extends from the frame. The attachment frame may surround at least a portion of the attachment and/or the auxiliary feature, and be connected to the attachment and/or the auxiliary feature by one or more struts (e.g., 2358). In some embodiments, the one or more struts are frangibly coupled to the attachment and/or the auxiliary feature for easier removal (e.g., with or without the use of a detachment tool). The one or more struts may have a tapered geometry.

As described herein, the dental attachment placement structures described herein can be made of one material or a combination of materials. In some cases, the dental attachment placement structures can formed of one or more polymers (e.g., polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, or a combination thereof). In some embodiments, the dental attachment placement structure can be fabricated out of a second material that is different than the attachment material. For example, the attachment can be fabricated from a composite material and the dental attachment placement structure can be fabricated from a polymer, such as those discussed above. In some embodiments, the attachment and dental attachment placement structure can be constructed such that they are connected to each other. As discussed herein, this connection can be designed to be cut, broken, or otherwise released to allow the dental attachment placement structure to be removed while the attachment is positioned on the tooth.

Figure 25A:
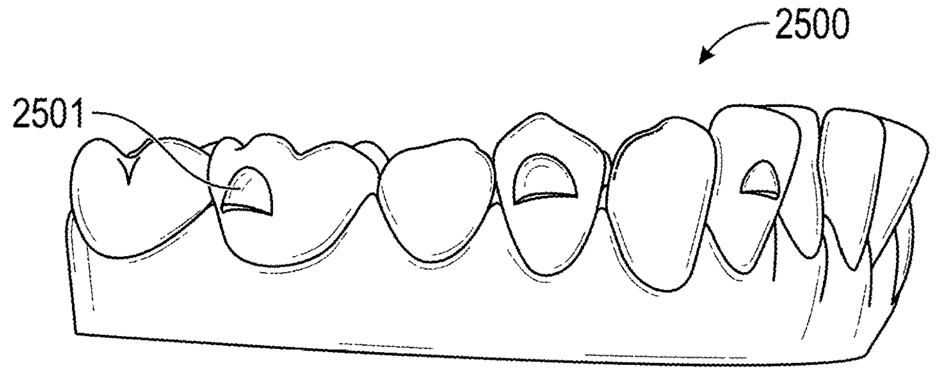
FIG. 25A shows dental attachments bonded to a number of teeth of a dental arch, in accordance with some embodiments.

FIG. 25A shows example dental attachments 2501 bonded to a number of teeth of a dental arch 2500. The dental attachments 2501 can be designed to engage with portions of a dental aligner to apply forces to the teeth in accordance with a dental treatment plan. The dental aligner may be a polymer shell aligner that is configured to interact with the dental attachments 2501 to reposition (e.g., straighten) the teeth. The dental attachments 2501 may be placed at predetermined locations on the teeth in order to apply appropriate forces (e.g., in magnitude and/or direction) in accordance with part of the dental treatment plan. In some cases, the dental treatment plan includes changing the dental attachments 2501 to a different set(s) of dental attachments over the treatment plan. For example, a subsequent set of dental attachments may have different shapes and/or be positioned at different locations on the teeth, and/or on different teeth, compared to a current set of dental attachments 2501. In other cases, the same set of dental attachments 2501 is used over the entirety of the treatment plan.

Figure 25B:
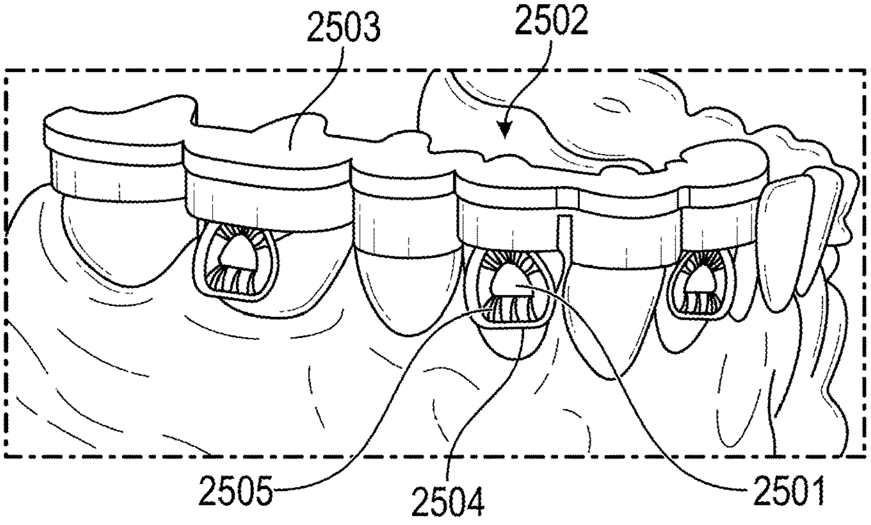
FIG. 25B shows a dental attachment placement apparatus, which may be used to properly place the dental attachments of FIG. 25A so that they can cooperate with a dental aligner to apply the correct forces on the teeth, in accordance with some embodiments.

FIG. 25B shows an example dental attachment placement apparatus 2502, which may be used to properly place the dental attachments 2501 so that they can cooperate with a dental aligner to apply the correct forces on the teeth. The dental attachment placement apparatus 2502 can include a body 2503 (also referred to as a positioner) that may be configured for placement against tooth surfaces of the dental arch. In some cases, the body 2503 is configured to contact occlusal surfaces of the teeth and extend over the occlusal surfaces to contact portions of the buccal and/or labial surfaces of the teeth. In some instances, the body 2503 is configured to contact all teeth of the dental arch. In other cases, the body 2503 is configured to contact only a subset of the teeth (e.g., 1, 2, 3, 4, 5, etc.) of the dental arch. The body may include surfaces that register with the tooth surfaces of the dental arch to retain a relative position of the dental attachment placement apparatus 2502 with respect to the dental arch when placed against the tooth surfaces. In some instance, the body may include one or more cavities shaped to receive corresponding one or more teeth to retain the relative position of the dental attachment placement apparatus with respect to the dental arch when placed against the tooth surfaces.

The body 2503 can include one or more attachment supports (e.g., attachment support structures) 2504 that are coupled to the body 2503 and that are configured to position one or more attachments 2501 adjacent to corresponding one or more teeth. The dental attachments 2501 may be formed with the body 2503 and attachment supports 2504 (prefabricated) so that the dental attachments 2501 are at a predetermined position with respect to the teeth when the body 2503 is placed on the dental arch. That is, when the body 2503 is properly positioned on the teeth, the attachment supports 2504 can align the attachments 2501 with respect to tooth surfaces for bonding. This helps the dental practitioner to ensure proper alignment of the attachments 2501 when bonding to the teeth. In the example shown, the attachment support(s) 2504 protrude from one side of the body 2503 such the attachments 2501 are positioned for bonding at predetermined positions on the buccal sides of the teeth.

Figure 25C:
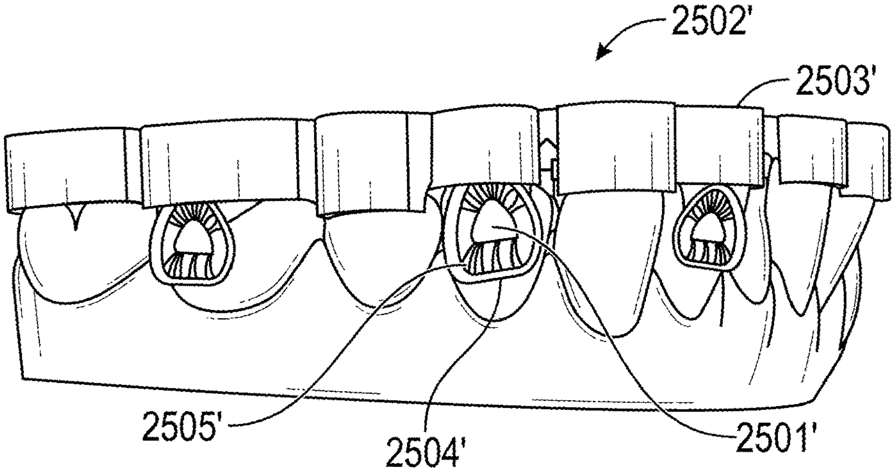
FIG. 25C shows a dental attachment placement apparatus computer model that can be used to form the dental attachment placement apparatus of FIG. 25B, in accordance with some embodiments.

The dental attachment placement apparatus 2502 may be formed using any manufacturing methods, including one or more of additive manufacturing (e.g., 3D printing), molding, joining, casting and/or other fabrication techniques. In some instances, the dental attachment placement apparatus 2502 is formed based on a computer model. FIG. 25C shows an example dental attachment placement apparatus computer model 2502' that can be used to form the dental attachment placement apparatus 2502. As shown, the computer model 2502' can include a body 2503' (corresponding to the body 2503), one or more attachment supports 2504' (corresponding to the attachment support(s) 2504), one or more supports 2505' (corresponding to the support(s) 2505), and one or more dental attachments 2501' (corresponding to the dental attachment(s) 2501). The computer model 2502' may be manipulated based on changes to the forces required to apply appropriate forces on the teeth at different stages of the treatment plan. For example, the placement and number of the dental attachment 2501 may be modified.

The dental attachment placement apparatus can include a dental attachment replacement system to provide one or more replacement dental attachments for replacing the dental attachments 2501 (referred to herein as first or primary attachments). This may be useful, for example, if one or more of the first or primary dental attachments 2501 is lost or damaged, for example, during transport or handling of the dental attachment placement apparatus 2502. For example, a dental specialist can use the replacement system to replace a dental attachment if it were to fall off during treatment, or if the dental attachment failed to bond. The replacement system can be configured to ensure proper placement of the replacement dental attachments with respect to the tooth/teeth of the dental arch. The replacement system can have little impact to the overall usability and precision of the dental attachment placement apparatus and may not place additional burden on manufacturing of the apparatus and/or on the dental specialist using the apparatus. In some cases, the replacement system may be considered part of the attachment support 2504.

FIGS. 26A-32C illustrate dental attachment replacement systems that can be integrated into any of the dental attachment placement apparatuses described herein, such as the dental attachment placement apparatus 1902 (FIGS. 19A and 19B) or any of the dental attachment placement apparatuses described above with reference to FIGS. 1A-18.

FIGS. 26A-26E show an example dental attachment replacement system 2620 that is configured to replace a first dental attachment 2601 with a second dental attachment 2621. As shown, the replacement system 2620 can be coupled to the body 2603 of the dental attachment placement apparatus. The replacement system 2620 is configured to move the second dental attachment 2621 with respect to the body 2603 to position the second dental attachment 2621 at a predetermined position adjacent to a tooth for bonding to the tooth. In this example, the replacement system 2620 includes a hinge 2606 that is configured to rotate the second dental attachment 2621 with respect to the body 2603. The hinge 2606 can be configured to rotate the second dental attachment 2621 in a direction perpendicular to and toward the tooth.

Figure 26A:
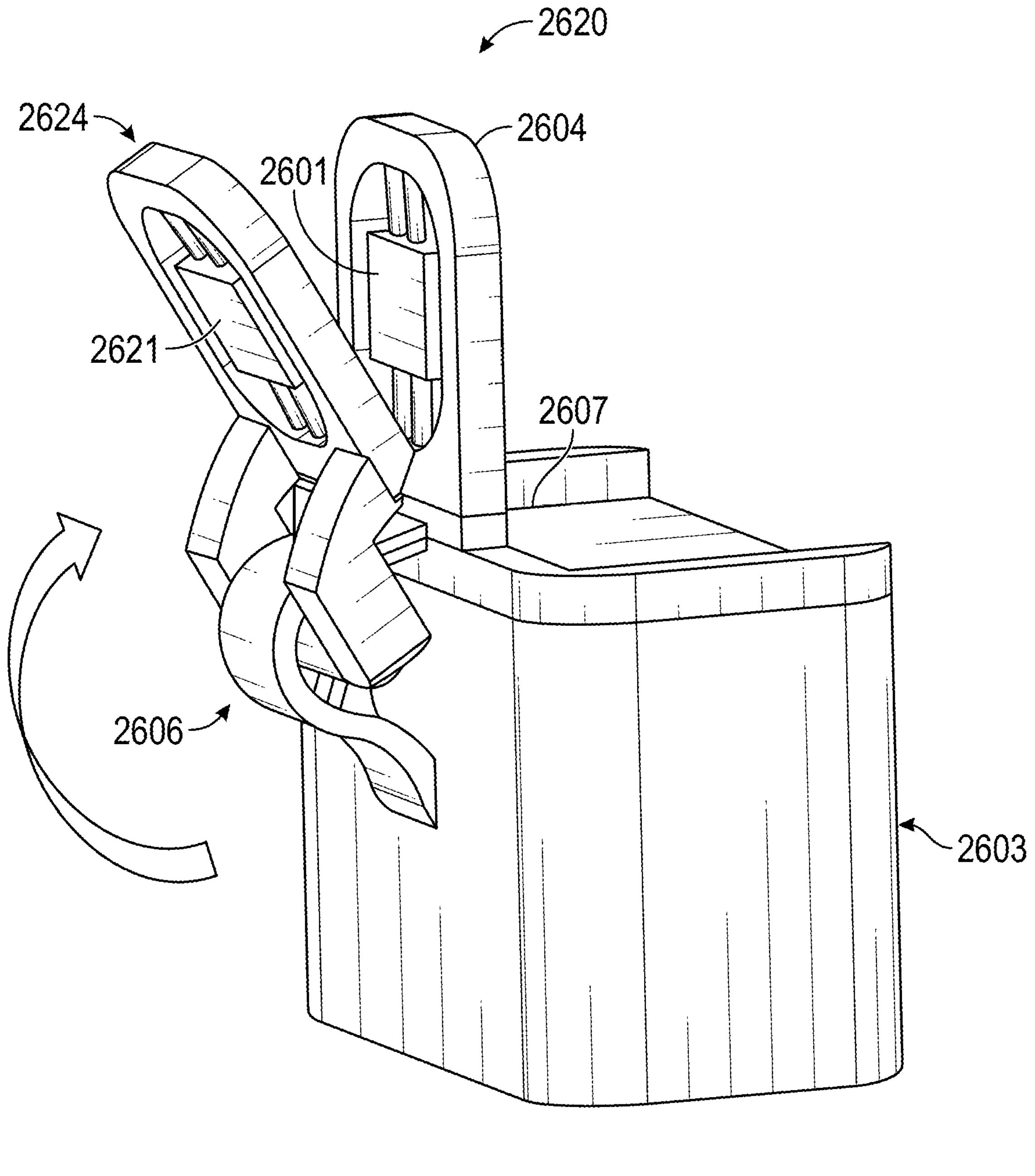
FIGS. 26A-26E illustrate a dental attachment replacement system configured to replace a first dental attachment with a second dental attachment.
Figure 26B:
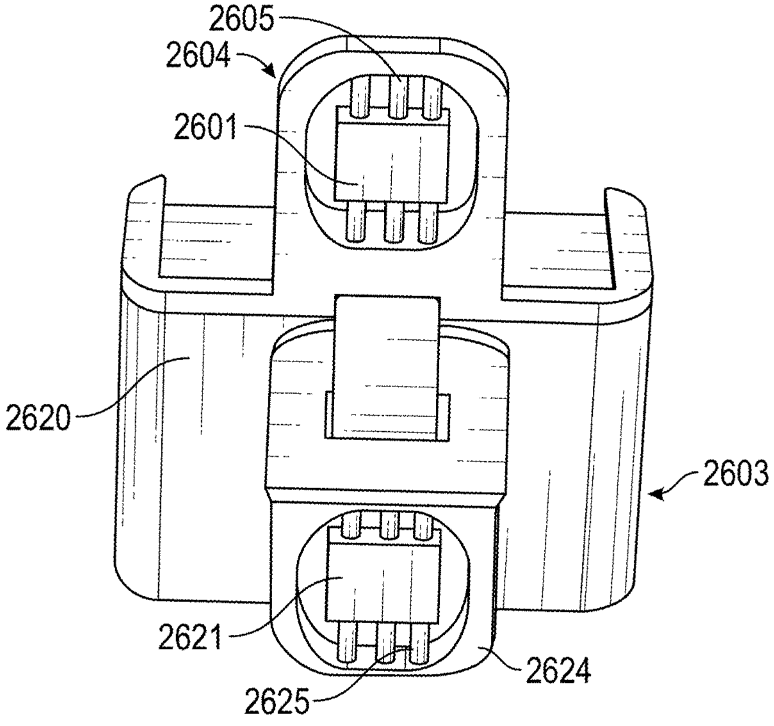
Figure 26C:
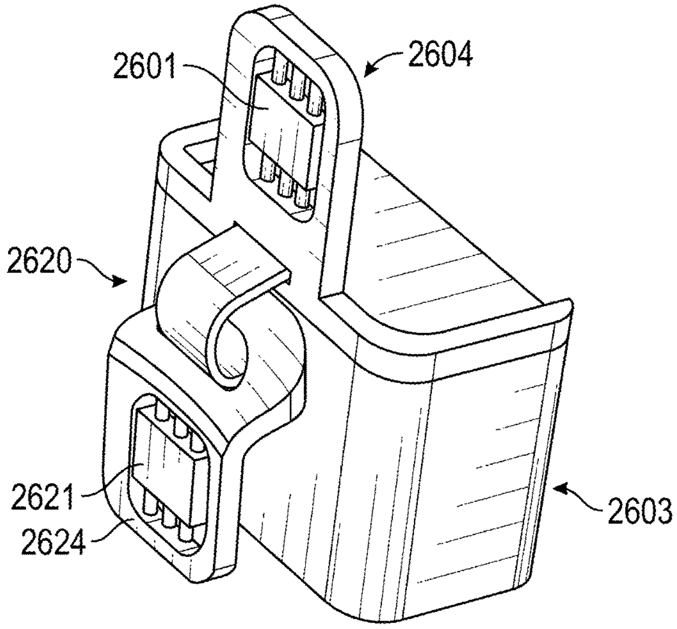

As shown in FIGS. 26A-26C, the replacement system 2620 can include a first attachment support 2604 for supporting the first dental attachment 2601 in position adjacent to a tooth. The first attachment support 2604 may have a frame shape that surrounds the first dental attachment 2601 within a plane. The first attachment support 2604 can include supports 2605 that connect the first dental attachment 2601 to the first attachment support 2604. In some cases, the supports 2605 are frangible so that the first dental attachment 2601 can be easily removed from the first attachment support 2604. A second attachment support 2624 that can similarly have a frame shape for supporting the second dental attachment 2621 therein. The second attachment support 2624 can include supports 2625 that connect the second dental attachment 2621 to the second attachment support 2624, and which also can be frangible.

Figure 26D:
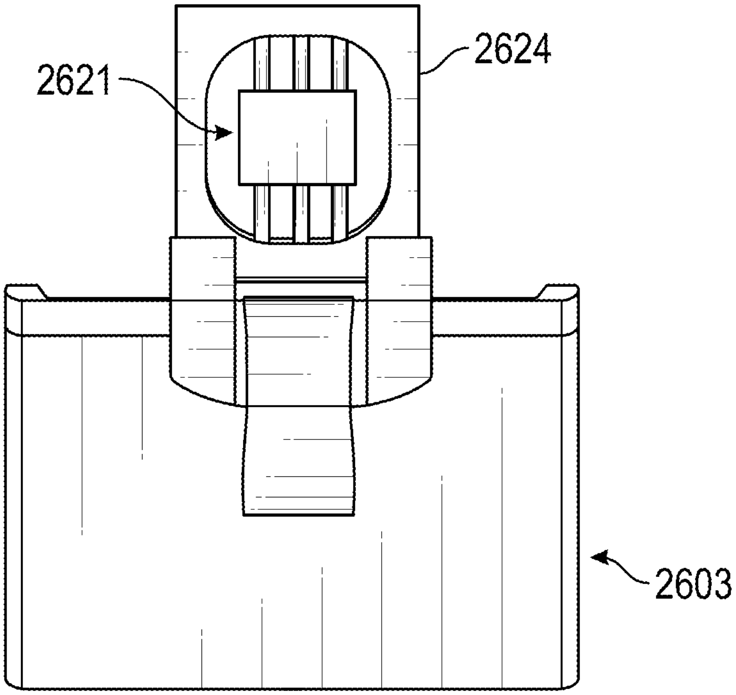
Figure 26E:
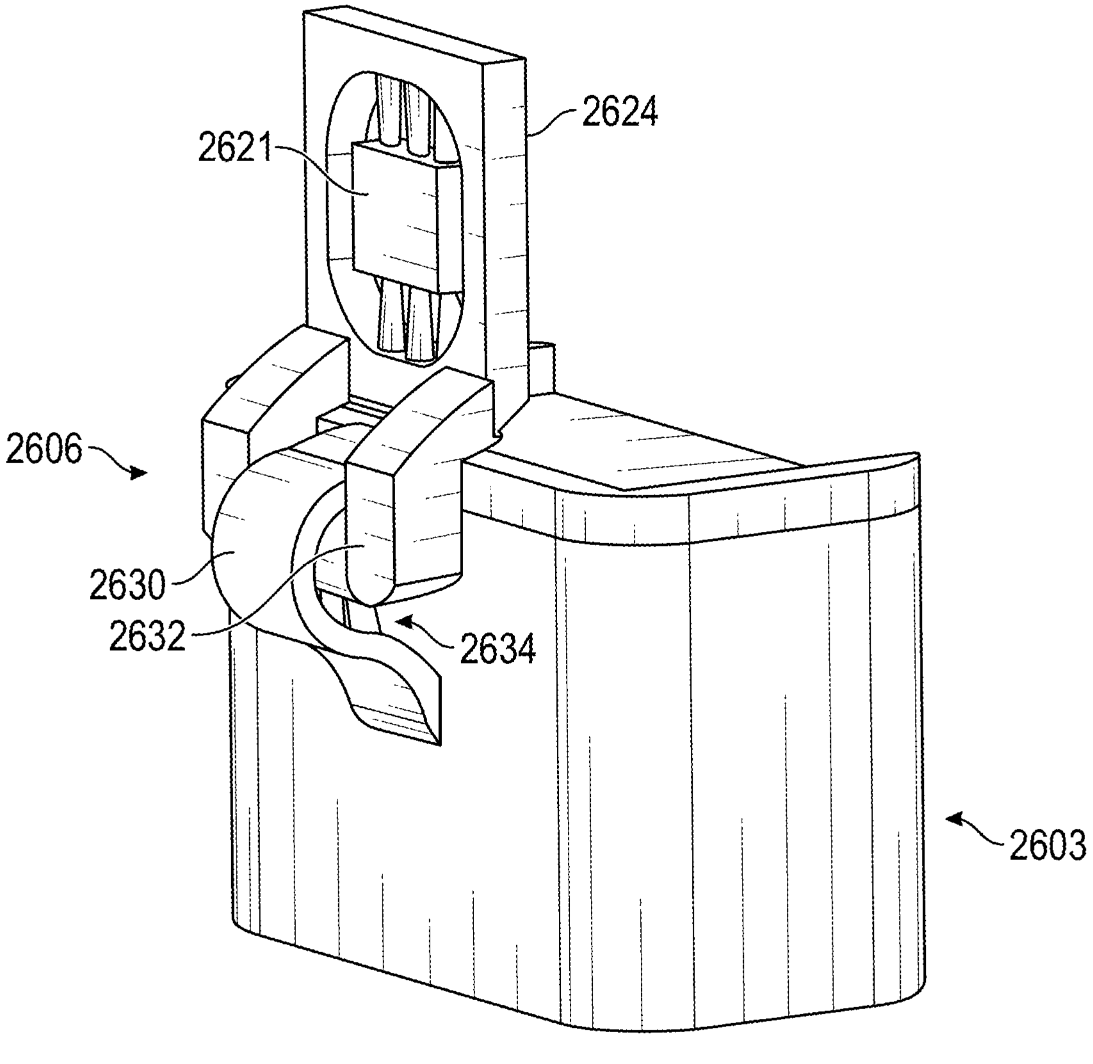

At least a portion of the first attachment support 2604 may be removable from the body 2603. For example, a breakable region 2607 at a base of the first attachment support 2604 can be configured to break away the first attachment support 2604 from the body 2603. Once the first attachment support 2604 is removed from the body 2603, the second attachment support 2624 supporting the second dental attachment 2621 can be rotated via the hinge 2606 to position the second dental attachment 2621 adjacent to the tooth as shown in FIGS. 26D and 26E. The hinge 2606 can include a loop section 2630 that is on a side of the body 2603 and that forms an opening for accommodating a bar 2632 of the second attachment support 2624. The loop section 2630 can be configured to allow the bar 2632 to rotate therein, thereby allowing the second attachment support 2624 with the second dental attachment 2621 to rotate relative to the body 2603. In some cases, the hinge 2606 may include a guide or lock 2634 that is configured to ensure proper positioning of the second attachment support 2624 and/or to lock the second attachment support 2624 in place once the second dental attachment 2621 is positioned at the desired location adjacent to the tooth for bonding.

It is noted that FIGS. 26A-26E show an example one dental attachment replacement system 2620 for attaching a replacement attachment 2621 on one tooth, which can be incorporated into a dental attachment placement apparatus (e.g., 1902). However, the dental attachment placement apparatuses described herein can include any number of dental attachment replacement systems (e.g., 1, 2, 3, 4, 5, 6, 7, 8, 10, 12 or 26) for attaching any number of replacement attachments to any number of teeth.

In any of the dental attachment placement apparatuses described herein, the replacement dental attachments may have the same shape and/or size as corresponding primary attachments or have different shapes and/or sizes than the corresponding primary attachments. Additionally, the dental attachments replacement systems may be arranged to position a replacement dental attachment at the same position with respect to the tooth as the corresponding dental attachment, or at a different position with respect to the tooth compared to the corresponding dental attachment. For example, referring to FIGS. 26A-26E, the second dental attachment 2621 may have the same size and shape as the first dental attachment 2601, thereby providing a replica of the first dental attachment 2601, for example, if the first dental attachment 2601 is lost or damaged. In some cases, the second dental attachment 2621 may have a different shape and/or size as the first dental attachment 2601. Additionally or alternatively, the second attachment support 2624 may be configured to position the second dental attachment 2621 at the same place relative to the tooth as the first attachment support 2604 places the first dental attachment 2601, or at a different place relative to the tooth compared to the first attachment support 2604. This flexibility may be useful, for example, if the second dental attachment 2621 is used to apply different forces (along with the dental aligner) to the teeth. For instance, the second dental attachment 2621 may be used for applying forces to the teeth (along with the dental aligner) in accordance with another step of the dental alignment plan. The second dental attachment 2621 may be made of the same material(s) as the first dental attachment 2601 or different material(s) compared to the first dental attachment 2601. A second dental attachment 2621 made of a different material may be useful, for example, if the second dental attachment 2621 is configured to withstand different forces than the first dental attachment 2601.

Figure 27:
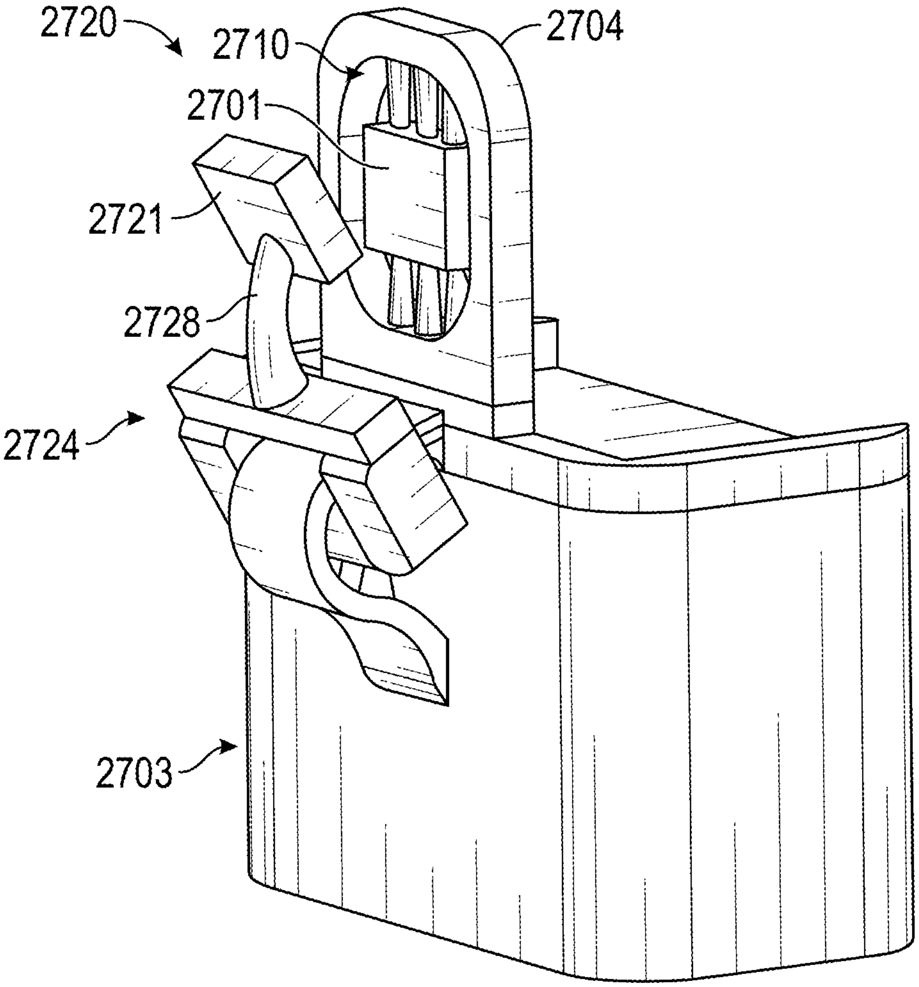
FIG. 27 shows a dental attachment replacement system that is an example of the hinge-based attachment replacement system, where the second attachment support includes a post (rather than a frame) for supporting the second dental attachment, in accordance with some embodiments.

FIG. 27 shows another example dental attachment replacement system 2720 that is an example of the hinge-based attachment replacement system 2020, where the second attachment support 2724 includes a post 2728 (rather than a frame) for supporting the second dental attachment 2727. The post 2728 may have a curved shape that curves toward the tooth to facilitate the placement of the second dental attachment 2727. In this example, once the first dental attachment 2701 is removed from the first attachment support 2704, the first attachment support 2704 (e.g., frame) may remain attached to the body 2703 when the second dental attachment 2727 is rotated adjacent to the tooth. In some cases, the first attachment support 2704 (e.g., frame) may be shaped and sized to align the second dental attachment 2727 with respect to the tooth. For example, the first attachment support 2704 (e.g., frame) can include one or more internal surface 2710 that contact and align the second dental attachment 2727.

Figure 28:
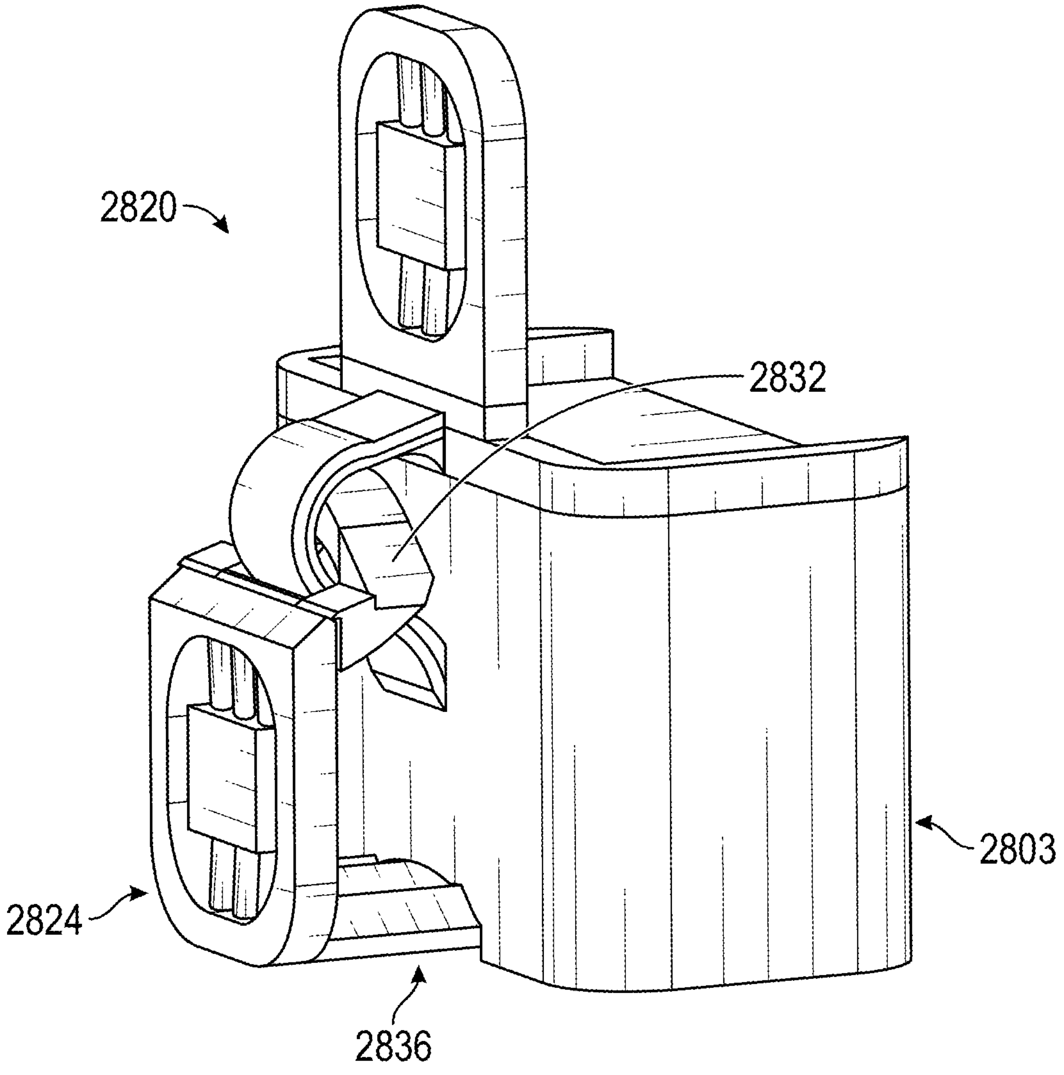
FIG. 28 shows a dental attachment replacement system that is another example of the hinge-based attachment replacement system, where the dental attachment replacement system includes a sacrificial support that couples the second attachment support to the body, in accordance with some embodiments.

FIG. 28 shows a further example dental attachment replacement system 2820 that is another example of the hinge-based attachment replacement system 2020, where the dental attachment replacement system 2820 includes a sacrificial support 2836 that couples the second attachment support 2824 to the body 2803. The sacrificial support 436 can be configured to be severed/broken, for example by the dental specialist, to release the second attachment support 2824 so that the second attachment support 2824 can be rotated into place adjacent to the tooth. In some cases, the sacrificial support 2836 can act as a handle for the dental specialist when positioning the dental attachment placement apparatus on a patient's dental arch. Alternatively, the sacrificial support 2836 may be removed prior to shipping to the dental specialist. In this example, the bar 2832 of the second attachment support 2824 has curved shaped to lengthen the second attachment support 2824. Note that in cases where the dental attachment placement apparatus is printed (e.g., using 3D printing), the sacrificial support 2836 can be oriented at the bottom so that the dental attachment placement apparatus may be printed without additional printing supports.

Figure 29A:
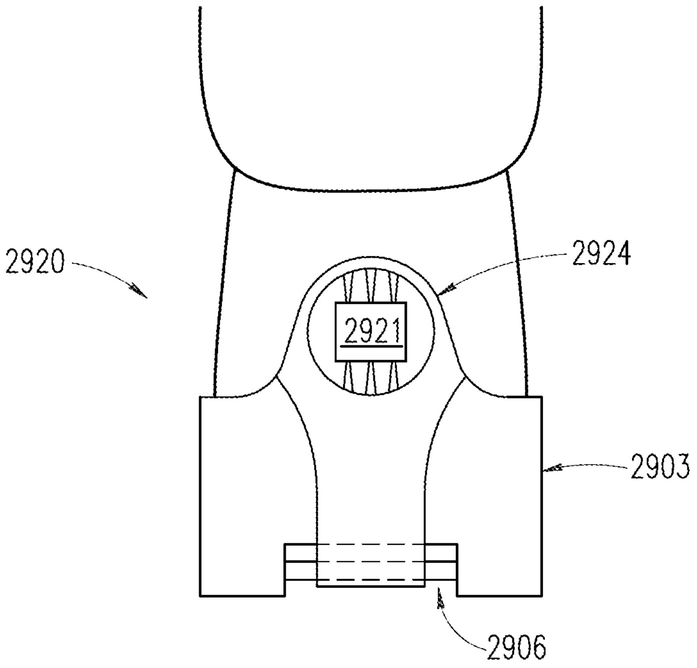
FIGS. 29A-29B show a dental attachment replacement system that is a further example of the hinge-based attachment replacement system, where the hinge is configured to rotate the second attachment support to either side of the body, in accordance with some embodiments.
Figure 29B:
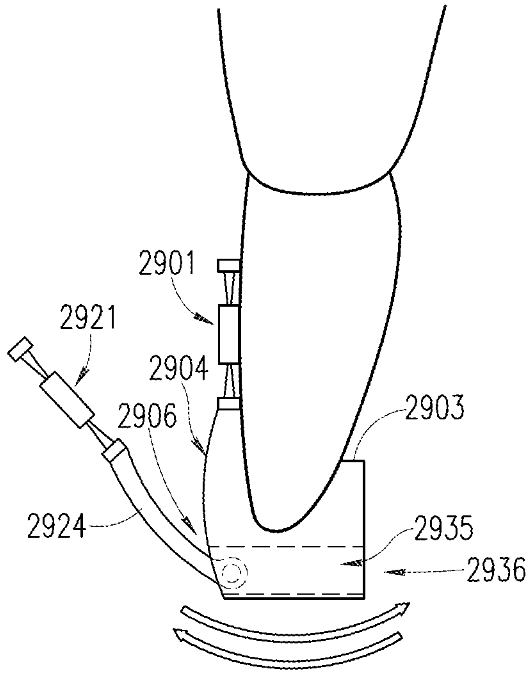

FIGS. 29A and 29B show another example dental attachment replacement system 2920 that is a further example of the hinge-based attachment replacement system 2020, where the hinge 2906 is configured to rotate the second attachment support 2924 to either side of the body 2903. In addition, the body 2903 can include an internal cutout 2935 that allows lateral movement of the hinge 2906 within the body so that the second attachment support 2924 (with the second dental attachment 2921 attached thereto) may be stored on a side 2936 of the body 2903 opposite the first attachment support 2904 (e.g., supporting the first dental attachment 2901). This configuration can allow the second attachment support 2924 and second dental attachment 2921 to be positioned out of the way until needed.

Figure 30A:
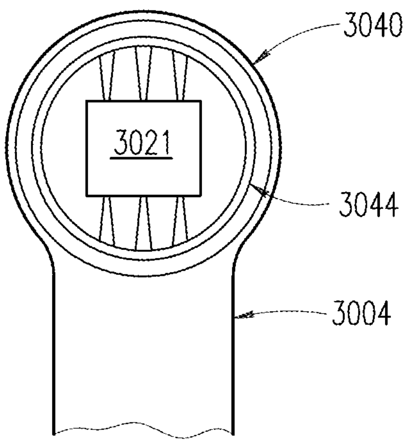
FIG. 30A shows a frontal view of the first frame and the second frame from the perspective of the tooth, in accordance with some embodiments.
Figure 30B:
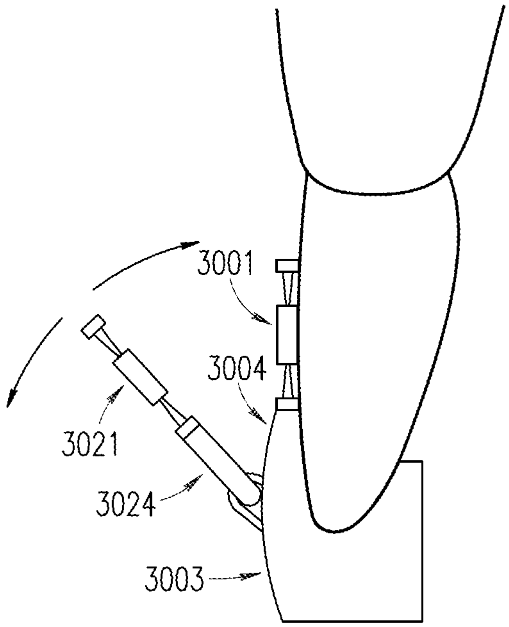
FIG. 30B shows a side view of the dental attachment replacement system illustrating how the second attachment support can rotate with respect to the body to replace the first dental attachment with the second dental attachment, in accordance with some embodiments.
Figure 30C:
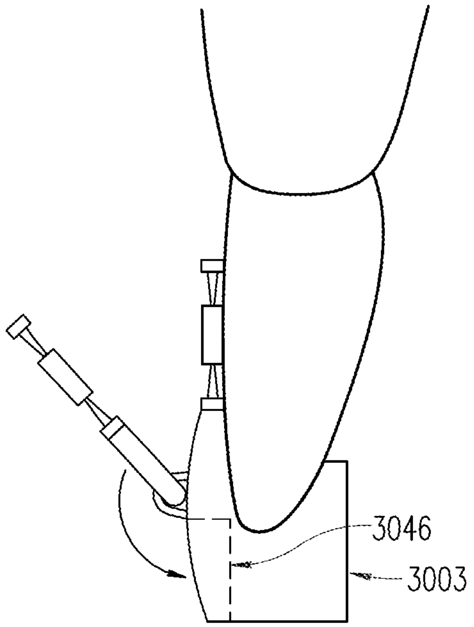
FIG. 30C shows another example where the body includes an internal cutout that allows the second attachment support rotate further to move the second attachment support out of the way until needed.

FIGS. 30A and 30B show a further example of a dental attachment replacement system 3020 that is another example of the hinge-based attachment replacement system 2020, where the first attachment support 3004 has a first frame 3040 that is configured to align a second frame 3044 of the second attachment support 3030. FIG. 30A shows a frontal view of the first frame 3040 and the second frame 3044 from the perspective of the tooth. The first frame 3040 can have a shape that accommodates the smaller second frame 3044 so that the second dental attachment 3021 can be positioned adjacent to the tooth. Thus, when rotated toward the tooth, the second frame 3044 can self-locate into the first frame 3040 for proper alignment of the second dental attachment 3021. FIG. 30B shows a side view of the dental attachment replacement system 3020 illustrating how the second attachment support 3030 can rotate with respect to the body 3003 to replace the first dental attachment 3001 with the second dental attachment 3021. FIG. 30C shows another example where the body 3003 includes an internal cutout 3046 that allows the second attachment support 3030 rotate further to move the second attachment support 3030 out of the way until needed.

Figure 31A:
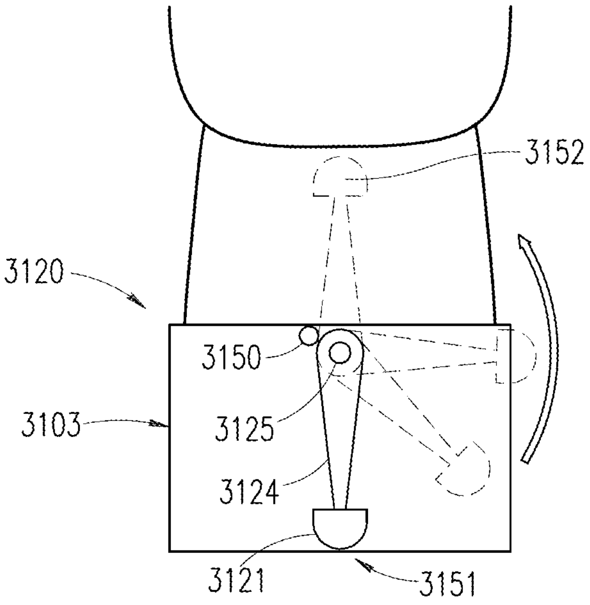
FIGS. 31A-31B show a dental attachment replacement system that includes a dial type assembly where the second attachment support is rotatable around a post, in accordance with some embodiments.
Figure 31B:
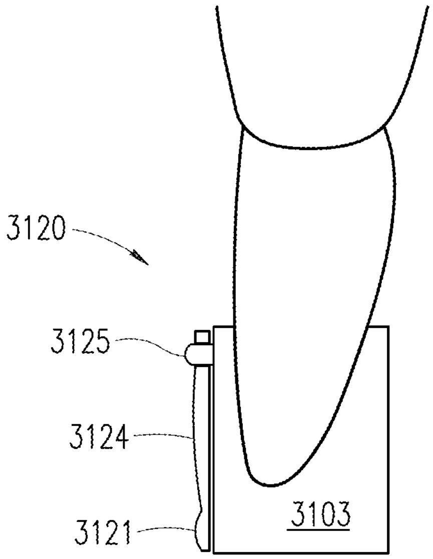

FIGS. 31A and 31B show an example dental attachment replacement system 3120 that includes a dial type assembly where the second attachment support 3124 is rotatable around a post 3131. Once the first dental attachment is removed from dental attachment placement apparatus, the second attachment support 3124 can be rotated such that the second dental attachment 3121, which is attached to the second attachment support 3124, can be rotated from a storage position 3151 to a desired position 3152 adjacent to the tooth. A stopper 3150 can prevent the second attachment support 3124 from rotating past the desired position 3152 so that the second dental attachment 3121 is properly positioned adjacent to the tooth.

Figure 32:
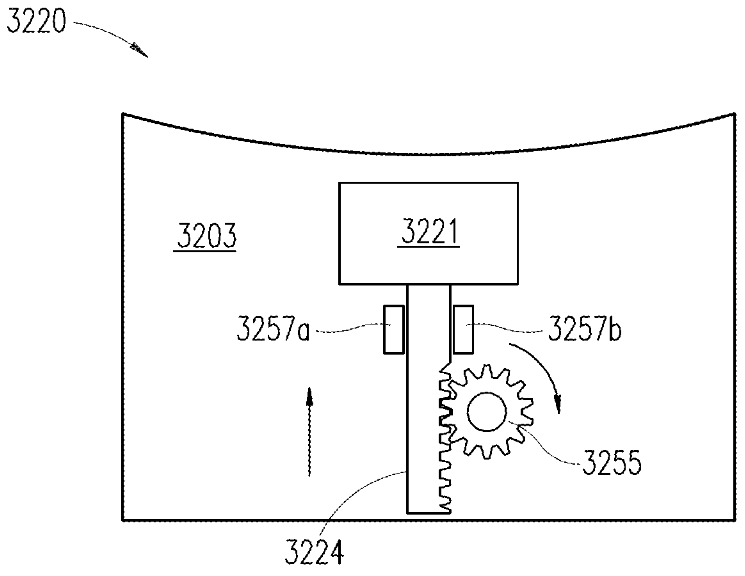
FIG. 32 shows a dental attachment replacement system that includes a gear assembly, in accordance with some embodiments.

FIG. 32 shows an example dental attachment replacement system 3220 that includes a gear assembly. The teeth of a gear 3255 can engage with teeth on the second support structure 3224 such that rotational motion of the gear 3255 causes linear translation of the second support structure 3224. For example, the gear 3255 can be rotated in a first direction to extend the second dental attachment 3221 above (or below) the body 3203 to a desired position adjacent a tooth. Likewise, the gear 3255 may be rotated in a second (opposite) direction to retract the second dental attachment 3221 the out of the way, for example, of the first dental attachment. In some instances, guides 3257*a*, 3257*b* guide the second support structure 3224 to so that the second dental attachment 3221 is positioned properly adjacent to the tooth.

Figure 33A:
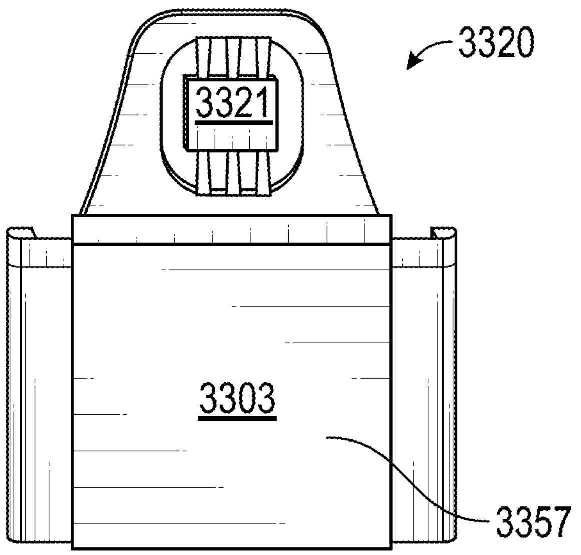
FIGS. 33A-33C show a dental attachment replacement system that includes a dowel joint assembly, in accordance with some embodiments.
Figure 33B:
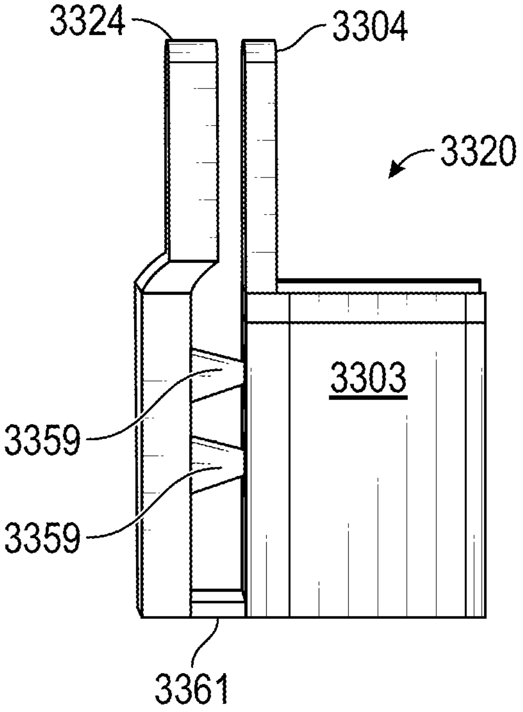
Figure 33C:
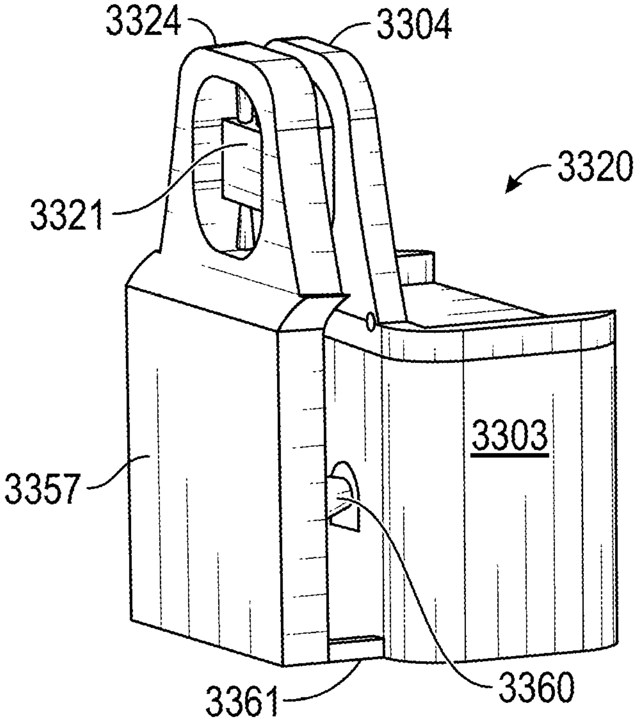

FIGS. 33A-33C show an example dental attachment replacement system 3320 that includes a dowel joint assembly. In this example, the second support structure 3324 that is connected to the body 3303 by a breakable support 3361. The breakable support 3361 can be broken, thereby freeing the second support structure 3324 from the body 3303. The first support structure 3304 can be removed from the body 3303, for example, if it is damaged or has a missing first dental attachment. The second support structure 3324 includes one or more alignment structures 3359 (e.g., dowel shaped, or cone shaped) that are configured to fit within one or more correspondingly shaped openings 3360 of the body 3303, which align the second support structure 3324 with the second dental attachment 3321 into proper position for bonding of the second dental attachment 3321 against the tooth. In this example, the second support structure 3324 includes three alignment structures 3359 to maximize stabilization and ensure consistent placement of the second dental attachment 3321. However, the dental attachment replacement system 3320 may include more alignment structures 3359 with corresponding openings 3360 (e.g., 4, 5, 6, 7, 10), or less alignment structures 3359 with corresponding openings 3360 (e.g., 1 or 2). In some instances, the second support structure 3324 includes a label 3357 (e.g., upper left mandible "ULM") to track the second support structure 3324 when separated from the body 3303, thereby reducing the chances of the second support structure 3324 being placed incorrectly. In some cases, the second support structure 3324 has a large enough size that it can be handled by the dental specialist without risk of breaking the second dental attachment 3321. In the case of a 3D printed part, the second support structure 3324 may be printed along with the rest of the dental attachment placement apparatus, thereby eliminating tolerance stack up and traceability issues associated with lots of small spare individual parts. Further, dental attachment placement apparatus. The second support structure 3324 may be removed from the body 3303 during manufacturing and placed in kit or may be removed by dental specialist.

Figure 34A:
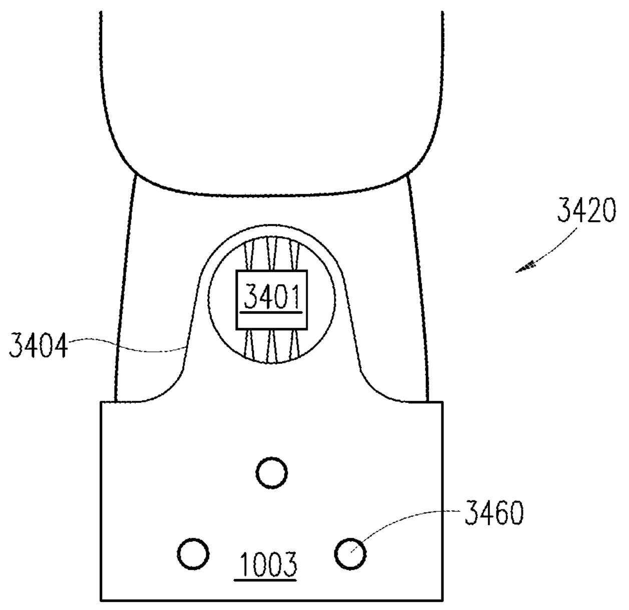
FIGS. 34A-34B show a dental attachment replacement system having a dowel joint assembly, in accordance with some embodiments.
Figure 34B:
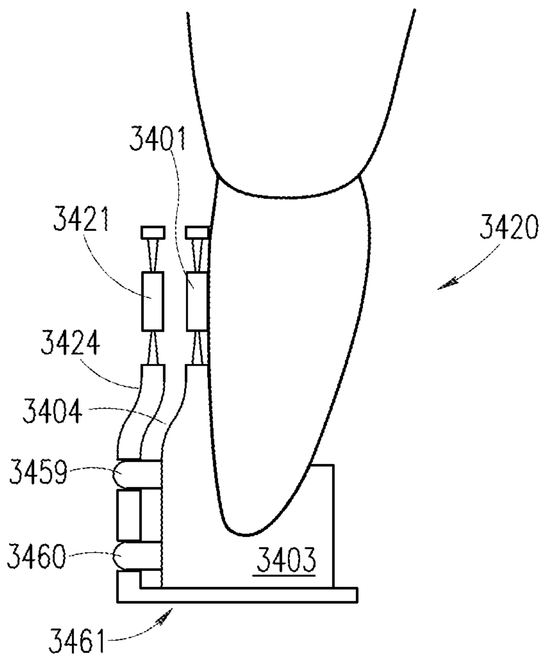

FIGS. 34A and 34B show another example of a dental attachment replacement system 3420 having a dowel joint assembly. In this case, the body 3403 includes one or more alignment structures 3459 that are configured to fit within one or more correspondingly shaped openings 3460 of the second support structure 3424. The breakable support 3461 can be broken to release the second support structure 3424 from the body 3403, then positioned properly adjacent the tooth by the one or more alignment structures 3459 guided within the one or more correspondingly shaped openings 3460 once the first dental attachment 3401 (and in some cases also the first support structure 3404) is removed from the body 3403.

Figure 35A:
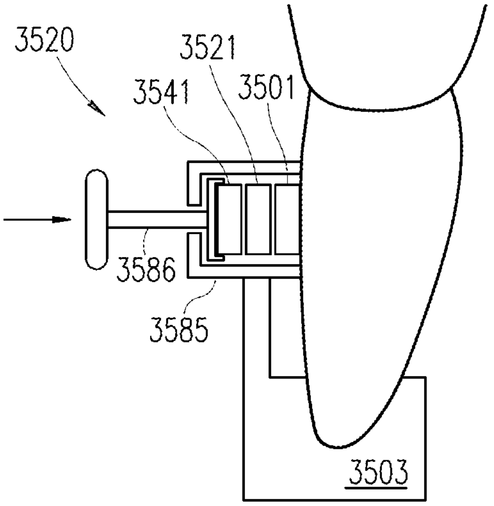
FIGS. 35A-35C show dental attachment replacement systems having dispenser type assemblies, in accordance with some embodiments.
Figure 35B:
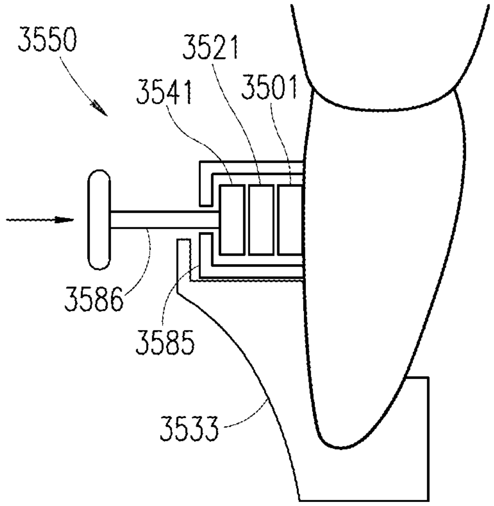
Figure 35C:
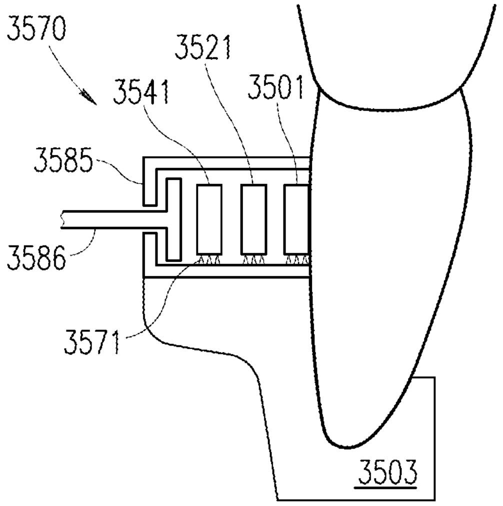
Figure 36A:
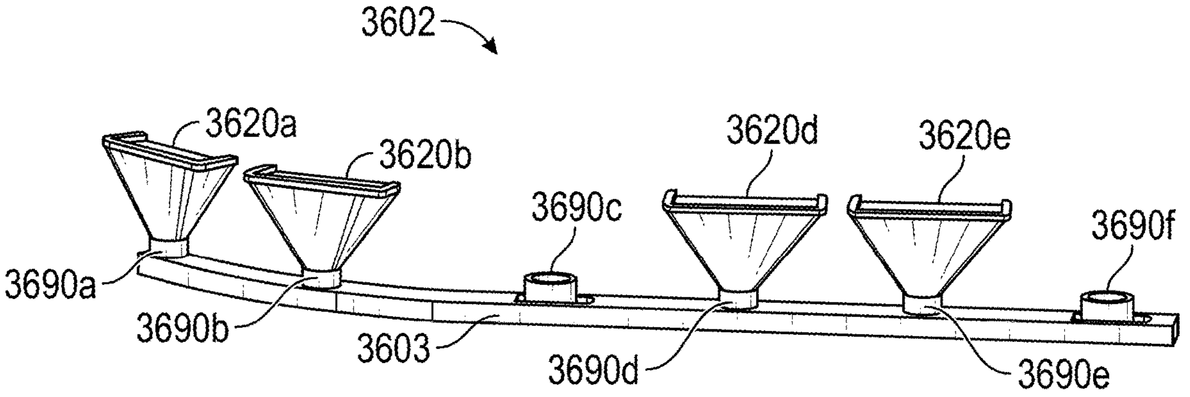
FIGS. 36A-36D show a portion of a dental attachment placement apparatus that includes anchors configured to removably connect with multiple corresponding dental attachment replacement systems, in accordance with some embodiments.
Figure 36B:
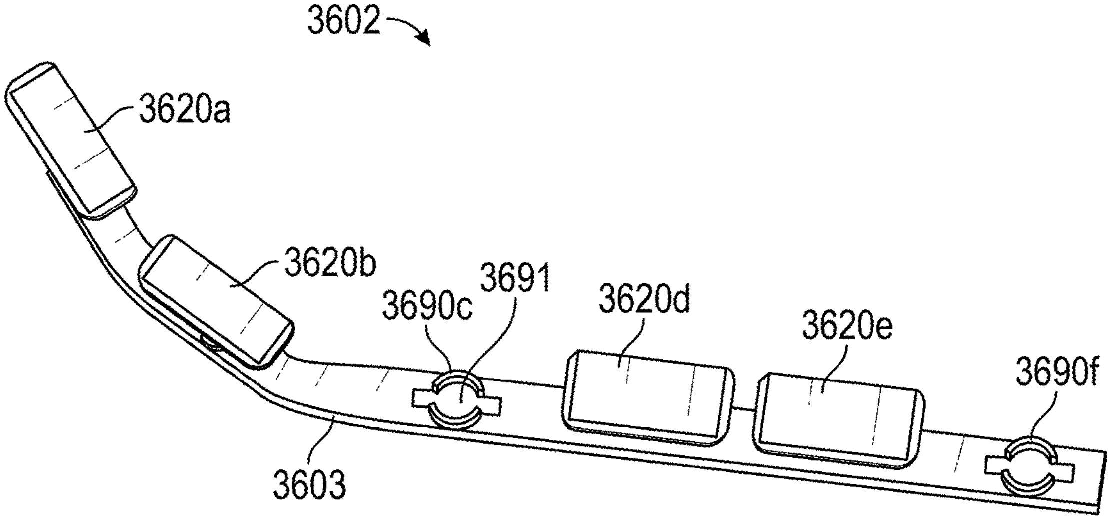
Figure 36C:
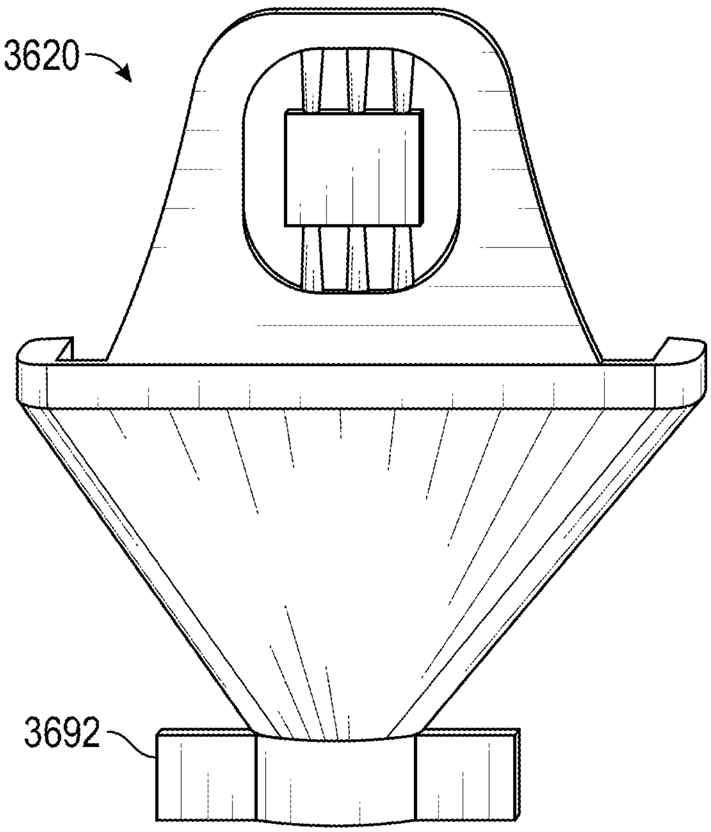
Figure 36D:
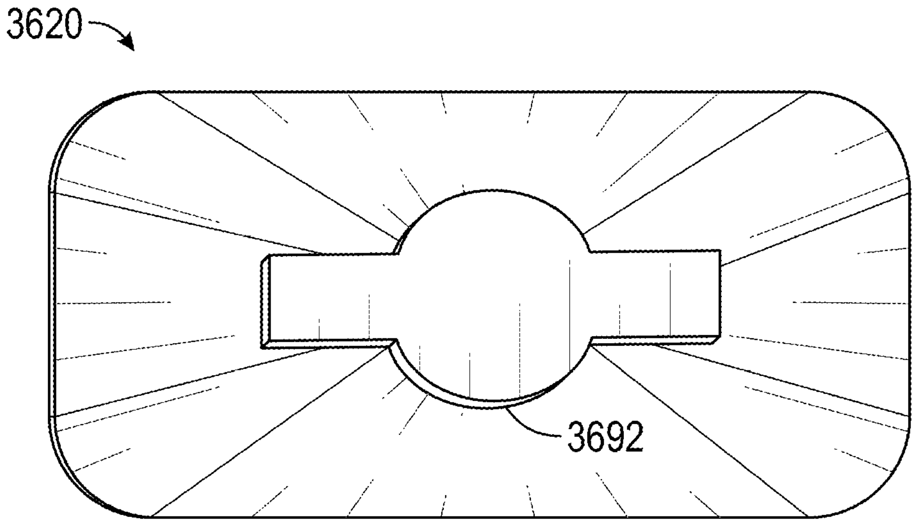

FIGS. 35A-35C show example dental attachment replacement systems 3520, 3580 and 3590 having dispenser type assemblies. In FIG. 35A, the dental attachment replacement systems 3520 includes multiple dental attachments 3501, 3521 and 3541 stored within a reservoir 3585 until they are needed. A push rod 3586 can be used to push a desired one of the multiple dental attachments 3501, 3521 and 3541 adjacent to the tooth. For example, if the first dental attachment 3501 fails to bond, the first dental attachment 3501 can be removed and the second dental attachment 3521 can be moved into place by pushing the push rod 3586. FIG. 35B shows dental attachment replacement system 3550 example similar to the dental attachment replacement system 3520 except that the body 3533 (compared to body 3503) extends partially around the reservoir 3585 and has a contoured shape. FIG. 35C shows another dental attachment replacement system 3570 example similar to the dental attachment replacement system 3520 except that the dental attachments 3501, 3521 and 3541 are frangibly connected to the body 3503 by breakable features 3571, which can maintain the positions of the dental attachments 3501, 3521 and 3541 within the reservoir 3585. In the examples of FIGS. 35A-35C, the dental attachments 3501, 3521 and 3541 may be manufactured separately from or with the manufacture of the dental attachment replacement systems 3520, 3580 and 3590.

FIGS. 36A-36D show an example of a portion of a dental attachment placement apparatus 3602 that includes anchors (e.g., 3690*a*, 3690*b*, 3690*c*, 3690*d*, 3690*e* and 3690*f*) that are configured to removably connect with multiple corresponding dental attachment replacement systems (e.g., 3620*a*, 3620*b*, 3620*d* and 3620*e*). In this example, the anchors 3690 include keyholes 3691 that are configured to accept protruding keys 3692 of the anchors 3620. In some cases, the keys 3692 are attached by press fit within the keyholes 3691. Allowing the dental attachment replacement systems 3620 to be removably attached to the body 3603 adds a degree of flexibility to the apparatus 3602. For example, the manufacturer or the specialist can choose which dental attachment placement apparatus(es) 3602 to attached to the body 3603. The dental attachment replacement systems 3620 may be manufactured with or separately from the body 3603. This modular assembly can also allow any one of the replacement dental attachments to be switched to a different type (e.g., shape or size) mid treatment without the need to manufacture the entire dental attachment placement apparatus. Additional aligner orders can utilize the same body—just order new anchors. In some cases, additional anchors can be stored at the specialist's office. Manufacturing of the anchor and dental attachment as a unit ensures the attachment can be placed accurately every time as it relies on the stability of the anchor for reliable placement. The anchors may be large enough to be easily manufactured as stand-alone parts and easily traced, for example, by labeling each of the replacement attachments.

Figure 37A:
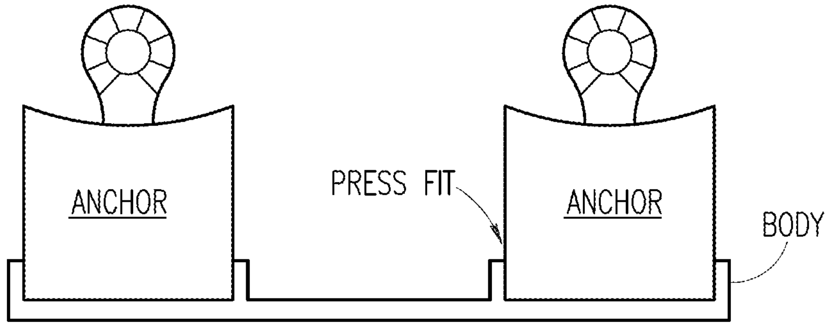
FIG. 37A shows a dental attachment placement apparatus having removable dental attachment replacement systems where the anchors are removably coupled (press fit) to square or rectangular shaped holes in the body, in accordance with some embodiments.
Figure 37B:
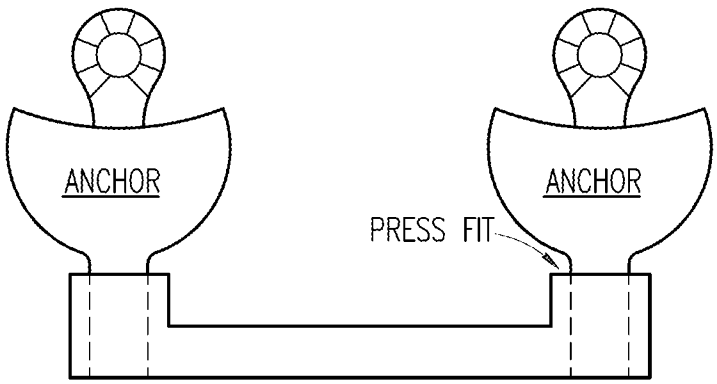
FIG. 37B shows a dental attachment placement apparatus having removable dental attachment replacement systems where the anchors are removably coupled (press fit) to round shaped holes in the body, in accordance with some embodiments.
Figure 37C:
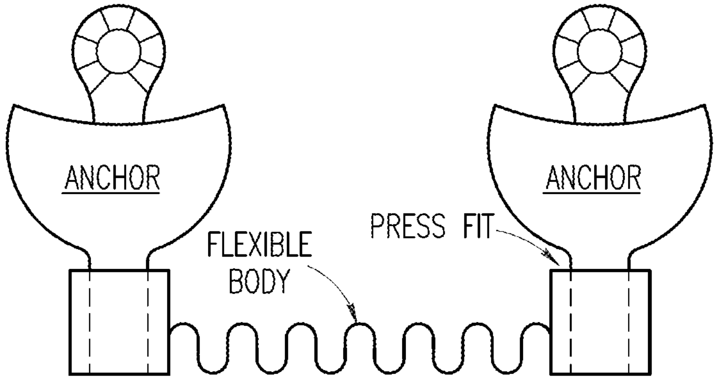
FIG. 37C shows a dental attachment placement apparatus having removable dental attachment replacement systems where the anchors are removably coupled (press fit) to a flexible body, in accordance with some embodiments.

FIGS. 37A-37C show other examples of example of dental attachment placement apparatus having removable dental attachment replacement systems. FIG. 37A shows an example where the anchors are removably coupled (press fit) to square or rectangular shaped holes in the body. FIG. 37B shows an example where the anchors are removably coupled (press fit) to round shaped holes in the body. FIG. 37C shows an example where the anchors are removably coupled (press fit) to a flexible body.

Figure 38A:
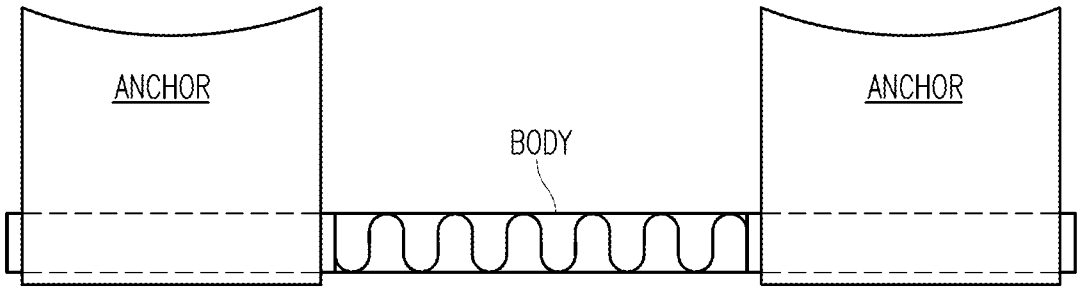
FIGS. 38A-38C show removable dental attachment replacement systems, in accordance with some embodiments.
Figure 38B:
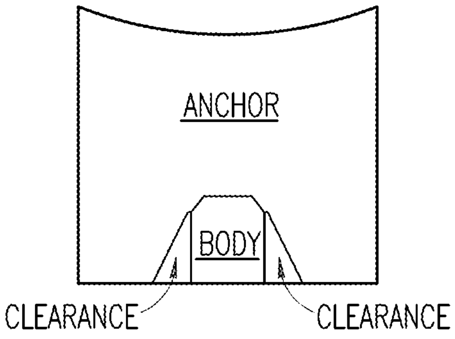
Figure 38C:
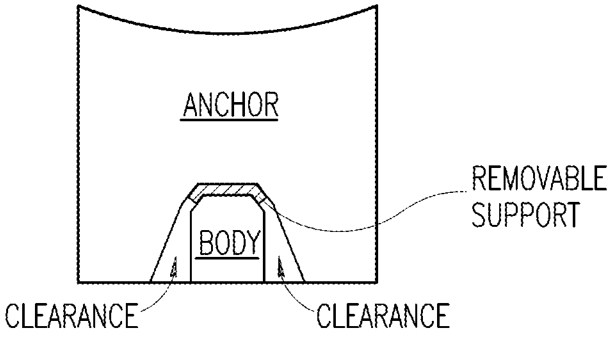

FIGS. 38A-38C show other examples of removable dental attachment replacement systems. FIGS. 38A and 38C shows an example where a clearance is provided between the anchors and the body so that the anchors and body may be printed as separate parts (e.g., during a single 3D printing). The anchor may snugly fit into the body (e.g., press fit, screw, slide etc.) Extra anchors can be manufactured separately and provided up front as backups or by request for individual teeth. FIG. 38C shows a example where a removable support is provided between the body and the anchor so that the body and the anchor can remain connected during post-processing, packaging, shipping etc. A user may press down on the anchor to break the removable support, thereby freeing the anchor from the body.

Certain aspects of the present disclosure provide dental attachments printed with a composition and/or method of the present disclosure. A dental attachment can be a solid article configured to be coupled directly to a tooth. In many cases, a dental attachment is coupled to a surface or a tooth with an adhesive, such as an epoxy.

The dental attachment can be configured to couple to additional orthodontic appliances, such as one or more incremental palatal expanders or aligners, thereby enabling, augmenting, or improving treatment with such apparatuses. For example, a tooth which has a shape that would be difficult to couple to a dental aligner, such as a dental aligner diagrammed in FIG. 1, can be coupled to a dental attachment coupled to the tooth, and transmit force through the dental attachment to affect tooth movement. The dental attachment can comprise a groove, hook, button, or other structure to facilitate coupling to the orthodontic appliance. In some courses of treatment, every tooth of a patient is coupled to a dental attachment. In other cases, dental attachments are provided to only a subset of the patient's teeth.

In some cases, the tooth attachment is configured for detection by a scanner or imaging system. Detection of the dental attachment can aid in orthodontic device design (e.g., for designing new dental aligners during a course of treatment). In some cases, the dental attachments are used as reference points for tooth movement and treatment progression.

2) Directly Fabricated Dental Aligners

FIG. 1A illustrates an exemplary tooth repositioning appliance or aligner 100 that can be worn by a patient in order to achieve an incremental repositioning of individual teeth 102 in the jaw. In some cases, the repositioning appliance or aligner can be configured to couple to a dental attachment coupled to a tooth or to multiple teeth 102. The appliance can include a shell (e.g., a continuous polymeric shell or a segmented shell) having teeth-receiving cavities that receive and resiliently reposition the teeth. An appliance or portion(s) thereof may be indirectly fabricated using a physical model of teeth. For example, an appliance (e.g., polymeric appliance) can be formed using a physical model of teeth and a sheet of suitable layers of polymeric material. In some embodiments, a physical appliance is directly fabricated, e.g., using rapid prototyping fabrication techniques, from a digital model of an appliance. An appliance can fit over all teeth present in an upper or lower jaw, or less than all of the teeth. The appliance can be designed specifically to accommodate the teeth of the patient (e.g., the topography of the tooth-receiving cavities matches the topography of the patient's teeth), and may be fabricated based on positive or negative models of the patient's teeth generated by impression, scanning, and the like. Alternatively, the appliance can be a generic appliance configured to receive the teeth, but not necessarily shaped to match the topography of the patient's teeth. In some cases, only certain teeth received by an appliance will be repositioned by the appliance while other teeth can provide a base or anchor region for holding the appliance in place as it applies force against the tooth or teeth targeted for repositioning. In some cases, some, most, or even all of the teeth will be repositioned at some point during treatment. Teeth that are moved can also serve as a base or anchor for holding the appliance as it is worn by the patient. Typically, no wires or other means will be provided for holding an appliance in place over the teeth. In some cases, however, it may be desirable or necessary to provide individual attachments or other anchoring elements 104 on teeth 102 with corresponding receptacles or apertures 106 in the appliance 100 so that the appliance can apply a selected force on the tooth. Exemplary appliances, including those utilized in the Invisalign® System, are described in numerous patents and patent applications assigned to Align Technology, Inc. including, for example, in U.S. Pat. Nos. 6,450,807, and 5,975,893, as well as on the company's website, which is accessible on the World Wide Web (see, e.g., the url "invisalign.com"). Examples of tooth-mounted attachments suitable for use with orthodontic appliances are also described in patents and patent applications assigned to Align Technology, Inc., including, for example, U.S. Pat. Nos. 6,309,215 and 6,830,450.

Figure 1B:
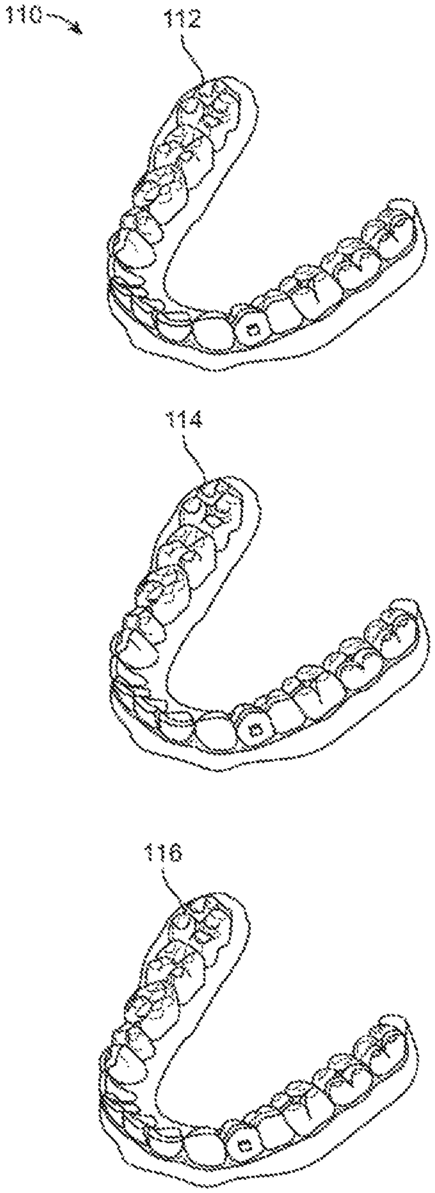
FIG. 1B illustrates a tooth repositioning system, in accordance with some embodiments.

FIG. 1B illustrates a tooth repositioning system 110 including a plurality of appliances 112, 114, 116. Any of the appliances described herein can be designed and/or provided as part of a set of a plurality of appliances used in a tooth repositioning system. Each appliance may be configured so a tooth-receiving cavity has a geometry corresponding to an intermediate or final tooth arrangement intended for the appliance. The patient's teeth can be progressively repositioned from an initial tooth arrangement to a target tooth arrangement by placing a series of incremental position adjustment appliances over the patient's teeth. For example, the tooth repositioning system 110 can include a first appliance 112 corresponding to an initial tooth arrangement, one or more intermediate appliances 114 corresponding to one or more intermediate arrangements, and a final appliance 116 corresponding to a target arrangement. A target tooth arrangement can be a planned final tooth arrangement selected for the patient's teeth at the end of all planned orthodontic treatment. Alternatively, a target arrangement can be one of some intermediate arrangements for the patient's teeth during the course of orthodontic treatment, which may include various different treatment scenarios, including, but not limited to, instances where surgery is recommended, where interproximal reduction (IPR) is appropriate, where a progress check is scheduled, where anchor placement is best, where palatal expansion is desirable, where restorative dentistry is involved (e.g., inlays, onlays, crowns, bridges, implants, veneers, and the like), etc.

As such, it is understood that a target tooth arrangement can be any planned resulting arrangement for the patient's teeth that follows one or more incremental repositioning stages. Likewise, an initial tooth arrangement can be any initial arrangement for the patient's teeth that is followed by one or more incremental repositioning stages.

Figure 1C:
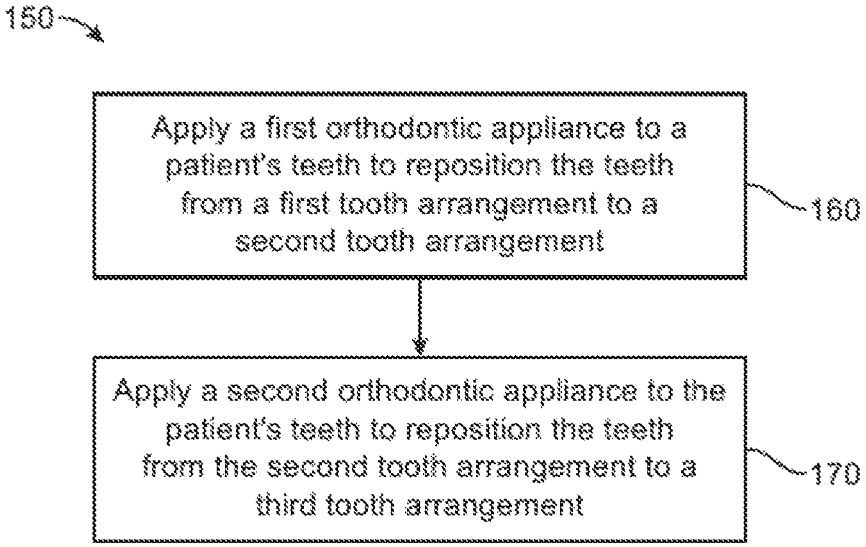
FIG. 1C illustrates a method of orthodontic treatment using a plurality of appliances, in accordance with some embodiments.

FIG. 1C illustrates a method 150 of orthodontic treatment using a plurality of appliances, in accordance with embodiments. The method 150 can be practiced using any of the appliances or appliance sets described herein. In step 160, a first orthodontic appliance is applied to a patient's teeth in order to reposition the teeth from a first tooth arrangement to a second tooth arrangement. In step 170, a second orthodontic appliance is applied to the patient's teeth in order to reposition the teeth from the second tooth arrangement to a third tooth arrangement. The method 150 can be repeated as necessary using any suitable number and combination of sequential appliances in order to incrementally reposition the patient's teeth from an initial arrangement to a target arrangement. The appliances can be generated all at the same stage or in sets or batches (e.g., at the beginning of a stage of the treatment), or the appliances can be fabricated one at a time, and the patient can wear each appliance until the pressure of each appliance on the teeth can no longer be felt or until the maximum amount of expressed tooth movement for that given stage has been achieved. A plurality of different appliances (e.g., a set) can be designed and even fabricated prior to the patient wearing any appliance of the plurality. After wearing an appliance for an appropriate period of time, the patient can replace the current appliance with the next appliance in the series until no more appliances remain. The appliances are generally not affixed to the teeth and the patient may place and replace the appliances at any time during the procedure (e.g., patient-removable appliances). The final appliance or several appliances in the series may have a geometry or geometries selected to overcorrect the tooth arrangement. For instance, one or more appliances may have a geometry that would (if fully achieved) move individual teeth beyond the tooth arrangement that has been selected as the "final." Such over-correction may be desirable in order to offset potential relapse after the repositioning method has been terminated (e.g., permit movement of individual teeth back toward their pre-corrected positions). Over-correction may also be beneficial to speed the rate of correction (e.g., an appliance with a geometry that is positioned beyond a desired intermediate or final position may shift the individual teeth toward the position at a greater rate). In such cases, the use of an appliance can be terminated before the teeth reach the positions defined by the appliance. Furthermore, over-correction may be deliberately applied in order to compensate for any inaccuracies or limitations of the appliance.

The various embodiments of the orthodontic appliances presented herein can be fabricated in a wide variety of ways. In some embodiments, the orthodontic appliances herein (or portions thereof) can be produced using direct fabrication, such as additive manufacturing techniques (also referred to herein as "3D printing") or subtractive manufacturing techniques (e.g., milling). In some embodiments, direct fabrication involves forming an object (e.g., an orthodontic appliance or a portion thereof) without using a physical template (e.g., mold, mask etc.) to define the object geometry. Additive manufacturing techniques can include: (1) vat photopolymerization (e.g., stereolithography), in which an object is constructed layer by layer from a vat of liquid photopolymer resin; (2) material jetting, in which material is jetted onto a build platform using either a continuous or drop on demand (DOD) approach; (3) binder jetting, in which alternating layers of a build material (e.g., a powder-based material) and a binding material (e.g., a liquid binder) are deposited by a print head; (4) fused deposition modeling (FDM), in which material is drawn though a nozzle, heated, and deposited layer by layer; (5) powder bed fusion, including but not limited to direct metal laser sintering (DMLS), electron beam melting (EBM), selective heat sintering (SHS), selective laser melting (SLM), and selective laser sintering (SLS); (6) sheet lamination, including but not limited to laminated object manufacturing (LOM) and ultrasonic additive manufacturing (UAM); and (7) directed energy deposition, including but not limited to laser engineering net shaping, directed light fabrication, direct metal deposition, and 3D laser cladding. For example, stereolithography can be used to directly fabricate one or more of the appliances herein. In some embodiments, stereolithography involves selective polymerization of a photosensitive resin (e.g., a photo-polymer) according to a desired cross-sectional shape using light (e.g., ultraviolet light). The object geometry can be built up in a layer-by-layer fashion by sequentially polymerizing a plurality of object cross-sections. As another example, the appliances herein can be directly fabricated using selective laser sintering. In some embodiments, selective laser sintering involves using a laser beam to selectively melt and fuse a layer of powdered material according to a desired cross-sectional shape in order to build up the object geometry. As yet another example, the appliances herein can be directly fabricated by fused deposition modeling. In some embodiments, fused deposition modeling involves melting and selectively depositing a thin filament of thermoplastic polymer in a layer-by-layer manner in order to form an object. In yet another example, material jetting can be used to directly fabricate the appliances herein. In some embodiments, material jetting involves jetting or extruding one or more materials onto a build surface in order to form successive layers of the object geometry.

Alternatively, or in combination, some embodiments of the appliances herein (or portions thereof) can be produced using indirect fabrication techniques, such as by thermoforming over a positive or negative mold. Indirect fabrication of an orthodontic appliance can involve producing a positive or negative mold of the patient's dentition in a target arrangement (e.g., by rapid prototyping, milling, etc.) and thermoforming one or more sheets of material over the mold in order to generate an appliance shell.

In some embodiments, the direct fabrication methods provided herein build up the object geometry in a layer-by-layer fashion, with successive layers being formed in discrete build steps. Alternatively, or in combination, direct fabrication methods that allow for continuous build-up of an object geometry can be used, referred to herein as "continuous direct fabrication." Various types of continuous direct fabrication methods can be used. As an example, in some embodiments, the appliances herein are fabricated using "continuous liquid interphase printing," in which an object is continuously built up from a reservoir of photo-polymerizable resin by forming a gradient of partially cured resin between the building surface of the object and a polymerization-inhibited "dead zone." In some embodiments, a semi-permeable membrane is used to control transport of a photo-polymerization inhibitor (e.g., oxygen) into the dead zone in order to form the polymerization gradient. Continuous liquid interphase printing can achieve fabrication speeds about 25 times to about 100 times faster than other direct fabrication methods, and speeds about 1000 times faster can be achieved with the incorporation of cooling systems. Continuous liquid interphase printing is described in U.S. Patent Publication Nos. 2015/0097315, 2015/0097316, and 2015/0102532, the disclosures of each of which are incorporated herein by reference in their entirety.

As another example, a continuous direct fabrication method can achieve continuous build-up of an object geometry by continuous movement of the build platform (e.g., along the vertical or Z-direction) during the irradiation phase, such that the hardening depth of the irradiated photopolymer is controlled by the movement speed. Accordingly, continuous polymerization of material on the build surface can be achieved. Such methods are described in U.S. Pat. No. 7,892,474, the disclosure of which is incorporated herein by reference in its entirety.

In another example, a continuous direct fabrication method can involve extruding a composite material composed of a curable liquid material surrounding a solid strand. The composite material can be extruded along a continuous three-dimensional path in order to form the object. Such methods are described in U.S. Patent Publication No. 2014/0061974, the disclosure of which is incorporated herein by reference in its entirety.

In yet another example, a continuous direct fabrication method utilizes a "heliolithography" approach in which the liquid photo-polymer is cured with focused radiation while the build platform is continuously rotated and raised. Accordingly, the object geometry can be continuously built up along a spiral build path. Such methods are described in U.S. Patent Publication No. 2014/0265034, the disclosure of which is incorporated herein by reference in its entirety.

The direct fabrication approaches provided herein are compatible with a wide variety of materials, including but not limited to one or more of the following: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, a polytrimethylene terephthalate, a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, a thermoplastic polyamide elastomer, a thermoset material, or combinations thereof. The materials used for direct fabrication can be provided in an uncured form (e.g., as a liquid, resin, powder, etc.) and can be cured (e.g., by photo-polymerization, light curing, gas curing, laser curing, cross-linking, etc.) in order to form an orthodontic appliance or a portion thereof. The properties of the material before curing may differ from the properties of the material after curing. Once cured, the materials herein can exhibit sufficient strength, stiffness, durability, biocompatibility, etc. for use in an orthodontic appliance. The post-curing properties of the materials used can be selected according to the desired properties for the corresponding portions of the appliance.

In some embodiments, relatively rigid portions of the orthodontic appliance can be formed via direct fabrication using one or more of the following materials: a polyester, a co-polyester, a polycarbonate, a thermoplastic polyurethane, a polypropylene, a polyethylene, a polypropylene and polyethylene copolymer, an acrylic, a cyclic block copolymer, a polyetheretherketone, a polyamide, a polyethylene terephthalate, a polybutylene terephthalate, a polyetherimide, a polyethersulfone, and/or a polytrimethylene terephthalate.

In some embodiments, relatively elastic portions of the orthodontic appliance can be formed via direct fabrication using one or more of the following materials: a styrenic block copolymer (SBC), a silicone rubber, an elastomeric alloy, a thermoplastic elastomer (TPE), a thermoplastic vulcanizate (TPV) elastomer, a polyurethane elastomer, a block copolymer elastomer, a polyolefin blend elastomer, a thermoplastic co-polyester elastomer, and/or a thermoplastic polyamide elastomer.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated before, during, and/or at the end of each build, and/or at predetermined time intervals (e.g., every $n^{th}$ build, once per hour, once per day, once per week, etc.), depending on the stability of the system. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

Optionally, the direct fabrication methods described herein allow for fabrication of an appliance including multiple materials, referred to herein as "multi-material direct fabrication." In some embodiments, a multi-material direct fabrication method involves concurrently forming an object from multiple materials in a single manufacturing step. For instance, a multi-tip extrusion apparatus can be used to selectively dispense multiple types of materials from distinct material supply sources in order to fabricate an object from a plurality of different materials. Such methods are described in U.S. Pat. No. 6,749,414, the disclosure of which is incorporated herein by reference in its entirety. Alternatively, or in combination, a multi-material direct fabrication method can involve forming an object from multiple materials in a plurality of sequential manufacturing steps. For instance, a first portion of the object can be formed from a first material in accordance with any of the direct fabrication methods herein, then a second portion of the object can be formed from a second material in accordance with methods herein, and so on, until the entirety of the object has been formed.

Direct fabrication can provide various advantages compared to other manufacturing approaches. For instance, in contrast to indirect fabrication, direct fabrication permits production of an orthodontic appliance without utilizing any molds or templates for shaping the appliance, thus reducing the number of manufacturing steps involved and improving the resolution and accuracy of the final appliance geometry. Additionally, direct fabrication permits precise control over the three-dimensional geometry of the appliance, such as the appliance thickness. Complex structures and/or auxiliary components can be formed integrally as a single piece with the appliance shell in a single manufacturing step, rather than being added to the shell in a separate manufacturing step. In some embodiments, direct fabrication is used to produce appliance geometries that would be difficult to create using alternative manufacturing techniques, such as appliances with very small or fine features, complex geometric shapes, undercuts, interproximal structures, shells with variable thicknesses, and/or internal structures (e.g., for improving strength with reduced weight and material usage). For example, in some embodiments, the direct fabrication approaches herein permit fabrication of an orthodontic appliance with feature sizes of less than or equal to about 5 μm, or within a range from about 5 μm to about 50 μm, or within a range from about 20 μm to about 50 μm.

The direct fabrication techniques described herein can be used to produce appliances with substantially isotropic material properties, e.g., substantially the same or similar strengths along all directions. In some embodiments, the direct fabrication approaches herein permit production of an orthodontic appliance with a strength that varies by no more than about 25%, about 20%, about 15%, about 10%, about 5%, about 1%, or about 0.5% along all directions. Additionally, the direct fabrication approaches herein can be used to produce orthodontic appliances at a faster speed compared to other manufacturing techniques. In some embodiments, the direct fabrication approaches herein allow for production of an orthodontic appliance in a time interval less than or equal to about 1 hour, about 30 minutes, about 25 minutes, about 20 minutes, about 15 minutes, about 10 minutes, about 5 minutes, about 4 minutes, about 3 minutes, about 2 minutes, about 1 minutes, or about 30 seconds. Such manufacturing speeds allow for rapid "chair-side" production of customized appliances, e.g., during a routine appointment or checkup.

In some embodiments, the direct fabrication methods described herein implement process controls for various machine parameters of a direct fabrication system or device in order to ensure that the resultant appliances are fabricated with a high degree of precision. Such precision can be beneficial for ensuring accurate delivery of a desired force system to the teeth in order to effectively elicit tooth movements. Process controls can be implemented to account for process variability arising from multiple sources, such as the material properties, machine parameters, environmental variables, and/or post-processing parameters.

Material properties may vary depending on the properties of raw materials, purity of raw materials, and/or process variables during mixing of the raw materials. In many embodiments, resins or other materials for direct fabrication should be manufactured with tight process control to ensure little variability in photo-characteristics, material properties (e.g., viscosity, surface tension), physical properties (e.g., modulus, strength, elongation) and/or thermal properties (e.g., glass transition temperature, heat deflection temperature). Process control for a material manufacturing process can be achieved with screening of raw materials for physical properties and/or control of temperature, humidity, and/or other process parameters during the mixing process. By implementing process controls for the material manufacturing procedure, reduced variability of process parameters and more uniform material properties for each batch of material can be achieved. Residual variability in material properties can be compensated with process control on the machine, as discussed further herein.

Machine parameters can include curing parameters. For digital light processing (DLP)-based curing systems, curing parameters can include power, curing time, and/or grayscale of the full image. For laser-based curing systems, curing parameters can include power, speed, beam size, beam shape and/or power distribution of the beam. For printing systems, curing parameters can include material drop size, viscosity, and/or curing power. These machine parameters can be monitored and adjusted on a regular basis (e.g., some parameters at every 1-x layers and some parameters after each build) as part of the process control on the fabrication machine. Process control can be achieved by including a sensor on the machine that measures power and other beam parameters every layer or every few seconds and automatically adjusts them with a feedback loop. For DLP machines, gray scale can be measured and calibrated at the end of each build. In addition, material properties and/or photo-characteristics can be provided to the fabrication machine, and a machine process control module can use these parameters to adjust machine parameters (e.g., power, time, gray scale, etc.) to compensate for variability in material properties. By implementing process controls for the fabrication machine, reduced variability in appliance accuracy and residual stress can be achieved.

In many embodiments, environmental variables (e.g., temperature, humidity, Sunlight or exposure to other energy/curing source) are maintained in a tight range to reduce variability in appliance thickness and/or other properties. Optionally, machine parameters can be adjusted to compensate for environmental variables.

In many embodiments, post-processing of appliances includes cleaning, post-curing, and/or support removal processes. Relevant post-processing parameters can include purity of cleaning agent, cleaning pressure and/or temperature, cleaning time, post-curing energy and/or time, and/or consistency of support removal process. These parameters can be measured and adjusted as part of a process control scheme. In addition, appliance physical properties can be varied by modifying the post-processing parameters. Adjusting post-processing machine parameters can provide another way to compensate for variability in material properties and/or machine properties.

The configuration of the orthodontic appliances herein can be determined according to a treatment plan for a patient, e.g., a treatment plan involving successive administration of a plurality of appliances for incrementally repositioning teeth. Computer-based treatment planning and/or appliance manufacturing methods can be used in order to facilitate the design and fabrication of appliances. For instance, one or more of the appliance components described herein can be digitally designed and fabricated with the aid of computer-controlled manufacturing devices (e.g., computer numerical control (CNC) milling, computer-controlled rapid prototyping such as 3D printing, etc.). The computer-based methods presented herein can improve the accuracy, flexibility, and convenience of appliance fabrication.

Figure 2:
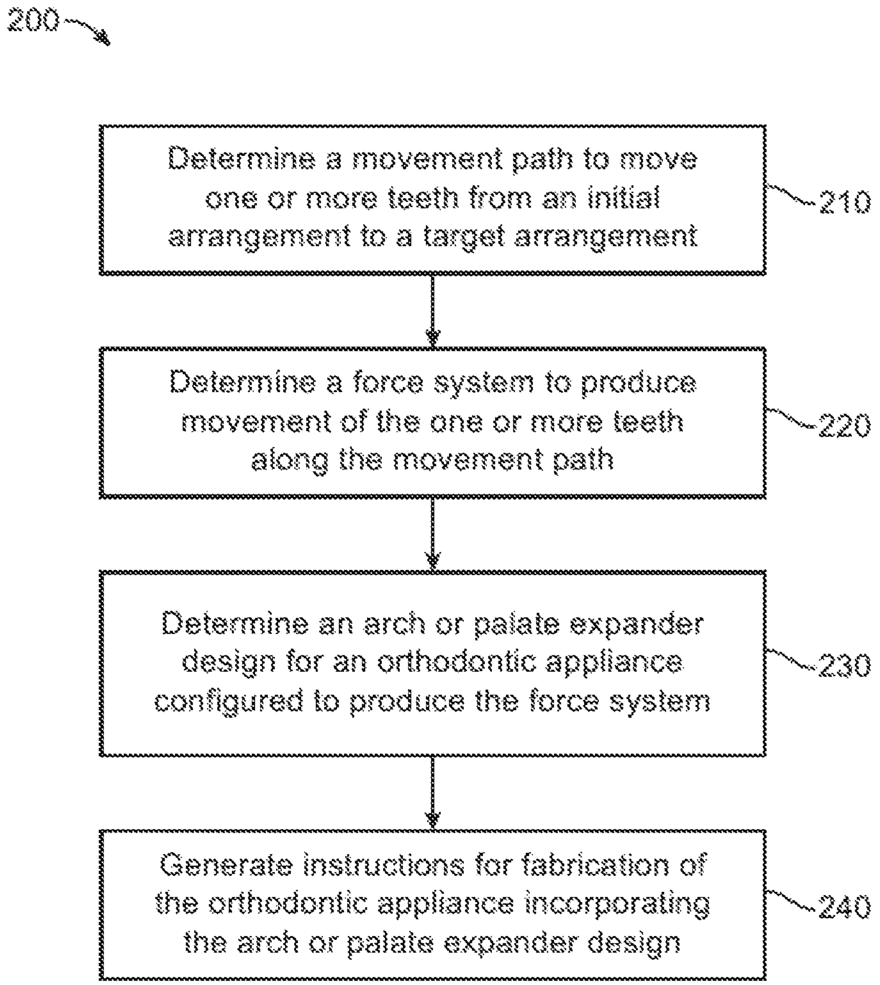
FIG. 2 illustrates a method for designing an orthodontic appliance, in accordance with some embodiments.

FIG. 2 illustrates a method 200 for designing an orthodontic appliance to be produced by direct fabrication, in accordance with embodiments. The method 200 can be applied to any embodiment of the orthodontic appliances described herein. Some or all of the steps of the method 200 can be performed by any suitable data processing system or device, e.g., one or more processors configured with suitable instructions.

In step 210, a movement path to move one or more teeth from an initial arrangement to a target arrangement is determined. The initial arrangement can be determined from a mold or a scan of the patient's teeth or mouth tissue, e.g., using wax bites, direct contact scanning, x-ray imaging, tomographic imaging, sonographic imaging, and other techniques for obtaining information about the position and structure of the teeth, jaws, gums and other orthodontically relevant tissue. From the obtained data, a digital data set can be derived that represents the initial (e.g., pretreatment) arrangement of the patient's teeth and other tissues. Optionally, the initial digital data set is processed to segment the tissue constituents from each other. For example, data structures that digitally represent individual tooth crowns can be produced. Advantageously, digital models of entire teeth can be produced, including measured or extrapolated hidden surfaces and root structures, as well as surrounding bone and soft tissue.

The target arrangement of the teeth (e.g., a desired and intended end result of orthodontic treatment) can be received from a clinician in the form of a prescription, can be calculated from basic orthodontic principles, and/or can be extrapolated computationally from a clinical prescription. With a specification of the desired final positions of the teeth and a digital representation of the teeth themselves, the final position and surface geometry of each tooth can be specified to form a complete model of the tooth arrangement at the desired end of treatment.

Having both an initial position and a target position for each tooth, a movement path can be defined for the motion of each tooth. In some embodiments, the movement paths are configured to move the teeth in the quickest fashion with the least amount of round-tripping to bring the teeth from their initial positions to their desired target positions. The tooth paths can optionally be segmented, and the segments can be calculated so that each tooth's motion within a segment stays within threshold limits of linear and rotational translation. In this way, the end points of each path segment can constitute a clinically viable repositioning, and the aggregate of segment end points can constitute a clinically viable sequence of tooth positions, so that moving from one point to the next in the sequence does not result in a collision of teeth.

In step 220, a force system to produce movement of the one or more teeth along the movement path is determined. It is noted that, in various implementations, a force system need not be determined and that an example method can determine a movement path without a force system explicitly being determined/defined for a given patient. (As an example, in some implementations, a set of displacements may be determined for a given patient without determination of the force systems required to produce those displacements for that given patient.) A force system can include one or more translational forces and/or one or more torques. Different force systems can result in different types of tooth movement, such as tipping, translation, rotation, extrusion, intrusion, root movement, etc. Biomechanical principles, modeling techniques, force calculation/measurement techniques, and the like, including knowledge and approaches commonly used in orthodontia, may be used to determine the appropriate force system to be applied to the tooth to accomplish the tooth movement. In determining the force system to be applied, sources may be considered including literature, force systems determined by experimentation or virtual modeling, computer-based modeling, clinical experience, minimization of unwanted forces, etc.

The determination of the force system can include constraints on the allowable forces, such as allowable directions and magnitudes, as well as desired motions to be brought about by the applied forces.

The determination of the force system can also include modeling of the facial structure of the patient, such as the dentition and/or skeletal structure of the jaw and palate. Scan data of the dentition, such as Xray data or 3D optical scanning data, for example, can be used to determine parameters of the patient's mouth, so as to determine forces sufficient to provide a desired movement of the patient's dentition and/or expansion of the palate and/or arch. In some embodiments, various parameters of the patient's dentition may be measured, or input by a treating professional. In other embodiments, the treating professional can select an appropriate treatment based on physiological characteristics of the patient. For example, the properties of the dentition may also be estimated based on factors such as the patient's age and/or other characteristics.

In step 230, a design for an orthodontic appliance configured to produce the force system is determined. Determination of the design, appliance geometry, material composition, and/or properties can be performed using a treatment or force application simulation environment. A simulation environment can include, e.g., computer modeling systems, biomechanical systems or apparatus, and the like. Optionally, digital models of the appliance and/or teeth can be produced, such as finite element models. The finite element models can be created using computer program application software available from a variety of vendors. For creating solid geometry models, computer aided engineering (CAE) or computer aided design (CAD) programs can be used, such as the AutoCAD® software products available from Autodesk, Inc., of San Rafael, CA. For creating finite element models and analyzing them, program products from a number of vendors can be used, including finite element analysis packages from ANSYS, Inc., of Canonsburg, PA, and SIMULIA(Abaqus) software products from Dassault Systèmes of Waltham, MA.

Optionally, one or more designs can be selected for testing or force modeling. As noted above, a desired tooth movement, as well as a force system required or desired for eliciting the desired tooth movement, can be identified. Using the simulation environment, a candidate design can be analyzed or modeled for determination of an actual force system resulting from use of the candidate appliance. One or more modifications can optionally be made to a candidate appliance, and force modeling can be further analyzed as described, e.g., in order to iteratively determine an appliance design that produces the desired force system.

In step 240, instructions for fabrication of the orthodontic appliance incorporating the appliance design are generated. The instructions can be configured to control a fabrication system or device in order to produce the orthodontic appliance with the specified arch or palate expander design. In some embodiments, the instructions are configured for manufacturing the orthodontic appliance using direct fabrication (e.g., stereolithography, selective laser sintering, fused deposition modeling, 3D printing, continuous direct fabrication, multi-material direct fabrication, etc.), in accordance with the various methods presented herein. In alternative embodiments, the instructions can be configured for indirect fabrication of the appliance, e.g., by thermoforming.

Method 200 may comprise additional steps: 1) Dentition of the patient is scanned intraorally to generate three-dimensional data of the dentition; 2) The three-dimensional shape profile of the appliance is determined to provide a plurality of tooth receiving cavities to move the patient's dentition from an initial arrangement toward a target arrangement as described herein.

Although the above steps show a method 200 of designing an orthodontic appliance in accordance with some embodiments, a person of ordinary skill in the art will recognize some variations based on the teaching described herein. Some of the steps may comprise sub-steps. Some of the steps may be repeated as often as desired. One or more steps of the method 200 may be performed with any suitable fabrication system or device, such as the embodiments described herein. Some of the steps may be optional, and the order of the steps can be varied as desired.

Figure 3:
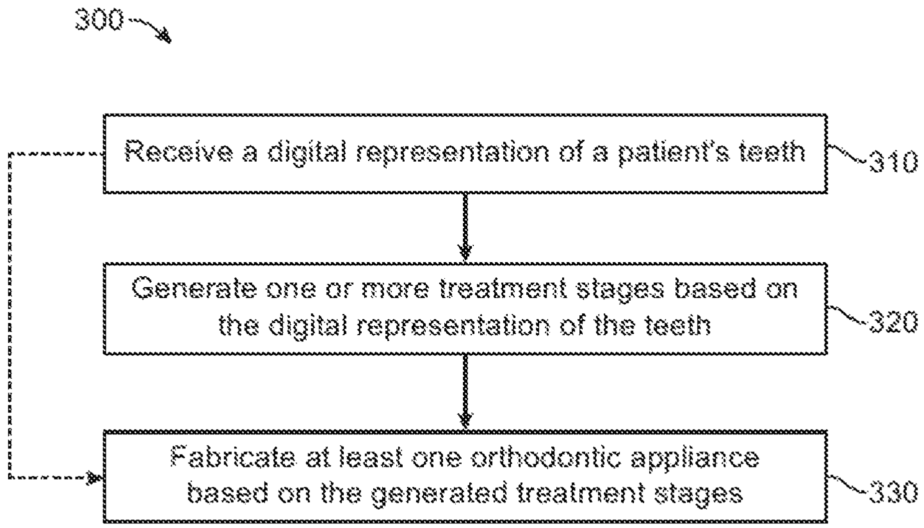
FIG. 3 illustrates a method for digitally planning an orthodontic treatment, in accordance with some embodiments.

FIG. 3 illustrates a method 300 for digitally planning an orthodontic treatment and/or design or fabrication of an appliance, in accordance with embodiments. The method 300 can be applied to any of the treatment procedures described herein and can be performed by any suitable data processing system.

In step 310, a digital representation of a patient's teeth is received. The digital representation can include surface topography data for the patient's intraoral cavity (including teeth, gingival tissues, etc.). The surface topography data can be generated by directly scanning the intraoral cavity, a physical model (positive or negative) of the intraoral cavity, or an impression of the intraoral cavity, using a suitable scanning device (e.g., a handheld scanner, desktop scanner, etc.).

In step 320, one or more treatment stages are generated based on the digital representation of the teeth. The treatment stages can be incremental repositioning stages of an orthodontic treatment procedure designed to move one or more of the patient's teeth from an initial tooth arrangement to a target arrangement. For example, the treatment stages can be generated by determining the initial tooth arrangement indicated by the digital representation, determining a target tooth arrangement, and determining movement paths of one or more teeth in the initial arrangement necessary to achieve the target tooth arrangement. The movement path can be optimized based on minimizing the total distance moved, preventing collisions between teeth, avoiding tooth movements that are more difficult to achieve, or any other suitable criteria.

In step 330, at least one orthodontic appliance is fabricated based on the generated treatment stages. For example, a set of appliances can be fabricated, each shaped according a tooth arrangement specified by one of the treatment stages, such that the appliances can be sequentially worn by the patient to incrementally reposition the teeth from the initial arrangement to the target arrangement. The appliance set may include one or more of the orthodontic appliances described herein. The fabrication of the appliance may involve creating a digital model of the appliance to be used as input to a computer-controlled fabrication system. The appliance can be formed using direct fabrication methods, indirect fabrication methods, or combinations thereof, as desired.

In some instances, staging of various arrangements or treatment stages may not be necessary for design and/or fabrication of an appliance. As illustrated by the dashed line in FIG. 3, design and/or fabrication of an orthodontic appliance, and perhaps a particular orthodontic treatment, may include use of a representation of the patient's teeth (e.g., receive a digital representation of the patient's teeth 310), followed by design and/or fabrication of an orthodontic appliance based on a representation of the patient's teeth in the arrangement represented by the received representation.

2) On-Track Treatment

Figure 4:
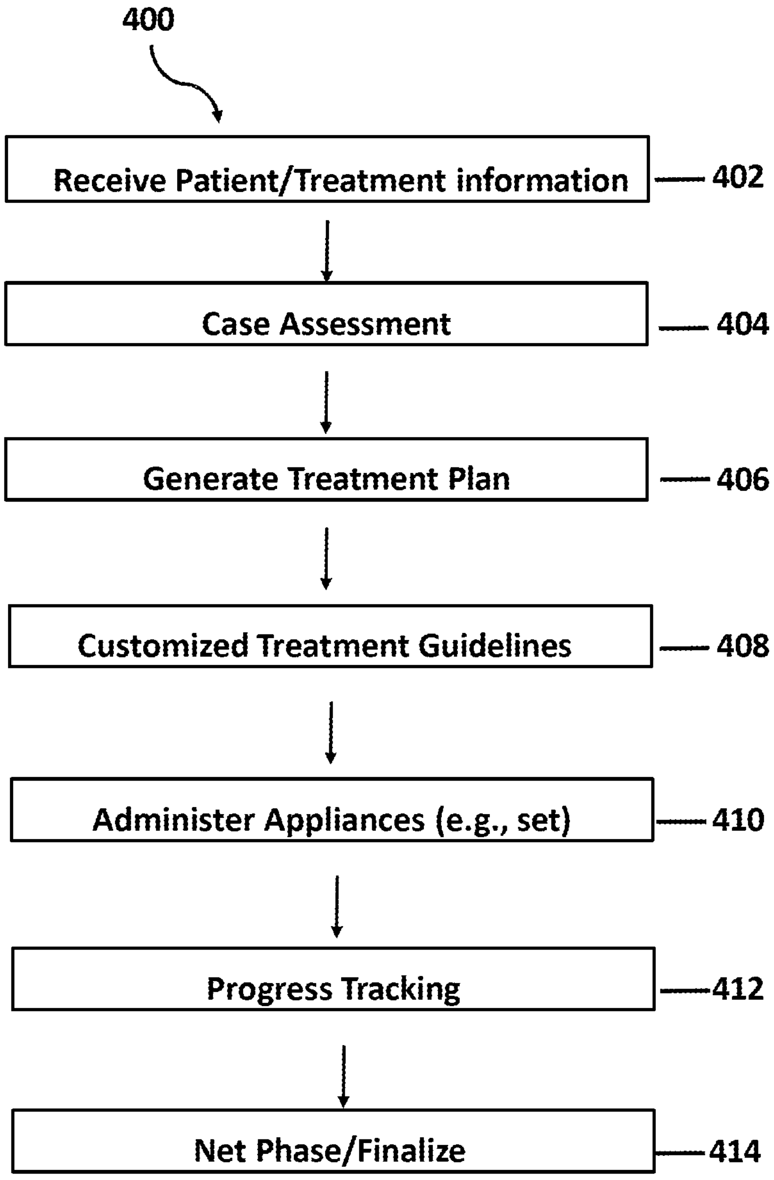
FIG. 4 shows generating and administering treatment, in accordance with some embodiments.

Referring to FIG. 4, a process 400 according to the present disclosure is illustrated. Individual aspects of the process are discussed in further detail below. The process includes receiving information regarding the orthodontic condition of the patient and/or treatment information (402), generating an assessment of the case (404), and generating a treatment plan for repositioning a patient's teeth (406). Briefly, a patient/treatment information includes data comprising an initial arrangement of the patient's teeth, which includes obtaining an impression or scan of the patient's teeth prior to the onset of treatment and can further include identification of one or more treatment goals selected by the practitioner and/or patient. A case assessment can be generated (404) so as to assess the complexity or difficulty of moving the particular patient's teeth in general or specifically corresponding to identified treatment goals, and may further include practitioner experience and/or comfort level in administering the desired orthodontic treatment. In some cases, however, the assessment can include simply identifying particular treatment options (e.g., appointment planning, progress tracking, etc.) that are of interest to the patient and/or practitioner. The information and/or corresponding treatment plan includes identifying a final or target arrangement of the patient's teeth that is desired, as well as a plurality of planned successive or intermediary tooth arrangements for moving the teeth along a treatment path from the initial arrangement toward the selected final or target arrangement.

The process further includes generating customized treatment guidelines (408). The treatment plan may include multiple phases of treatment, with a customized set of treatment guidelines generated that correspond to a phase of the treatment plan. The guidelines can include detailed information on timing and/or content (e.g., specific tasks) to be completed during a given phase of treatment, and can be of sufficient detail to guide a practitioner, including a less experienced practitioner or practitioner relatively new to the particular orthodontic treatment process, through the phase of treatment. Since the guidelines are designed to specifically correspond to the treatment plan and provide guidelines on activities specifically identified in the treatment information and/or generated treatment plan, the guidelines can be customized. The customized treatment guidelines are then provided to the practitioner so as to help instruct the practitioner as how to deliver a given phase of treatment. As set forth above, appliances can be generated based on the planned arrangements and can be provided to the practitioner and ultimately administered to the patient (410). The appliances can be provided and/or administered in sets or batches of appliances, such as 2, 3, 4, 5, 6, 7, 8, 9, or more appliances, but are not limited to any particular administrative scheme. Appliances can be provided to the practitioner concurrently with a given set of guidelines, or appliances and guidelines can be provided separately.

After the treatment according to the plan begins and following administration of appliances to the patient, treatment progress tracking, e.g., by teeth matching, is done to assess a current and actual arrangement of the patient's teeth compared to a planned arrangement (412). If the patient's teeth are determined to be "on-track" and progressing according to the treatment plan, then treatment progresses as planned and treatment progresses to the next stage of treatment (414). If the patient's teeth have substantially reached the initially planned final arrangement, then treatment progresses to the final stages of treatment (414). Where the patient's teeth are determined to be tracking according to the treatment plan, but have not yet reached the final arrangement, the next set of appliances can be administered to the patient.

The threshold difference values of a planned position of teeth to actual positions selected as indicating that a patient's teeth have progressed on-track are provided below in TABLE 12. If a patient's teeth have progressed at or within the threshold values, the progress is considered to be on-track. If a patient's teeth have progressed beyond the threshold values, the progress is considered to be off-track.

TABLE 12

| Type Movement | Difference Actual/Planned |
|---|---|
| Rotations | |
| Upper Central Incisors | 9 degrees |
| Upper Lateral Incisors | 11 degrees |
| Lower Incisors | 11 degrees |
| Upper Cuspids | 11 degrees |
| Lower Cuspids | 9.25 degrees |
| Upper Bicuspids | 7.25 degrees |
| Lower First Bicuspid | 7.25 degrees |
| Lower Second Bicuspid | 7.25 degrees |
| Molars | 6 degrees |
| Extrusion | |
| Anterior | 0.75 mm |
| Posterior | 0.75 mm |
| Intrusion | |
| Anterior | 0.75 mm |
| Posterior | 0.75 mm |
| Angulation | |
| Anterior | 5.5 degrees |
| Posterior | 3.7 degrees |
| Inclination | |
| Anterior | 5.5 degrees |
| Posterior | 3.7 degrees |
| Translation | |
| BL Anterior | 0.7 mm |
| BL Posterior Cuspids | 0.9 mm |
| MD Anterior | 0.45 mm |
| MD Cuspids | 0.45 mm |
| MD Posterior | 0.5 mm |

3) Experimental Methods

All chemicals were purchased from commercial sources and were used without further purification, unless otherwise stated.

In some embodiments, the stress relaxation of a material or device can be measured by monitoring the time-dependent stress resulting from a steady strain. The extent of stress relaxation can also depend on the temperature, relative humidity and other applicable conditions (e.g., presence of water). In embodiments, the test conditions for stress relaxation are a temperature of 37±2° C. at 100% relative humidity or a temperature of 37±2° C. in water.

The dynamic viscosity of a fluid indicates its resistance to shearing flows. The SI unit for dynamic viscosity is the Poiseuille (Pa·s). Dynamic viscosity is commonly given in units of centipoise, where 1 centipoise (cP) is equivalent to 1 mPa·s. Kinematic viscosity is the ratio of the dynamic viscosity to the density of the fluid; the SI unit is $m^2/s$. Devices for measuring viscosity include viscometers and rheometers. For example, an MCR 301 rheometer from Anton Paar may be used for rheological measurement in rotation mode (PP-25, 50 s-1, 50-115° C., 3° C./min).

Determining the water content when fully saturated at use temperature can comprise exposing the polymeric material to 100% humidity at the use temperature (e.g., 40° C.) for a period of 24 hours, then determining water content by methods known in the art, such as by weight.

In some embodiments, the presence of a crystalline phase and an amorphous phase provide favorable material properties to the polymeric materials. Property values of the cured polymeric materials can be determined, for example, by using the following methods:

storage modulus can be measured at 37° C. and is reported in MPa;

$T_g$ of the cured polymeric material can be assessed using dynamic mechanical analysis (DMA) and is provided herein as the tan δ peak;

tensile modulus, tensile strength, elongation at yield and elongation at break can be assessed according to ISO 527-2 5B; and tensile strength at yield, elongation at break, tensile strength, and Young's modulus can be assessed according to ASTM D1708.

Figure 5:
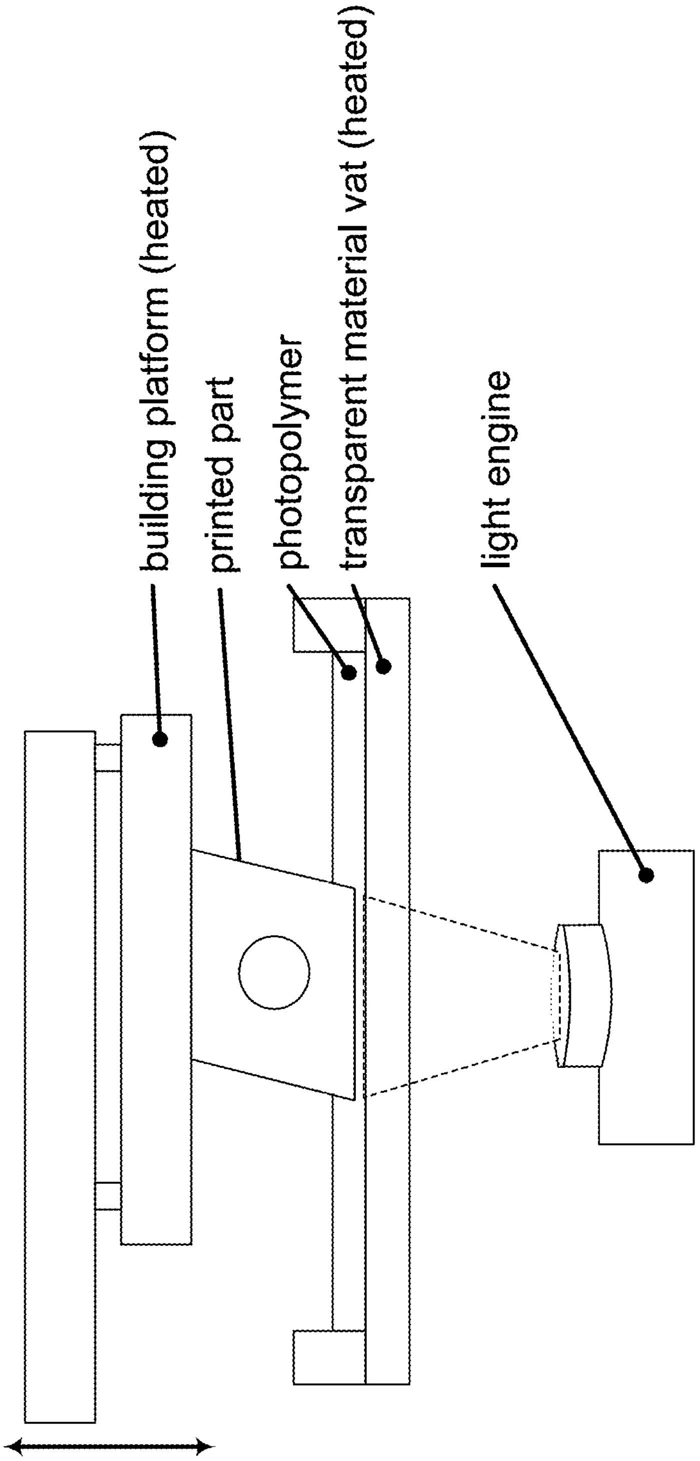
FIG. 5 shows a schematic configuration of an (e.g., high temperature) additive manufacturing device used for curing a curable resin of the present disclosure by using a 3D printing process, in accordance with some embodiments.

As a non-limiting example, an additive manufacturing or 3D printing processes for generating a device herein (e.g., an orthodontic appliance) can be conducted using a Hot Lithography apparatus prototype from Cubicure (Vienna, Austria), which can substantially be configured as schematically shown in FIG. 5. In such cases, a photo-curable resin (e.g., resin) according to the present disclosure can be filled into the transparent material vat of the apparatus shown in FIG. 5, which vat can be heated to 90-110° C. The building platform can be heated to 90-110° C., too, and lowered to establish holohedral contact with the upper surface of the curable resin. By irradiating the composition with 375 nm UV radiation using a diode laser from Soliton, which can have an output power of 70 mW, which can be controlled to trace a predefined prototype design, and alternately raising the building platform, the composition can be cured layer by layer by a photopolymerization process according to the disclosure, resulting in a polymeric material according to present disclosure.

EXAMPLES

The following examples are given for the purpose of illustrating various embodiments of the invention and are not meant to limit the present disclosure in any fashion. The present examples, along with the methods described herein are presently representative of some embodiments, are exemplary, and are not intended as limitations on the scope of the invention. Changes therein and other uses which are encompassed within the spirit of the invention as defined by the scope of the claims will occur to those skilled in the art.

Example 1

Crosslinker-Containing Composition

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 13. The formulation was cured for 60 seconds in light oven between 2 slides. The viscosity and flexibility were checked immediately following curing and for incubated films. The films produced with the composition of TABLE 13 were hard and brittle.

TABLE 13

| Curable Composition | | |
|---|---|---|
| CONSTITUENT | COMPONENT | WT % |
| Crosslinker | Ethoxylated (6) bisphenol A dimethacrylate (E6BAD) | 22.0% |
| Crosslinker | Triethylene glycol dimethacrylate (TEGDMA) | 25.0% |
| Crosslinker | EBPADM | 41.5% |
| Crosslinker | Urethane dimethacrylate (UDMA) | 5.0% |
| Filler | Fumed silica Aerosil R7200 | 5.0% |
| Photoinitiator | TPO-L | 1.5% |

Example 2

Crosslinker-Containing Composition

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 14. The formulations was cured for 60 seconds in light oven between 2 slides. The viscosity and flexibility were checked immediately following curing and for incubated films. The films produced with the composition of TABLE 14 exhibited desirable viscosity, and produced films which were hard and stiff with good flexibility.

TABLE 14

| Curable Composition | | |
|---|---|---|
| CONSTITUENT | COMPONENT | WT % |
| Crosslinker | E6BAD | 37.0% |
| Crosslinker | TEGDMA | 25.0% |
| Crosslinker | EBPADM | 31.5% |
| Filler | Aerosil R8200 | 5.0% |
| Photoinitiator | TPO-L | 1.5% |

Example 3

Crosslinker-Containing Composition

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 15. The formulation was cured for 60 seconds in light oven between 2 slides. The viscosity and flexibility were checked immediately following curing and for incubated films. The films produced with the composition of TABLE 15 were hard and stiff with good flexibility, while the composition had slightly higher than desired viscosity. Furthermore, this composition contained more than the desired number of bubbles, with filler dispersing poorly throughout the matrix.

TABLE 15

| Curable Composition | | |
|---|---|---|
| CONSTITUENT | COMPONENT | WT % |
| Crosslinker | E6BAD | 42.0% |
| Crosslinker | TEGDMA | 20.0% |
| Crosslinker | EBPADM | 26.5% |
| Filler | Aerosil R8200 | 10.0% |
| Photoinitiator | TPO-L | 1.5% |

Example 4

Crosslinker-Containing Composition

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 16. The formulation was cured for 60 seconds in light oven between 2 slides. The viscosity and flexibility were checked immediately following curing and for incubated films. The films produced with the composition of TABLE 16 were hard and stiff with good flexibility, while the composition had good viscosity.

TABLE 16

| Curable Composition | | |
|---|---|---|
| CONSTITUENT | COMPONENT | WT % |
| Crosslinker | E6BAD | 38.5% |
| Crosslinker | TEGDMA | 20.0% |
| Crosslinker | EBPADM | 35.0% |
| Filler | Aerosil R8200 | 5.0% |
| Photoinitiator | TPO-L | 1.5% |

Example 5

Crosslinker-Containing Composition

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 17. The formulation was cured for 60 seconds in light oven between 2 slides. The viscosity and flexibility were checked immediately following curing and for incubated films. The films produced with the composition of TABLE 17 were flexible, and the composition had good viscosity.

TABLE 17

| Curable Composition | | |
|---|---|---|
| CONSTITUENT | COMPONENT | WT % |
| Crosslinker | E6BAD | 36.0% |
| Crosslinker | BisGMA | 8.0% |
| Crosslinker | TEGDMA | 20.0% |
| Crosslinker | EBPADM | 30.0% |

TABLE 17-continued

| Curable Composition | | |
|---|---|---|
| CONSTITUENT | COMPONENT | WT % |
| Filler | Aerosil R8200 | 5.0% |
| Photoinitiator | TPO-L | 1.0% |

Example 6

Crosslinker-Containing Composition

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 18. The formulation was cured for 60 seconds in light oven between 2 slides. The viscosity and flexibility were checked immediately following curing and for incubated films. The films produced with the composition of TABLE 18 had moderate flexibility, while the composition had a low viscosity.

TABLE 18

| Curable Composition | | |
|---|---|---|
| CONSTITUENT | COMPONENT | WT % |
| Crosslinker | E6BAD | 39.0% |
| Crosslinker | BisGMA | 15.0% |
| Crosslinker | TEGDMA | 15.0% |
| Crosslinker | EBPADM | 25.0% |
| Filler | Aerosil R8200 | 5.0% |
| Wetting Agent | BYK-W 9010 | 0.2% |
| Photoinitiator | TPO-L | 1.0% |

Example 7

Crosslinker-Containing Composition

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 19. The formulation was cured for 60 seconds in light oven between 2 slides. The viscosity and flexibility were checked immediately following curing and for incubated films. The films produced with the composition of TABLE 19 had good flexibility, while the composition had decent viscosity.

TABLE 19

| Curable Composition | | |
|---|---|---|
| CONSTITUENT | COMPONENT | WT % |
| Crosslinker | E6BAD | 38.8% |
| Crosslinker | BisGMA | 20.0% |
| Crosslinker | TEGDMA | 20.0% |
| Crosslinker | EBPADM | 20.0% |

TABLE 19-continued

| Curable Composition | | |
|---|---|---|
| CONSTITUENT | COMPONENT | WT % |
| Wetting Agent | BYK-W 9010 | 0.2% |
| Photoinitiator | TPO-L | 1.0% |

Example 8

Crosslinker-Containing Composition

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 20. The formulation was cured for 60 seconds in light oven between 2 slides. The viscosity and flexibility were checked immediately following curing and for incubated films. The films produced with the composition of TABLE 20 were brittle, while the composition exhibited decent viscosity.

TABLE 20

| Curable Composition | | |
|---|---|---|
| CONSTITUENT | COMPONENT | WT % |
| Crosslinker | E6BAD | 48.0% |
| Crosslinker | BisGMA | 25.0% |
| Crosslinker | TEGDMA | 5.0% |
| Crosslinker | EBPADM | 20.8% |
| Wetting Agent | BYK-W 9010 | 0.2% |
| Photoinitiator | TPO-L | 1.0% |

Example 9

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 21. The formulation was cured for 60 seconds in light oven between 2 slides. The viscosity and flexibility was checked immediately following curing and for incubated films. The composition of TABLE 21 had decent viscosity, and produced films with moderate brittleness, and good flexibility and toughness.

TABLE 21

| Curable Composition | | |
|---|---|---|
| CONSTITUENT | COMPONENT | WT % |
| Crosslinker | E6BAD | 45.0% |
| Crosslinker | BisGMA | 35.0% |
| Crosslinker | EBPADM | 18.8% |
| Wetting Agent | BYK-W 9010 | 0.2% |
| Photoinitiator | TPO-L | 1.0% |

Example 10

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 22. The formulations was printed as flexural bars, and aged over 24 hours at 90° C.

TABLE 22

| Curable Composition | | |
|---|---|---|
| CONSTITUENT | COMPONENT | WT % |
| Crosslinker | E6BAD | 48.0% |
| Crosslinker | BisGMA | 20.0% |
| Crosslinker | TEGDMA | 5.0% |
| Crosslinker | EBPADM | 15.8% |
| Filler | SG-BAG700GBFCMP5 | 10.0% |
| Wetting Agent | BYK-W 9010 | 0.2% |
| Photoinitiator | TPO-L | 1.0% |

Example 11

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 23. The formulations was printed as flexural bars, and aged over 24 hours at 90° C.

TABLE 23

| Curable Composition | | |
|---|---|---|
| CONSTITUENT | COMPONENT | WT % |
| Crosslinker | E6BAD | 50.0% |
| Crosslinker | BisGMA | 20.0% |
| Crosslinker | TEGDMA | 5.0% |
| Crosslinker | EBPADM | 21.3% |
| Filler | Aerosil R8200 | 2.5% |
| Wetting Agent | BYK-W 9010 | 0.2% |
| Photoinitiator | TPO-L | 1.0% |

Example 12

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 24. The formulations was printed as flexural bars, and aged over 24 hours at 90° C.

TABLE 24

| Curable Composition | | |
|---|---|---|
| CONSTITUENT | COMPONENT | WT % |
| Crosslinker | E6BAD | 48.0% |
| Crosslinker | BisGMA | 25.0% |
| Crosslinker | TEGDMA | 5.0% |
| Crosslinker | EBPADM | 20.3% |
| Filler | Aerosil R8200 | 0.5% |
| Wetting Agent | BYK-W 9010 | 0.2% |
| Photoinitiator | TPO-L | 1.0% |

Example 13

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 25. The formulations was printed as flexural bars, and aged over 24 hours at 90° C.

TABLE 25

| Curable Composition | | |
|---|---|---|
| CONSTITUENT | COMPONENT | WT % |
| Crosslinker | BisGMA | 25.0% |
| Crosslinker | TEGDMA | 5.0% |
| Crosslinker | EBPADM | 68.3% |
| Crosslinker | Aerosil R8200 | 0.5% |
| Wetting Agent | BYK-W 9010 | 0.2% |
| Photoinitiator | TPO-L | 1.0% |

Example 14

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 26. The formulations was printed as flexural bars, and aged over 24 hours at 90° C.

TABLE 26

| Curable Composition | | |
|---|---|---|
| CONSTITUENT | COMPONENT | WT % |
| Crosslinker | Ebecryl 8402 | 40.0% |
| Crosslinker | BisGMA | 25.0% |
| Crosslinker | TEGDMA | 5.0% |
| Crosslinker | EBPADM | 27.8% |
| Filler | Aerosil R8200 | 1.0% |
| Wetting Agent | BYK-W 9010 | 0.2% |
| Photoinitiator | TPO-L | 1.0% |

Example 15

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 27. The formulations was printed as flexural bars, and aged over 24 hours at 90° C.

TABLE 27

| Curable Composition | | |
|---|---|---|
| CONSTITUENT | COMPONENT | WT % |
| Crosslinker | Ebecryl 8402 | 30.95% |
| Crosslinker | BisGMA | 20.0% |
| Crosslinker | HDDMA | 15.0% |
| Crosslinker | EBPADM | 27.8% |
| Filler | Aerosil R8200 | 5.0% |
| Wetting Agent | BYK-W 9010 | 0.25% |
| Photoinitiator | TPO-L | 1.0% |

Example 16

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 28. The formulations was printed as flexural bars, and aged over 24 hours at 90° C.

TABLE 28

| Curable Composition | | |
|---|---|---|
| CONSTITUENT | COMPONENT | WT % |
| Crosslinker | Ebecryl 8402 | 24.95% |
| Crosslinker | Photomer 4810 (Isodecyl acrylate) | 1.00% |
| Crosslinker | BisGMA | 25.0% |
| Crosslinker | TEGDMA | 15.0% |
| Crosslinker | EBPADM | 30.3% |
| Filler | Aerosil R8200 | 2.5% |
| Wetting Agent | BYK-W 9010 | 0.25% |
| Photoinitiator | TPO-L | 1.0% |

Example 17

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 29. The formulations was printed as flexural bars, and aged over 24 hours at 90° C.

TABLE 29

| Curable Composition | | |
|---|---|---|
| CONSTITUENT | COMPONENT | WT % |
| Crosslinker | Ebecryl 8402 | 19.10% |
| Crosslinker | Photomer 4810 (Isodecyl acrylate) | 2.00% |
| Crosslinker | BisGMA | 25.0% |
| Crosslinker | TEGDMA | 20.0% |
| Crosslinker | EBPADM | 27.8% |
| Filler | Aerosil R8200 | 5.0% |
| UV Blocker | Dioxybenzone | 0.10% |
| Photoinitiator | TPO-L | 1.0% |

Example 18

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 30. The formulations was printed as flexural bars, and aged over 24 hours at 90° C.

TABLE 30

| Curable Composition | | |
|---|---|---|
| CONSTITUENT | COMPONENT | WT % |
| Crosslinker | Ebecryl 4100 | 31.4% |
| Crosslinker | BisGMA | 25.0% |
| Crosslinker | TEGDMA | 10.0% |
| Crosslinker | EBPADM | 30.0% |
| Filler | Aerosil R8200 | 2.5% |
| UV Blocker | Dioxybenzone\ | 0.10% |
| Photoinitiator | TPO-L | 1.0% |

Example 19

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 31. The formulations was printed as flexural bars, and aged over 24 hours at 90° C.

TABLE 31

| Curable Composition | | |
|---|---|---|
| CONSTITUENT | COMPONENT | WT % |
| Crosslinker | Ebecryl 8402 | 10.0% |
| Crosslinker | E6BAD | 37.6% |
| Crosslinker | BisGMA | 25.0% |
| Crosslinker | TEGDMA | 5.0% |
| Crosslinker | EBPADM | 20.3% |
| Filler | Aerosil R8200 | 1.0% |
| UV Blocker | Dioxybenzone | 0.1% |
| Photoinitiator | TPO-L | 1.0% |

Example 20

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 32. The formulations was printed as flexural bars, and aged over 24 hours at 90° C.

TABLE 32

| Curable Composition | | |
|---|---|---|
| CONSTITUENT | COMPONENT | WT % |
| Crosslinker | Ethoxylated (10) bisphenol A dimethacrylate (E10BAD) | 48.0% |
| Crosslinker | BisGMA | 25.0% |
| Crosslinker | TEGDMA | 5.0% |
| Crosslinker | EBPADM | 19.9% |
| Filler | Aerosil R8200 | 1.0% |
| UV Blocker | Dioxybenzone | 0.1% |
| Photoinitiator | TPO-L | 1.0% |

Example 21

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 33. The formulations was printed as flexural bars, and aged over 24 hours at 90° C.

TABLE 33

| Curable Composition | | |
|---|---|---|
| CONSTITUENT | COMPONENT | WT % |
| Crosslinker | E10BAD | 67.9% |
| Crosslinker | BisGMA | 25.0% |
| Crosslinker | TEGDMA | 5.0% |
| Filler | Aerosil R8200 | 1.0% |
| UV Blocker | Dioxybenzone | 0.1% |
| Photoinitiator | TPO-L | 1.0% |

Example 22

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 34. The formulations was printed as flexural bars, and aged over 24 hours at 90° C.

TABLE 34

| Curable Composition | | |
|---|---|---|
| CONSTITUENT | COMPONENT | WT % |
| Crosslinker | E10BAD | 66.4% |
| Crosslinker | BisGMA | 30.0% |
| Filler | Aerosil R8200 | 2.5% |
| UV Blocker | Dioxybenzone | 0.1% |
| Photoinitiator | TPO-L | 1.0% |

Example 23

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 35. The formulations was printed as flexural bars, and aged over 24 hours at 90° C.

TABLE 35

| Curable Composition | | |
|---|---|---|
| CONSTITUENT | COMPONENT | WT % |
| Crosslinker | E10BAD | 67.9% |
| Crosslinker | BisGMA | 30.0% |
| Filler | Aerosil R8200 | 1.0% |
| UV Blocker | Dioxybenzone | 0.1% |
| Photoinitiator | TPO-L | 1.0% |

Example 24

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 36. The formulations was printed as flexural bars, and aged over 24 hours at 90° C.

TABLE 36

| Curable Composition | | |
|---|---|---|
| CONSTITUENT | COMPONENT | WT % |
| Crosslinker | E10BAD | 62.9% |
| Crosslinker | BisGMA | 35.0% |
| Filler | Aerosil R8200 | 1.0% |
| UV Blocker | Dioxybenzone | 0.1% |
| Photoinitiator | TPO-L | 1.0% |

Example 25

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 37. The formulations was printed as flexural bars, and aged over 24 hours at 90° C.

TABLE 37

| Curable Composition | | |
|---|---|---|
| CONSTITUENT | COMPONENT | WT % |
| Crosslinker | E10BAD | 72.9% |
| Crosslinker | BisGMA | 25.0% |
| Pigment | $TiO_2$ Rutile 2558 | 1.0% |
| UV Blocker | Dioxybenzone | 0.1% |
| Photoinitiator | TPO-L | 1.0% |

Example 26

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 38. The formulations was printed as flexural bars, and aged over 24 hours at 90° C.

TABLE 38

| Curable Composition | | |
|---|---|---|
| CONSTITUENT | COMPONENT | WT % |
| Crosslinker | E10BAD | 58.9% |
| Crosslinker | BisGMA | 40.0% |
| Pigment | $TiO_2$ Rutile 2558 | 0.05% |
| UV Blocker | Dioxybenzone | 0.10% |
| Photoinitiator | TPO-L | 1.0% |

Example 27

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 39. The formulations was printed as flexural bars, and aged over 24 hours at 90° C.

TABLE 39

| Curable Composition | | |
|---|---|---|
| CONSTITUENT | COMPONENT | WT % |
| Crosslinker | E10BAD | 53.9% |
| Crosslinker | BisGMA | 45.0% |
| Pigment | $TiO_2$ Rutile 2558 | 0.03% |
| UV Blocker | Dioxybenzone | 0.10% |
| Photoinitiator | TPO-L | 1.0% |

Example 28

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 40. The formulations was printed as flexural bars, and aged over 24 hours at 90° C.

TABLE 40

| Curable Composition | | |
|---|---|---|
| CONSTITUENT | COMPONENT | WT % |
| Crosslinker | E10BAD | 58.9% |
| Crosslinker | BisGMA | 40.0% |
| Pigment | $TiO_2$ Rutile 2558 | 0.01% |
| UV Blocker | Dioxybenzone | 0.10% |
| Photoinitiator | TPO-L | 1.0% |

Example 29

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 41. The formulations was printed as flexural bars, and aged over 24 hours at 90° C.

TABLE 41

| Curable Composition | | |
|---|---|---|
| CONSTITUENT | COMPONENT | WT % |
| Crosslinker | E10BAD | 68.9% |
| Crosslinker | BisGMA | 30.0% |
| Pigment | $TiO_2$ Rutile 2558 | 0.01% |
| UV Blocker | Dioxybenzone | 0.10% |
| Photoinitiator | TPO-L | 2.0% |

Example 30

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 42. The formulations was printed as flexural bars, and aged over 24 hours at 90° C.

TABLE 42

| Curable Composition | | |
|---|---|---|
| CONSTITUENT | COMPONENT | WT % |
| Crosslinker | UDMA - Exo 8 | 25.0% |
| Crosslinker | BisGMA | 5.0% |
| Crosslinker | TEGDMA | 10.0% |
| Crosslinker | EBPADM | 57.4% |
| Pigment | $TiO_2$ Rutile 2558 | 0.01% |
| UV Blocker | Dioxybenzone | 0.10% |
| Photoinitiator | TPO-L | 2.5% |

Example 31

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 43. The formulations was printed as flexural bars, and aged over 24 hours at 90° C.

TABLE 43

| Curable Composition | | |
|---|---|---|
| CONSTITUENT | COMPONENT | WT % |
| Crosslinker | UDMA - Exo 8 | 50.0% |
| Crosslinker | BisGMA | 5.0% |
| Crosslinker | TEGDMA | 10.0% |
| Crosslinker | EBPADM | 32.4% |
| Pigment | $TiO_2$ Rutile 2558 | 0.01% |
| UV Blocker | Dioxybenzone | 0.10% |
| Photoinitiator | TPO-L | 2.5% |

Example 32

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 44. The formulations was printed as flexural bars, and aged over 24 hours at 90° C.

TABLE 44

| Curable Composition | | |
|---|---|---|
| CONSTITUENT | COMPONENT | WT % |
| Crosslinker | UDMA - Exo 8 | 50.0% |
| Crosslinker | BisGMA | 5.0% |
| Crosslinker | HDDA (1,6-Hexanediol diacrylate) | 10.0% |
| Crosslinker | EBPADM | 32.4% |
| Pigment | $TiO_2$ Rutile 2558 | 0.01% |
| UV Blocker | Dioxybenzone | 0.10% |
| Photoinitiator | TPO-L | 2.5% |

Example 33

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 45. The formulations was printed as flexural bars, and aged over 24 hours at 90° C.

TABLE 45

| Curable Composition | | |
|---|---|---|
| CONSTITUENT | COMPONENT | WT % |
| Crosslinker | UDMA - Exo 8 | 50.0% |
| Filler | SG-BAG700GBFCMP5 | 5.0% |
| Crosslinker | HDDA | 10.0% |
| Crosslinker | EBPADM | 32.4% |
| Pigment | $TiO_2$ Rutile 2558 | 0.01% |
| UV Blocker | Dioxybenzone | 0.10% |
| Photoinitiator | TPO-L | 2.5% |

Example 34

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 46. The formulations was printed as flexural bars, and aged over 24 hours at 90° C.

TABLE 46

| Curable Composition | | |
|---|---|---|
| CONSTITUENT | COMPONENT | WT % |
| Crosslinker | UDMA - Exo 8 | 35.0% |
| Crosslinker | BisGMA | 5.0% |
| Filler | SG-25SRG2000CMP5 | 20.0% |
| Crosslinker | HDDA | 15.0% |
| Crosslinker | EBPADM | 22.4% |
| UV Blocker | Dioxybenzone | 0.10% |
| Photoinitiator | TPO-L | 2.5% |

Example 35

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 47. The formulations was printed as flexural bars, and aged over 24 hours at 90° C.

TABLE 47

| Curable Composition | | |
|---|---|---|
| CONSTITUENT | COMPONENT | WT % |
| Crosslinker | UDMA - Exo 8 | 50.0% |
| Crosslinker | BisGMA | 10.0% |
| Crosslinker | HDDA | 15.0% |
| Crosslinker | EBPADM | 22.4% |
| Pigment | $TiO_2$ Rutile 2558 | 0.01% |
| UV Blocker | Dioxybenzone | 0.10% |
| Photoinitiator | TPO-L | 2.5% |

Example 36

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 48. The formulations was printed as flexural bars, and aged over 24 hours at 90° C.

TABLE 48

| Curable Composition | | |
|---|---|---|
| CONSTITUENT | COMPONENT | WT % |
| Crosslinker | UDMA - Exo 8 | 45.0% |
| Crosslinker | BisGMA | 5.0% |
| Crosslinker | HDDA | 15.0% |
| Crosslinker | EBPADM | 22.4% |
| Filler | ESST 2 um BBAS Glass | 10.0% |
| UV Blocker | Dioxybenzone | 0.10% |
| Photoinitiator | TPO-L | 2.5% |

Example 37

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 49. The formulations was printed as flexural bars, and aged over 24 hours at 90° C.

TABLE 49

| Curable Composition | | |
|---|---|---|
| CONSTITUENT | COMPONENT | WT % |
| Crosslinker | DDDMA | 60.0% |
| Crosslinker | BisGMA | 10.0% |
| Crosslinker | EBPADM | 27.4% |
| Pigment | $TiO_2$ Rutile 2558 | 0.01% |
| UV Blocker | Dioxybenzone (UV Blocker) | 0.10% |
| Photoinitiator | TPO-L | 2.5% |

Example 38

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 50. The formulations was printed as flexural bars, and aged over 24 hours at 90° C.

TABLE 50

| Curable Composition | | |
|---|---|---|
| CONSTITUENT | COMPONENT | WT % |
| Crosslinker | DDDMA | 25.0% |
| Crosslinker | BisGMA | 10.0% |
| Crosslinker | E6BAD | 20.0% |
| Crosslinker | EBPADM | 42.4% |
| Pigment | $TiO_2$ Rutile 2558 | 0.01% |
| UV Blocker | Dioxybenzone | 0.10% |
| Photoinitiator | TPO-L | 2.5% |

Example 39

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 51. The formulations was printed as flexural bars, and aged over 24 hours at 90° C.

TABLE 51

| Curable Composition | | |
|---|---|---|
| CONSTITUENT | COMPONENT | WT % |
| Crosslinker | DDDMA | 25.0% |
| Crosslinker | BisGMA | 10.0% |
| Crosslinker | Ebecryl 8402 | 30.0% |
| Crosslinker | EBPADM | 32.4% |
| Pigment | $TiO_2$ Rutile 2558 | 0.01% |
| UV Blocker | Dioxybenzone | 0.10% |
| Photoinitiator | TPO-L | 2.5% |

Example 40

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 52. The formulations was printed as flexural bars, and aged over 24 hours at 90° C.

TABLE 52

| Curable Composition | | |
|---|---|---|
| CONSTITUENT | COMPONENT | WT % |
| Crosslinker | DDDMA | 32.0% |
| Crosslinker | BisGMA | 15.0% |
| Crosslinker | Ebecryl 8402 | 35.0% |
| Crosslinker | EBPADM | 15.4% |
| Pigment | $TiO_2$ Rutile 2558 | 0.01% |
| UV Blocker | Dioxybenzone | 0.10% |
| Photoinitiator | TPO-L | 2.5% |

Example 41

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 53. The formulations was printed as flexural bars, and aged over 24 hours at 90° C.

TABLE 53

| Curable Composition | | |
|---|---|---|
| CONSTITUENT | COMPONENT | WT % |
| Crosslinker | DDDMA | 25.0% |
| Crosslinker | BisGMA | 15.0% |
| Crosslinker | Ebecryl 8402 | 37.0% |
| Photoinitiator | AIBN (Azobisisobutyronitrile) | 0.5% |
| Crosslinker | EBPADM | 15.4% |
| UV Blocker | Dioxybenzone | 0.10% |
| Photoinitiator | TPO-L | 1.0% |

Example 42

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 54. The formulations was printed as flexural bars, and aged over 24 hours at 90° C.

TABLE 54

| Curable Composition | | |
|---|---|---|
| CONSTITUENT | COMPONENT | WT % |
| Crosslinker | DDDMA | 15.0% |
| Crosslinker | BisGMA | 15.0% |
| Crosslinker | Ebecryl 8402 | 35.0% |
| Crosslinker | EBPADM | 26.9% |
| Pigment | $TiO_2$ Rutile 2558 | 0.01% |
| UV Blocker | Dioxybenzone | 0.15% |
| Photoinitiator | TPO-L | 2.0% |

Example 43

Crosslinker-Containing Compositions

This example overviews a curable composition with high crosslinker content. The curable composition can be utilized by a variety of printing platforms, including DLP and hot SLA/DLP printing methods using ranges of light engine systems. The appearance and color of the composition is optimized for neutral aesthetics and 3D scanner compatibility with intraoral scanners such as the iTero® system. The curable composition is outlined in TABLE 55. The formulations was printed as flexural bars, and aged over 24 hours at 90° C.

TABLE 55

| Curable Composition | | |
|---|---|---|
| CONSTITUENT | COMPONENT | WT % |
| Crosslinker | DDDMA | 15.0% |
| Crosslinker | BisGMA | 15.0% |
| Crosslinker | Ebecryl 8402 | 35.0% |
| Crosslinker | EBPADM | 26.9% |
| Pigment | $TiO_2$ Rutile 2558 | 0.01% |
| UV Blocker | Dioxybenzone | 0.150% |
| Photoinitiator | TPO-L | 3.0% |

Example 44

Crosslinker-Containing Compositions

This example overviews two curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions, which each contained 4 crosslinking monomers, $TiO_2$ pigment, and photoinitiators optimized for printing using high-intensity light sources centered around 365 nm, are outlined in TABLES 56-57.

The curable composition of TABLE 56 was used for an initial feasibility study with 3 doctors and around 15 patients. This formulation was scaled-up and further optimized for higher-throughput printing. The appearances of the formulations were optimized for scannability and neutral appearance important for many intraoral applications. The curable composition of TABLE 57 further comprised a siloxane wetting agent to enhance printability through modification of the surface energy of the resin with respect to the printing/contact substrate.

TABLE 56

| Curable Composition | | |
|---|---|---|
| CONSTITUENT | COMPONENT | WT % |
| Crosslinker | Decanediol dimethacrylate (DDDMA) | 15.8 |
| Crosslinker | Bisphenol a-glycidyl methacrylate (BisGMA) | 15.8 |
| Crosslinker | Ethoxylated Bisphenol A Dimethacrylate (EBPADM) | 36.8 |
| Crosslinker | EBECRYL ® 8409 | 28.3 |
| Pigment | $TiO_2$ | 0.01 |
| UV Blocker | Dioxybenzone | 0.15 |
| Photoinitiator | 2,4,6-trimethylbenzoyldiphenyl phosphine oxide | 3.14 |

TABLE 57

| Curable Composition | | |
|---|---|---|
| CONSTITUENT | COMPONENT | WT % |
| Crosslinker | Decanediol dimethacrylate (DDDMA) | 15.6 |
| Crosslinker | Bisphenol a-glycidyl methacrylate (BisGMA) | 15.6 |
| Crosslinker | Ethoxylated Bisphenol A Dimethacrylate (EBPADM) | 36.3 |
| Crosslinker | EBECRYL ® 8409 | 27.9 |
| Pigment | $TiO_2$ | 0.03 |
| Wetting Agent | Polyether-modified polydimethylsiloxane | 0.5 |
| UV Blocker | Dioxybenzone | 0.05 |
| Photoinitiator | phenylbis(2,4,6-trimethylbenzoyl)-phosphine oxide (BAPO) | 1 |
| Photoinitiator | Oligo[2-hydroxy-2-methyl-1-[4-(1-methylvinyl) phenyl]propanone] | 3 |

The curable compositions yielded printed materials with colors defined by L* values between 78 and 87, a* values of between −7 and −3, and b* values of between 8 and 16. The printed materials exhibited strengths of >50 MPa, moduli of >1200 MPa, and strain at break values of >4%.

Example 45

Crosslinker-Containing Compositions

This example overviews two curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions are outlined in TABLES 58-59.

TABLE 58

| Curable Composition | | |
|---|---|---|
| CONSTITUENT | COMPONENT | WT % |
| Crosslinker | DDDMA | 15.0% |
| Crosslinker | BisGMA | 15.0% |
| Crosslinker | BRC-443D | 35.0% |
| Crosslinker | EBPADM | 26.9% |
| Pigment | $TiO_2$ Rutile 2558 | 0.01% |
| UV Blocker | Dioxybenzone | 0.150% |
| Photoinitiator | TPO-L | 3.0% |

TABLE 59

| Curable Composition | | |
|---|---|---|
| CONSTITUENT | COMPONENT | WT % |
| Crosslinker | DDDMA | 15.8% |
| Crosslinker | BisGMA | 15.8% |
| Crosslinker | Ebecryl 8409 | 36.8% |
| Crosslinker | EBPADM | 28.3% |
| Pigment | $TiO_2$ Rutile 2558 | 0.01% |
| Photoinitiator | Omnirad TPO (lot BIG1) | 3.14% |

Example 46

Crosslinker-Containing Compositions

This example overviews two curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions are outlined in TABLES 60-61.

TABLE 60

| Curable Composition | | |
|---|---|---|
| CONSTITUENT | COMPONENT | WT % |
| Crosslinker | DDDMA | 5.0% |
| Crosslinker | BisGMA | 5.0% |
| Crosslinker | Ebecryl 8409 | 48.8% |
| Crosslinker | EBPADM | 20.0% |
| Pigment | $TiO_2$ Rutile 2558 | 0.01% |
| UV Blocker | MG-900 | 0.15% |
| Photoinitiator | Omnirad TPO | 1.00% |
| Filler | SK Barium Glass 0.7 um | 20.0% |

TABLE 61

| Curable Composition | | |
|---|---|---|
| CONSTITUENT | COMPONENT | WT % |
| Crosslinker | DDDMA | 5.0% |
| Crosslinker | BisGMA | 5.0% |
| Crosslinker | Ebecryl 8409 | 42.84% |
| Crosslinker | EBPADM (lot 811-139) | 16.0% |
| Pigment | $TiO_2$ Rutile 2558 | 0.01% |
| UV Blocker | MG-900 (Dioxybenzone) | 0.15% |
| Photoinitiator | Omnirad TPO | 1.00% |
| Filler | SK Barium Glass 0.7 um | 10.0% |
| Filler | SK Barium Glass 2.5 um | 20.0% |

Example 47

Crosslinker-Containing Compositions

This example overviews two curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions are outlined in TABLES 62-63.

TABLE 62

| Curable Composition | | |
|---|---|---|
| CONSTITUENT | COMPONENT | WT % |
| Crosslinker | DDDMA | 7.5% |
| Crosslinker | BisGMA | 5.0% |
| Crosslinker | Ebecryl 8409 | 39.34% |
| Crosslinker | EBPADM | 16.0% |
| Pigment | TiO2 Rutile 2558 | 0.01% |
| UV Blocker | MG-900 | 0.15% |
| Photoinitiator | Omnirad TPO (lot BIG1) | 2.00% |
| Filler | SK Barium Glass 2.5 um | 30.0% |

TABLE 63

| Curable Composition | | |
|---|---|---|
| CONSTITUENT | COMPONENT | WT % |
| Crosslinker | DDDMA | 5.0% |
| Crosslinker | BisGMA | 5.0% |
| Crosslinker | Ebecryl 8409 | 40.97% |
| Crosslinker | EBPADM | 20.0% |
| Pigment | $TiO_2$ Rutile 2558 | 0.01% |
| UV Blocker | MG-1000 | 0.03% |
| Photoinitiator | BAPO, Omnirad 819 | 1.00% |
| Photoinitiator | CHIVACURE 300 | 3.0% |
| Filler | SK Barium Glass 2.5 um | 25.0% |

Example 48

Crosslinker-Containing Compositions

This example overviews two curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions are outlined in TABLES 64-65.

TABLE 64

| Curable Composition | | |
|---|---|---|
| CONSTITUENT | COMPONENT | WT % |
| Crosslinker | DDDMA | 5.0% |
| Crosslinker | BisGMA | 5.0% |
| Crosslinker | Ebecryl 8409 | 47.8% |
| Crosslinker | EBPADM | 20.0% |
| Pigment | $TiO_2$ Rutile 2558 | 0.01% |
| UV Blocker | MG-900 | 0.15% |
| Photoinitiator | Omnirad TPO | 2.00% |
| Filler | Esstech Barium Glass 0.7 um | 20.0% |

TABLE 65

| Curable Composition | | |
|---|---|---|
| CONSTITUENT | COMPONENT | WT % |
| Crosslinker | DDDMA | 6.0% |
| Crosslinker | BisGMA | 6.0% |
| Crosslinker | Ebecryl 8409 | 50.8% |
| Crosslinker | EBPADM | 25.0% |
| Pigment | $TiO_2$ Rutile 2558 | 0.01% |
| UV Blocker | MG-900 | 0.15% |

TABLE 65-continued

| Curable Composition | | |
|---|---|---|
| CONSTITUENT | COMPONENT | WT % |
| Photoinitiator | Omnirad TPO | 2.00% |
| Filler | Esstech Barium Glass 0.7 um | 10.0% |

Example 49

Crosslinker-Containing Compositions

This example overviews two curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions are outlined in TABLES 66-67.

TABLE 66

| Curable Composition | | |
|---|---|---|
| CONSTITUENT | COMPONENT | WT % |
| Crosslinker | DDDMA | 5.0% |
| Crosslinker | BisGMA | 5.0% |
| Crosslinker | Ebecryl 8409 | 42.8% |
| Crosslinker | EBPADM | 20.0% |
| Pigment | TiO2 Rutile 2558 | 0.01% |
| UV Blocker | MG-900 | 0.15% |
| Photoinitiator | Omnirad TPO | 2.00% |
| Filler | SK Barium Glass 0.7 um | 25.0% |

TABLE 67

| Curable Composition | | |
|---|---|---|
| CONSTITUENT | COMPONENT | WT % |
| Crosslinker | DDDMA | 6.0% |
| Crosslinker | BisGMA | 6.0% |
| Crosslinker | Ebecryl 8409 | 50.8% |
| Crosslinker | EBPADM | 25.0% |
| Pigment | $TiO_2$ Rutile 2558 | 0.01% |
| UV Blocker | MG-900 | 0.15% |
| Photoinitiator | Omnirad TPO | 2.00% |
| Filler | Esstech Barium Glass 0.7 um | 10.0% |

Example 50

Crosslinker-Containing Compositions

This example overviews two curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions are outlined in TABLES 68-69.

TABLE 68

| Curable Composition | | |
|---|---|---|
| CONSTITUENT | COMPONENT | WT % |
| Crosslinker | DDDMA | 5.0% |
| Crosslinker | BisGMA | 5.0% |
| Crosslinker | Ebecryl 8409 | 45.8% |
| Crosslinker | EBPADM | 20.0% |
| Pigment | $TiO_2$ Rutile 2558 | 0.01% |
| UV Blocker | MG-900 | 0.15% |
| Photoinitiator | Omnirad TPO | 2.00% |
| Filler | SK Barium Glass 0.7 um | 22.0% |

TABLE 69

| Curable Composition | | |
|---|---|---|
| CONSTITUENT | COMPONENT | WT % |
| Crosslinker | DDDMA | 5.0% |
| Crosslinker | BisGMA | 5.0% |
| Crosslinker | Ebecryl 8409 | 48.8% |
| Crosslinker | EBPADM | 20.0% |
| Pigment | $TiO_2$ Rutile 2558 | 0.01% |
| UV Blocker | MG-900 | 0.15% |
| Photoinitiator | Omnirad TPO | 2.00% |
| Filler | SK Barium Glass 0.7 um | 20.0% |

Example 51

Crosslinker-Containing Compositions

This example overviews two curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions are outlined in TABLES 70-71.

TABLE 70

| Curable Composition | | |
|---|---|---|
| CONSTITUENT | COMPONENT | WT % |
| Crosslinker | DDDMA | 6.0% |
| Crosslinker | BisGMA | 6.0% |
| Crosslinker | Ebecryl 8409 | 50.9% |
| Crosslinker | EBPADM | 25.0% |
| UV Blocker | MG-900 | 0.15% |
| Photoinitiator | Omnirad TPO | 2.00% |
| Filler | SK Barium Glass 0.7 um | 10.0% |

TABLE 71

| Curable Composition | | |
|---|---|---|
| CONSTITUENT | COMPONENT | WT % |
| Crosslinker | DDDMA | 4.82% |
| Crosslinker | BisGMA | 4.82% |
| Crosslinker | Ebecryl 8409 | 47.0% |
| Crosslinker | EBPADM | 19.27% |
| Pigment | $TiO_2$ Rutile 2558 | 0.01% |
| UV Blocker | MG-900 | 0.05% |

TABLE 71-continued

| Curable Composition | | |
|---|---|---|
| CONSTITUENT | COMPONENT | WT % |
| Photoinitiator | BAPO (Omnirad 819) | 1.00% |
| Photoinitiator | Chivacure 300 | 3.00% |
| Filler | SK Barium Glass 0.7 um | 20.0% |

Example 52

Crosslinker-Containing Compositions

This example overviews three curable compositions with high crosslinker content. The curable compositions can be utilized by a variety of printing platforms, including DLP and hot SLA/DLP printing methods using ranges of light engine systems. The appearance and color of the compositions are optimized for neutral aesthetics and 3D scanner compatibility with intraoral scanners such as the iTero® system. The curable compositions are outlined in TABLES 72-74.

TABLE 72

| Curable Composition | | |
|---|---|---|
| CONSTITUENT | COMPONENT | WT % |
| Crosslinker | DDDMA | 4.82% |
| Crosslinker | BisGMA | 4.82% |
| Crosslinker | Ebecryl 8409 | 47.0% |
| Crosslinker | EBPADM | 19.27% |
| Pigment | $TiO_2$ Rutile 2558 | 0.01% |
| UV Blocker | MG-900 | 0.05% |
| Photoinitiator | BAPO (Omnirad 819) | 1.00% |
| Photoinitiator | Chivacure 300 | 3.00% |
| Filler | SK Barium Glass 0.7 um (SG-PZNNAUUAG9) | 20.0% |

TABLE 73

| Curable Composition | | |
|---|---|---|
| CONSTITUENT | COMPONENT | WT % |
| Crosslinker | DDDMA | 4.82% |
| Crosslinker | BisGMA) | 4.82% |
| Crosslinker | Ebecryl 8409 | 47.0% |
| Crosslinker | EBPADM | 19.27% |
| Pigment | TiO2 Rutile 2558 | 0.01% |
| UV Blocker | MG-900 | 0.05% |
| Photoinitiator | BAPO (Omnirad 819) | 1.00% |
| Photoinitiator | Chivacure 300 | 3.00% |
| Filler | SK Barium Glass 0.7 um | 20.0% |

TABLE 74

| Curable Composition | | |
|---|---|---|
| CONSTITUENT | COMPONENT | WT % |
| Crosslinker | DDDMA | 5.0% |
| Crosslinker | BisGMA | 5.0% |
| Crosslinker | Ebecryl 8409 | 48.8% |
| Crosslinker | EBPADM | 20.0% |
| Pigment | $TiO_2$ Rutile 2558 | 0.01% |
| UV Blocker | MG-900 | 0.15% |
| Photoinitiator | Omnirad TPO | 2.00% |
| Filler | Admatech 0.5 um | 20.0% |

Example 53

Treatment Using an Orthodontic Appliance

This example describes the use of a directly 3D printed orthodontic appliance to move a patient's teeth according to a treatment plan. This example also describes the characteristics that the orthodontic appliance can have following its use, in contrast to its characteristics prior to use.

A patient in need of, or desirous of, a therapeutic treatment to rearrange at least one tooth has their teeth arrangement assessed. An orthodontic treatment plan is generated for the patient. The orthodontic treatment plan comprises a plurality of intermediate tooth arrangements for moving teeth along a treatment path, from the initial arrangement (e.g., that which was initially assessed) toward a final arrangement. The treatment plan includes the use of an orthodontic appliance, fabricated using photo-curable resins and methods disclosed further herein, to provide orthodontic appliances having low levels of hydrogen bonding units. In some embodiments, a plurality of orthodontic appliances is used, each of which can be fabricated using the photo-curable resins comprising one or more polymerizable compounds and methods disclosed further herein.

The orthodontic appliances are provided, and iteratively applied to the patient's teeth to move the teeth through each of the intermediate tooth arrangements toward the final arrangement. The patient's tooth movement is tracked. A comparison is made between the patient's actual teeth arrangement and the planned intermediate arrangement. Where the patient's teeth are determined to be tracking according to the treatment plan, but have not yet reached the final arrangement, the next set of appliances can be administered to the patient. The threshold difference values of a planned position of teeth to actual positions selected as indicating that a patient's teeth have progressed on-track are provided above in TABLE 12. If a patient's teeth have progressed at or within the threshold values, the progress is considered to be on-track. Favorably, the use of the appliances disclosed herein increases the probability of on-track tooth movement.

The assessment and determination of whether treatment is on-track can be conducted, for example, 1 week (7 days) following the initial application of an orthodontic appliance. Following this period of application, additional parameters relating to assessing the durability of the orthodontic appliance can also be conducted. For example, relative repositioning force (compared to that which was initially provided by the appliance), remaining flexural stress, relative flexural modulus, and relative elongation at break can be determined.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by some embodiments, exemplary embodiments and optional features, modification and variation of the concepts herein disclosed may be resorted to by those skilled in the art, and that such modifications and variations are considered to be within the scope of this invention as defined by the appended claims. The specific embodiments provided herein are examples of useful embodiments of the present invention and it will be apparent to one skilled in the art that the present invention may be carried out using a large number of variations of the devices, device components, methods steps set forth in the present description. As will be obvious to one of skill in the art, methods and devices useful for the present methods can include a large number of optional composition and processing elements and steps.

What is claimed is:

1. A curable composition for additive manufacturing, the curable composition comprising:

a plurality of polymerizable monomers, which polymerizable monomers comprise at least 80 wt % of a crosslinker; and at least 10 wt % of a filler material, wherein the crosslinker comprises:

a first crosslinker having the following structure (I):

$$Y^1—X^1\text{-}L^1\text{-}A\text{-}L^2\text{-}X^2—Y^2, \qquad (I)$$

wherein:

A is a cycloalkylene, alkylenecycloalkylene, alkylenecycloalkylencalkylene heterocycloalkylene, arylene, heteroarylene, alkylenearylene or alkylenearylenealkylene group;

$L^1$ and $L^2$ are independently an amide, ether, ester, carbonate, urethane or urea linkage;

$X^1$ and $X^2$ are independently an alkylene or heteroalkene linker; and $Y^1$ and $Y^2$ are independently a polymerizable functional group, and a second crosslinker having the following structure (II):

$$Y^3—X^3\text{-}L^3\text{-}B\text{-}L^4\text{-}X^4—Y^3, \qquad (II)$$

wherein:

B is a linear or branched alkylene or heteroalkylene group;

$L^3$ and $L^4$ are independently an optional amide, ether, ester, carbonate, urethane or urea linkage;

$X^3$ and $X^4$ are independently an optional alkylene or heteroalkene linker; and $Y^3$ and $Y^4$ are independently a polymerizable functional group.

2. A curable composition comprising:

a plurality of polymerizable monomers, which polymerizable monomers comprise at least 80 wt % of a crosslinker; and at least 0.5 wt % of a wetting agent, wherein the crosslinker comprises:

a first crosslinker having the following structure (I):

$$Y^1—X^1\text{-}L^1\text{-}A\text{-}L^2\text{-}X^2—Y^2, \qquad (I)$$

wherein:

A is a cycloalkylene, alkylenecycloalkylene, alkylenecycloalkylenealkylene heterocycloalkylene, arylene, heteroarylene, alkylenearylene or alkylenearylenealkylene group;

$L^1$ and $L^2$ are independently an amide, ether, ester, carbonate, urethane or urea linkage;

$X^1$ and $X^2$ are independently an alkylene or heteroalkene linker; and $Y^1$ and $Y^2$ are independently a polymerizable functional group, and a second crosslinker having the following structure (II):

$$Y^3—X^3\text{-}L^3\text{-}B\text{-}L^4\text{-}X^4—Y^3, \qquad (II)$$

wherein:

B is a linear or branched alkylene or heteroalkylene group;

$L^3$ and $L^4$ are independently an optional amide ether ester, carbonate, urethane or urea linkage;

$X^3$ and $X^4$ are independently an optional alkylene or heteroalkene linker; and $Y^3$ and $Y^4$ are independently a polymerizable functional group.

3. A curable composition comprising:

a plurality of polymerizable monomers, which polymerizable monomers comprise at least 80 wt % of a crosslinker;

wherein the curable composition is configured to develop a color defined by an L* value between 70 and 95, an a* value of between −11 and 1, and a b* value of between 2 and 22 upon curing, and wherein the crosslinker comprises:

a first crosslinker having the following structure (I):

$$Y^1—X^1\text{-}L^1\text{-}A\text{-}L^2\text{-}X^2—Y^2, \quad (I)$$

wherein:

A is a cycloalkylene, alkylenecycloalkylene, alkylenecycloalkylenealkylene heterocycloalkylene, arylene, heteroarylene, alkylenearylene or alkylenearylenealkylene group;

$L^1$ and $L^2$ are independently an amide, ether, ester, carbonate, urethane or urea linkage;

$X^1$ and $X^2$ are independently an alkylene or heteroalkene linker; and $Y^1$ and $Y^2$ are independently a polymerizable functional group, and a second crosslinker having the following structure (II):

$$Y^3—X^3\text{-}L^3\text{-}B\text{-}L^4\text{-}X^4—Y^3, \quad (II)$$

wherein:

B is a linear or branched alkylene or heteroalkylene group;

$L^3$ and $L^4$ are independently an optional amide, ether, ester, carbonate, urethane or urea linkage;

$X^3$ and $X^4$ are independently an optional alkylene or heteroalkene linker; and $Y^3$ and $Y^4$ are independently a polymerizable functional group.

4. The curable composition of claim 1, wherein the crosslinker is at least 90 wt % of the polymerizable monomers.

5. The curable composition of claim 1, wherein the crosslinker is at least 95 wt % of the polymerizable monomers.

6. The curable composition of claim 1, wherein the crosslinker comprises a plurality of crosslinkers with different molecular weights.

7. The curable composition of claim 1, wherein between 50 and 100 wt % of the crosslinker comprise two polymerizable functional groups.

8. The curable composition of claim 1, wherein between 50 and 100 wt % of the crosslinker comprise at least 14 atoms between polymerizable functional groups.

9. The curable composition of claim 1, wherein the curable composition is photocurable, chemically curable, thermocurable, or any combination thereof.

10. The curable composition of claim 1, wherein the curable composition is photocurable.

11. The curable composition of claim 1, wherein between 50 and 100 mol percent of functional groups of the plurality of polymerizable monomers are ethylenically unsaturated functional groups.

12. The curable composition of claim 1, wherein between 50 and 100 mol percent of functional groups of the plurality of polymerizable monomers are acrylate, methacrylate, or a combination thereof.

13. The curable composition of claim 1, wherein between 50 and 100 wt % of the polymerizable monomers comprise a molecular weight of at least 250 Da.

14. The curable composition of claim 1, wherein the filler material comprises a silica, a glass, a radiopaque material, a ceramic, a metal, a metal oxide, a crystal, a pre-polymerized species or any combination thereof.

15. The curable composition of claim 1, wherein the curable composition comprises between 10 and 60 wt % of the filler material.

16. The curable composition of claim 1, wherein the curable composition comprises between 10 and 20 wt % of the filler material.

17. The curable composition of claim 1, wherein the curable composition comprises between about 60 wt % and about 90 wt % of the polymerizable monomers.

18. The curable composition of claim 1, further comprising a wetting agent.

19. The curable composition of claim 1, wherein the wetting agent comprises a siloxane.

20. The curable composition of claim 1, further comprising a pigment.

21. The curable composition of claim 20, wherein the pigment is inorganic or organometallic.

22. The curable composition of claim 1, further comprising a photoinitiator.

23. The curable composition of claim 22, wherein the photoinitiator comprises an oligomer or a polymer.

24. The curable composition of claim 1, wherein the curable composition is configured to develop a color defined by an L* value between 70 and 95, an a* value of between −11 and 1, and a b* value of between 2 and 22 upon curing.

25. The curable composition of claim 1, wherein the curable composition is configured to develop a color defined by an L* value between 78 and 87, an a* value of between −7 and −3, and a b* value of between 8 and 16 upon curing.

26. The curable composition of claim 1, wherein:

1) A has one of the following structures:

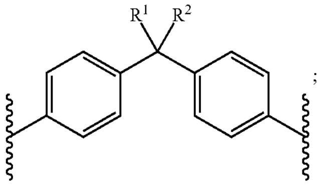
;
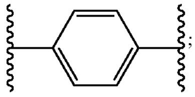
;
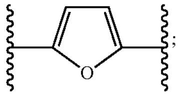
;
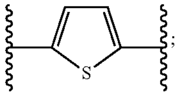
;
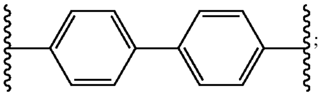
;
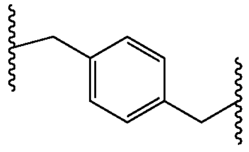
or
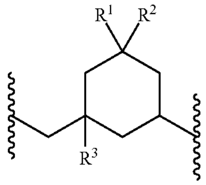
; and 2) B has one of the following structures:
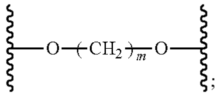;
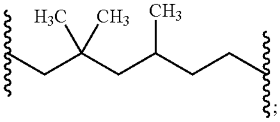;
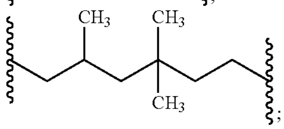;
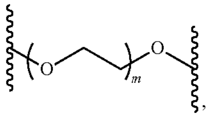,
wherein m is an integer from 1 to 20.
* * * * *